(12) United States Patent
Taylor

(10) Patent No.: US 7,897,048 B2
(45) Date of Patent: Mar. 1, 2011

(54) MEMBRANE BIOREACTOR AND SEWAGE TREATMENT METHOD

(75) Inventor: Anthony Patrick Andrew Taylor, New South Wales (AU)

(73) Assignee: Australian Nuclear Science and Technology Organisation, New South Wales (AU)

( * ) Notice: Subject to any disclaimer, the term of this patent is extended or adjusted under 35 U.S.C. 154(b) by 323 days.

(21) Appl. No.: 12/093,847

(22) PCT Filed: Nov. 17, 2006

(86) PCT No.: PCT/AU2006/001728
§ 371 (c)(1),
(2), (4) Date: Oct. 9, 2008

(87) PCT Pub. No.: WO2007/056818
PCT Pub. Date: May 24, 2007

(65) Prior Publication Data
US 2009/0250394 A1    Oct. 8, 2009

(30) Foreign Application Priority Data
Nov. 17, 2005    (AU) ................................. 2005906407

(51) Int. Cl.
*C02F 3/00*    (2006.01)
(52) U.S. Cl. .......... 210/615; 210/620; 210/150; 210/151; 210/220; 210/500.21; 210/505; 435/252.1
(58) Field of Classification Search ................. 210/615, 210/620, 150–151, 220, 500.21, 505; 435/252.1
See application file for complete search history.

(56) References Cited

U.S. PATENT DOCUMENTS

| 5,116,506 | A | 5/1992 | Williamson et al. |
| 5,833,896 | A | 11/1998 | Jacobs et al. |
| 5,945,002 | A | 8/1999 | Leukes et al. |
| 6,387,262 | B1 * | 5/2002 | Rittmann et al. ........ 210/321.89 |
| 2002/0139747 | A1 | 10/2002 | Gantzer |
| 2003/0104192 | A1 | 6/2003 | Hester et al. |

FOREIGN PATENT DOCUMENTS

| EP | 0 761 608 A2 | 3/1997 |
| EP | 1 647 530 A1 | 4/2006 |
| JP | 46-24688 * | 7/1971 |
| JP | 2002-85050 | 3/2002 |
| JP | 2003251381 * | 9/2003 |
| JP | 2003251381 A * | 9/2003 |
| JP | 2005-034069 | 2/2005 |
| WO | WO 89/00188 | 1/1989 |

(Continued)

OTHER PUBLICATIONS

Derwent Accession No. 1971-47314S, English Abstract of JP 46-24688 B (1971).*

(Continued)

*Primary Examiner* — Chester T Barry
(74) *Attorney, Agent, or Firm* — Stephen A. Bent; Foley & Lardner LLP

(57) ABSTRACT

The present invention discloses a membrane, optionally for use in sewage treatment. The membrane comprises a support membrane having a gas face biolayer on a gas face of the membrane and/or in the support membrane near the gas face, and a liquid face biolayer on a liquid face of the membrane and/or in the support membrane near the liquid face.

34 Claims, 100 Drawing Sheets

FOREIGN PATENT DOCUMENTS

| WO | WO 9002170 A1 * | 3/1990 |
|---|---|---|
| WO | WO 02/10077 A1 | 2/2002 |
| WO | WO 02/094979 A2 | 11/2002 |
| WO | WO 03/072513 A1 | 9/2003 |
| WO | WO 2005/016498 A1 | 2/2005 |
| WO | WO 2005/111193 A1 | 11/2005 |

OTHER PUBLICATIONS

K. Brindle et al., "Nitrification in a Bubbleless Oxygen Mass Transfer Membrane Bioreactor", Wat. Sci. Tech. vol. 34, No. 9, pp. 261-267, 1996.

K. Brindle et al., "Enhanced biological treatment of high oxygen demanding wastewaters by a membrane bioreactor capable of bubbleless oxygen mass transfer", Proc. Weftec. 97 Chicago Oct. 18-22, 63-72, 1997.

Kazuaki Hibiya et al., "Simultaneous nitrification and denitrification by controlling vertical and horizontal microenvironment in a membrane-aerated biofilm reactor", Journal of Biotechnology 100 (2003) 23-32.

C.M. Ho et al., "Autotrophic denitrification via a biofilm growing on a gas-permeable silicon tube", Zhongguo Huanjing Gongcheng Xuekan 12 (4): 307-313 (2002).

A. Ogawa et al., "Production of Kojic Acid From *Aspergillus oryzae* Var.*oryzae* by Membrane-Surface Liquid Culture", Biotechnology Techniques, vol. 9, No. 2 (Feb. 1995) pp. 153-156.

Akinori Ogawa et al., "Production of Neutral Protease by Membrane-Surface Liquid Culture of *Aspergillus oryzae* IAM2704", Journal of Fermentation and Bioengineering, vol. 80, No. 1, 35-40, 1995.

Akinori Ogawa et al., "Production of Kojic Acid by Membrane-Surface Liquid Culture of *Aspergillus oryzae* NRRL484", Journal of Fermenation and Bioengineering, vol. 80, No. 1, 41-45,1995.

Senay Yalcin, "Effectiveness Factors for Hollow Fiber Biofilm Reactors", Proc. of Int. Conf. Mathematics and Eng. Techniq. In Med. and Biol Sci. Las Vegas USA, Jun. 25-28, 2001, 304-310.

Kazuaki Yamagiwa et al., "Simultaneous Organic Carbon Removal and Dentrification by Biofilm Formed on Oxygen Enriched Membrane", Journal of Chemical Engineering of Japan, 27(5): 638-643 (1994).

A. Yasuhara et al., "Production of Neutral Protease From *Aspergillus oryzae* by a Novel Culture Method on a Microporous Membrane", Biotechnology Techniques, vol. 8, No. 4, (Apr. 1994) pp. 249-254.

Derwent Abstract Accession No. 2006-247652/26, and JP 2006-087310 A (Dokuritsu Gyosei Hojin Kokuriitsu Kenko) Apr. 6, 2006.

Derwent Abstract Accession No. 2005-799127/82 and CN 1648071 A (Ecological Environment Res Cen) Aug. 3, 2005.

Akihiko Terada et al., "Sequencing Batch Membrane Biofilm Reactor for Simultaneous Nitrogen and Phosphorus Removal: Novel Application of Membrane-Aerated Biofilm", Biotechnology and Bioengineering, Wiley & Sons, Hoboken NJ, US, vol. 94, No. 4, Jul. 5, 2006 pp. 730-739.

* cited by examiner

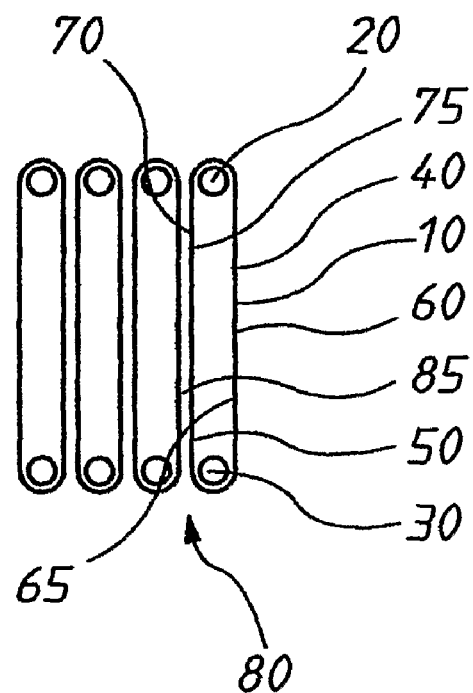
FIG. 3
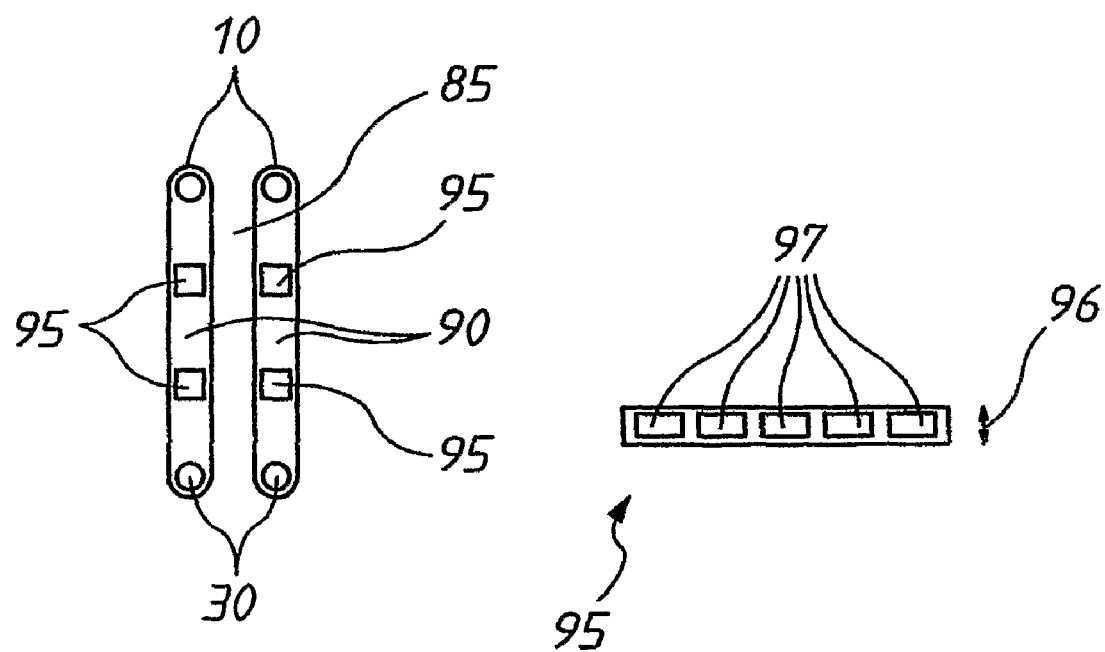
FIG. 3a
FIG. 3b

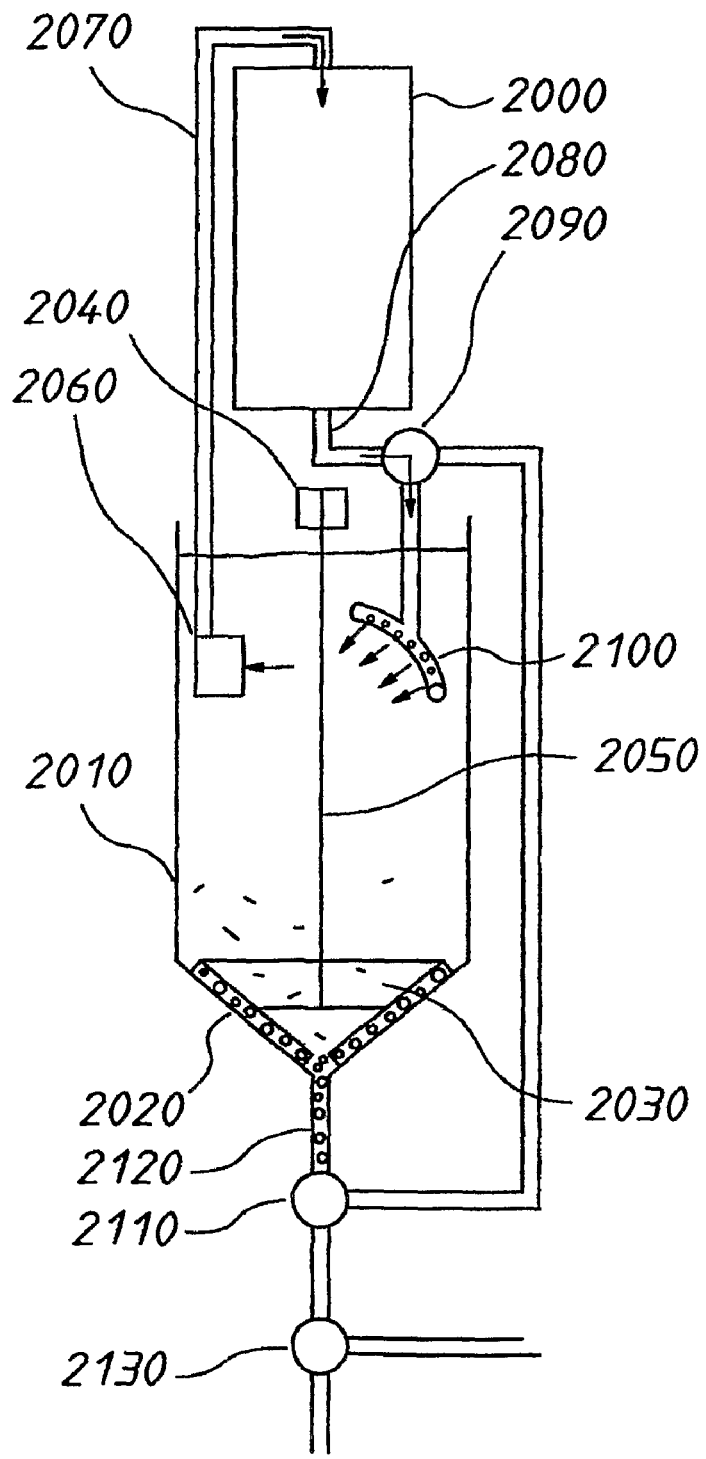
FIG. 10D(ii)

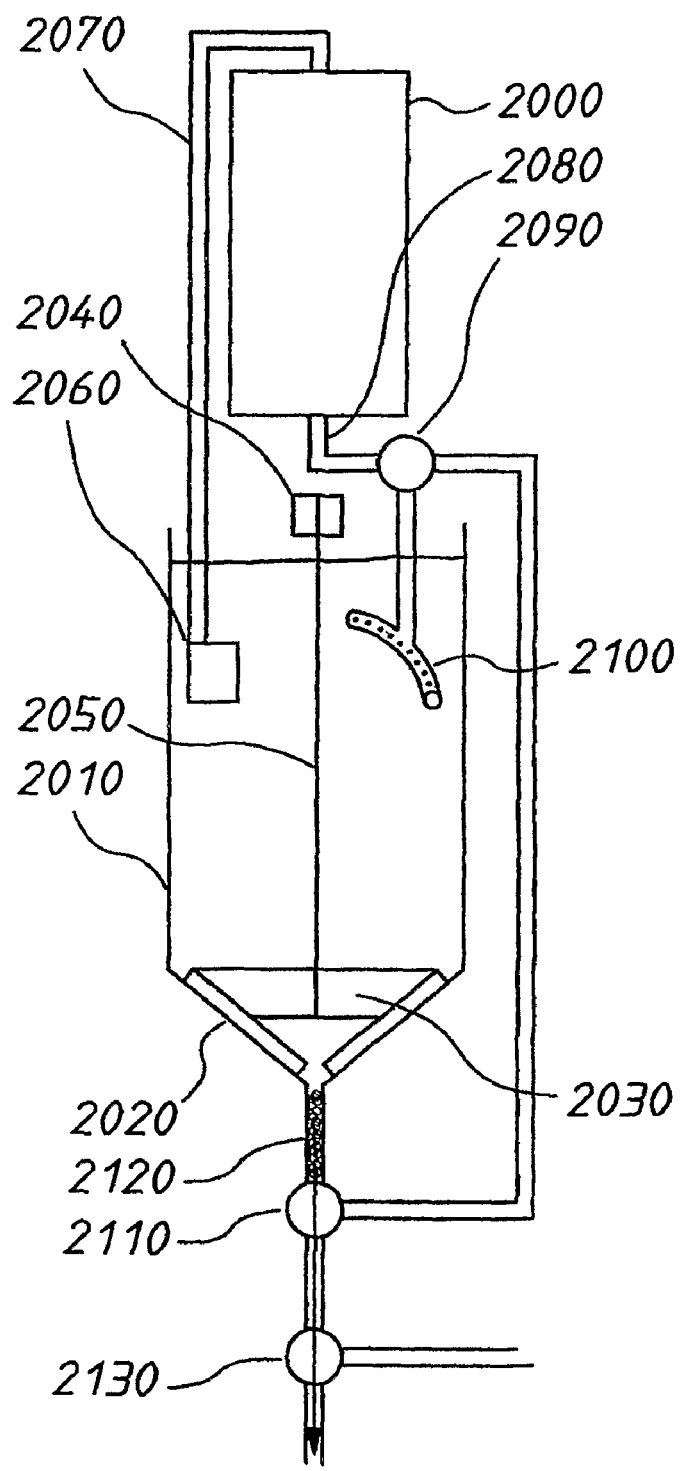
FIG. 10D(iii)

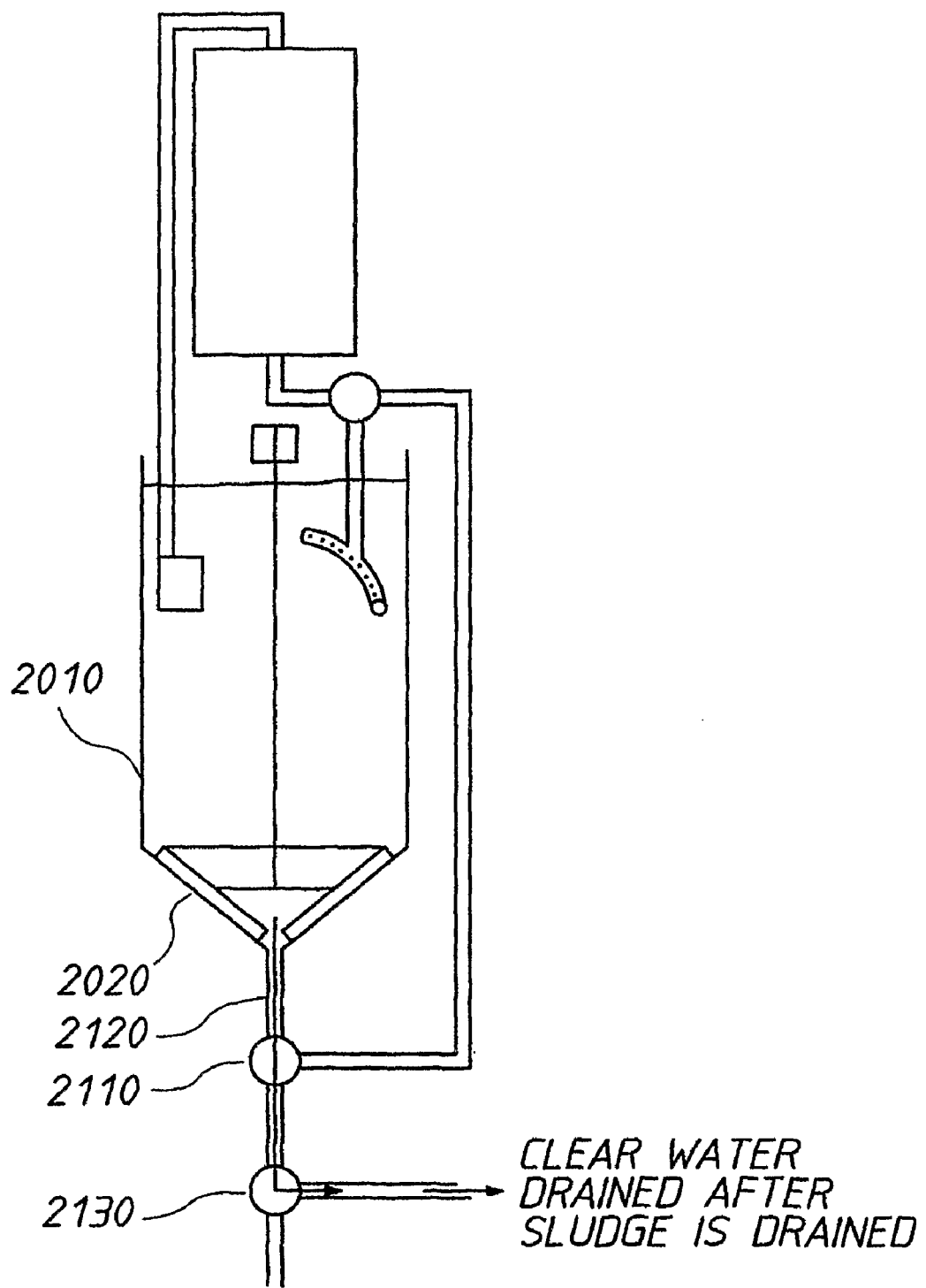
FIG. 10D(iv)

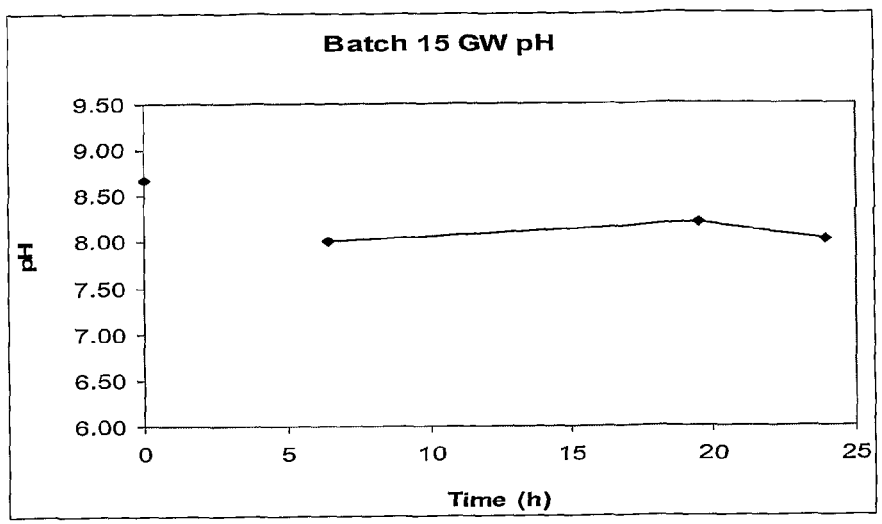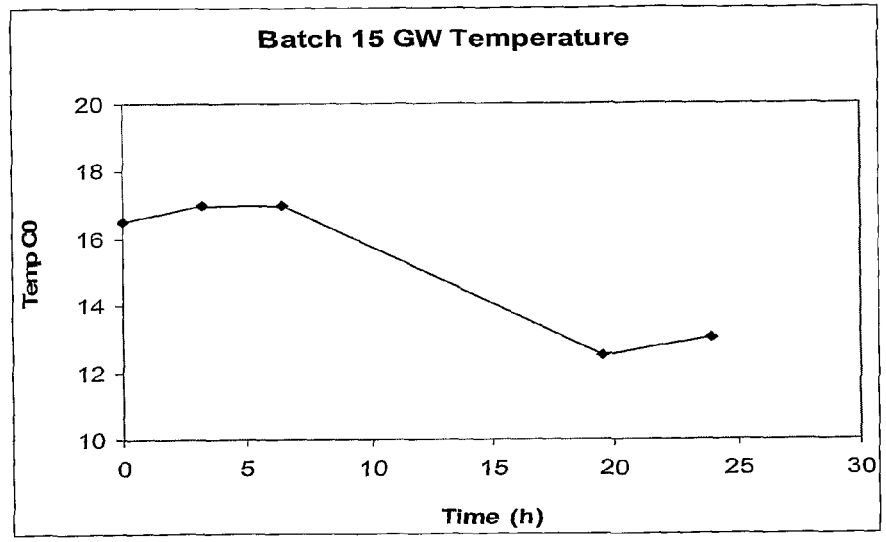
FIG. 15c cont.
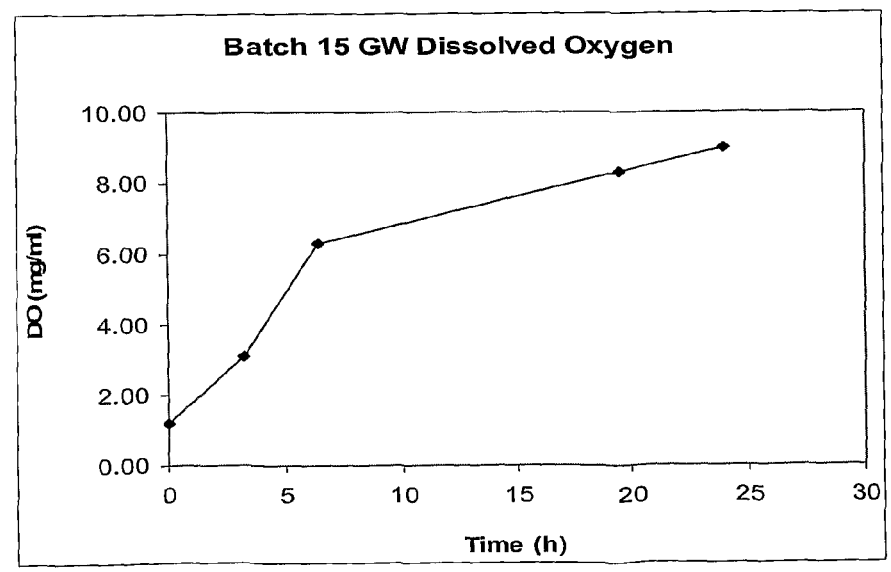

MEMBRANE BIOREACTOR AND SEWAGE TREATMENT METHOD

TECHNICAL FIELD

The present invention relates to a membrane and a bioreactor for use in treatment of sewage.

BACKGROUND OF THE INVENTION

Membrane bioreactors, which use biological matter in conjunction with a membrane to convert materials supplied to the biological matter, may be used for bioreaction applications such as the production of useful substances, for example pharmaceuticals, antibodies or vaccine components, the bioconversion of organic wastes into biomass or biofuels, or remediation of toxic wastes including degradation of toxic chemicals to inert or non-bioavailable forms and precipitation or reduction/oxidation of heavy metals.

Broadly speaking, existing bioreactors can be classified as mechanically agitated bioreactors, pneumatically agitated bioreactors or non-agitated bioreactors. Mechanically agitated bioreactors include: aeration-agitation bioreactors; rotating drum bioreactors; and spin-filter bioreactors. Pneumatically agitated bioreactors include sparge bioreactors, and air-lift bioreactors. Non-agitated bioreactors include gaseous phase bioreactors, oxygen-permeable membrane aerator bioreactors, and overlay aeration bioreactors.

Pneumatically agitated bioreactors typically consist of a vat fitted with aeration vents that sparge air through the contained liquid medium, to maintain an adequate supply of dissolved oxygen for the biomass. Such reactors use a variety of systems to ensure that the biomass and process liquor remain well mixed, including impellers, propellers, and paddles. Paddles are also used to scrape biomass from the sides of the vessel to minimise fouling and ensure that the biomass remains in contact with the process liquor. However a disadvantage with such systems is that the shear forces associated with such mixing and scraping can often damage fragile cultures, leading to a reduction in biological activity and a consequent reduction in productivity. As well, the presence of the biomass, which is relatively dense, increases the viscosity of the reaction medium, thus reducing both mixing efficiency and the rate of diffusion of molecular oxygen and other gases within the process stream. Any reduction in the availability of oxygen leads to a corresponding reduction in the activity of the biomass, ensuring that many cell types no longer function as they would in natural systems (e.g. at the air-solid interface or, in the case of animal cells, while bathed in blood).

Tissue culture systems include sparged bioreactors and a variety of submerged surface-growth systems in culture vessels or rolling drums. A disadvantage of these systems is that the uptake of oxygen is relatively low, and hence the bioavailability of dissolved oxygen becomes limiting once small amounts of biomass have grown. The low availability of dissolved oxygen prevents many types of cells from being cultured, and many cell lines do not function as they would in the body, where oxygen is more readily available.

In packed column systems, cells are immobilised on inert materials of various shapes such as rings, spheres saddles or polygons which are packed into a column. A nutrient stream is oxygenated prior to being fed to the column. A disadvantage of these systems is that they are limited by the solubility of oxygen in the nutrient stream. They are usually run in trickling mode and oxygen limitation may also relate to thickness of the biomass. A further disadvantage is that growth of the cells can lead to agglomeration of the packing and to clogging of the column. Cost is also an issue for highly engineered versions of these.

Secondary sewage treatment may involve activated sludge bioreactors coupled to a clarification system. The biomass in the activated sludge is high (typically 3000 mg/L) and is oxygenated by sparging air. The dissolved oxygen concentration is typically 0.5 mg/L and the biomass oxidises the soluble reduced organic molecules, the ammonium cations to nitrate anions, and also flocculates particulate and suspended cellular matter so that it settles easily in the clarification system downstream. The clarification system separates the majority of the suspended solids from the liquid component using sedimentation and recycles the solids/biomass back to the activated sludge bioreactors to maintain the high biomass concentration needed to conduct these processes. The process of sparging the activated sludge consumes a lot of energy.

Previous membrane based systems for treating sewage have used immersed hollow fibre membranes. In these systems, the membrane is immersed into the sewage liquid to be treated, and gas is passed from the lumen of the membrane through the membrane itself and provides oxygen to a biofilm located on the outside of the membrane. The membranes require the strength to withstand a pressure of gas necessary to penetrate the membrane, and provide relatively inefficient bioremediation of the sewage liquid. Another system for sewage treatment is the trickle bed system. In this system, the treatment bed comprises relatively large particles provided with a biolayer capable of treating the sewage. Air is sparged upwards through the bed and sewage is passed down through the bed. As the sewage is contacted with the air and biolayer, it is treated by the biolayer, and treated sewage exits through the lower regions of the bed. This system is relatively inefficient, and is prone to fouling There is therefore a need for an efficient and robust system for removing organic matter and ammonium ions from sewage. A suitable system may operate by effectively retaining biomass and providing a cheap and effective aeration system.

OBJECT OF THE INVENTION

It is an object of the present invention to overcome or substantially ameliorate at least one of the above disadvantages.

SUMMARY OF THE INVENTION

In one aspect of the invention there is provided a membrane, said membrane having a liquid face and a gas face, said membrane comprising:
  a support membrane;
  a gas face biolayer on the gas face and/or in the support membrane near the gas face; and
  a liquid face biolayer on the liquid face and/or in the support membrane near the liquid face.

It will be understood that the gas face is one of the faces of the support membrane and the liquid face is the other face of the support membrane. Since in some embodiments, the support membrane is porous, the gas face biolayer may be located at least partially within or wholly within the support membrane The liquid face biolayer may be located at least partially within or wholly within the support membrane. The support membrane is permeable and/or porous membrane so that nutrients can pass or diffuse through the membrane from the liquid face to the gas face biolayer. The membrane may also allow oxygen to pass (e.g. diffuse) through the membrane from the gas face to the liquid face biolayer. When one or both of the biolayers is/are wholly within the support membrane the membrane is permeable to oxygen so as to allow oxygen to pass (e.g. diffuse) through the membrane from the gas face and/or the liquid face to the gas face biolayer and/or liquid face biolayer. When a biolayer is near a face of the membrane, "near" may refer to the biolayer being within the membrane and at a distance from the face within 25% to 0.1% of the total thickness of the membrane, or at a distance from the face within 20, 15, 10 or 5% of the total thickness of the membrane.

Thus in a first aspect of the invention there is provided a membrane comprising:

a support membrane having a liquid face and a gas face;
a gas face biolayer at a location selected from on the gas face, in the support membrane near the gas face, and both on the gas face and in the support membrane; and
a liquid face biolayer at a location selected from on the liquid face, in the support membrane near the liquid face, and both on the liquid face and in the support membrane.

The gas face biolayer may be both on the gas face and in the support membrane near the gas face. It may be on the gas face. The liquid face biolayer may be both on the liquid face and in the support membrane near the liquid face. It may be on the liquid face.

The membrane may be a membrane for use in sewage treatment or in treatment of some other waste stream. The gas face biolayer may be a biofilm. The liquid face biolayer may be a biofilm. The membrane may be a planar membrane. The support membrane may be a planar support membrane The membrane, and, independently, the support membrane, may be nanoporous, mesoporous or microporous or may have a combination of nanoscale and/or mesoscale and/or microscale pores. The membrane may be capable of separating a gas at the gas face from a liquid at the liquid face. The membrane may be capable of allowing diffusion of gases and/or liquids therethrough (e.g. aqueous liquids) without the external application of pressure. The membrane may be capable of allowing diffusion of a gas, e.g. oxygen, from the gas face to the liquid face. The membrane may be capable of allowing diffusion of a liquid, e.g. an aqueous liquid, from the liquid face to the gas face. The membrane may be capable of allowing diffusion of ions, and optionally other soluble species (e.g. soluble molecules such as nutrients for one or both biolayers), from the liquid face to the gas face and/or from the gas face to the liquid face. The membrane may be capable of allowing diffusion of ions, and optionally other soluble species (e.g. soluble molecules such as nutrients for one or both biolayers), from the liquid face to the gas face and/or from the gas face to the liquid face and of allowing diffusion of oxygen (e.g. dissolved oxygen) from the gas face to the liquid face. Diffusion of oxygen from the gas face to the liquid face may provide oxygen to the liquid face biolayer for supporting metabolism of bacteria and/or fungi thereof. The membrane may have no support matrix on either face thereof. The membrane may be flexible. In operation, pressure across the membrane may cause the membrane to flex.

The support membrane may comprise:

a support material, and
a gel supported by the support material.

The gel may be disposed on and/or in and/or through the support material. The support material may comprise a woven or non-woven fibrous material or a non-fibrous porous material. The support material may be a knitted material, a woven material, a compressed fibre material, loose fibres, a felted material or some other suitable material, or may comprise a combination of any two or more of these. The support material may be internal to the gel or it may be external to the gel e.g. on a surface thereof. The support material may be hydrophilic or hydrophobic, and it may have sizing or may have no sizing on the surface thereof. It may be polymeric (e.g. polyester, polyamide, acrylic, polyolefin etc.), inorganic (e.g. glass fibre), natural fibre (cellulose or modified cellulose, cotton etc.) or some other material. The support material may be flexible. The gel may be hydrophilic or hydrophobic. It may be sol-gel derived. It may be not annealed. It may be a hydrogel. It may comprise silica gel. It may be nanoporous, mesoporous or microporous or may have a combination of nanoscale and/or mesoscale and/or microscale pores.

The gas face biolayer and the liquid face biolayer may comprise bacteria and optionally fungi: gas face bacteria and fungi (if present) and liquid face bacteria and fungi (if present) respectively. The gas face biolayer and the liquid face biolayers comprise predominantly aerobic microorganisms e.g. aerobic bacteria and optionally also facultative anaerobic microorganisms. They may each comprise predominantly aerobic microorganisms. Thus at least 80% (or 85, 90, 95, 99, 80-100, 85-100, 90-100, 95-100, 99-100, 80-99, 80-95, 90-99, 90-95 or 95-99, e.g. about 80, 85, 90, 95, 96, 97, 98, 99, 99.5 or 99.9%) of the microorganisms in either the gas face biolayer or the liquid face biolayer may be aerobic microorganisms. The gas face biolayer and the liquid face biolayer comprise predominantly aerobic biomass and optionally also facultative anaerobic microorganisms. The gas face biolayer and the liquid face biolayer may, independently, comprise more than one type of bacteria and/or fungi, and may comprise more than one strain of bacteria (e.g. 2, 3, 4, 5 or more than 5). The gas face biolayer may be capable of converting ammonia to nitrate. The gas face biolayer may comprise bacteria capable of converting (oxidising) ammonia to nitrite. The bacteria may comprise bacteria of genera *Nitrosomonas* and *Nitrobacter*. The gas face bacteria may comprise nitrosifying and nitrifying bacteria. The gas face biolayer may comprise bacteria capable of converting (oxidising) nitrite to nitrate. The bacteria may also be capable of sequestering and metabolizing soluble organic compounds. These organic compounds may therefore be nutrients for the bacteria. The gas face biolayer may comprise bacteria capable of converting (oxidizing) ammonium ions to nitrite. The liquid face biolayer may comprise bacteria capable of adhering to solids in a liquid stream (for example solids in a stream derived from sewage). The liquid face biolayer may comprise bacteria capable of sequestering solids from a liquid stream. The liquid face biolayer may be sticky. It may be capable of adhering to solids in the liquid stream. The liquid face biolayer may comprise bacteria capable of degrading solids from the liquid stream. The liquid face biolayer may comprise bacteria capable of adhering or sequestering coliform bacterial from the liquid stream. The liquid face biolayer may comprise the same bacteria/fungi as the gas face biolayer, or different bacteria/fungi, or some bacteria/fungi of the gas face biolayer may be the same as those of the liquid face biolayer and some may be different thereto.

The membrane may comprise a gel reinforced by a support material, said membrane having opposing surfaces and a thickness between said surfaces whereby the gel communicates between said opposing surfaces and allows diffusion of a liquid and/or of solutes and/or of a gas through the membrane. The support membrane may comprise a gel reinforced by a support material, said support membrane having opposing surfaces and a thickness between said surfaces whereby the gel communicates between said opposing surfaces and allows diffusion of a liquid and/or of solutes and/or of a gas through the support membrane.

The gel may comprise silica gel, titania gel, zirconia gel, alumina gel or a mixed gel comprising two or more of silica, titania, zirconia and alumina (e.g. silica-alumina gel). It may comprise agar agar, agarose, calcium alginate, pectin or other biopolymer. In some embodiments the gel is not be degraded by the gas face biolayer or the liquid face biolayer, or is slowly degraded thereby. If the gel is degraded by the gas face biolayer or the liquid face biolayer, the rate of degradation may be sufficiently slow as to not interfere with the operation of a bioreactor which incorporates the membrane. The rate may be such that the membrane remains intact for the life of the bioreactor. In some embodiments the rate of degradation is such that the membrane does not remain intact for the life of the bioreactor. In such embodiments, the membrane may be replaced during the life of the bioreactor.

In a second aspect of the invention there is provided a bioreactor comprising:
- a membrane according to the first aspect of the invention;
- a support for supporting the membrane; and
- a liquid cycling system for passing a liquid past the membrane.

The bioreactor may be suitable for treating sewage, or a liquid derived from sewage, or some other waste stream, such as from a winery, an abattoir, a rendering plant, a brewery, drainage from polluted soil etc. The bioreactor may have a plurality of membranes, each according to the first aspect of the invention. The membranes may be arranged in gills, each gill having a pair of membranes arranged in parallel (i.e. parallel to each other) so as to define an inside region. During operation of the bioreactor, the inside region may expand or contract in response to the volume or pressure of the liquid in the inside region. In this case the membranes may not be parallel, and may on occasions contact each other. However it should be understood that the term "parallel" is intended to encompass such situations, and includes such approximately parallel arrangements. The liquid face biolayer of each membrane of a gill may abut the inside region of said gill. In operation, the inside region has liquid derived from sewage, or some other liquid to be treated by the bioreactor, therein. In operation, the distance between the membranes of a gill may vary depending on the pressure between the inside and the outside of a gill. Thus if the pressure inside the gill increases relative to the outside of the gill (for example due to an increase in flow rate of the liquid through the gill), the gill may expand, i.e. the membranes of the gill may move apart or flex. The membranes of the bioreactor may be replaceable.

The support may be any suitable structure capable of supporting the membrane(s). The membranes may be mounted on the support. They may hang from the support. They may be stretched on the support. The support may comprise a tensioning device for tensioning the membranes.

The bioreactor may comprise an outer housing for housing the membrane(s) and at least a portion of the support. The housing may prevent ingress or egress of microorganisms. It may prevent contamination of the membrane by unwanted microorganisms. The outer housing may be opaque to UV radiation (either UVA: about 400 to about 315 nm, UVB: about 315 to about 280 nm, UVC: about 280 nm to about 1 nm), a combination of two or more of UVA, UVB and UVC, or total UV radiation). It may be capable of blocking at least 80% of incident UV radiation, or at least 85, 90, 95, 99, 99.5 or 99.9%, or between about 80 and 100, 85 and 100, 90 and 100, 95 and 100, 99 and 100, 99.5 and 100 or 99.9 and 100 of incident UV radiation, e.g. about 80, 85, 90, 95, 96, 97, 98, 99, 99.5, 99.1, 99.2, 99.3, 99.4, 99.5, 99.6, 99.7, 99.8, 99.9, 99.95, 99.99 or 100% or incident UV radiation. The housing may have an air inlet and an air outlet. The air inlet and/or the air outlet may be fitted with a filter for preventing passage of microorganisms. The filter may have a maximum pore size of or less than about 0.22 microns, or about 0.2, 0.15 or 0.1 microns. The housing may also have a gas pump for pumping air or another oxygen containing gas into or out of the housing so that the gas face of the membrane may be exposed to a gas containing oxygen. The gas pump may have a controllable speed, and may have a variable speed. The speed of the gas pump may be controlled in order to control the rate of evaporation of liquid from the membrane(s) of the bioreactor. This may be used to control the temperature of the membrane(s). Additionally or alternatively the gas may be heated or cooled (i.e. its temperature may be controlled) prior to entry into the bioreactor in order to at least partly control the temperature of the bioreactor.

The bioreactor may have one or more gas face scrapers for scraping the gas face(s) of the membrane(s). The scraping may be for the purpose of removing at least a portion of the gas face biolayer, for example if the gas face biolayer becomes sufficiently thick that insufficient oxygen can diffuse through the membrane to the liquid face biolayer. The bioreactor may have one or more liquid face scrapers for scraping the liquid face(s) of the membrane(s). The scraping may be for the purpose of removing at least a portion of the liquid face biolayer. This may remove solid waste which may be collected and removed from the bioreactor. The gas face scraper(s) and liquid face scraper(s) may penetrate through the housing, if present. They may penetrate in a manner that does not allow microorganisms to enter or exit the housing, i.e. they may be sealed against the housing. They may be operable from outside the housing. Optionally the scrapers do not penetrate through the housing. The scrapers may be operated electrically and/or remotely.

The liquid cycling system may comprise one or more of:
- a pump for pumping the liquid,
- an inlet manifold or spraying system for passing the liquid to the membrane,
- an outlet manifold for accepting liquid from the membrane,
- a reservoir for holding the liquid,
- an influent line for passing liquid from the reservoir to the inlet manifold or spraying system,
- a effluent line for passing liquid from the outlet manifold to the reservoir,
- a reflux line for returning liquid that leaks from the membrane to the inlet manifold or spraying system or to the influent line or to the reservoir, and
- a reflux pump for pumping fluid through the reflux line.

The reservoir (which may be for example a tank) may have means for removing solid matter therefrom, optionally from the bottom thereof. The reservoir may be, or comprise, a clarifier for clarifying liquid that has passed the membrane. Alternatively the bioreactor may comprise a separate clarifier. The means for removing solid matter may comprise a solids remover, for example a sludge remover. The means may remove the solids in the form of a sludge, a slurry, a suspension or some other form. The solids so removed may be suitable for use in vermiculture. They may useful as a feed for animals, fish, etc. The solids may be used (e.g. consumed) by detritovores such as crayfish, yabbies, marron, and prawns etc. The solids may be used as a feed for the detritovores.

In an embodiment the bioreactor comprises:
- a pair of membranes according to the first aspect of the invention arranged in a gill, said gill having an inlet at the top and an outlet at the bottom thereof;
- a support for supporting the membrane;
- a reservoir,
- an inlet manifold or spraying system, an influent line for passing liquid from the reservoir to the inlet manifold or spraying system, and a pump for pumping the liquid through the influent line, whereby, in use, liquid passes through the inlet manifold and into the inlet, from where it passes the membranes and exits the outlet, passing into the reservoir from where it is pumped through the influent line to the inlet manifold by means of the pump.

The bioreactor may have a plurality of gills, each of said gills comprising a pair of membranes according to the first aspect of the invention, each of said gills having an inlet at the top and an outlet at the bottom thereof. In this case, in use, the liquid may pass from the inlet manifold into each of the inlets, through the gills and exit through the outlets. The outlets may be coupled to an outlet manifold, whereby the liquid is capable of passing from the outlets to the outlet manifold.

In one embodiment, the bioreactor comprises a plurality of membrane loops. Each membrane loop is disposed so the axis of the loop is horizontal. Each membrane loop has a supporting member and a weighting member inside the loop. The supporting member supports the loop, and the weighting member causes the membrane loop to adopt an orientation whereby it has two parallel vertical portions, each of said vertical portions being a membrane according to the first aspect of the invention. The vertical portions of two adjoining loops form a gill, as defined earlier, whereby the inside region of the gill is the region between the two vertical portions of the adjoining loops. In this configuration, the liquid face of the membrane is on the outside of the loop (and thereby on the inside of the gill) and the gas face of the membrane is on the inside of the loop (and thereby on the outside of the gill).

In a third aspect of the invention there is provided a process for making a membrane comprising:
   providing a support membrane,
   contacting a liquid derived from sewage with a first face of the support membrane and exposing a second face of the support to a gas containing oxygen,
   allowing growth of liquid face bacteria to form a liquid face biolayer on the first face; and
   allowing growth of gas face bacteria to form a gas face biolayer on the second face.

Alternatively, the support membrane may be contacted with a liquid comprising bacteria from sewage. The membrane may be suitable for use in sewage treatment or treatment of some other waste stream. The support membrane may comprise:
   a support material, and
   a gel supported by the support material.

The step of providing the support membrane may comprise making the support membrane. One process for making the support membrane comprises the steps of:
   infusing a precursor liquid into the support material, said precursor liquid being capable of generating the gel; and
   generating the gel on and/or in the support material to form the support membrane.

The process may also comprise the step of exposing the support material to an alkaline aqueous solution, an acidic aqueous solution, an acidic gas, or to a water plasma prior to the step of infusing. The precursor liquid may comprise for example colloidal silica, or a solution or a suspension of calcium alginate or agar agar or agarose or pectin or another natural or synthetic polymer, or a mixture of these. The process of infusing may comprise immersing the support material in the precursor liquid followed by removing the support material from the liquid, or it may comprise flowing the liquid past the support material, or it may comprise some other suitable method for infusing. The process of generating the gel will depend on the nature of the precursor liquid, but may for example comprise evaporating at least a part of the precursor liquid infused in the support material, changing the pH of, e.g. acidifying, the precursor liquid infused in the support material (e.g. by immersing the support material with the precursor liquid infused therein into a liquid with a suitable pH), changing the temperature of the precursor liquid in the support material or exposing the precursor liquid in the support material to a precipitant or crosslinker in order to precipitate or polymerise the nanoporous solid or gel on and/or in the support material.

The step of contacting the liquid with the first face of the support membrane may comprise passing the liquid past the first face. The liquid derived from sewage may comprise suitable bacteria and/or fungi (or fungal spores) for forming the gas face biolayer and the liquid face biolayer. It may comprise the gas face bacteria and the liquid face bacteria. It may also comprise nutrients for the gas face bacteria and the liquid face bacteria. The concentration of bacteria in the liquid may be sufficient to allow the bacteria to colonise the gas face and the liquid face. It may be convenient to mount the support membrane in and/or on a support and to provide a liquid cycling system for passing a liquid past the support membrane. The support and the liquid cycling system may be the same as described for the bioreactor. Thus a bioreactor structure may be provided that is the same as the bioreactor described above, except that instead of the membrane(s), one or more support membranes are used. The support membranes may be arranged in pairs to form precursor gills. The support membranes of each pair may be parallel to each other. Each pair of support membranes of a gill may define an inside region of the gill therebetween. If a liquid derived from sewage, e.g. primary treated sewage, is passed by, for example circulated past, the support membranes, or through the gills, of the bioreactor structure, while the support membranes, or gills, are exposed to a gas containing oxygen, then gas face bacteria may grow on (colonise) a gas face of the membrane(s) (or the outside of the precursor gills) and liquid face bacteria may grow on (colonise) a liquid face of the support membrane(s) (or the inside of the precursor gills), thereby forming the membrane(s). The gas face bacteria may penetrate or grow through the support membrane from the liquid face to the gas face in order to grow on the gas face.

The steps of allowing growth of the liquid face bacteria and allowing growth of the gas face bacteria may comprise maintaining the support membrane, and optionally also the liquid derived from sewage, under conditions conducive to growth of the liquid face bacteria and the gas face bacteria respectively. The conditions may comprise a suitable temperature. The suitable temperature may be between about 0 and about 60° C. These steps may comprise maintaining the gas face bacteria and the liquid face bacteria in a nutrient starved condition. Thus in preferred operating conditions the controlling factor for growth of these bacteria should be nutrient supply and not oxygen supply. This requires that the concentration of nutrients in the liquid should be low. It may be sufficiently low that an increase in the concentration of oxygen in the gas does not lead to a substantial increase in consumption of nutrients by the gas face bacteria or the liquid face bacteria.

The process of making the membrane may be conducted without exposing the support membrane to a starter culture. Thus the step of contacting the liquid with the first face may be sufficient to provide the correct microorganisms for formation of the gas face biolayer and the liquid face biolayer.

In a fourth aspect of the invention there is provided a process for making a bioreactor comprising:

supporting a membrane according to the first aspect of the invention on a support; and providing a liquid cycling system for passing a liquid past the membrane.

The bioreactor may be useful for treating sewage or some other waste stream. The liquid cycling system may be as described in the second aspect of the invention. In some embodiments, a plurality of membranes are supported on the support. The membranes may be arranged in parallel pairs so as to form gills. Each gill may have an inside region defined by the pair of membranes thereof. The liquid face biolayer of each membrane of a pair may abut the inside region of the gill formed by said pair. In this case, the liquid cycling system should be capable of passing the liquid through the inside region of one or more, optionally each, gill.

In a fifth aspect of the invention there is provided a process for making a bioreactor comprising:

supporting a support membrane on a support;

providing a liquid cycling system for passing a liquid past the support membrane;

contacting a liquid derived from sewage with a first face of the support membrane using the liquid cycling system and exposing a second face of the support to a gas containing oxygen, allowing growth of liquid face bacteria to form a liquid face biolayer on the first face; and allowing growth of gas face bacteria to form a gas face biolayer on the second face.

The bioreactor may be useful for treating sewage or some other waste stream.

The support membrane may comprise:

a support material, and a gel supported by the support material.

A plurality of support membranes may be supported on the support, and the support membranes may be arranged in precursor gills, as described earlier. The step of contacting a liquid derived from sewage with the first face of the support membrane may comprise passing the liquid through the inner region of the precursor gills. The process of making the membrane may be conducted without exposing the support membrane to a starter culture. Thus the step of contacting the liquid with the first face may be sufficient to provide the correct microorganisms for formation of the gas face biolayer and the liquid face biolayer.

In a sixth aspect of the invention there is provided a method for treating sewage or some other waste stream, said method comprising:

providing a membrane according to the first aspect of the invention exposing the liquid face of the membrane to the sewage or other waste stream; and exposing the gas face of the membrane to a gas containing oxygen.

In particular, there is provided a method for treating sewage or some other waste stream, said method comprising:

providing a membrane according to the first aspect of the invention exposing the liquid face biolayer of the membrane to the sewage or other waste stream; and exposing the gas face biolayer of the membrane to a gas containing oxygen.

The sewage or other waste stream may be a liquid derived from sewage. It may comprise primary treated sewage. It may comprise supernatant from settling (e.g. primary settling) of raw sewage. It may comprise clarified raw sewage. The waste stream may be a waste stream comprising ammonia, ammonium ions and/or microorganisms and/or other solid matter and/or nutrients. The step of exposing the liquid face to the sewage or other waste stream may comprise passing the sewage or other waste stream across the liquid face, and may comprise recycling the sewage or other waste stream across or past the liquid face. The process may comprise separating solid matter from the sewage or other waste stream. The method may comprise the step of exposing raw sewage to primary treatment, or primary settling or clarification in order to produce the sewage or other waste stream. Such processes of primary treatment are known to those skilled in the art. The sewage or other waste stream may additionally or alternatively comprise some other waste water or waste stream, such as that from a brewery, chemical factory, abattoir, dairy etc.

The method may comprise maintaining the gas face biolayer and the liquid face biolayer in a nutrient starved condition. Thus in preferred operating conditions the controlling factor for growth of these biolayers should be nutrient supply and not oxygen supply. This requires that the concentration of nutrients in the sewage or other waste stream should be low. It should be sufficiently low that an increase in the concentration of oxygen in the gas does not lead to a substantial increase in consumption of nutrients by the gas face biolayer or the liquid face biolayer, or by the membrane. The actual concentrations of nutrient, oxygen etc. that are suitable may depend on the nature of the sewage or other waste stream, the permeability of the membrane to oxygen and to nutrients, the concentration of oxygen in the gas and other factors. In this context, an increase of 50% in the concentration of oxygen in the gas (e.g. from 10% to 20% oxygen in the gas) may result in an increase in consumption of nutrients by the membrane of less than about 10%, or less than about 9, 8, 7, 6, 5, 4, 3, 2, 1, 0.5 or 0.1%, e.g. of about 0, 0.1, 0.2, 0.3, 0.4, 0.5, 0.6, 0.7, 0.8, 0.9, 1, 2, 3, 4, 5, 6, 7, 8, 9 or 10%.

In an embodiment the membrane forms part of a bioreactor according to the invention. In this case, the process of recycling the sewage or other waste stream may comprise passing the sewage or other waste stream through the liquid cycling system of the bioreactor. During operation of the bioreactor, one or more membranes may fail (i.e. they may leak, degrade, or otherwise become non-functional). Any one or more of the membranes may be replaced by new membranes, or by support membranes during the operation of the bioreactor. When a membrane is replaced by a support membrane, the operation of the bioreactor may form a membrane from the support membrane by growing biolayers on the faces thereof. The bioreactor may comprise means, e.g. a tap, stopper, flow controller etc., for preventing flow to one or more membranes so that the membrane may be replaced.

In one embodiment there is provided a process for treating sewage comprising:

providing a bioreactor according to the second aspect of the invention, wherein the liquid cycling system comprises a pump for pumping the liquid, an inlet manifold for passing the liquid to the membrane, an outlet manifold for accepting liquid from the membrane, a reservoir for holding the liquid, an influent line for passing liquid from the reservoir to the inlet manifold and an effluent line for passing liquid from the outlet manifold to the reservoir;

passing a liquid derived from the sewage through the inlet manifold and into the inlet;

passing the liquid derived from the sewage past the membrane and out the outlet and optionally into the outlet manifold;

passing the liquid derived from the sewage into the reservoir; and pumping the liquid derived from the sewage through the influent line to the inlet manifold by means of the pump.

The liquid derived from the sewage may be primary treated sewage. It may be clarified sewage. It may be secondary treated sewage.

In a seventh aspect of the invention there is provide a treatment system comprising a plurality of bioreactors according to the second aspect of the invention, comprising a plurality of connecting lines connecting the bioreactors in series, whereby, in use, liquid that has been exposed to the liquid face of the membranes of one of the bioreactors passes through a connecting line to the next bioreactor. The treatment system may be suitable for treating sewage, or primary treated sewage or some other liquid derived from sewage or some other suitable waste stream. A first bioreactor is fitted with a feed line for providing liquid derived from sewage to the treatment system, and a last bioreactor is fitted with an outlet line for removing treated liquid from the treatment system. The feed line may be coupled to the inlet manifold of the first bioreactor, and the outlet line may be coupled to the outlet manifold, or to the reservoir, of the last bioreactor. The connecting lines may couple the reservoir of a bioreactor to the inlet manifold of the next bioreactor. Each connecting line and the outlet line may have a valve for controlling the proportion of liquid which is recycled to a bioreactor and the proportion that is passed to the next bioreactor. Each line lines (connecting lines, outlet lines etc.) may, independently, comprise a pipe, a tube, a hole in a partitioning wall, or some other sort of liquid conduit suitable for use in the sewage treatment system.

The bioreactor, and the treatment system, of the invention may also be used to treat other liquids than liquids derived from sewage. As the bioreactor is an efficient oxygenator, it may be used in applications where treatment of a liquid requires oxygenation. It may be used for removal of solids, microorganisms and/or ammonium ions from liquids other than sewage, for example industrial waste streams containing high levels of ammonium ion or ammonia, or for purifying water in an aquaculture pond or tank.

In an eighth aspect of the invention there is provided an effluent liquid, said effluent liquid being obtained by treatment of a liquid derived from sewage by the method described in the sixth aspect of the invention. The effluent liquid may be obtained from a bioreactor, or a treatment system, according to the invention. The effluent liquid may be suitable for use in aquaculture.

In a ninth aspect of the invention there is provided a solid material obtained by treatment of a liquid derived from sewage by the method described in the sixth aspect of the invention. The solid material may be obtained from a bioreactor, or a treatment system, according to the invention. The solid material may comprise solid material from the liquid, and/or solid material which has separated from the liquid face biolayer of the membrane used in the treatment. The solid material may be in the form of a sludge, a slurry, a suspension or some other form. It may be suitable for use in vermiculture and/or aquaculture.

In a tenth aspect of the invention there is provided an aquaculture system comprising a bioreactor according to the present invention coupled to a pond or tank. The bioreactor may be coupled to the pond or tank by means of an inlet tube or pipe, for conveying a liquid from the pond or tank to the bioreactor, and an outlet tube or pipe for conveying the liquid from the bioreactor to the pond or tank. The inlet tube or pipe may be fitted with a pump for pumping the liquid to the bioreactor. The pond or tank may be an aquaculture pond or tank or reservoir or dam. The bioreactor may be connected directly to the pond or tank. In operation, sedimented detritus suspended in a liquid (preferably aqueous) is pumped from the pond or tank, optionally from the bottom of the pond or tank, through the bioreactor and then returned to the pond, e.g. to the top of the pond. In passing through the bioreactor, the membrane(s) (optionally configured as gills) of the bioreactor may remove, flocculate and/or oxidise organic matter, oxidise ammonium ions and/or nitrite ions to nitrate ions, and/or oxygenate the liquid. In this embodiment, the bioreactor may have no reservoir, as the pond or tank of the aquaculture system may perform the function of the reservoir.

BRIEF DESCRIPTION OF THE DRAWINGS

A preferred form of the present invention will now be described by way of example with reference to the accompanying drawings wherein:

FIG. 3 shows a series of gills formed from membrane loops according to the present invention;

FIG. 3a shows a diagrammatic representation of the use of air spacers to separate gills in a biroreactor of the present invention;

FIG. 3b shows a diagrammatic representation of the spacers of FIG. 3a;

DETAILED DESCRIPTION OF THE PREFERRED EMBODIMENTS

Figure 1:
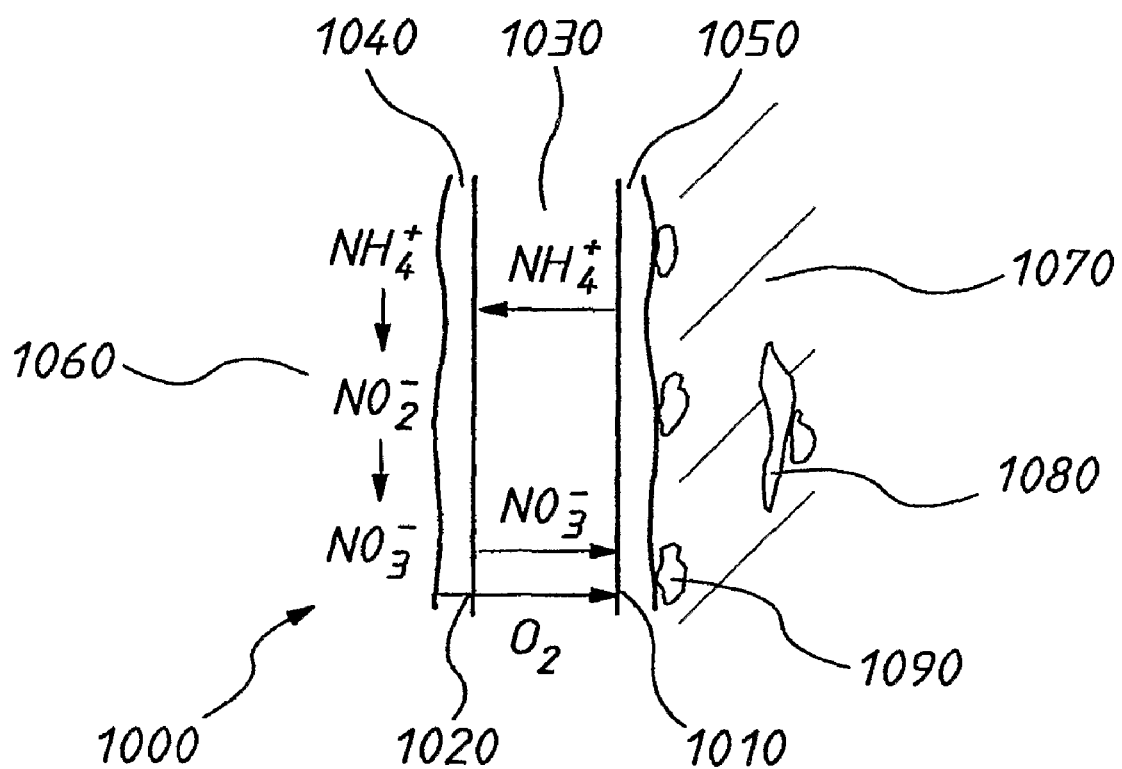
FIG. 1 is a diagram illustrating the operation of a membrane according to the present invention.

The membrane of the present invention may be an efficient oxygenator. Exposure of a liquid to the membrane may increase the oxygen concentration of the liquid. If the inlet oxygen concentration is about 1.5 mg/L, the outlet may be about 5.5 mg/L (cf. saturated oxygen in water at 20° C./1 atmosphere 9.1 mg/L). The membrane of the present invention, when used in a bioreactor as described herein, may be capable of increasing the oxygen concentration of the liquid by a factor of at least about 1.5, or at least about 2, 2.5, 3, 3.5, 4, 4.5 or 5, or by at least about 2 mg/L, or at least about 2.5, 3, 3.5, 4, 4.5 or 5 mg/L, and may increase the oxygen concentration by about 2, 2.5, 3, 3.5, 4, 4.5 or 5 mg/L or higher. This may be due to the high surface area to volume ratio of the liquid exposed to the membranes of the bioreactor and the slow rate of passage of the liquid past the membranes. The exposure may comprise passing the liquid through a bioreactor, or a sewage treatment system, according to the invention. The inventor has observed that if a fluid is cycled through the bioreactor of the present invention, its oxygen content increases as described above. If the same liquid is recycled into the reservoir without passing in contact with the membrane(s) of the bioreactor, the oxygen content of the liquid does not increase to the same extent or, optionally, does not increase at all. The inventor therefore concludes that the membrane is capable of acting as an efficient oxygenator. The bioreactor of the present invention may be referred to as an NMB: nanoparticulate membrane bioreactor.

The dissolved oxygen concentration (DO) of the influent liquid may range from 0.0 mg/L to saturation. The saturation point for dissolved oxygen in the liquid can vary with the temperature, water activity or salinity and barometric pressure. Typically the saturation level for dissolved oxygen in pure water at 20° C. and 1 atm pressure is approximately 9.2 mg/L.

A typical scenario would have a batch of primary treated sewage or raw shower water being added to the reservoir. The DO would rise from 0.0 mg/L to approximately 1.5 mg/L in the filling process (due to very high agitation). The membrane pump would pump the liquid up into the inlet manifold at approximately 1500 L/h and distribute it to trickle through the lumens between the membrane pairs (i.e. within the gills). DO would diffuse through the biofilms and membranes into the liquid in the lumens, with the DO increasing as the liquid travels down the lumens to the bottom/outlet. At this point it may have a DO typically between 3.0 and 5.5 mg/L after passage through a set of gills 1.5 m high and 1.0 m wide. Factors such as the concentration of nutrients the thickness of the biolayer, the thickness and type of membrane (support material, type of gel used to dope the membrane and the amount of gel in the membrane) the metabolic activity of the biomass on the membranes and in the nutrient stream, the water activity/salinity, concentration of oxygen in the air, temperature and barometric pressure may all influence the rate of transfer of dissolved oxygen into the liquid.

When the concentration of nutrients in the liquid to which the liquid face biolayer is exposed is high and said nutrients are capable of diffusing through the membrane, the growth of cells on the air face will be fastest. Conversely when the concentration of the nutrients in the liquid is low, the growth of cells on the liquid face of the membrane, and particularly of those cells in direct contact with the liquid, will be greatest.

The continuum of concentrations between high and low nutrient concentrations will favour cells distributed between the physical extremities of the air-face of the biolayer growing on the air-face of the membrane and the cells growing on the liquid-face of the biolayer growing on the liquid face of the membrane.

The ability of the nutrients to diffuse through the membrane also influences the distribution of growth rates. When nutrients diffuse very quickly, the cells closer to the air (gas face) grow more rapidly, and conversely, when nutrients have low diffusion rates, growth of cells closer to the liquid phase (liquid-face) is favoured.

When the metabolic rate of cells in the biolayer on the air face of the membrane is high, the rate of oxygen consumption will be concurrently high, which will reduce the rate of diffusion of dissolved oxygen to the biolayer growing on the liquid face of the membrane, which will in turn reduce the rate of growth on the liquid face of the membrane.

The bioreactor of the present invention is useful for treatment of primary treated sewage (i.e. supernatant from settling of raw sewage) or a waste stream e.g. waste water, from some other source e.g. brewery, chemical factory, abattoir, dairy. It may be used for treating macerated blackwater e.g. from a toilet, for treating shower water or for treating simulated shower water. The bioreactor provides a suitable environment for growth of naturally occurring bacterial systems and/or other biolayers for treating waste streams. Thus by passing the waste stream through the bioreactor, the appropriate biolayers form on the membranes for treating that waste stream. Introducing microbes into the system in the form of a mixed inoculum from environments containing diverse arrays of microorganisms, such as soil, sediments and natural waterways can also act as a source of suitable microbes to form the biolayers. The inoculum can be added to the liquid stream or to the air-faces of the membranes via an aerosol or spray of a suspension of the inoculum. The bioreactor is capable of treating sewage more rapidly than conventional equipment such as trickle bed reactors. This is particularly so especially if the ratio of membrane area to liquid volume is large in the bioreactor. As the ratio of membrane area to liquid volume in the bioreactor increases, the speed of bioconversion may also increase. The bioreactor of the present invention is capable of producing an effluent that does not have an offensive odour. It is capable of producing an effluent that is clearer (i.e. less visually opaque) than effluent from conventional equipment after the same treatment time. The bioreactor is capable of reducing microbial (e.g. faecal coliform) content of the primary treated sewage more rapidly than conventional equipment used for treatment of primary treated sewage. The bioreactor may be suitable for treating other types of liquid streams which contain nutrients for the microorganisms of the biolayers of the bioreactor.

In operation, a membrane according to the present invention commonly appears to exhibit growth of microorganisms on both sides thereof (i.e. on the gas face and on the liquid face of the support membrane) and/or in the support membrane near the gas and liquid faces. When the biolayers which are formed by these microorganisms become sufficiently thick, a portion of the biolayer may be separated from the membrane. This may be accomplished mechanically, for example by scraping the membrane, physically, e.g. by shaking the membrane, or may occur spontaneously. In particular, portions of the liquid face biolayer may detach from the membrane, and pass through to the reservoir. These portions may accumulate in the reservoir, and may be removed therefrom. These portions may represent a solid waste from the bioreactor. The solid waste may be useful for growing worms, and may have nutritive value. Solid matter separated from the gas face of the membrane, e.g. spontaneously or by operation of a scraper, may also be collected. These may be combined with the portions of liquid face biolayer that may detach, or may be handled separately.

The membrane of the present invention comprises a support membrane having a gas face biolayer on the gas face and/or in the support membrane near the gas face and a liquid face biolayer on the liquid face and/or in the support membrane near the liquid face. In particular it comprises a support membrane having a liquid face and a gas face, a gas face biolayer at a location selected from on the gas face, in the support membrane near the gas face, and both on the gas face and in the support membrane, and a liquid face biolayer at a location selected from on the liquid face, in the support membrane near the liquid face, and both on the liquid face and in the support membrane. The gas face biolayer comprises bacteria capable of converting ammonium ions in a liquid stream to nitrate ions. The gas face biolayer may also comprise fungi. The fungi may be capable of metabolising or degrading organic materials (e.g. solutes) in the liquid. The solutes may pass (e.g. diffuse) through the membrane to the gas face biolayer where they may be at least partially degraded and/or metabolised. The biolayer may comprise one type of bacterium for converting ammonium ions to nitrite ions and a second type of bacterium for converting nitrite ions to nitrate ions. The conversion from ammonium to nitrate may at least partially detoxify the liquid stream. The liquid face biolayer may comprise bacteria capable of adhering cells and/or other solid matter in the liquid stream. The liquid face bacteria may also be capable of at least partially degrading the adhered cells and/or other solid matter. The degradation may generate solid and/or liquid products. The membrane of the present invention is capable of allowing oxygen to pass from the gas face to the liquid face biolayer, and is capable of allowing dissolved ions (e.g. ammonium, nitrate) to pass from the gas face to the liquid face. The membrane may be at least partially permeable to oxygen. It may be at least partially permeable to aqueous liquids.

Thus in operation, the liquid face (or liquid face biolayer) of the membrane is exposed to a liquid derived from sewage. Such a liquid commonly contains cells, e.g. faecal coliform bacteria, together with other solid matter, and also contains ammonium ions or ammonia. Ammonium ions or ammonia permeate through the membrane to the gas face biolayer where the gas phase bacteria convert the ammonium ions or ammonia to nitrate. Oxygen for this oxidation process is provided by the gas to which the gas face (or gas face biolayer) is exposed, said gas containing oxygen. The gas may be air, or a mixture of oxygen with some other gas such as nitrogen, carbon dioxide, argon or a mixture of these, or it may be oxygen. Concurrently, solid matter from the liquid adheres to the liquid face biolayer, and may be at least partially degraded by the liquid face bacteria and optionally fungi. Solid waste comprising portions of the liquid face biolayer, together with adhered solid matter and/or degradation products thereof, may detach from the membrane and enter the liquid. This solid waste may be collected and removed from the bioreactor. It may for example be collected in the form of sludge in a reservoir that forms part of a bioreactor in which the membrane is located, and may be separated from the bottom of said reservoir. This is illustrated in FIG. 1.

Thus FIG. 1 shows membrane 1000 according to the present invention. Membrane 1000 comprises support membrane 1030 having liquid face 1010 and gas face 1020. Gas face biolayer 1040 is located on gas face 1020 and liquid face biolayer 1050 on liquid face 1030. In some embodiments, gas face biolayer is located in the porous structure of support membrane 1030, or both in said porous structure and on gas face 1020. Similarly liquid face biolayer may optionally be located in the porous structure of support membrane 1030 or both in said porous structure and on liquid face 1010. In operation, gas face biolayer 1020 is exposed to gas 1060, which contains oxygen, and liquid face biolayer 1010 is exposed to liquid 1070, which is a waste liquid to be treated, for example a liquid derived from sewage. Liquid 1070 commonly contains solid waste material 1080, and bacteria and other solid particles 1090 adhere to biolayer 1050. Commonly, once sufficient solid matter has adhered to liquid face 1010, portions may slough off as described above, to form a settlable sludge. As shown in FIG. 1, oxygen can penetrate through membrane 1000 from gas 1060 to biolayer 1050 and into liquid 1070. This oxygenates liquid 1070 and provides oxygen for growth of biolayer 1050. Biolayer 1040 comprises contains ammonia oxidising and nitrifying bacteria. Thus ammonium ions from liquid 1070 may pass through support membrane 1030 to biolayer 1040, where they are converted initially to nitrite and thence to nitrate. The nitrate may then pass back through membrane 1000 to liquid 1070, thereby, in total, converting ammonium ions in liquid 1070 to nitrate ions. The ammonia oxidation and nitrification process may also take place in the biofilm growing on the liquid-face of the membrane 1050.

Figure 1A:
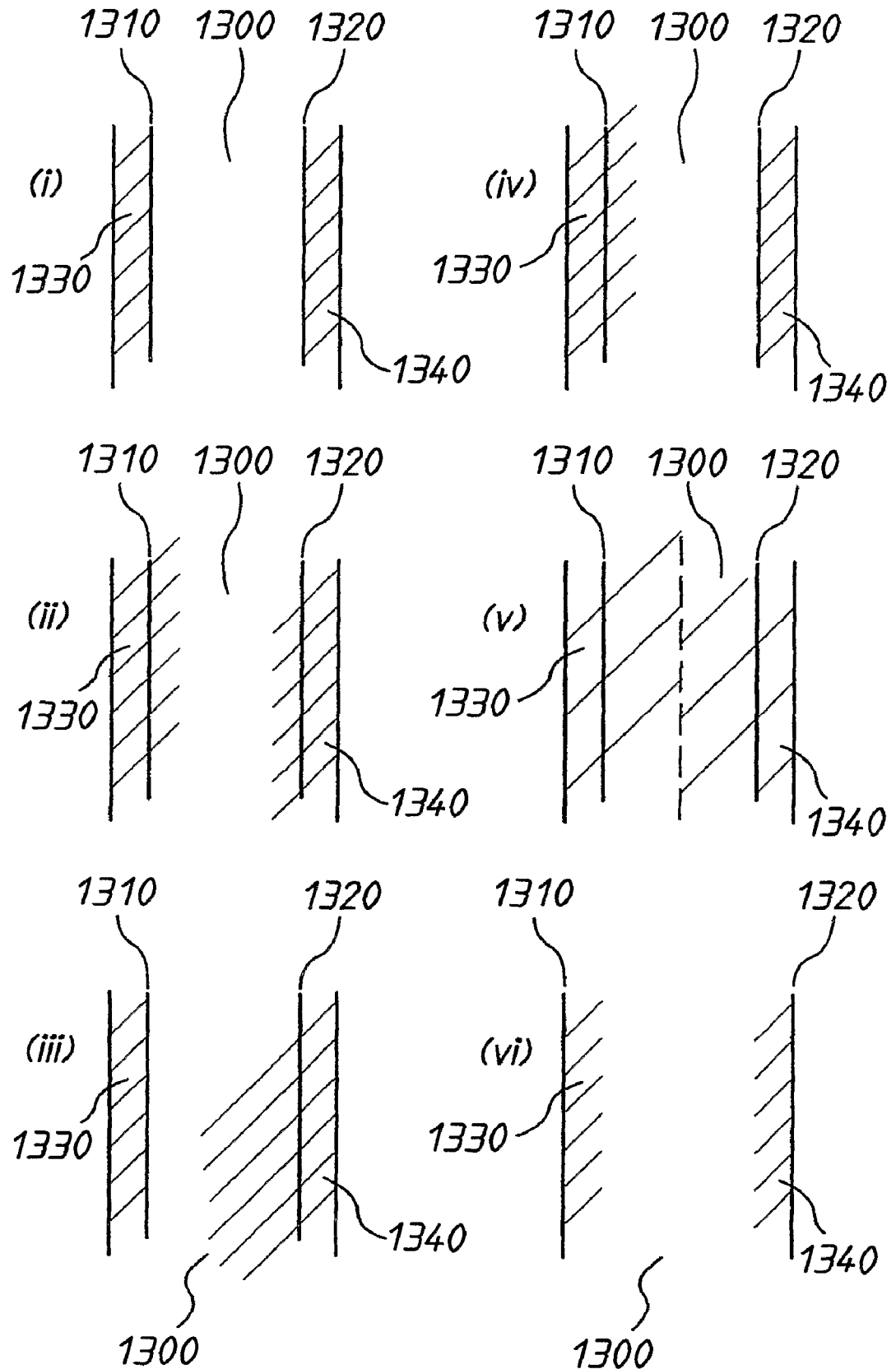
FIG. 1a shows different locations of biolayers on a support membrane in a membrane according to the invention.

FIG. 1a shows different locations of biolayers on a support membrane in a membrane according to the invention. Thus in FIG. 1a, support membrane 1300 has gas face 1310 and liquid face 1320. Gas face biolayer 1330 is at a location selected from on gas face 1310, in the support membrane near gas face 1310, and both on gas face 1310 and in support membrane 1300. Liquid face biolayer 1340 is at a location selected from on liquid face 1320, in support membrane 1320 near liquid face 1320, and both on liquid face 1320 and in support membrane 1300. Thus in FIG. 1a-l, gas face biolayer 1330 and liquid face biolayer are located on gas face 1310 and liquid face 1320 respectively. In FIG. 1a-ii and v gas face biolayer 1330 is located on gas face 1310 and partially in the porous structure of support membrane 1300, and liquid face biolayer 1330 is located on liquid is face 1320 and partially in the porous structure of support membrane 1300. In FIG. 1a-ii, the biolayers are restricted to the region near the respective surfaces (e.g within about 25% of the membrane thickness thereof), whereas in FIG. 1a-v, the biolayers extend to meet each other in the porous structure of the support membrane. In FIG. 1a-iii biolayer 1330 is located on gas face 1310, and liquid face biolayer 1340 is located on liquid face 1320 and extends into support membrane 1320. It may extend a short distance, e.g. less than about 25% of the membrane thickness, or may extend further, optionally to gas face 1310. The converse situation may also occur, wherein liquid face biolayer 1340 is located on liquid face 1320 and gas face biolayer 1330 is located on gas face 1310 and also extends into support membrane 1300, as shown in FIG. 1a-iv. In a further option, shown in FIG. 1a-vi, gas face biolayer 1330 is located in support membrane 1300 near gas face 1310 and liquid face biolayer 1340 is located in support membrane 1300 near liquid face 1320.

The reservoir may be a tank or a cistern or a storage tank or a barrel, or a vat or a drum or some other suitable container. It may be fitted with a sludge removal means, for example a tap capable of allowing passage of a sludge. The reservoir may have a tapered lower end, and the sludge removal means may be located at the bottom of the tapered lower end. The reservoir may have sufficient volume to accommodate the liquid to be treated by the bioreactor. Commonly the reservoir will have an inlet (which may be a pipe or a tube) for admitting liquid to the reservoir, said inlet being near or at the top of the reservoir. It may also have an outlet tube or pipe for allowing liquid to exit the reservoir. The outlet tube or pipe may reach to near the bottom of the reservoir, but should be sufficiently far above the bottom of the reservoir that it does not become clogged with sludge or solid waste which may collect at the bottom of the reservoir. Other than the inlet and outlet, the reservoir may be sealed, so that when liquid is pumped into the reservoir, a similar quantity of liquid is forced out of the outlet of the reservoir. In operation the reservoir may have an air space at the top, or may have no air space.

The oxidation of ammonium ions to nitrate ions in the present invention may occur at pH at or above about 6.5, but may also occur at pH below about 6.5. Commonly in bioreactors known in the prior art, it is necessary to maintain the pH above about 6.5 in order that the bacteria operate efficiently. This necessitates oxic/anoxic cycling, which is not necessary when using the membrane and bioreactor of the present invention. This provides for more efficient operation. The pH of the liquid in the present invention may be between about 2 and about 10, or about 5 and about 9 or between about 2 and 5, 9 and 10, 3 and 8, 5 and 8, 5 and 7, 5 and 6.5, 6 and 9, 7 and 9, 6.5 and 9, 6 and 8, 6.5 and 7.5 or 6 and 7, and may be about 2, 2.5, 3, 3.5, 4, 4.5, 5, 5.5, 6, 6.5, 7, 7.5, 8, 8.5, 9, 9.5 or 10.

Figures 2, 2A:
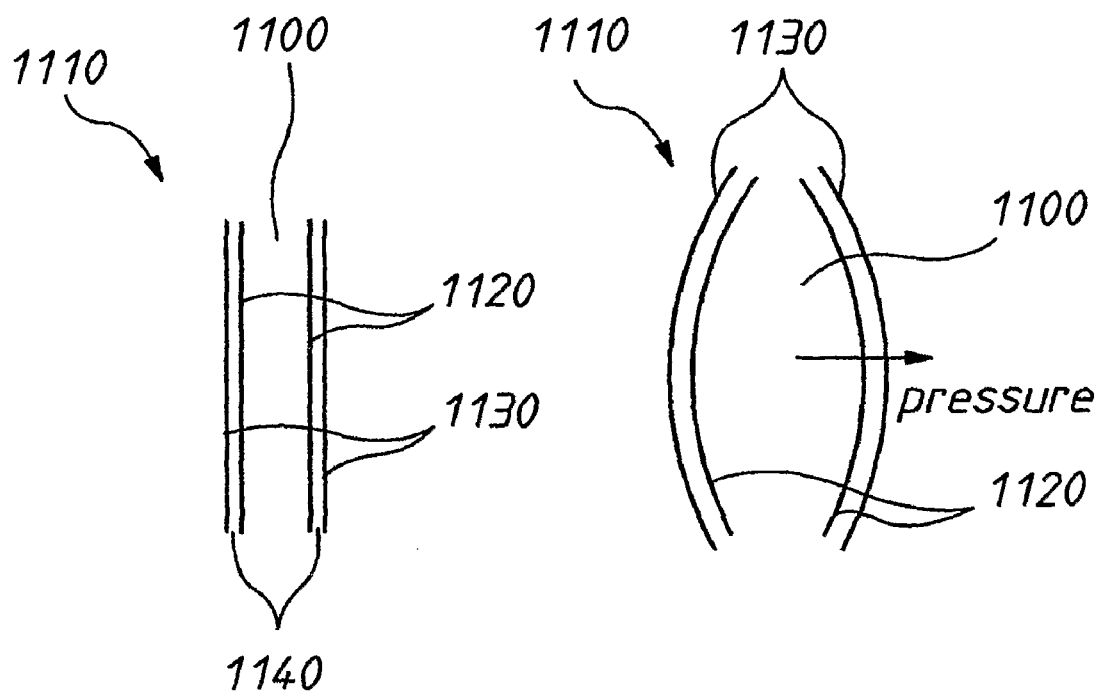
FIG. 2 illustrates a pair of membranes forming a gill.
FIG. 2a shows the expansion of the gill of FIG. 2 under pressure.

Commonly a bioreactor according to the invention comprises pairs of membranes disposed so as to form gills. In these gills, two membranes are disposed parallel to each other to define an inside region. The liquid face of each membrane abuts the liquid region. This is illustrated in FIG. 2. When liquid passes down the inside region 1100 of gill 1110, a pressure difference may arise between the liquid face 1120 and the gas face 1130 of the membranes 1140. This may be accommodated at least in part by expansion of the inside region, resulting from flexing of the membranes. This is illustrated in FIG. 2a (in which the expansion of the inside region is exaggerated for purposes of illustration).

Figure 2B:
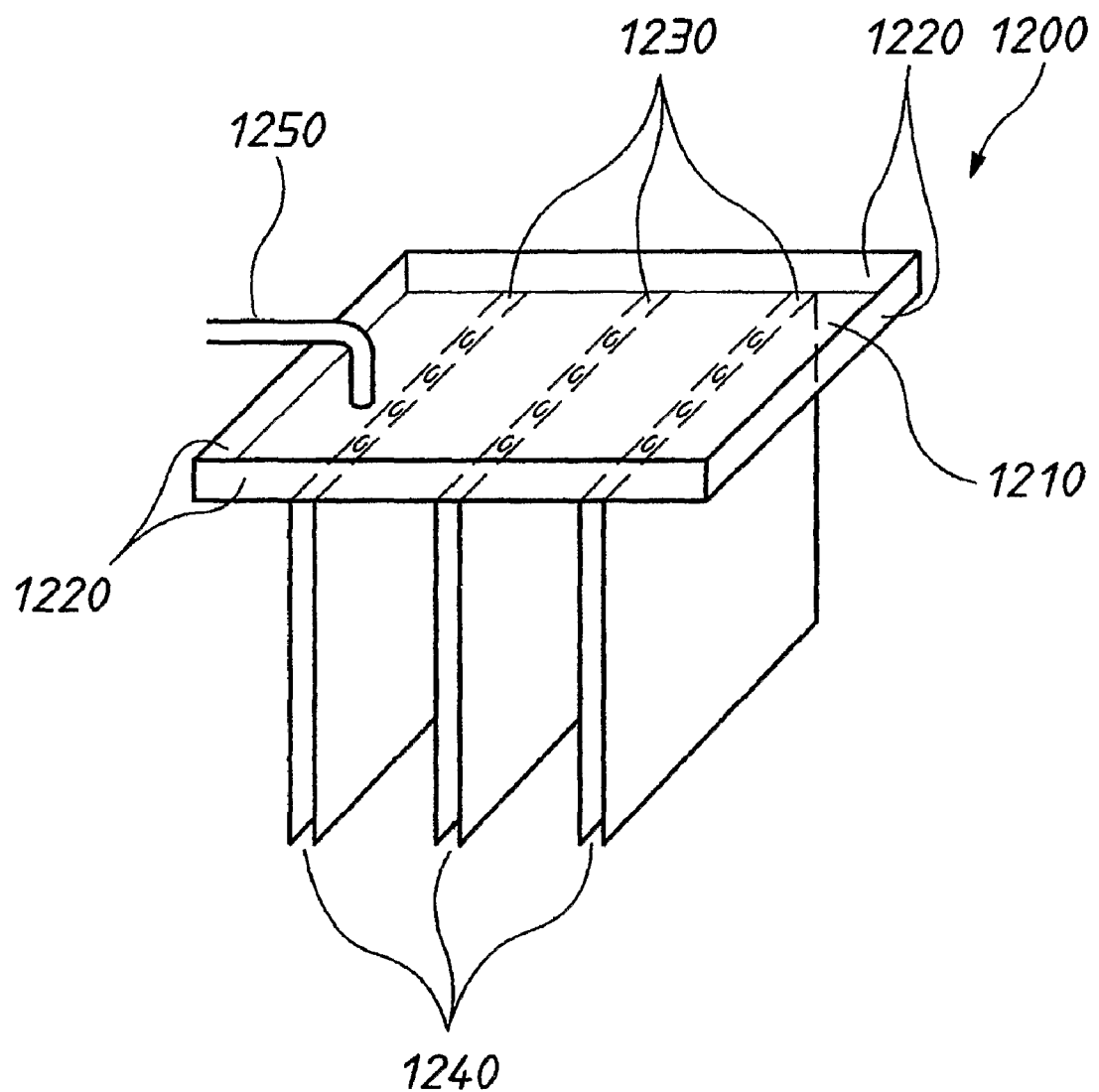
FIG. 2b shows a diagram of an inlet manifold for use in a bioreactor according to the invention.

The liquid may be passed to the gills through an inlet manifold. The inlet manifold may comprise a spray head, for spraying the liquid. It may comprise a horizontal panel or tray having perforations, e.g. holes or slots, therein, whereby the perforations are disposed so that liquid on an upper surface of the panel passes through the perforations and into the gills. Thus the perforations may be aligned with the gills. Thus when liquid is passed to the upper surface of the inlet manifold, it may be efficiently aerated/oxygenated, by of a relatively large area of the liquid to the air prior to the liquid passing to the gills. The panel of the inlet manifold may have raised sides to prevent the liquid from spilling over the sides of the inlet manifold. The perforations should have sufficient total area as to permit the desired flow of liquid into the gills of the bioreactor. This is shown diagrammatically in FIG. 2b. Thus in FIG. 2b, inlet manifold 1200 comprises horizontal panel 1210, having raised sides 1220. Panel 1210 comprises rows of holes 1230. These align with gills 1240, each of which comprises a pair of membranes as described elsewhere in this specification. Rows of holes 1230 are disposed so that liquid passing therethrough can pass into gills 1240. Inlet pipe 1250 is provided to feed liquid to inlet manifold 1200, and connects to a reservoir (not shown). Thus in operation liquid from the reservoir is pumped through pipe 1250 and is discharged therefrom to the top of panel 1210. It then passes through rows of holes 1230 and enters gills 1240. Commonly the liquid will form a thin layer of liquid on the top of panel 1210, and may thereby be efficiently aerated by exposure to the atmosphere above manifold 1200. FIG. 2b shows rows of holes 1230 which conduct liquid to gills 1240. These holes may be round or may be some other shape. In particular, they may be elongated, and may take the form of slots. In some embodiments, each row of holes 1230 is replaced by a single elongated slot aligned with the top of a gill.

In one embodiment, the bioreactor comprises a plurality of membrane loops. This is illustrated in FIG. 3. In FIG. 3, membrane loop 10 is disposed so the axis of the loop is horizontal. Membrane loop 10 has a supporting member 20 inside loop 10 from which loop 10 is supported, and weighting member 30 inside loop 10 to provide tension to loop 10 by weighting its lower portion. Members 20 and 30 may provide an appropriate spacing between adjacent gills, or between the gas faces of membranes with counterfacing gas faces. They may therefore act as spacers. Weighting member 30 causes membrane loop 10 to adopt an orientation whereby it has two parallel vertical portions 40 and 50, each of said vertical portions being a membrane according to the first aspect of the invention. Thus vertical portion 40 has liquid face 60 and gas face 65, and vertical portion 50 has liquid face 70 and gas face 75 The vertical portions of two adjoining loops form a gill 80, whereby the inside region 85 of the gill is the region between the two vertical portions of adjoining loops. In this configuration, the liquid face of the membrane is on the outside of the loop and the gas face of the membrane is on the inside of the loop. This configuration enables membranes to be readily added to the bioreactor, and for damaged membranes to be removed from the bioreactor. Additionally, by selecting an appropriate weight for the weighting member, a suitable tension may be applied to the membranes. The weighting member and the support member may comprise bars or rods or some other suitable member. The appropriate weight may depend on the nature of the membrane, particularly on the nature of the support membrane, and more particularly on the nature of the support of the support membrane. The appropriate weight should be sufficiently light as to not damage or tear the membrane, and sufficiently large that the vertical portions are maintained in a substantially planar configuration for example without substantial bucking or bending.

There may be spacers between gills in a bioreactor according to the present invention. This may prevent the membranes adhering due to surface tension. The spacers may be located approximately every 300 mm vertically, although the distance between spacers may be between about 200 and 500 mm, or between about 300 and 500, 400 and 500, 200 and 400 or 250 and 300 mm, e.g. about 200, 250, 300, 350, 400, 450 or 500 mm, or some other spacing. The spacing should be sufficient to prevent contact between adjacent gills. This is illustrated in FIG. 3a. Thus membrane loops 10 define inside region 85, as described above for FIG. 3. Spaces 90, within loops 10, are thus the spaces between gills. Spacers 95 are therefore provided, at vertical intervals as described above, to prevent contact between the two sides of loops 10. Contact between different loops is prevented by virtue of the surface tension of liquid within space 85. Weighting members 30 provide sufficient tension to loops 10 that the presence of spacers 95 can prevent contact between the sides of loops 10. FIG. 3b shows a top view of spacer 95. Width 96 is sufficient to prevent contact between the two sides of loops 10 as described above. It may be for example between about 0.5 and about 5 cm, or between about 1 and 30, 2 and 30, 3 and 30, 0.5 and 30, 0.5 and 20, and 30, 10 and 30, 0.5 and 10, 1 and 10, 1 and 5, 1 and 2 or 2 and 15 cm, e.g. about 0.5, 1, 1.5, 2, 2.5, 3, 3.5, 4, 4.5, 5, 6, 7, 8, 9, 10, 15, 20, 25, 30 cm. It has gaps 97, which may be any desirable shape, conveniently square, rectangular, round or elliptical. Gaps 97 are provided to permit air and biomass to pass through spacers. They should therefore be as large as possible consistent with structural integrity of spacer 95. Thus they may represent conveniently between about 50 and about 95% of the area of spacer 95, or between about 60, 70, 80 or 90 and 95% of the area, e.g. about 50, 60, 70, 80, 90 or 95% of the area. They may be made of a material that is resistant to the gas face biofilm. Thus they should not be readily biodegradable. They may be made for example from stainless steel, aluminium or some other bacteria resistant material.

Figure 4:
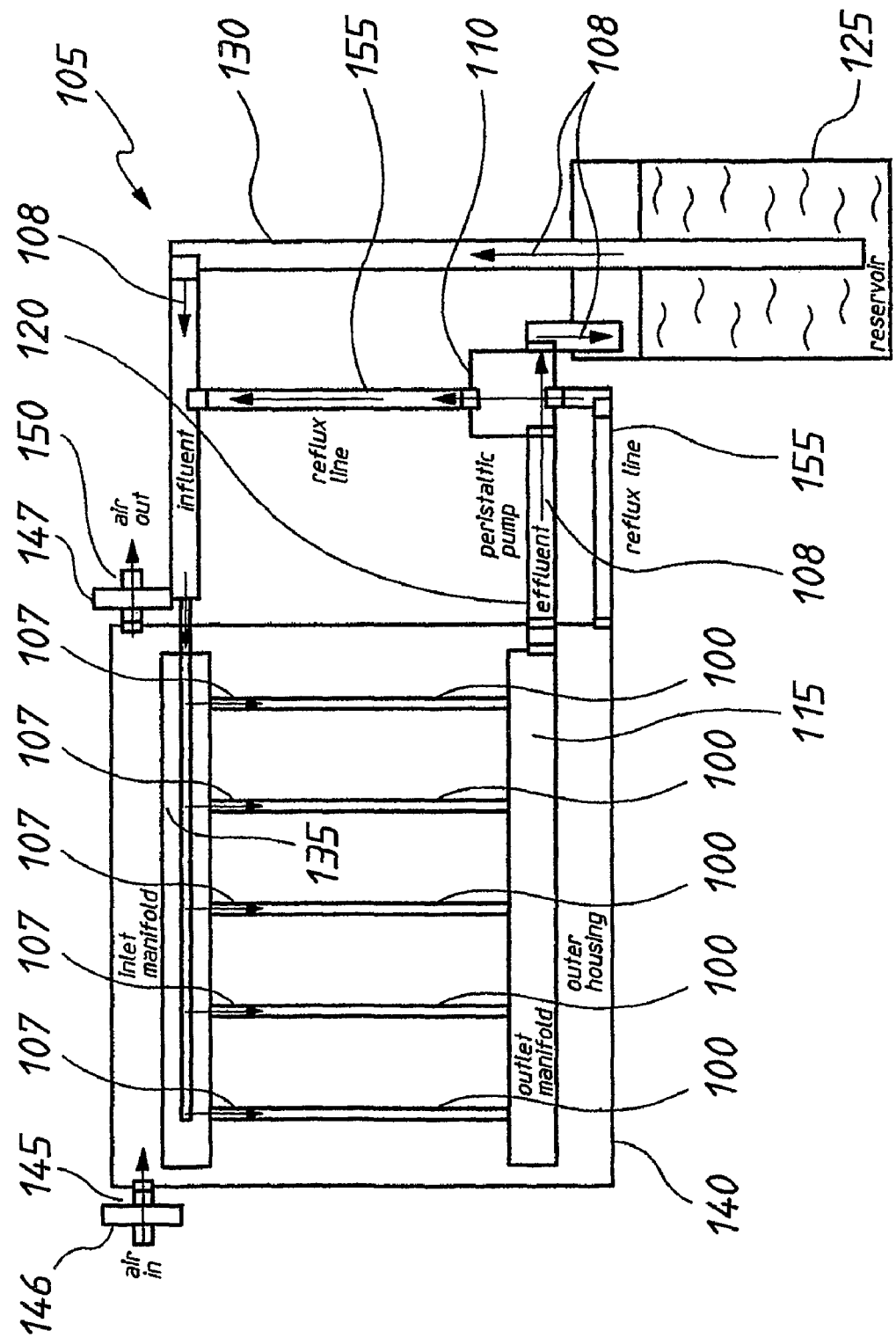
FIG. 4 is a diagrammatic representation of a bioreactor according to the present invention.
Figure 5:
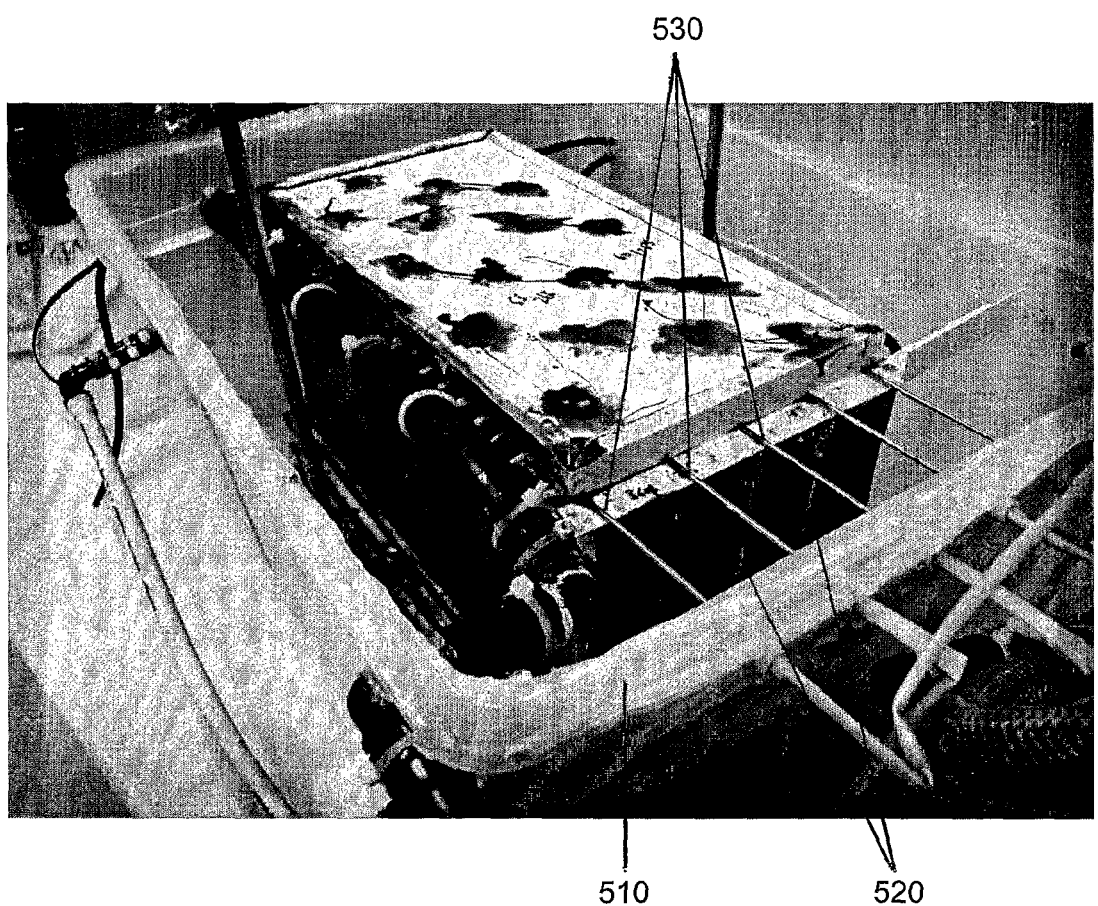
FIGS. 5 to 8 are photographs of a bioreactor or parts thereof according to the present invention.
Figure 6:
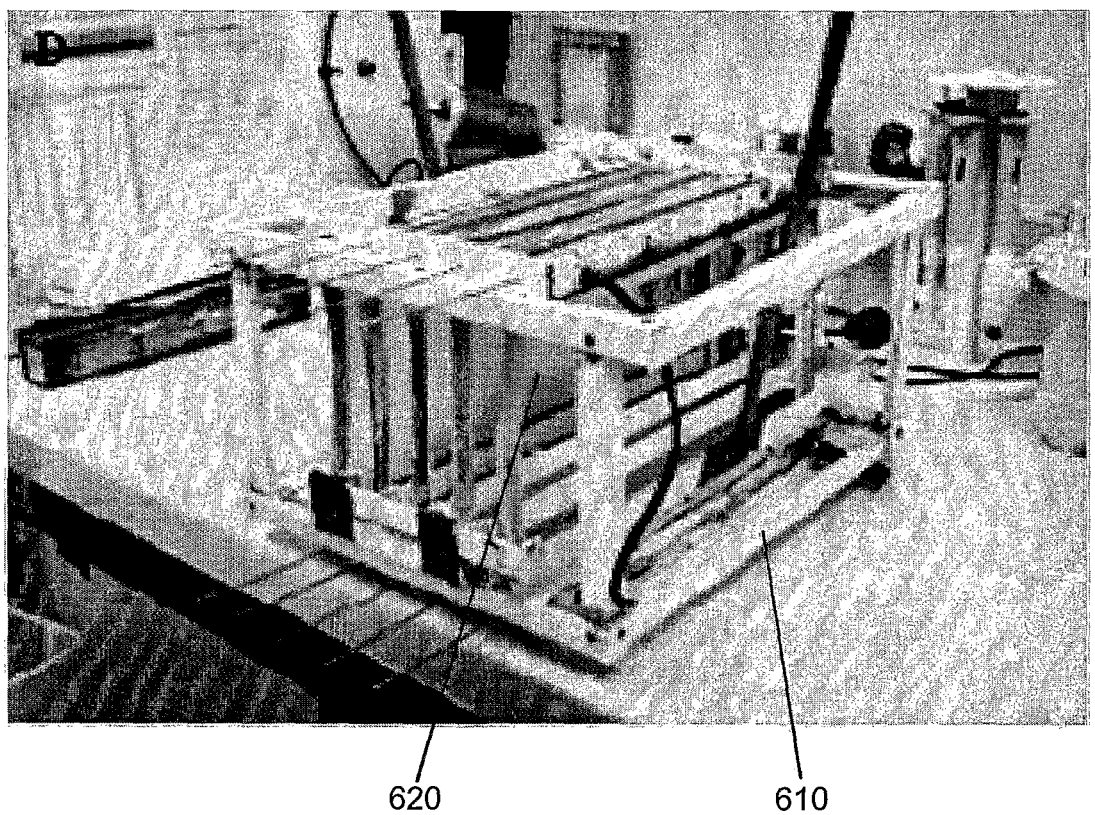
Figure 7:
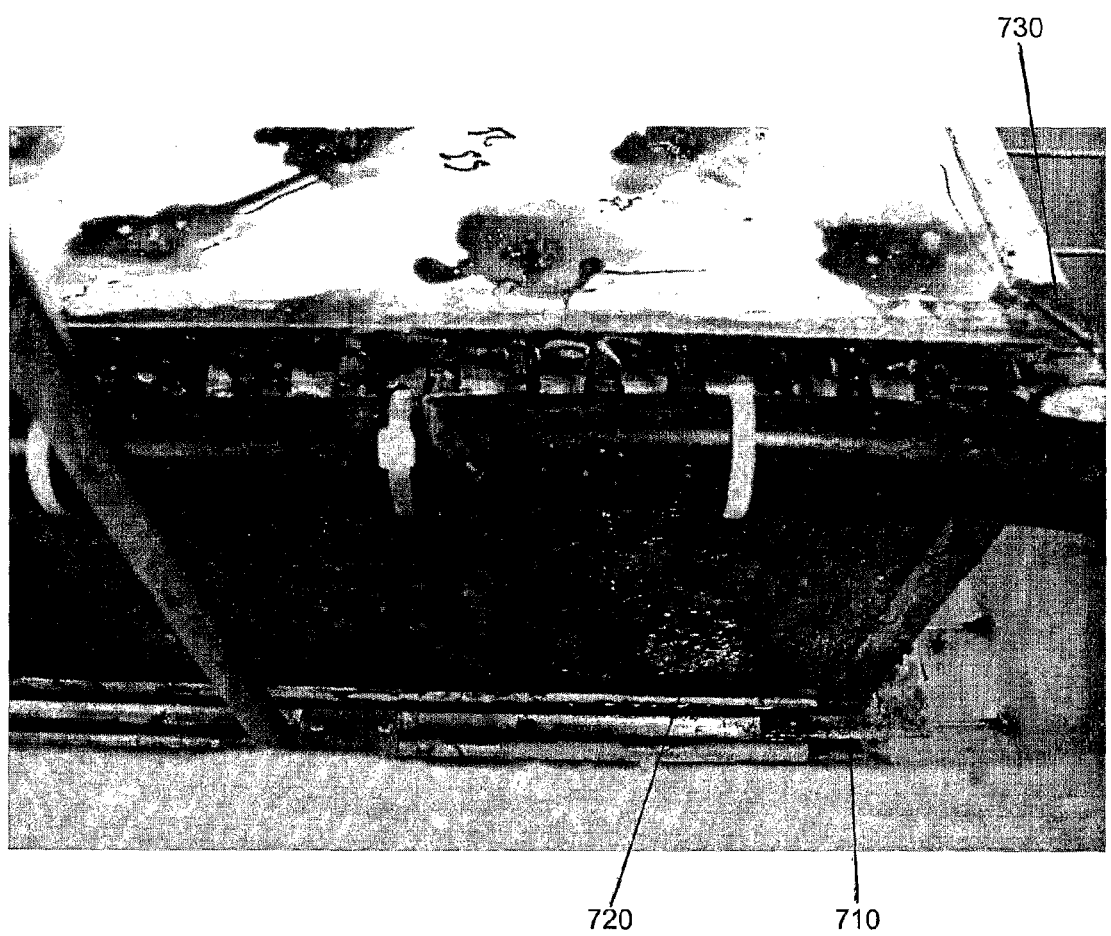
Figure 8:
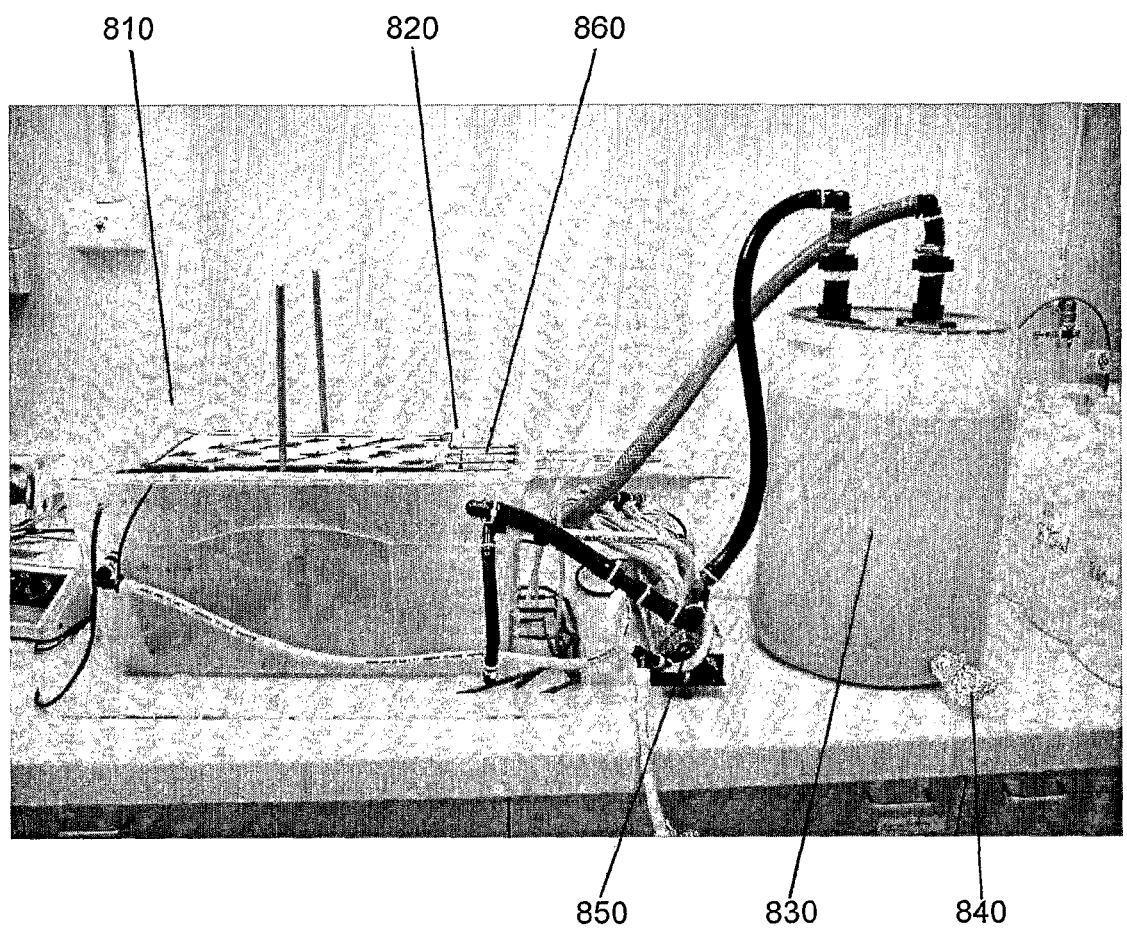

The membranes (optionally configured as gills) may be used in a bioreactor for treating sewage, as described above. A design for a bioreactor according to the invention is shown in FIG. 4. In FIG. 4, gills 100 are supported on a support which is not shown for reasons of simplicity. Liquid recycling system 105 is provided for passing liquid through gills 100. System 105 comprises peristaltic pump 110 for pumping the liquid. The pumping takes liquid from outlet manifold 115 (configured to receive fluid from the gills) and pumps it through effluent line 120 into the top of reservoir 125. Reservoir 125 is fitted with influent line 130 which reaches to near the bottom of reservoir 125. Reservoir 125 is sealed to air such that pumping effluent from the gills into reservoir 125 forces liquid from the reservoir into inlet manifold 135 via influent line 120. Arrows 107 show the direction of flow of liquid through gills 100 and arrows 108 show the direction of flow through the recycle system. Inlet manifold 135, outlet manifold 115 and gills 100 are located within outer housing 140, which provides a barrier to exit or entry of microorganisms, and thus inhibits microbial contamination of the biolayers of gills 100. Housing 140 is fitted with air inlet 145 and air outlet 150 to allow air to enter and leave the bioreactor. This is necessary in order to provide a continuing supply of oxygen to the biolayers. The air inlet and/or outlet may be fitted with filters to prevent passage of microorganisms, said filters (146 and 147 respectively being for example less than about 0.22 micron maximum pore size. The air inlet and/or outlet may also be fitted with a pump to pump air into or out of the housing to encourage air circulation. The bioreactor may also have a reflux line 155, fitted with a pump (which may be a portion of pump 110). The reflux line may be provided to take liquid which may leak from the gills or the manifolds and return them either to the influent line (as shown in FIG. 4) or alternatively to inlet manifold 135 or reservoir 125. The inventor observed in practice that very little such leakage occurred, and consequently the reflux line may not be necessary. FIGS. 5 to 8 are photographs of a bioreactor or parts thereof according to the present invention. In FIG. 5, the outer housing 510 is shown (opened for reasons of clarity). Gills 520 are indicated as are rods 530 which are connected to scrapers for scraping the membranes of gills 520. FIG. 6 shows the support 610 for the membranes of the bioreactor. One gill (620) is shown mounted on the support to illustrate its location in operation. FIG. 7 is a view of a membrane 710 fitted to a bioreactor according to the present invention. The membrane clearly shows a gas face biolayer 720 which forms part of membrane 710. The membrane is mounted on support 730. FIG. 8 shows a bioreactor with the outer housing 810 open for reasons of clarity. The support 820 for the membranes can be seen inside housing 810. Reservoir 830 contains liquid to be treated, and tap 840 is provided for removing sludge from reservoir 830. Peristaltic pump 850 is provided for pumping fluid through the bioreactor. Rods 860 are connected to scrapers (not visible in the photograph) which are provided for removing solid matter from the biolayers of the membranes. In operation, the primary treated sewage liquid recirculates through the bioreactor. The membranes oxidise ammonium ions in the liquid to nitrate. Also solid matter in the liquid adheres to and is at least partially degraded by the liquid face biolayer. Portions of the biolayer, with the solid matter and/or degradation products thereof may slough off the membrane, and are conveyed to the reservoir. They may be removed therefrom.

Figure 9:
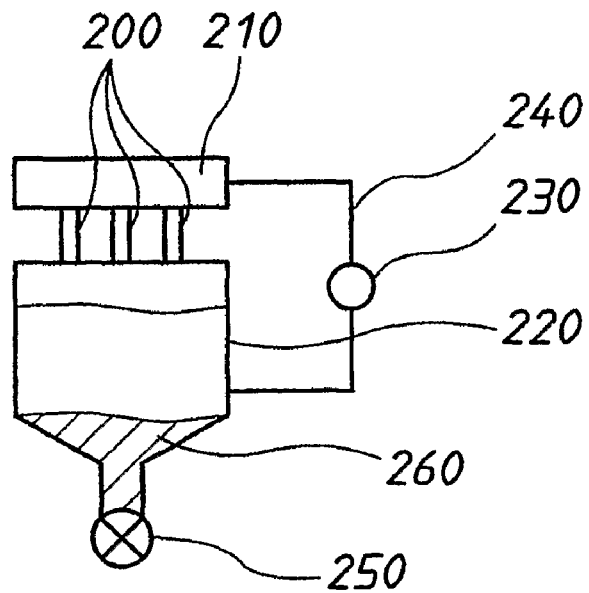
FIG. 9 is a diagrammatic representation of a bioreactor according to the present invention.

FIG. 9 shows another design of bioreactor according to the present invention. In FIG. 9, gills 200 comprise pairs of membranes according to the invention, as described earlier. The inside regions of gills 200 are coupled to inlet manifold 210, so that liquid can pass from manifold 210 into gills 200. The coupling may be direct, via tubes (not shown) or indirect, wherein holes or apertures in manifold 210 allow the liquid to flow or drip into gills 200. Alternatively the liquid may be sprayed onto the inlets of gills 200. Manifold 210 may therefore comprise one or more spray heads for spraying the liquid. Gills 200 are coupled to reservoir 220 so that liquid can pass from gills 200 into reservoir 220. Again, the coupling may be direct, with tubes passing from gills 200 (i.e. from the inside regions thereof) to reservoir 220, or may be indirect, whereby liquid that passes from gills 200 drops into reservoir 220. Pump 230 pumps liquid from reservoir 220 to inlet manifold 210 through pipe 240. It is convenient for pipe 240 to draw liquid from the lower regions of reservoir 220, although it should be sufficiently high in reservoir 220 as not to be clogged or fouled by solid waste (260) in the reservoir. Tap 250 is fitted to the bottom of reservoir 220 for removing solid waste from the bioreactor. The system may have a liquid inlet and liquid outlet for feeding primary treated sewage to the bioreactor and for removing treated liquid from the bioreactor respectively, however these are not shown for reasons of simplicity. They may be located in many different parts of the bioreactor, for example they may connect to the reservoir, pipe 240 or the inlet manifold.

In one form the bioreactor of the invention comprises vertical gills each of which comprise a pair of membranes according to the invention. The inlet to the gill may be in the form of a slot, which represents the space between the membranes of the gill. Liquid may be passed into the inlet to the gill by means of a tube or pipe from an inlet manifold, the tube or pipe having one end connected to the inlet manifold and the other end being in or near or above the inlet to the gill. The liquid may be passed into the inlet to the gill by spraying the liquid above the inlet to the gill. Liquid may thereby pass directly into the inlet to the gill, or may flow or trickle into the inlet to the gill, for example after contacting a portion of the support for the membranes.

Figure 10:
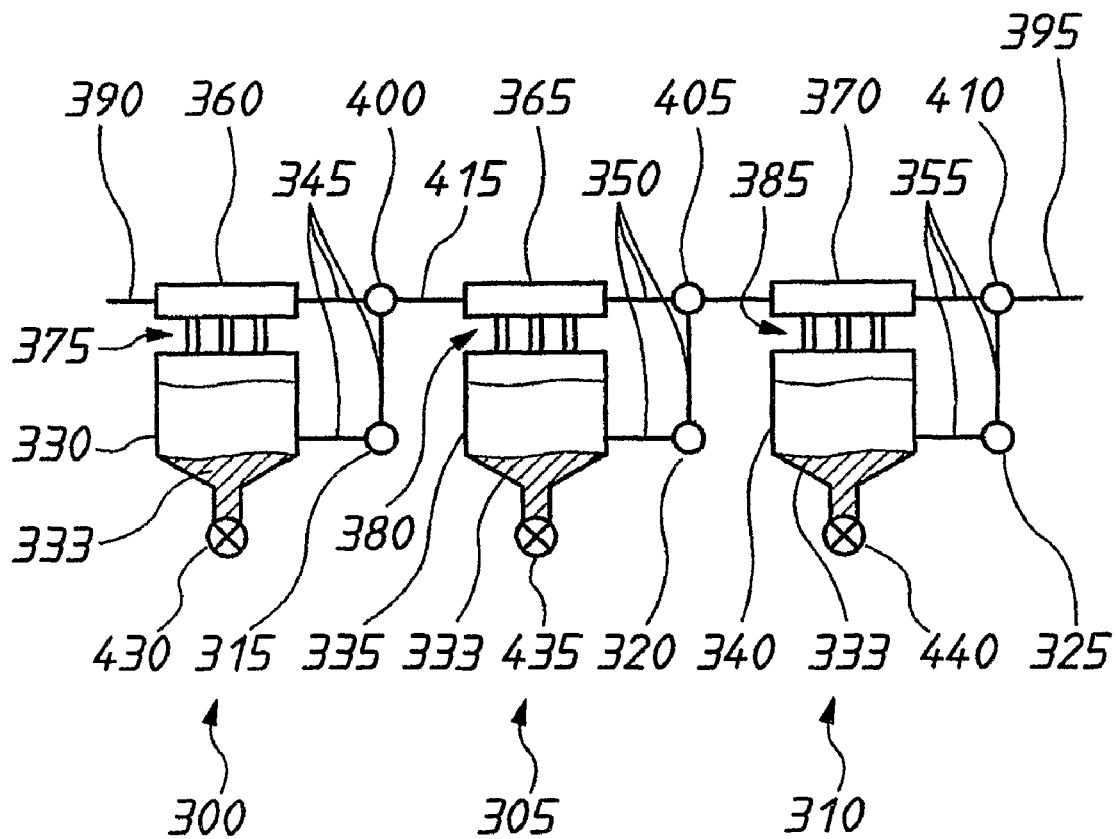
FIG. 10 is a diagrammatic representation of a system for sewage treatment according to the present invention.

FIG. 10 shows a system for treating sewage comprising three bioreactors according to the invention, connected in series. In FIG. 10, bioreactors 300, 305 and 310 are connected in series. The operation of each bioreactor is similar to that of the bioreactor of FIG. 9. Thus pumps 315, 320 and 325 pass liquid from reservoirs 330, 335 and 340 through pipes 345, 350 and 355 to inlet manifolds 360, 365 and 370, from which the liquid passes through sets of gills, 375, 380 and 385 (thereby removing ammonium ions and solid matter) to reservoirs 330, 335 and 340. Feed line 390 feeds liquid into the system, and outlet line 395 removes treated liquid from the system. Valves 400, 405 and 410 are fitted to lines 345, 350 and 355 respectively. These are connected to connecting lines 415 and 420 and outlet line 395 respectively, and may be set to determine the ratio between recycle flow and onward flow. Outlet taps 430, 435 and 440 are provided for removing solid waste from reservoirs 330, 335 and 340 respectively. Thus in operation primary treated sewage enters the system through feed line 390. The liquid passes into gills 375 through manifold 360, and is purified by gills 375. The partially purified liquid then passes into reservoir 330, where flocculated solids 333 settle to the bottom and liquid supernatant is pumped by pump 315 to valve 400. Valve 400 determines what proportion of the liquid is recycled to manifold 360 (which proportion undergoes a similar cycle to that described above) and what proportion passes through line 415 to bioreactor 305. The operation of bioreactor 305 is the same as that described above for bioreactor 300, with connecting line 415 performing a similar inlet function as feed line 390. Valve 405 then determines the ratio of recycle to onward flow to bioreactor 310, as was described for valve 400 above. Finally, liquid that passes through bioreactor 310 is passed to valve 410 which determines what proportion of the flow is passed out of the system as treated effluent through line 395. Solid waste that sloughs off the gills (i.e. from the liquid face biolayers) passes to the reservoirs, and may be removed through outlet taps 430, 435 and 440. This may be used for example for vermiculture, or as a feed for aquaculture.

Figures 10A, 10B:
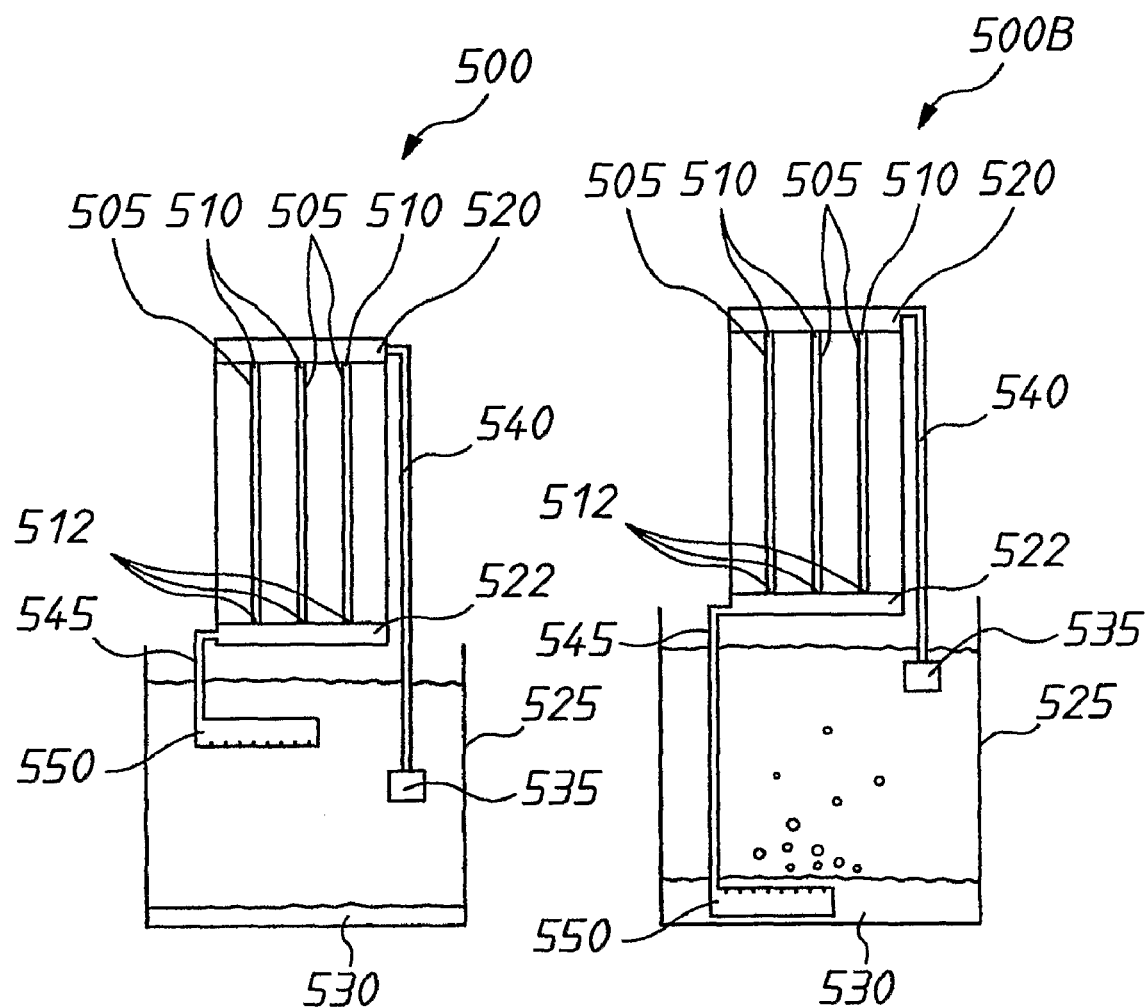
FIGS. 10A and 10B are diagrammatic representations of bioreactors according to the present invention.

The bioreactor of the present invention can act as an efficient oxygenator for a liquid to be treated therein. In many of the bioreactors of the prior art, it is necessary to agitate a feed liquid, e.g. by sparging with oxygen, in order to promote clarification by precipitation of solids. However the agitation itself inhibits settling. In some systems this problem has been addressed by having separate oxygenation and settling tanks. In the present bioreactor, there is no necessity for agitation, and therefore settling in a clarification tank is facilitated. FIG. 10A shows a suitable bioreactor according to the present invention. Bioreactor 500 In an embodiment the bioreactor comprises pairs of membranes (each membrane being as described according to the first aspect of the invention) arranged in gills 505. Each gill has an inlet 510 at the top and an outlet 512 at the bottom. Gills 505 are supported on a support (not shown) and are housed within housing 515. Inlets 510 are coupled to inlet manifold 520, and outlets 512 are coupled to outlet manifold 522. Clarifying tank 525 is provided for allowing solids formed in a feed liquid to settle as sludge 530. Pump 535 is provided to cycle clarified liquid from tank 525 to inlet manifold 520 through influent line 540. Line 545 is provided to convey liquid from outlet manifold 522 to outlet head 550. Outlet head 550 has a large number of holes so that liquid can flow from gills 505 into tank 525 with relatively little agitation.

In operation, feed liquid is passed into tank 525 through an inlet hose (not shown). It then is pumped by means of pump 535 through line 540 to inlet manifold 520. It then passes into the inner region of gills 505 via inlets 510. In passing down gills 505, nutrients in the feed liquid are metabolised by the biolayers of gills 505, which also receive oxygen from the gas faces of the membranes of the gills. This effectively oxygenates the liquid, which then passes out of outlets 512, through line 545 and out of the holes in head 550. This is accomplished with relatively minor agitation in tank 525, enabling sludge 530 to settle to the bottom of tank 525, and clarified liquid to be recycled to gills 505.

A similar bioreactor is described with reference to FIG. 10B. In bioreactor 500B FIG. 10B all components are numbered and described as in FIG. 10A. However in FIG. 10B, outlet head 550 is located near or at the bottom of tank 525, and has holes located in its upper surface. The operation of bioreactor 500B is similar to that of 500B, however oxygenated liquid from the gills which exits head 500 does so in an upward direction. As sludge 530 accumulates, it may extend above the level of the holes in head 500. The continuous movement of liquid out of these holes prevents them becoming clogged. Thus sludge 530 will be gradually lifted off head 550 and will resettle towards the bottom of tank 525 under gravity. In this manner there will be a gradient of biological oxygen demand (BOD) due to the sludge, which decreases towards the top of tank 525.

Figure 10C:
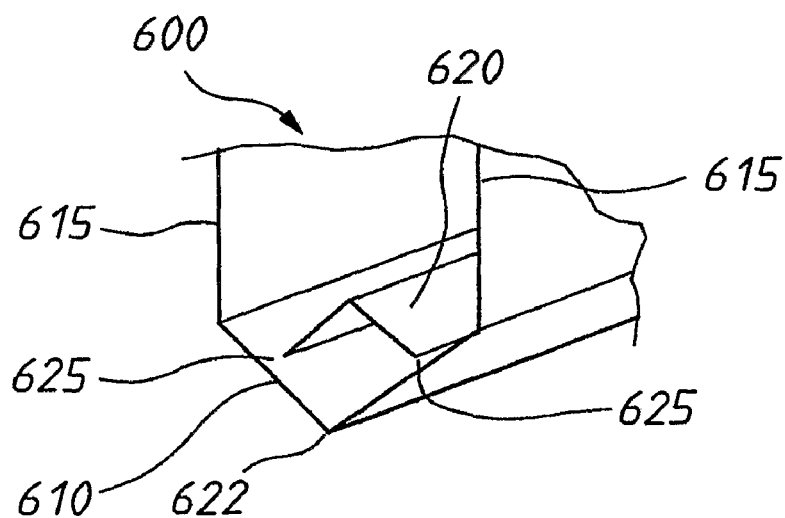
FIG. 10C is a diagrammatic representation of a tank bottom that may be used in conjunction with the bioreactors of FIG. 10A or 10B.

In FIGS. 10A and 10B, the bottom of clarifier tank 525 is shown as flat. This may be replaced by the tank bottom shown in FIG. 10C. Tank bottom 600 has a V-shaped profile 610 along its length, with vertical sides 615 extending upwards therefrom. It has insert 620 which has an inverted V-shaped profile along its length, tapering to apex 622, and is located so that gaps 625 are present between insert 620 and V-shaped profile 610. Gaps 625 are sufficiently large that they are not readily clogged by sludge forming in the tank. It may be between about 1 and 50 cm, commonly between about 5 and 20 cm. The purpose of tank bottom 600 is to trap sludge that rises in the tank due to anaerobic processes in the sludge. Thus in operation sludge that forms in the tank falls to the bottom. It may encounter V-shaped profile and slide down through gaps 625 towards apex 622, where it collects. The sludge may also encounter insert 620 and slide down the sides thereof, passing again through gaps 625 to accumulate near apex 622. Anaerobic processes occurring within the sludge near apex 622 may cause a portion of the sludge to rise, however this would then collect in the inverted V-shaped profile of insert 620. This would prevent sludge passing to the membranes of the bioreactor.

Figure 10D:
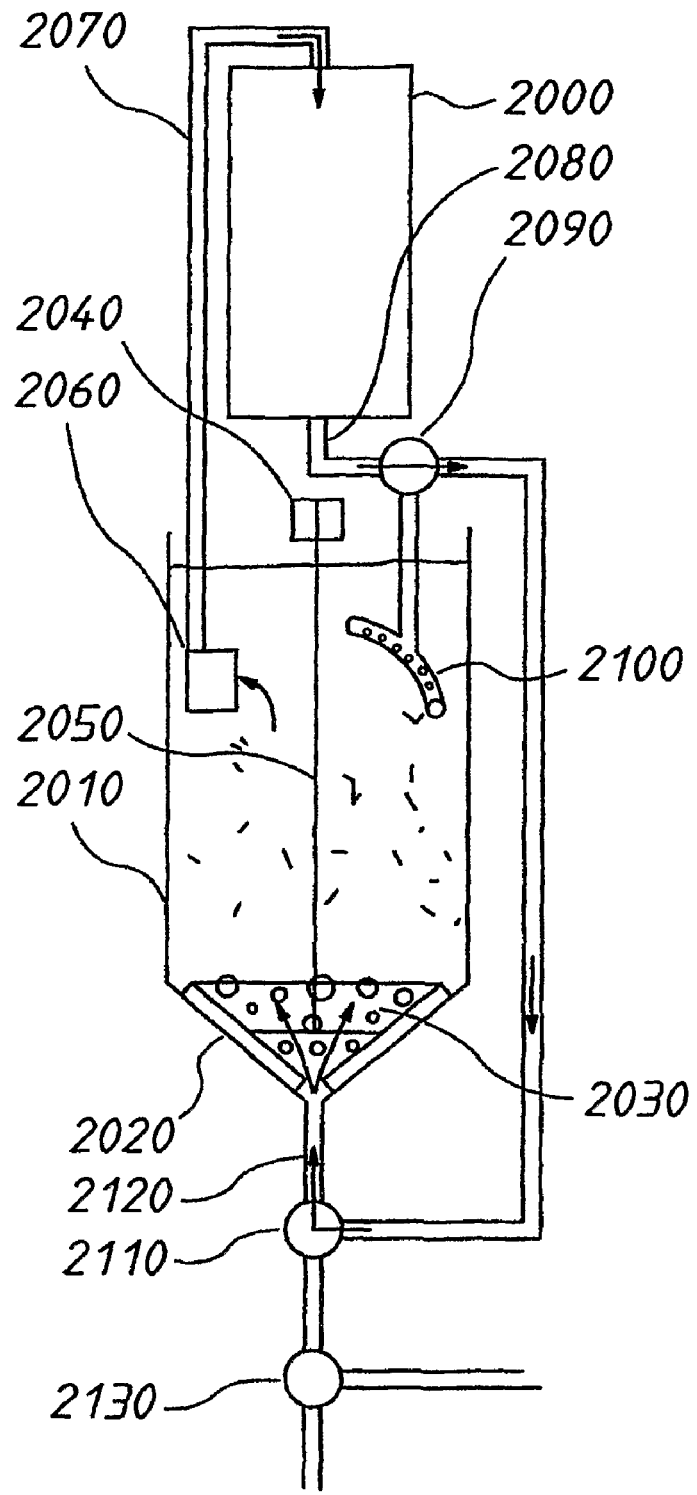
FIG. 10D is a diagrammatic representation of a bioreactor according to the present invention having a cylindrical clarifier.

FIG. 10D shows a design for a bioreactor according to the present invention having a cylindrical clarifier. In FIG. 10, housing 2000 contains membranes on a support structure, together with inlet and outlet manifolds, not shown. Housing 2000 is located above clarifier 2010, which has a conical shaped lower end 2020 fitted internally with a scraper 2030. Scraper 2030 is driven by scraper drive 2040 by means of shaft 2050. Pump 2060 is provided to pump liquid from clarifier 2010 to the inlet manifold inside housing 2000 through pipe 2070. The outlet manifold in housing 2000 connects to pipe 2080 which is fitted with T-valve 2090. One branch of T-valve 2090 leads to disperser 2100, located inside clarifier 2010. Disperser 2100 has holes to allow egress of liquid therefrom. Another branch of T-valve 2090 leads to a second T-valve 2110. A first pipe 2120 from T-valve 2110 leads to the bottom of lower end 2020 of clarifier 2010, and a second pipe therefrom leads to a third T-valve 2130.

FIG. 10D i) shows a diagram for the bioreactor operating in bioreactor-mode. The system has housing 2000 containing membranes attached to a cylindrical clarifier-bioreactor 2010 with a conical base 2020 and a portal in the bottom that acts as both an inlet for oxygenated liquid leaving membrane housing 2000 and an effluent portal for sludge/sediment/solids and later clarified liquid. During the bioreactor cycle the liquid in the dual-purpose conical-based bioreactor-clarifier 2010 would be pumped via pump 2060 up into the inlet manifold, where it would trickle down through the membrane gills inside housing 2000, becoming oxygenated and exit the bottom of membrane housing 2000 into a pipe 2080 and through valve 2090, which would direct it to the bottom 2020 of the bioreactor-clarifier through valve 2110, which would direct it up into the conical portion 2020 of the clarifier 2010. The oxygenated influent liquid entering the base of the clarifier 2010 would suspend settled solids that would be constantly pushed down the walls of the conical base 2020 by a rotating pitched scraper 2030 driven by a drive 2040 from above the clarifier 2010. The continuously uplifted solids would form a sludge-blanket that was well oxygenated. This would also prevent the stratification of solids and dissolved oxygen.

FIG. 10D ii) shows the system operating in clarification mode. After initially operating in bioreactor mode as described above, valve 2090 would be switched so that the direction of the flow of the effluent liquid coming out of the membrane housing 2000 would flow through a disperser 2100 in the cylindrical/upper part of the clarifier 2010. The uplift of the settled solids would cease, so they would fall to the conical bottom 2020 of the clarifier 2010. As solids accumulate on the bottom of the clarifier 2010, the rotating scraper 2030 would periodically turn on to push the solids to the outlet in the bottom. Valve 2110 could at first be left open so that solids could accumulate in the line leading back to the housing 2000 to act as a biomass store for the next batch of liquid, or it could be sealed during the clarification cycle to prevent solids accumulating in the line, depending on which is preferable.

FIG. 10D iii) Periodically valve 2110 could be opened to allow the sludge to pass to valve 2130, which would direct it to a sludge outlet for further processing or discharge to the sewer line in the case of sewer-mining operations. The pump 2060 could be switched off to allow a final settling cycle to take place, and the sludge could be periodically discharged to the sludge outlet via valve 2130 opening and closing.

FIG. 10D iv) Finally valve 2130 could be switched to allow the clarified liquid to be drained from the clarifier 2010 to a discharge line for the clarified liquid for to be further processed or discharge depending on the final application.

Figure 11:
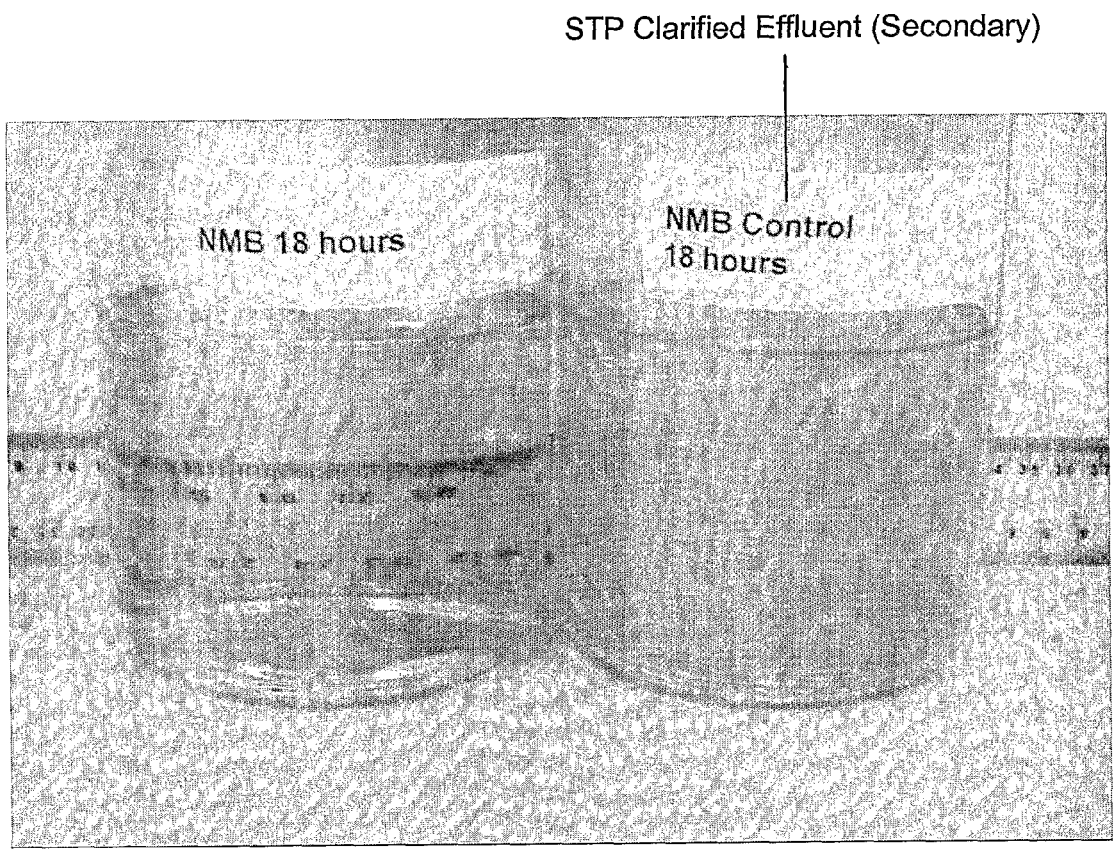
FIG. 11 is a photograph showing sewage clarified by an operating sewage treatment plant and by a bioreactor according to the present invention.
Figure 12A:
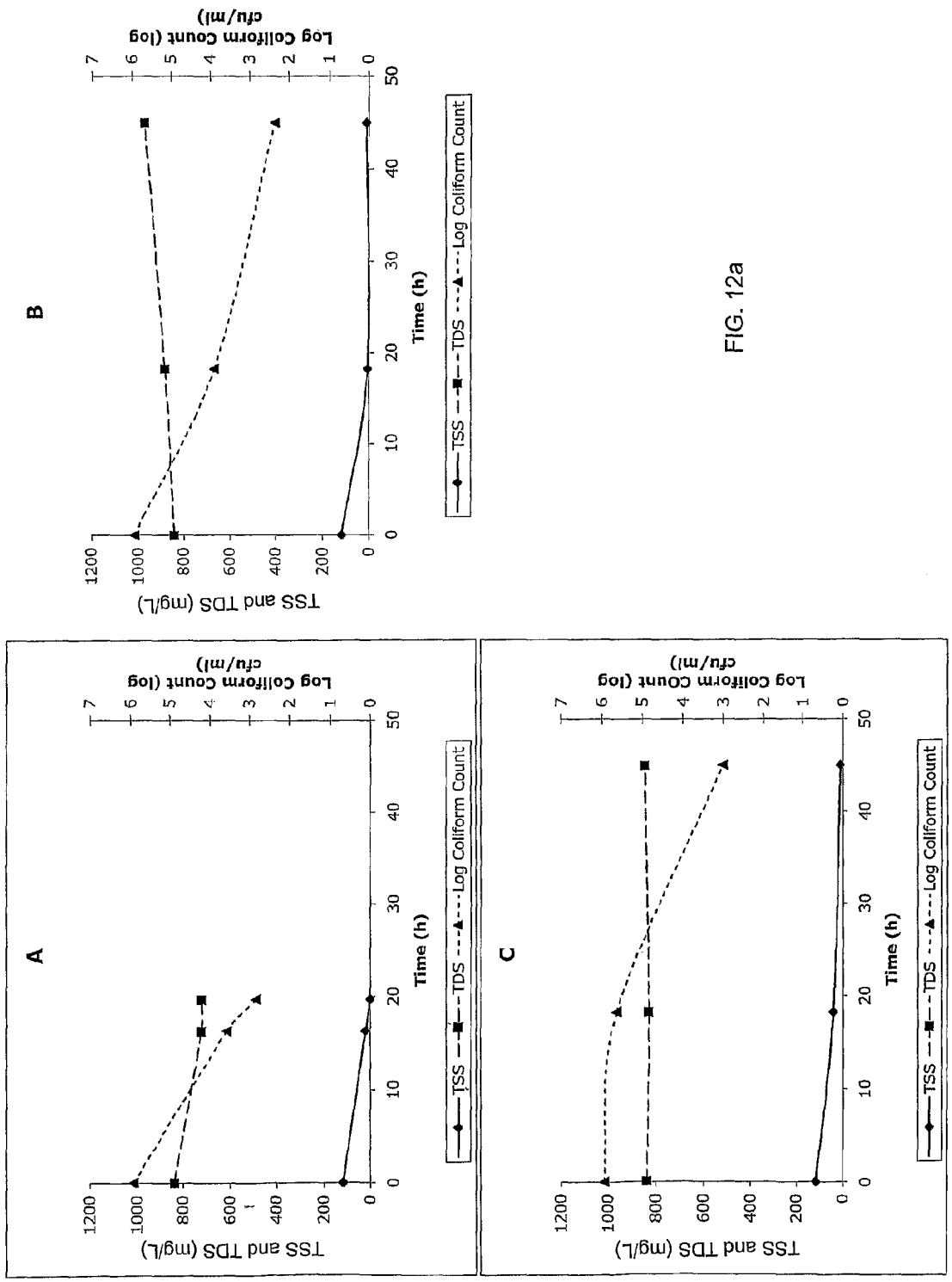
FIG. 12 shows results from Example 1.
Figure 12B:
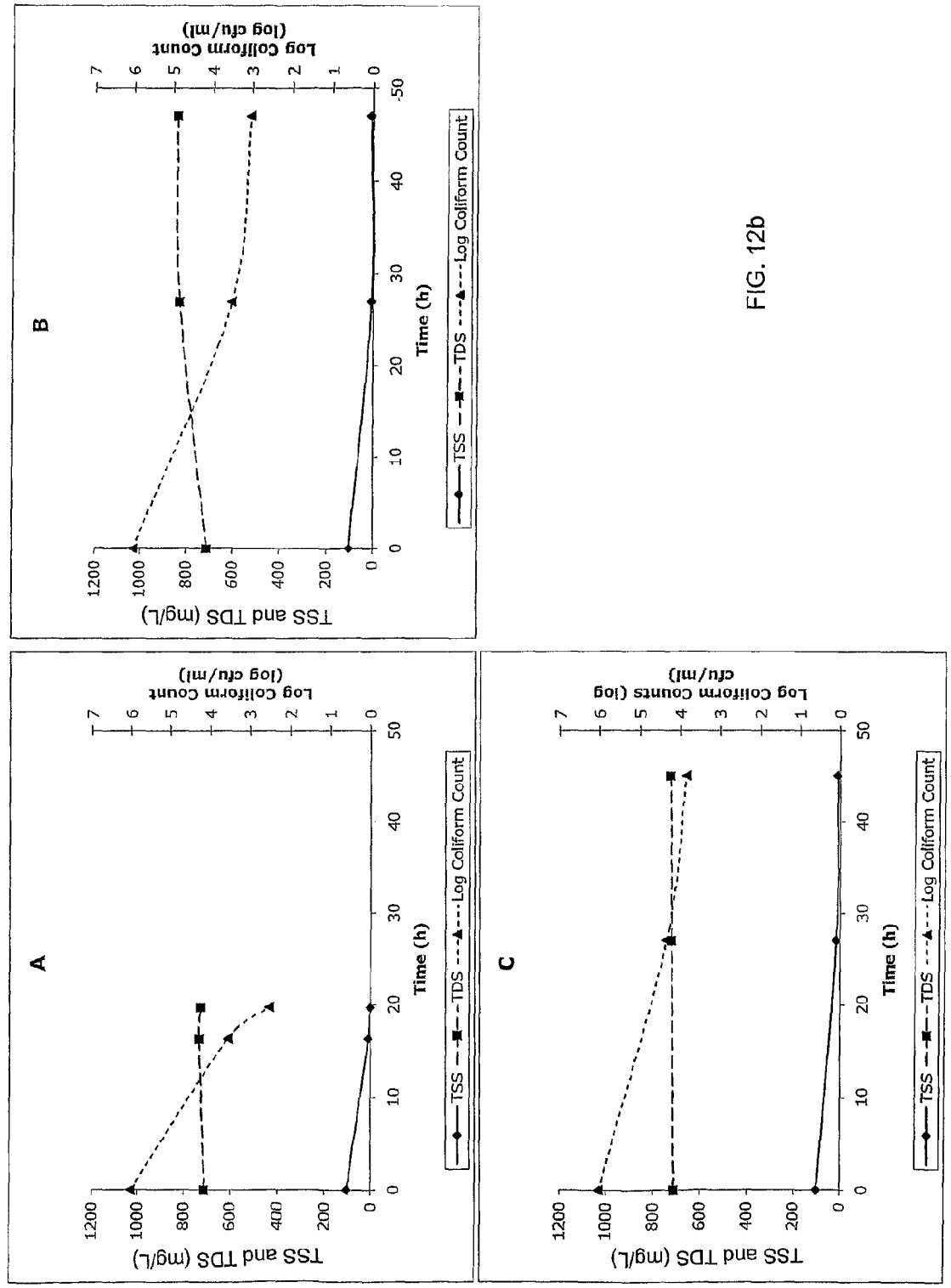
Figure 12C:
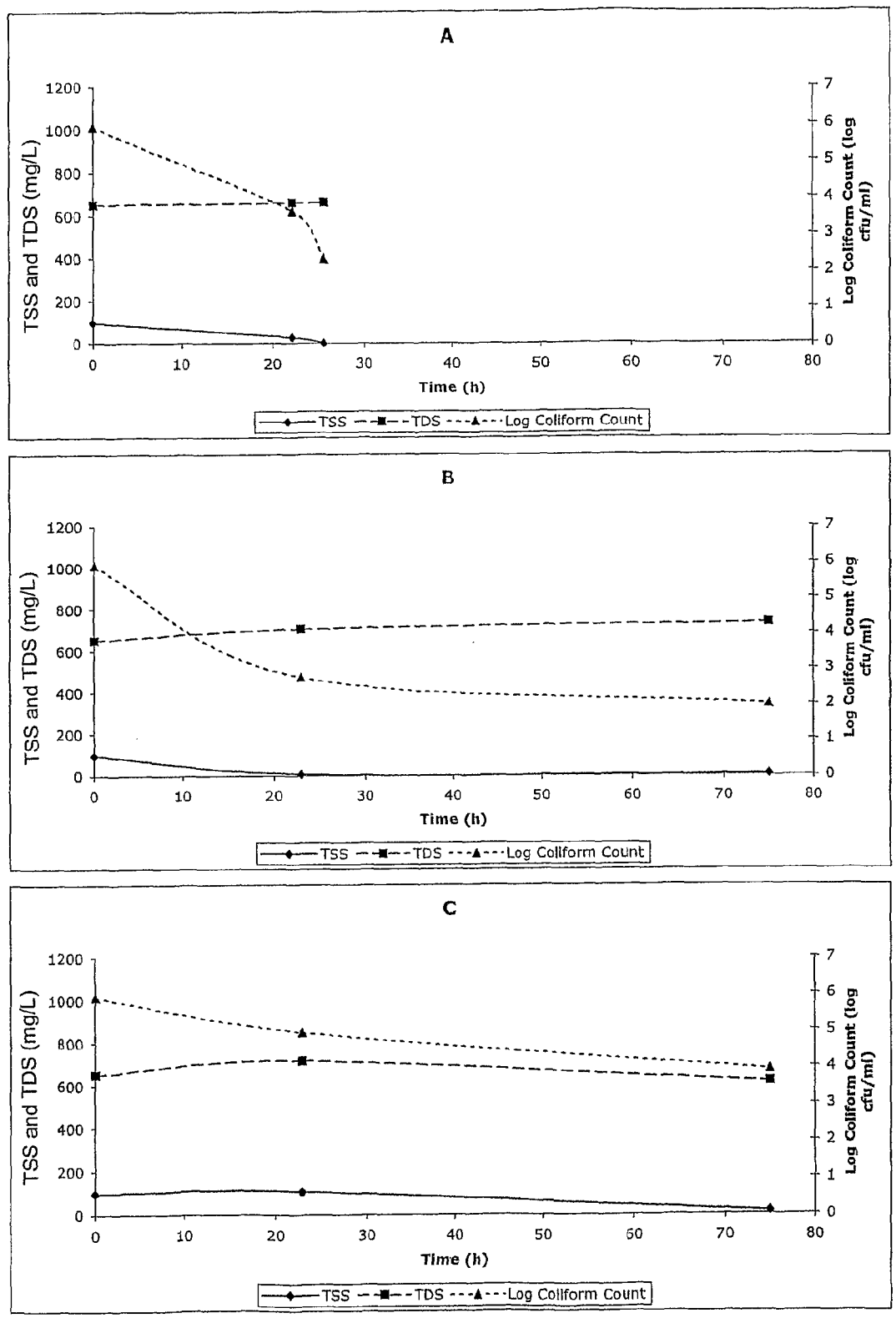
Figure 12D:
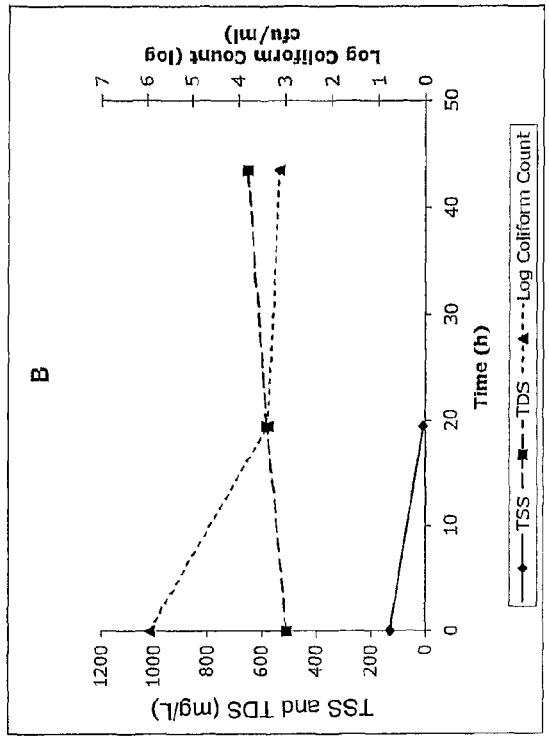
Figure 12D:
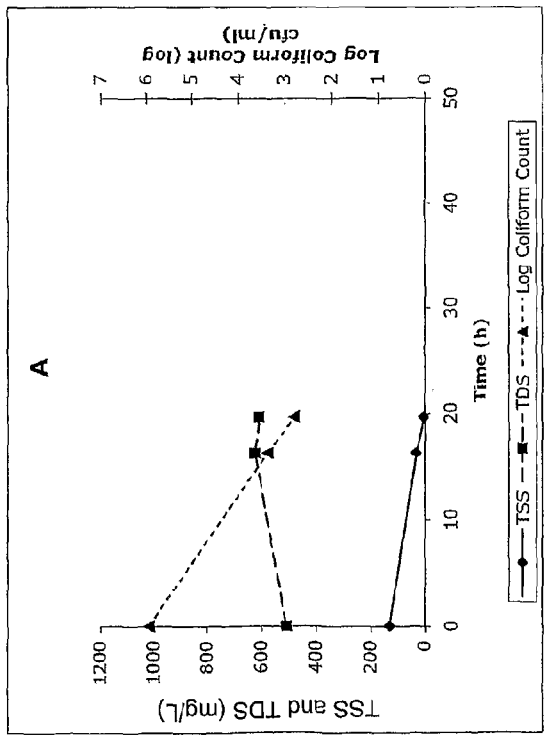
Figure 12D:
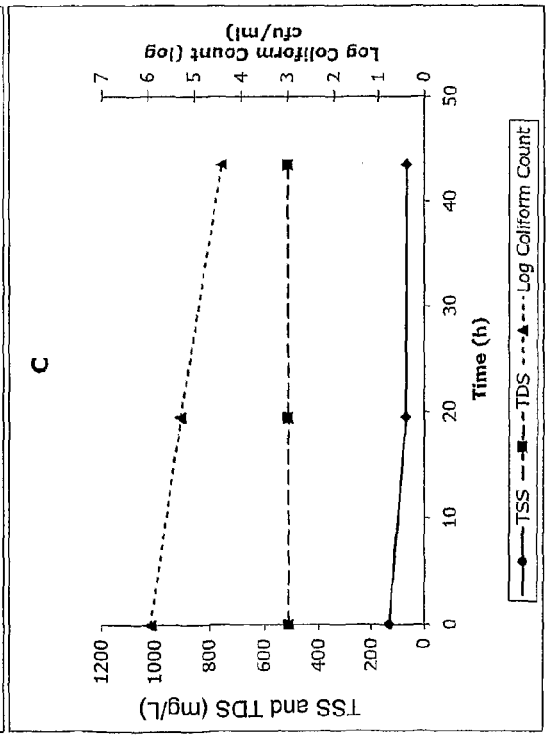
Figure 12E:
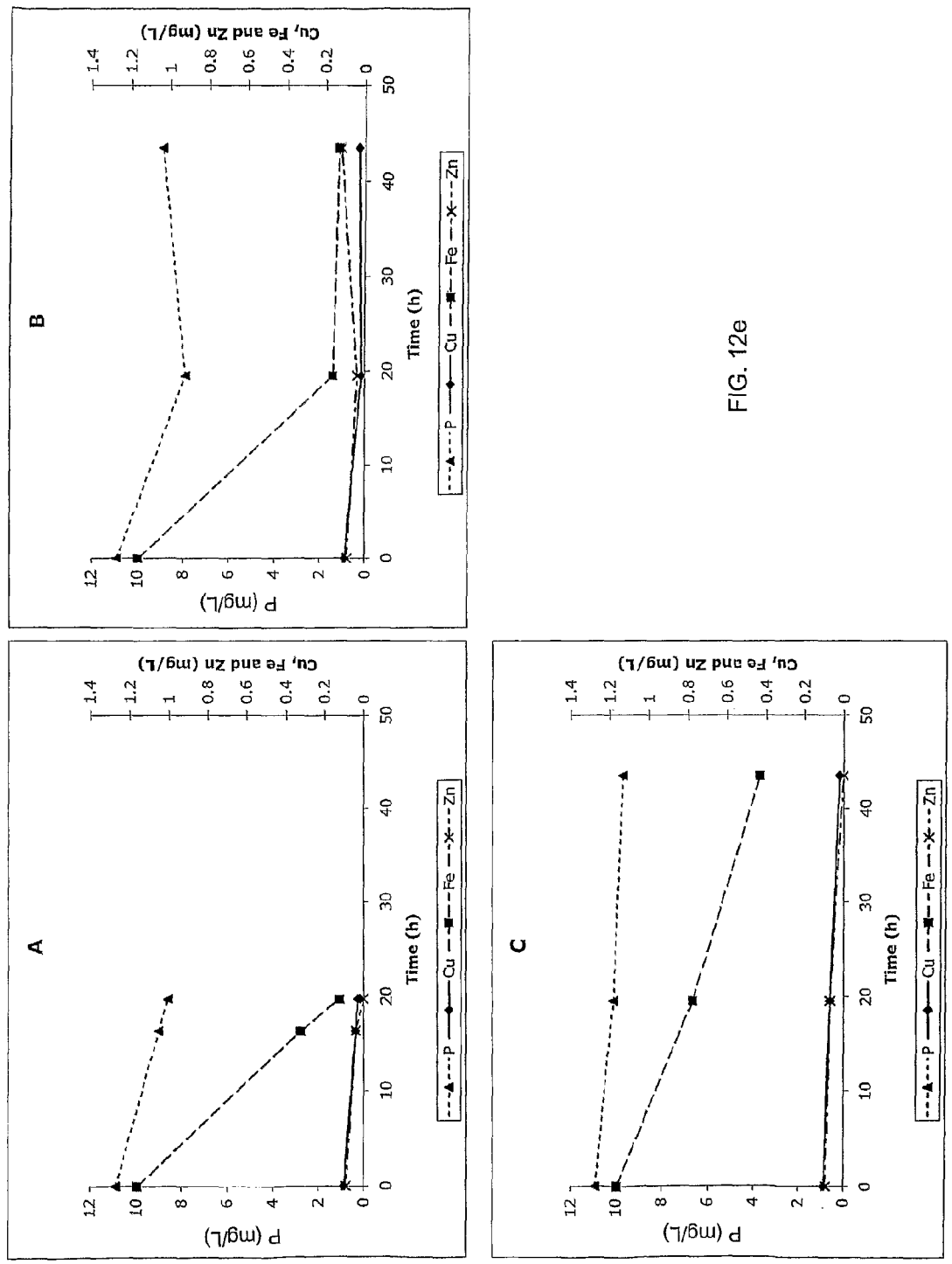
Figure 12F:
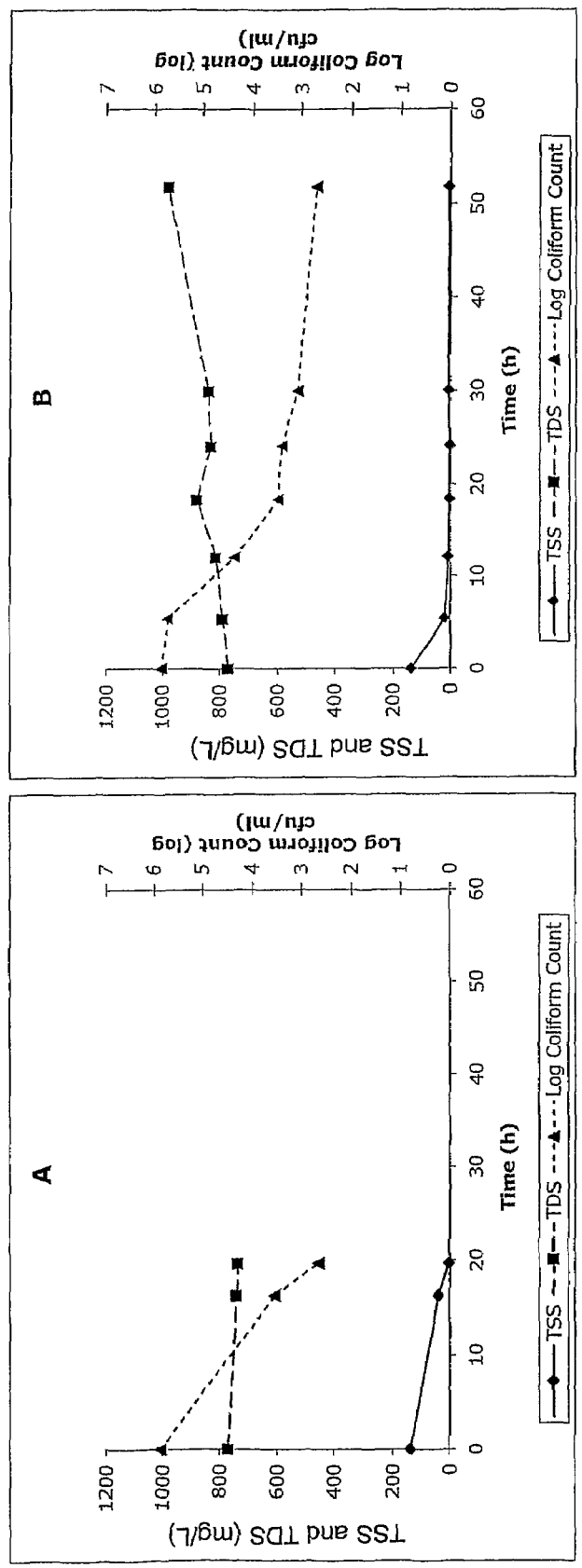
Figure 12G:
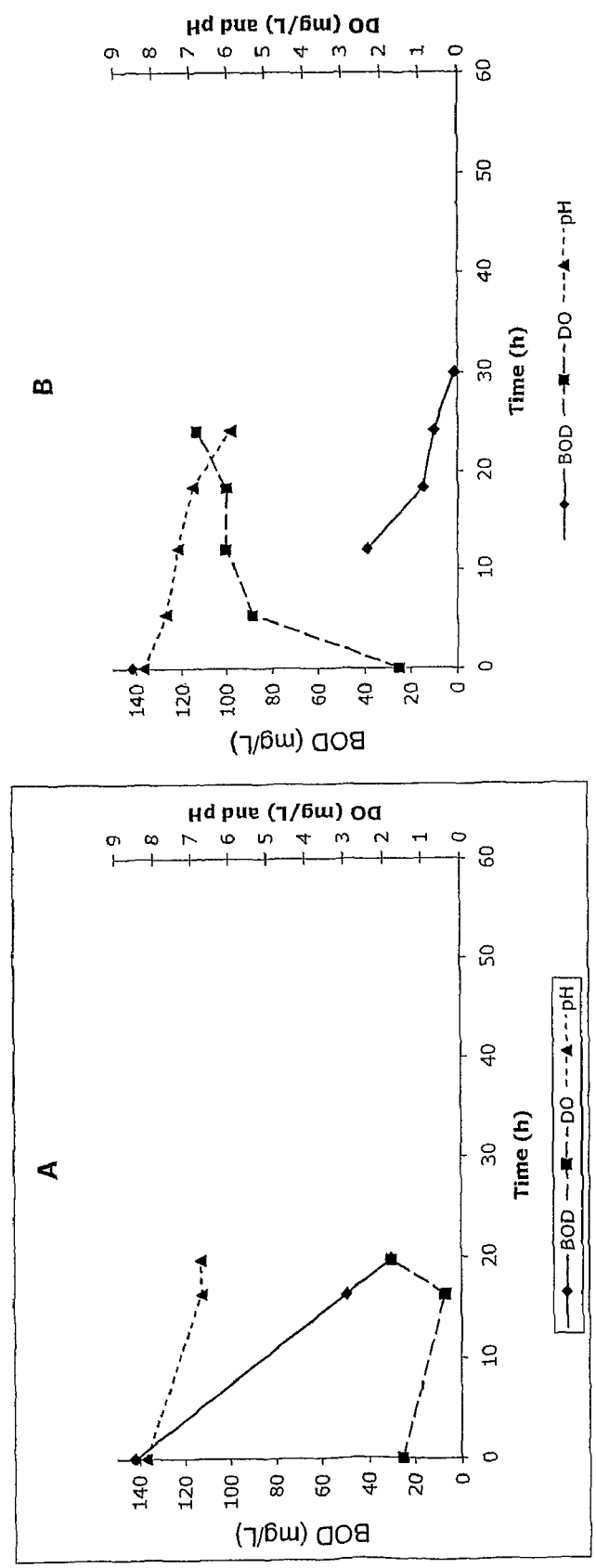
Figure 12H:
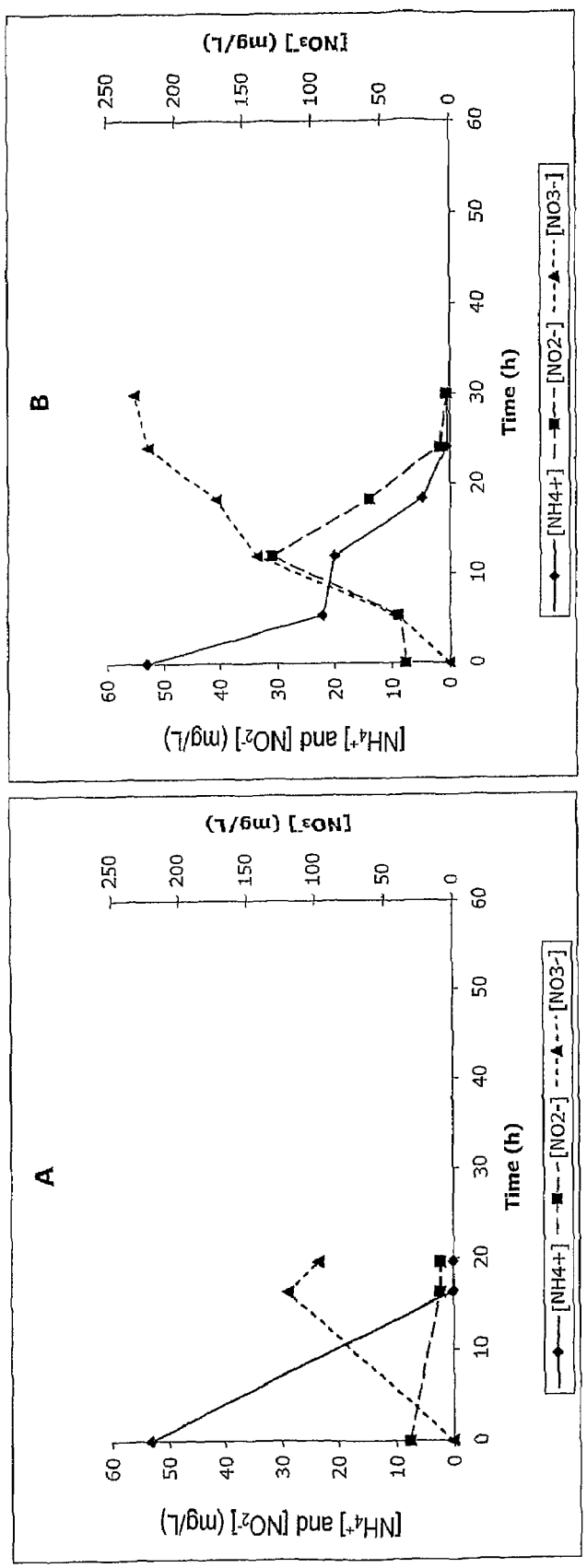
Figure 12I:
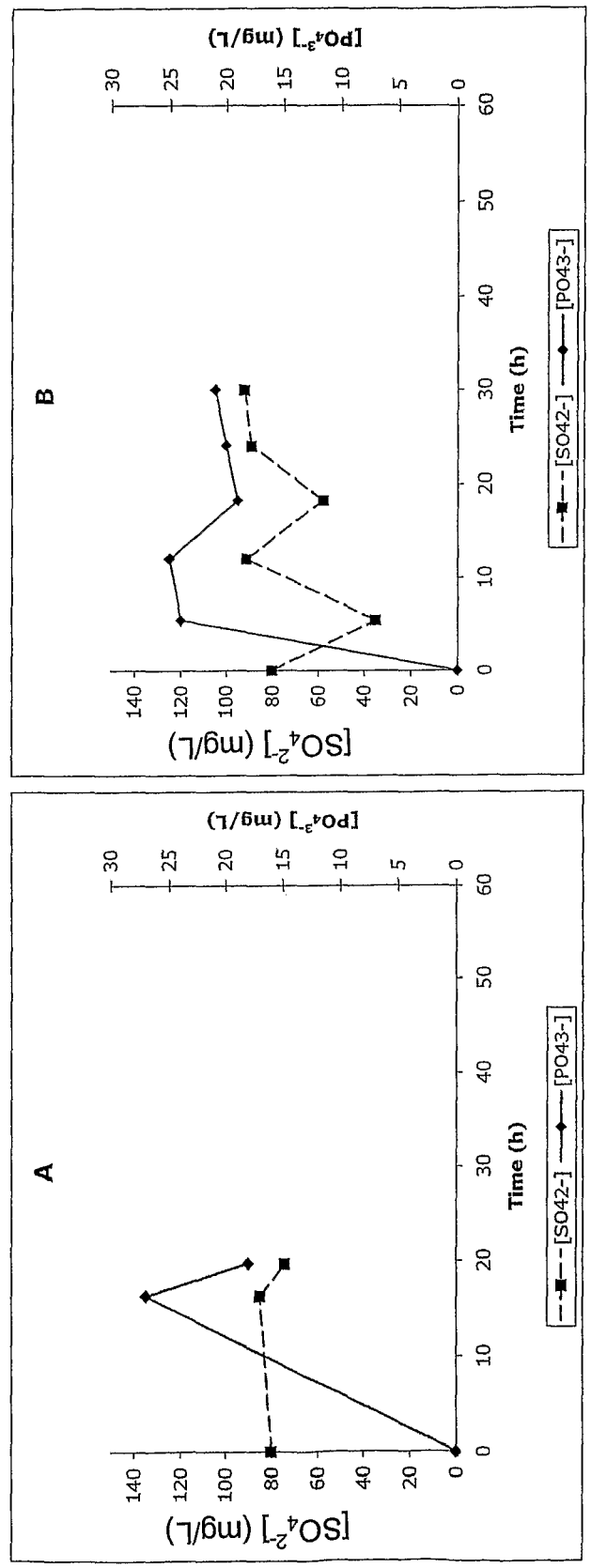
Figure 12J:
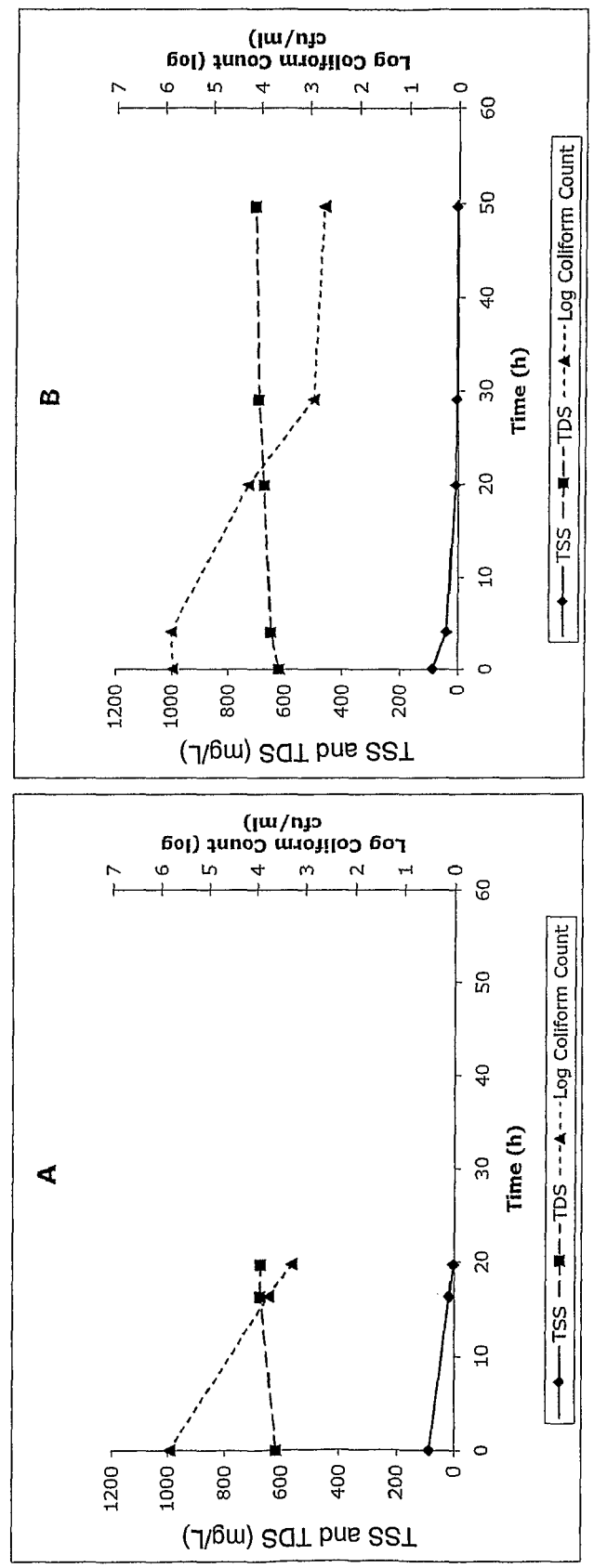
Figure 12K:
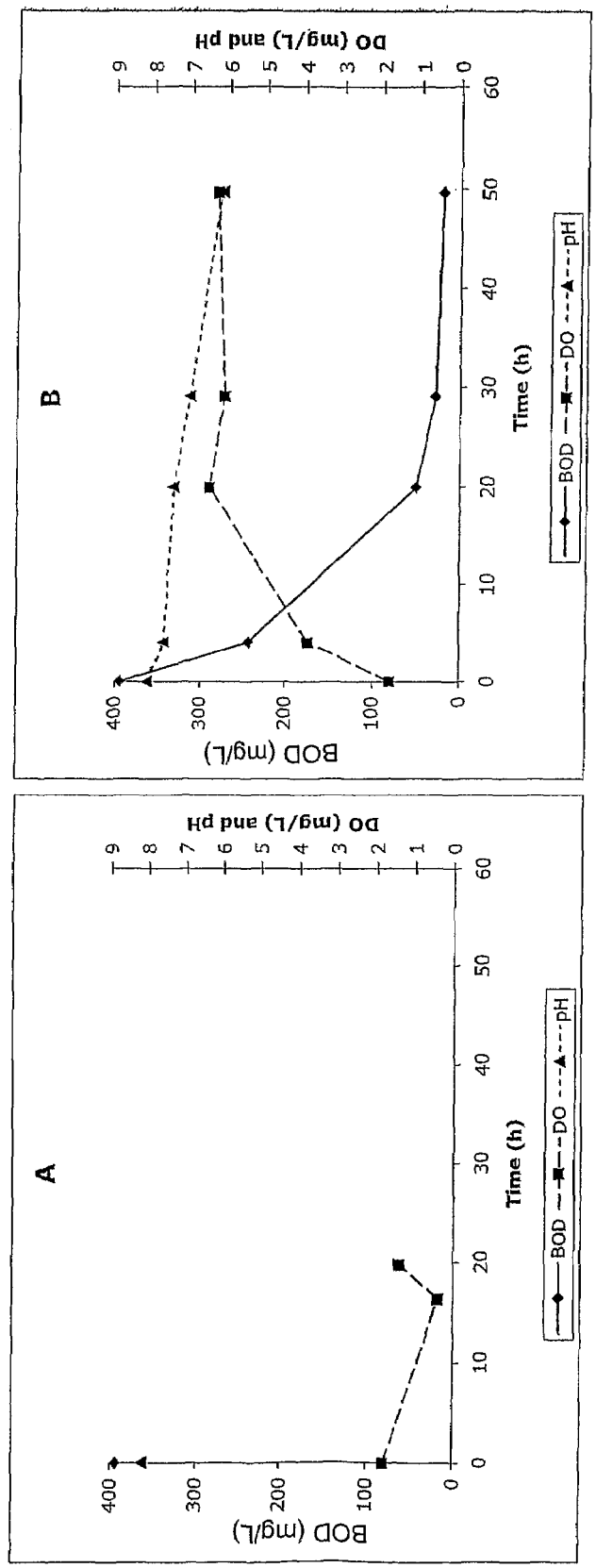
Figure 12I:
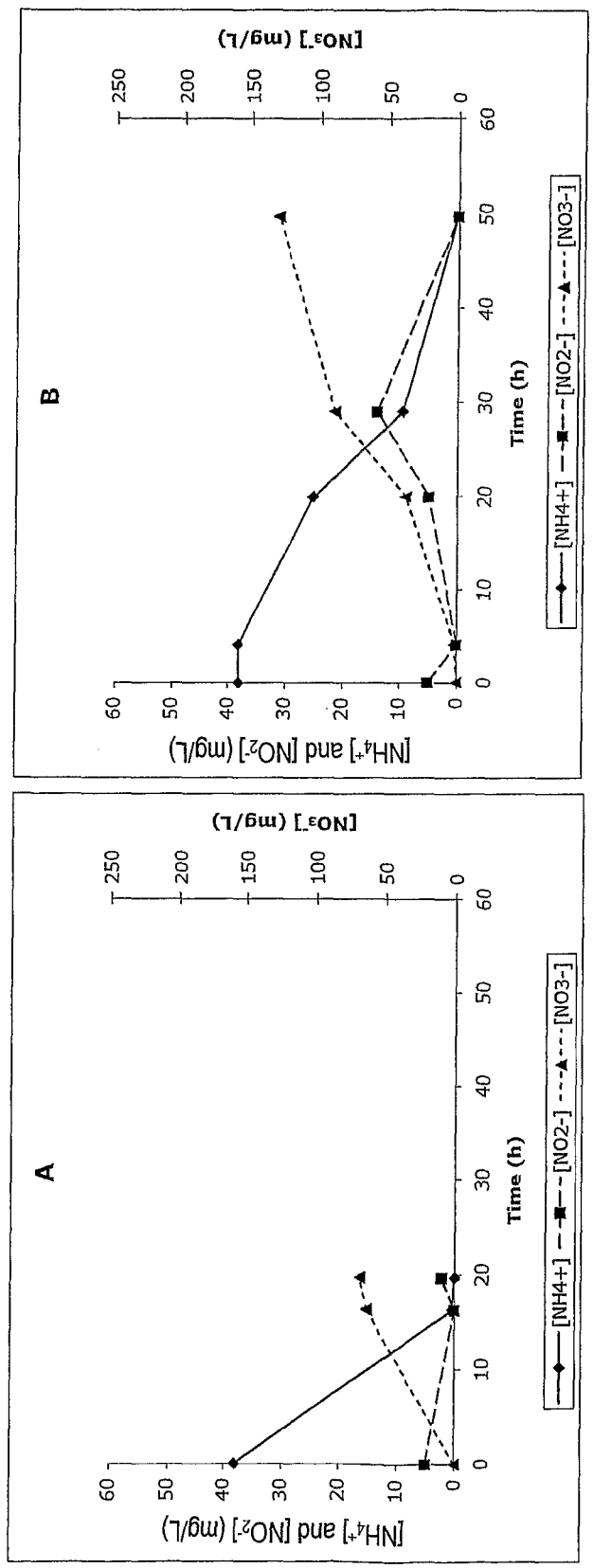
Figure 12M:
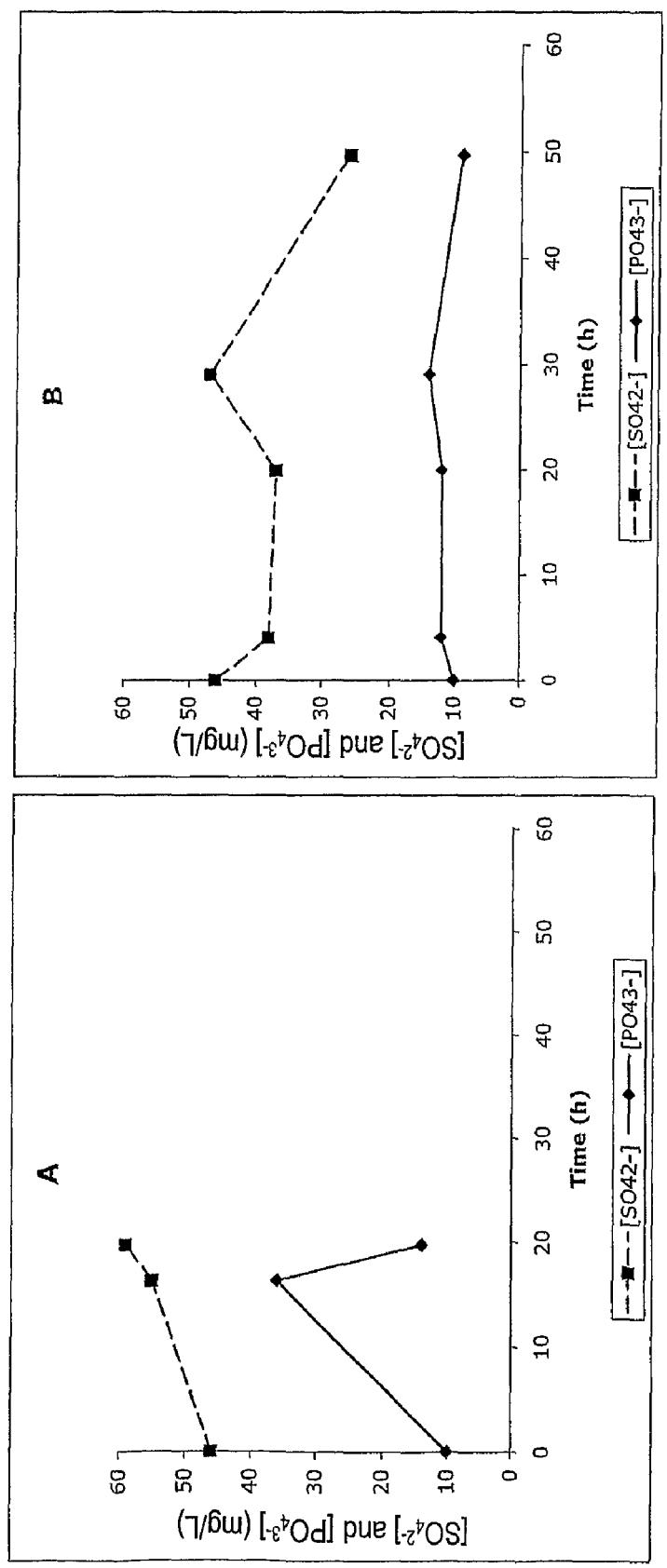
Figure 12N:
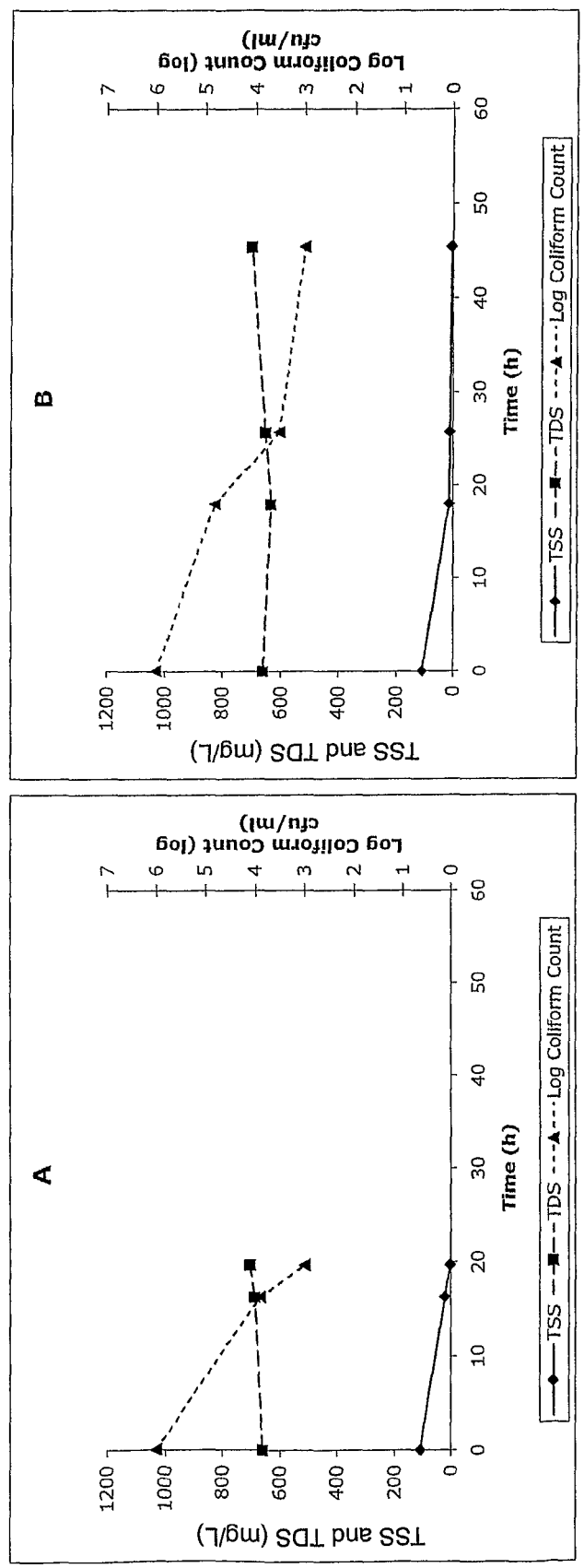
Figure 12O:
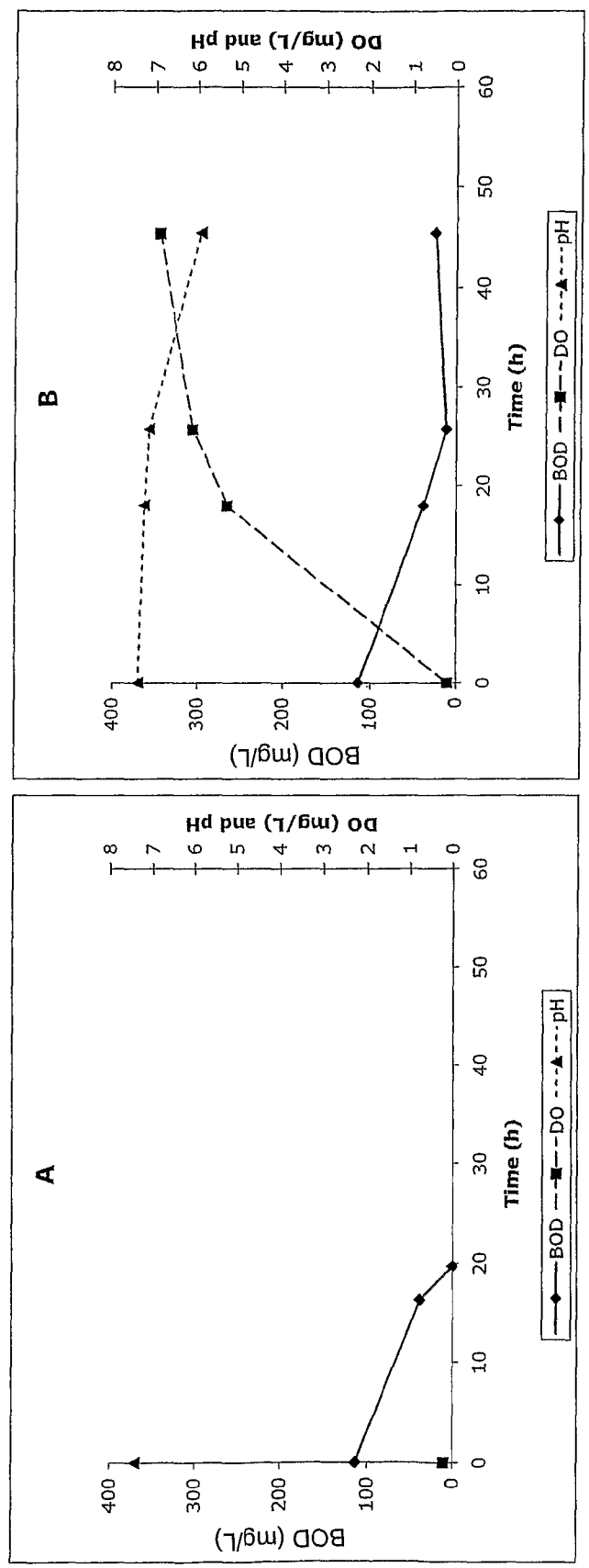
Figure 12P:
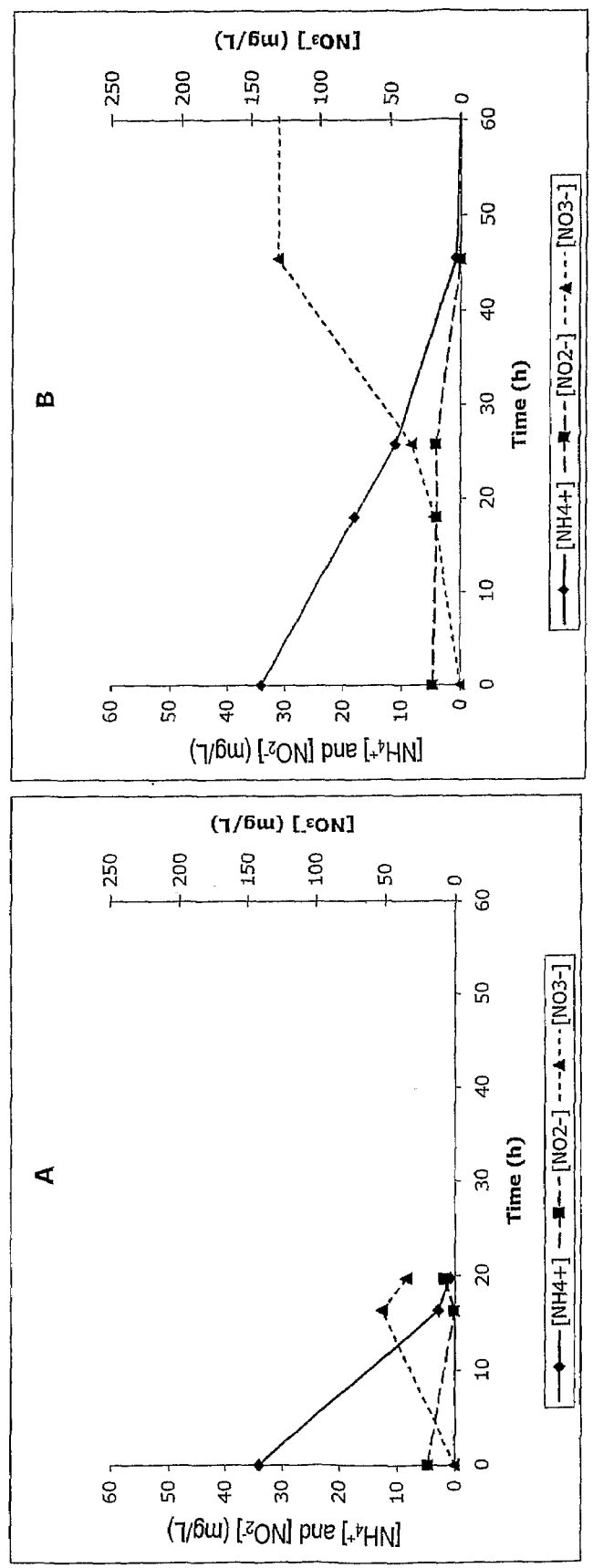
Figure 12Q:
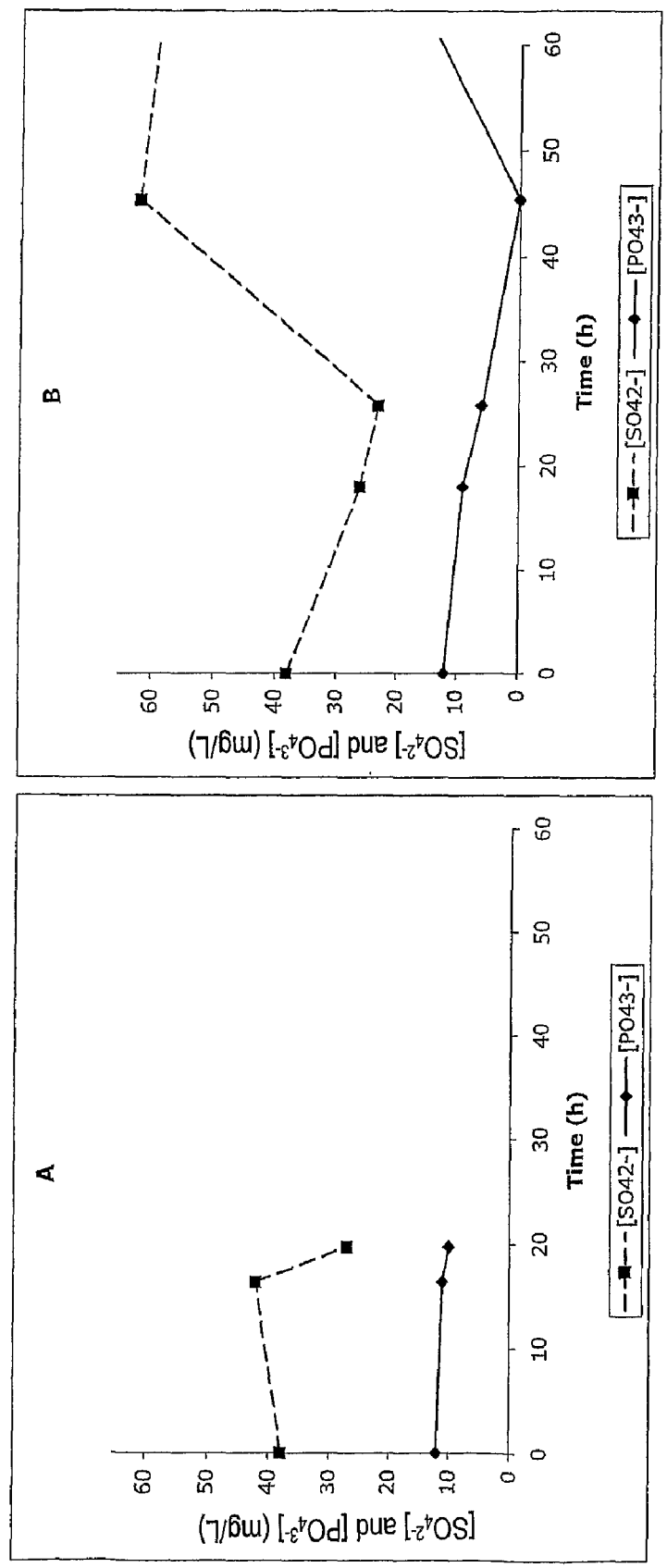
Figure 12R:
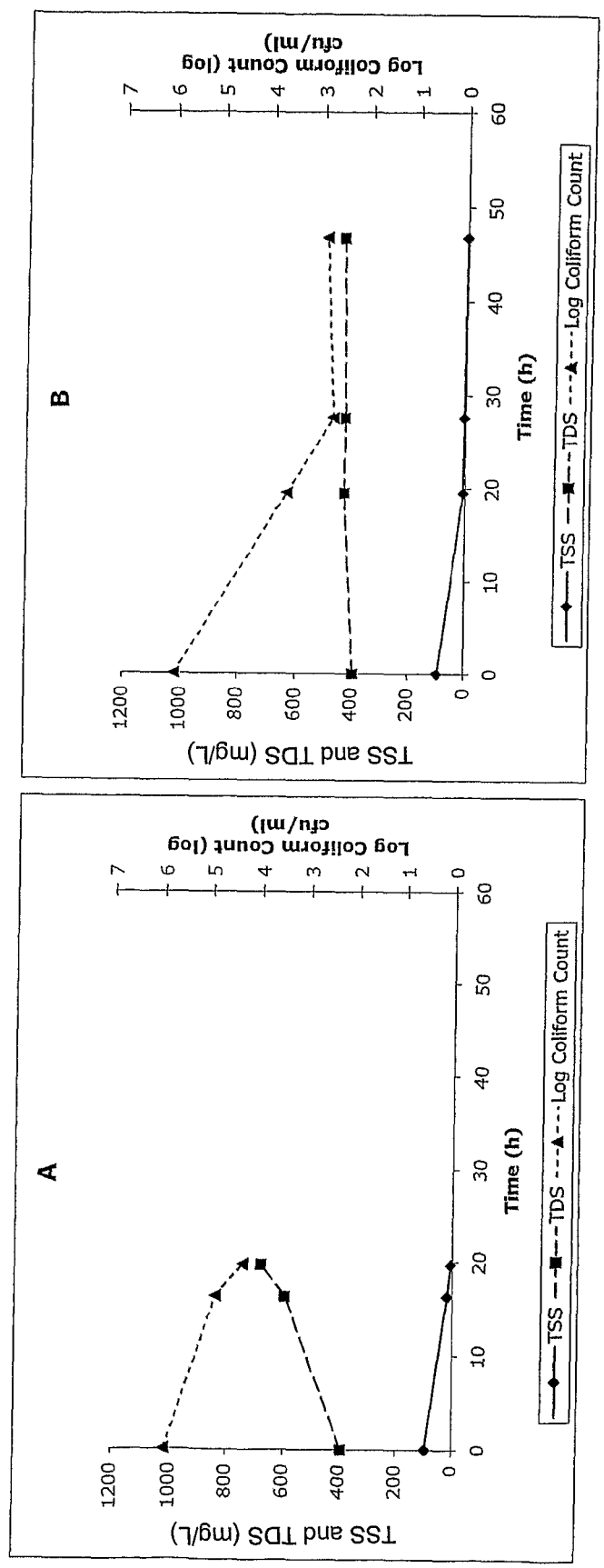
Figure 12S:
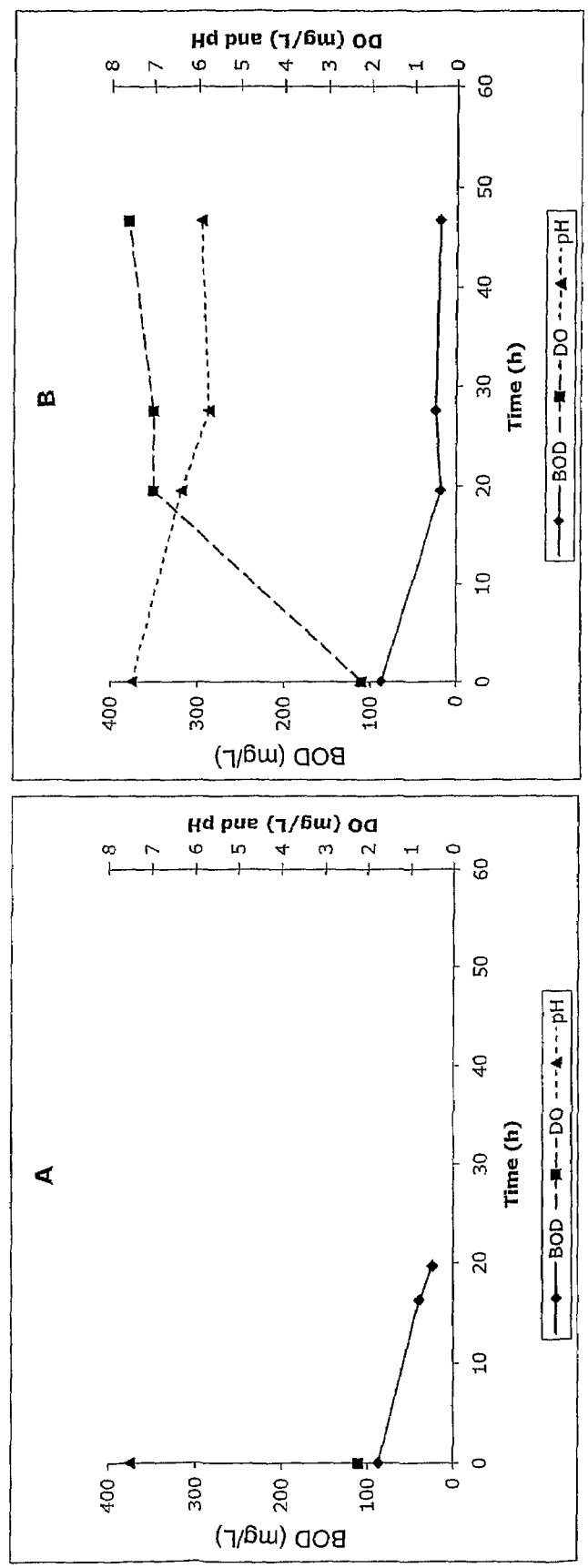
Figure 12T:
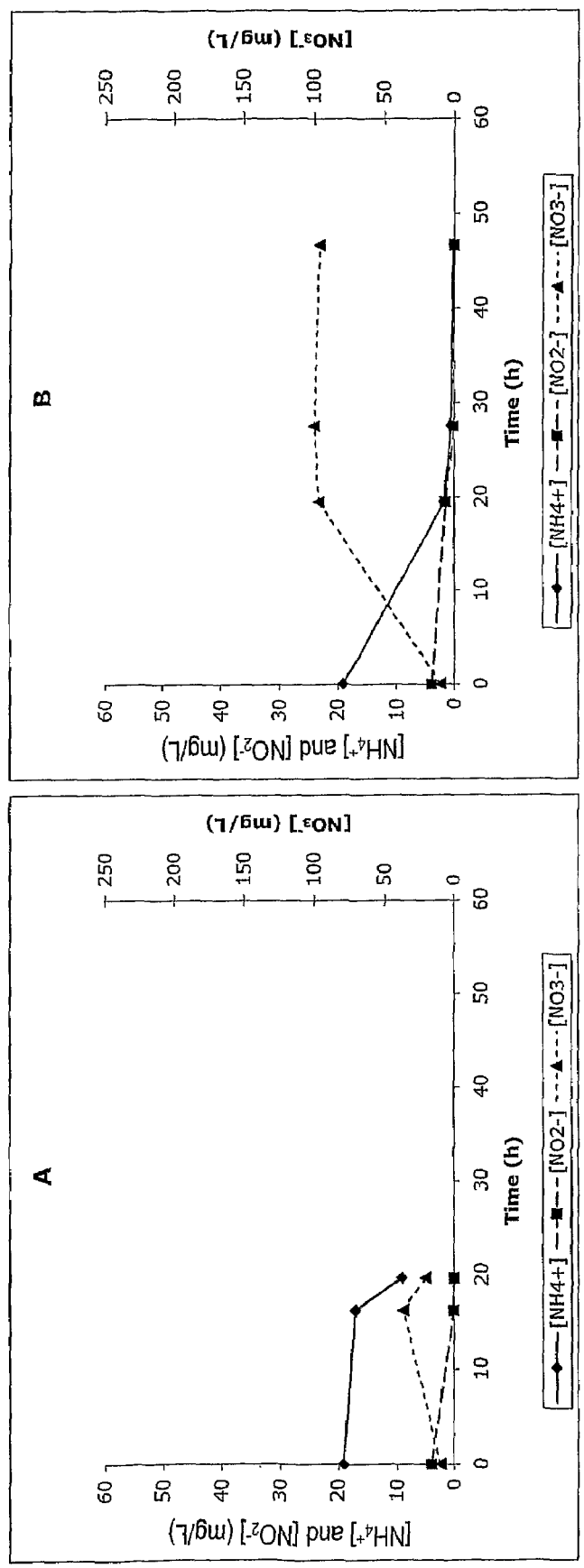
Figure 12U:
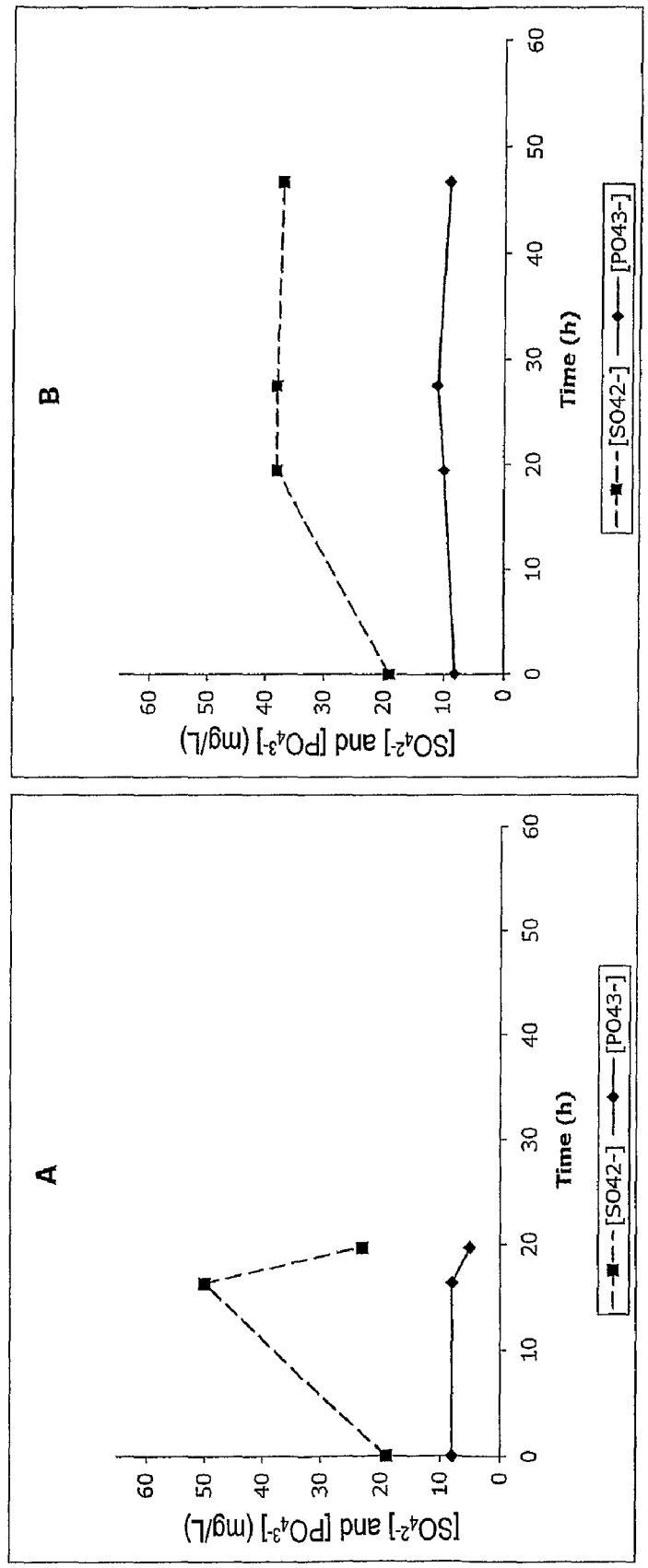
Figure 12V:
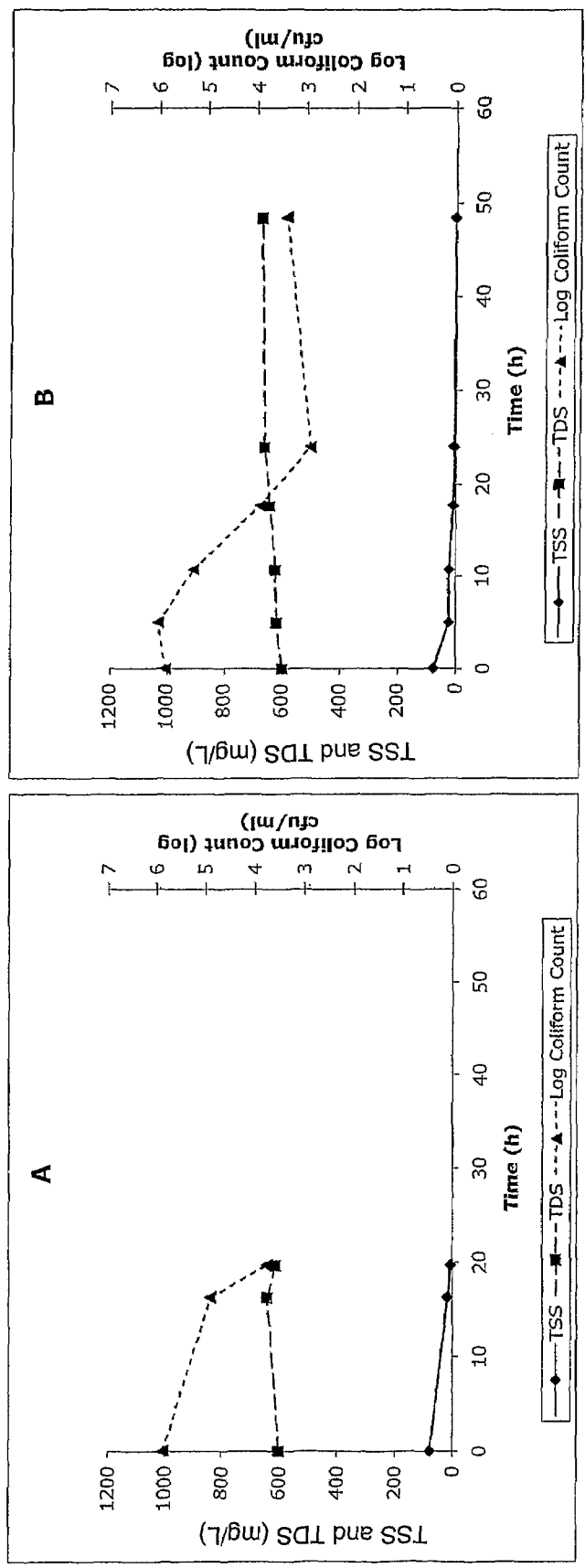
Figure 12W:
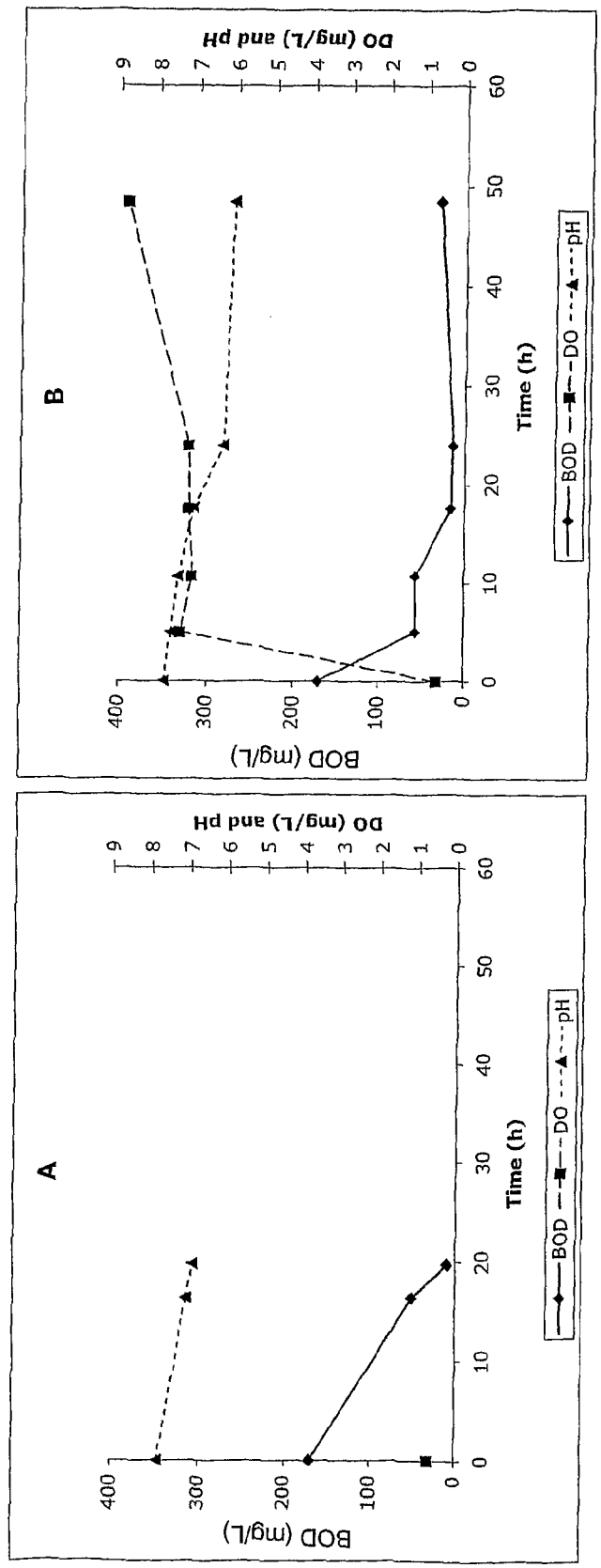
Figure 12X:
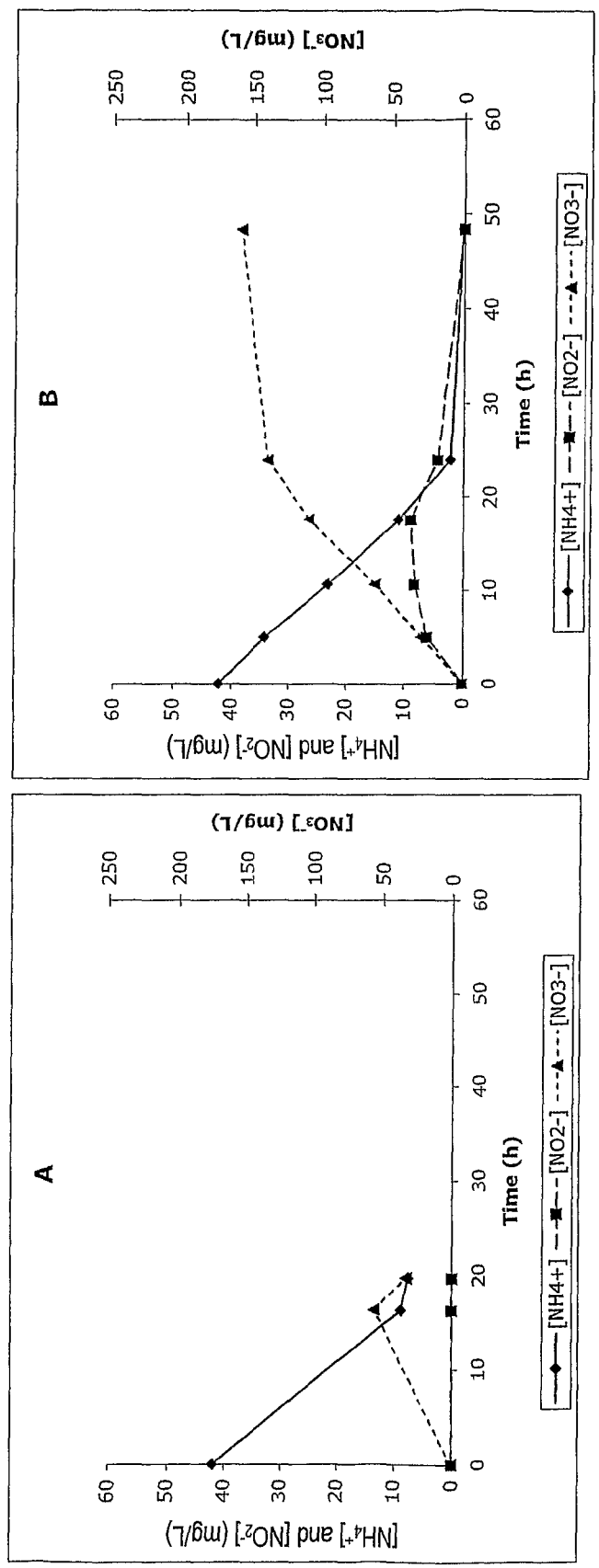
Figure 12Y:
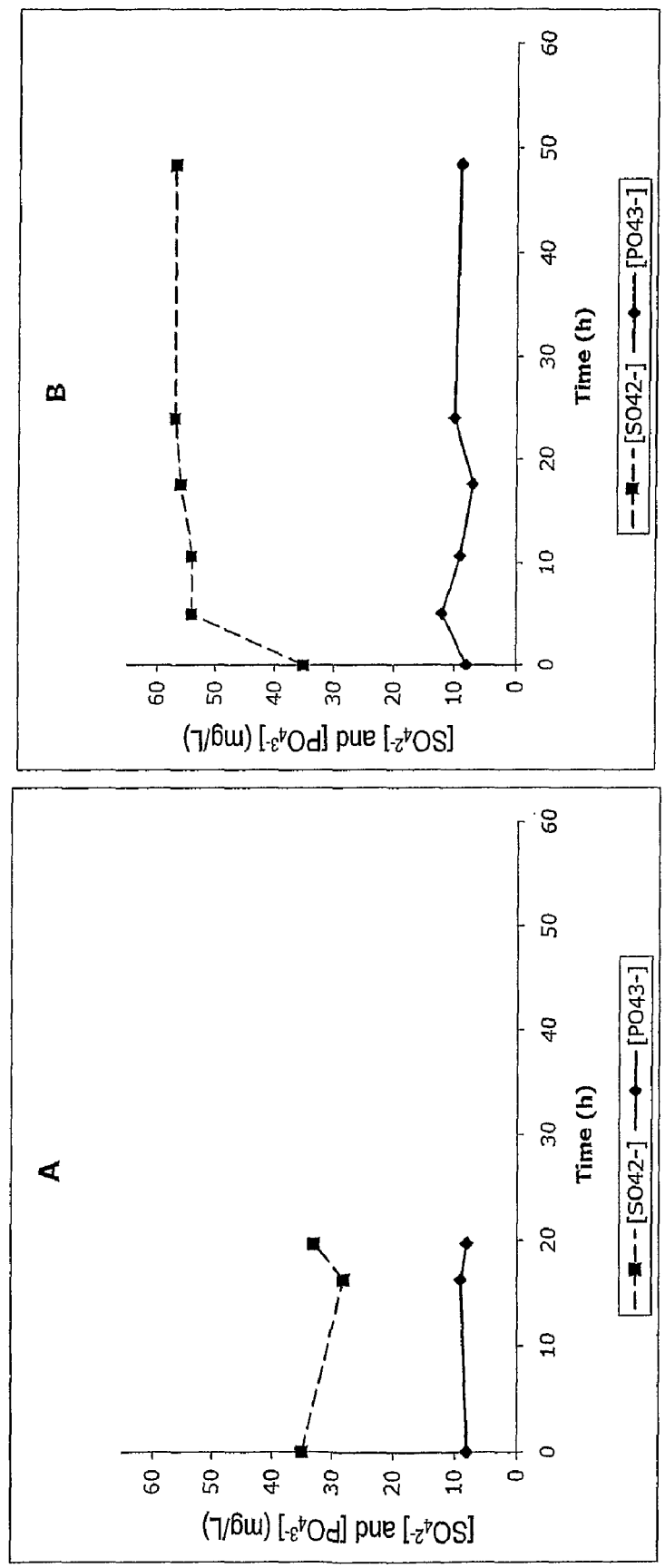
Figure 12Z:
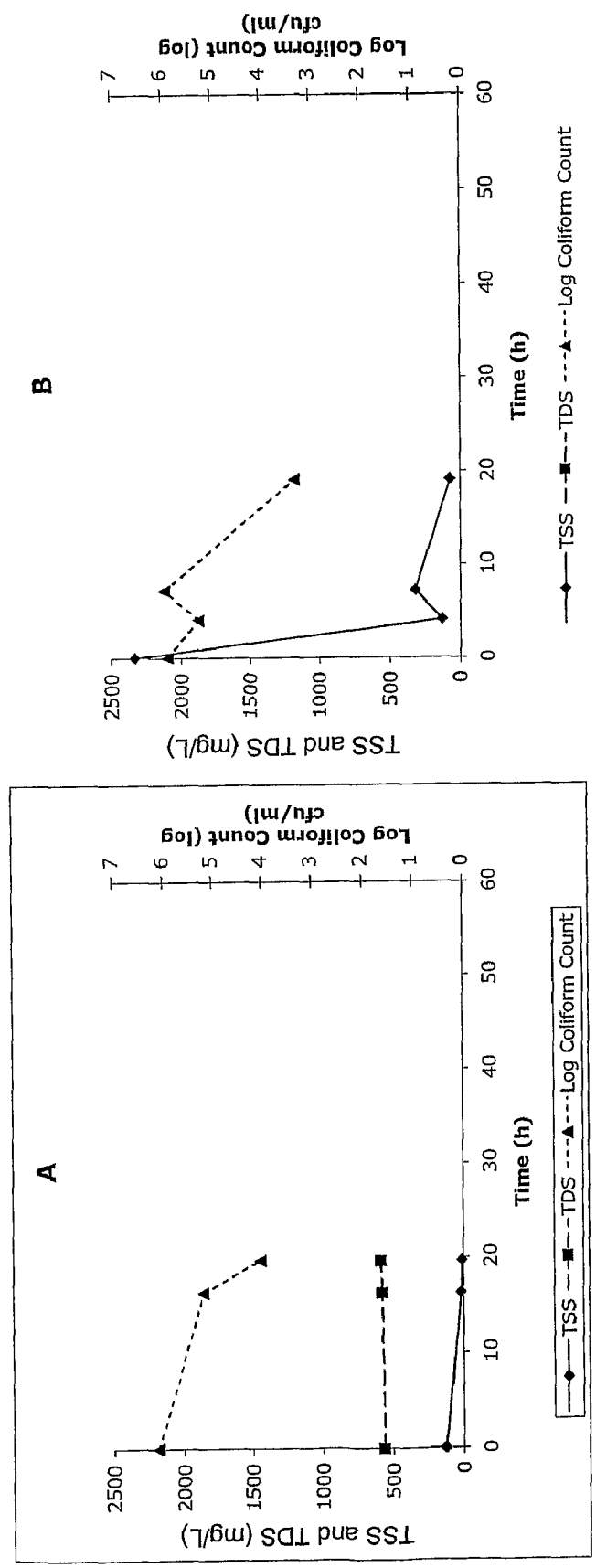
Figure 12A:
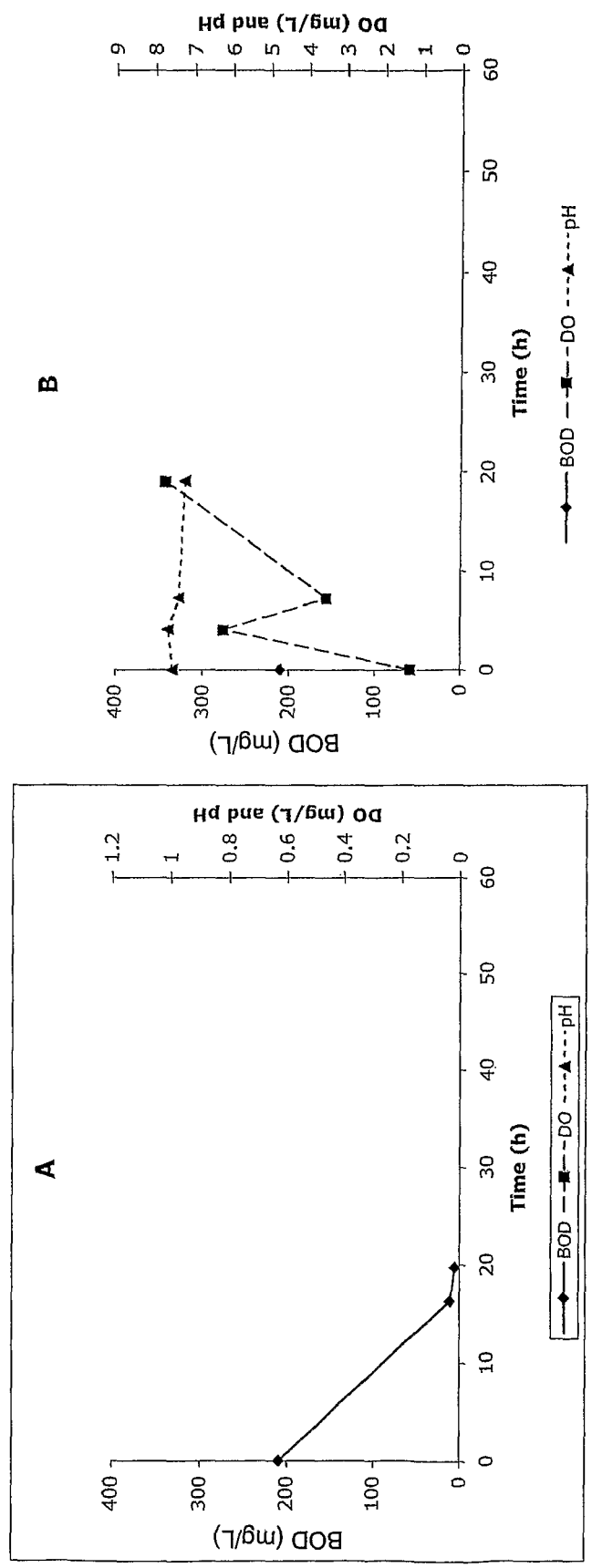
Figure 12A:
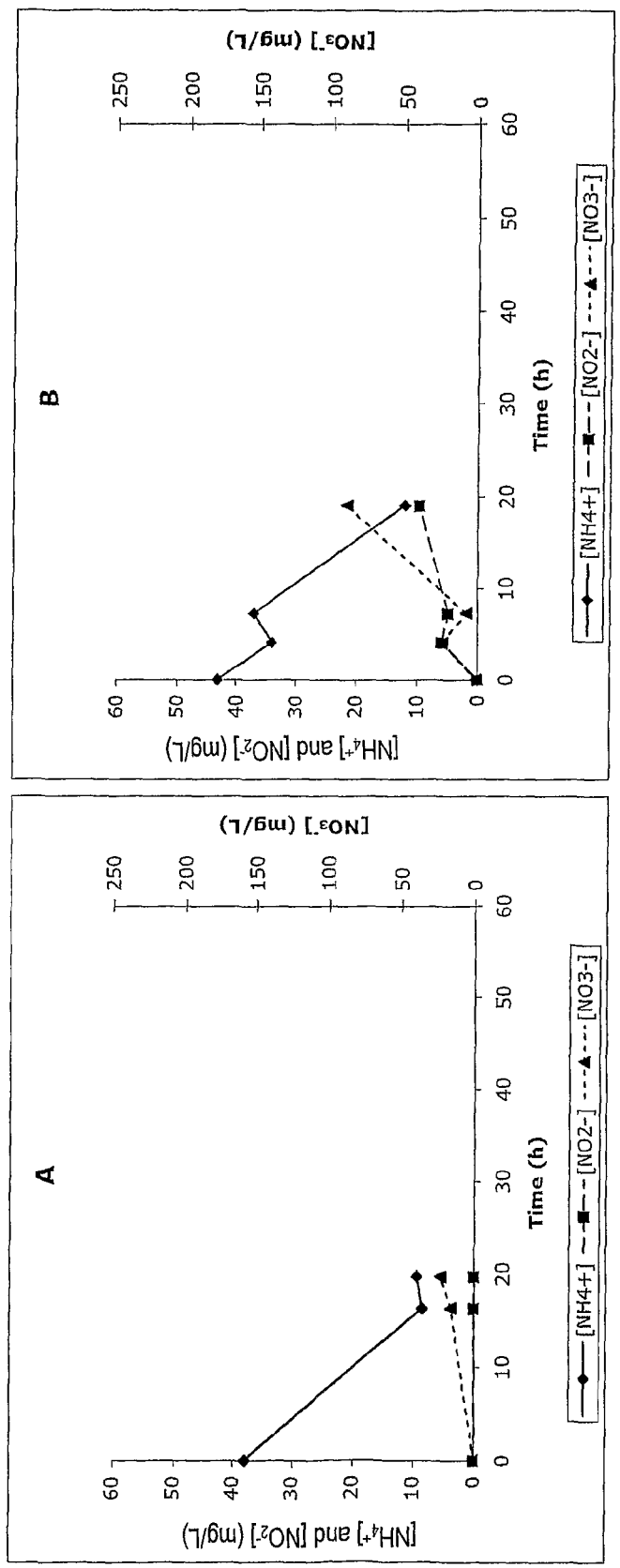
Figure 12A:
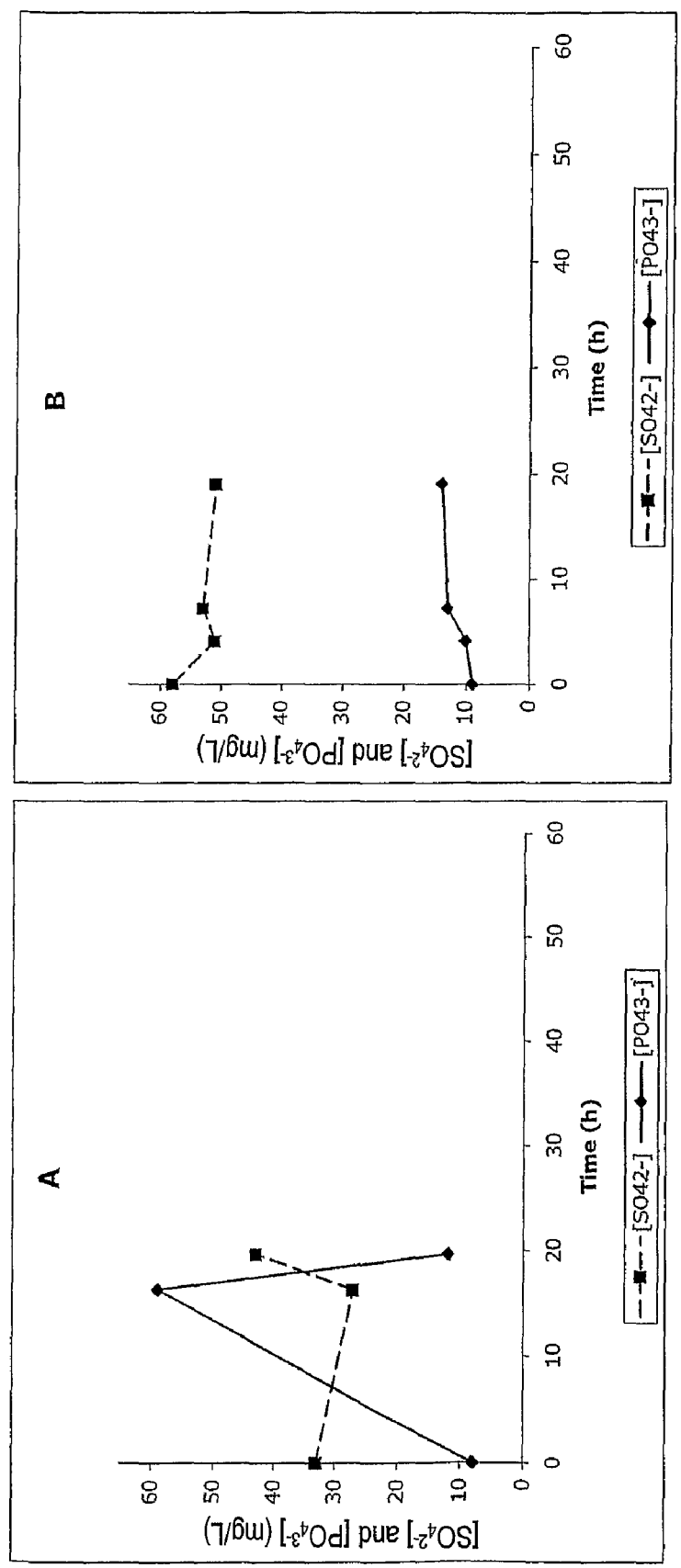
Figure 12A:
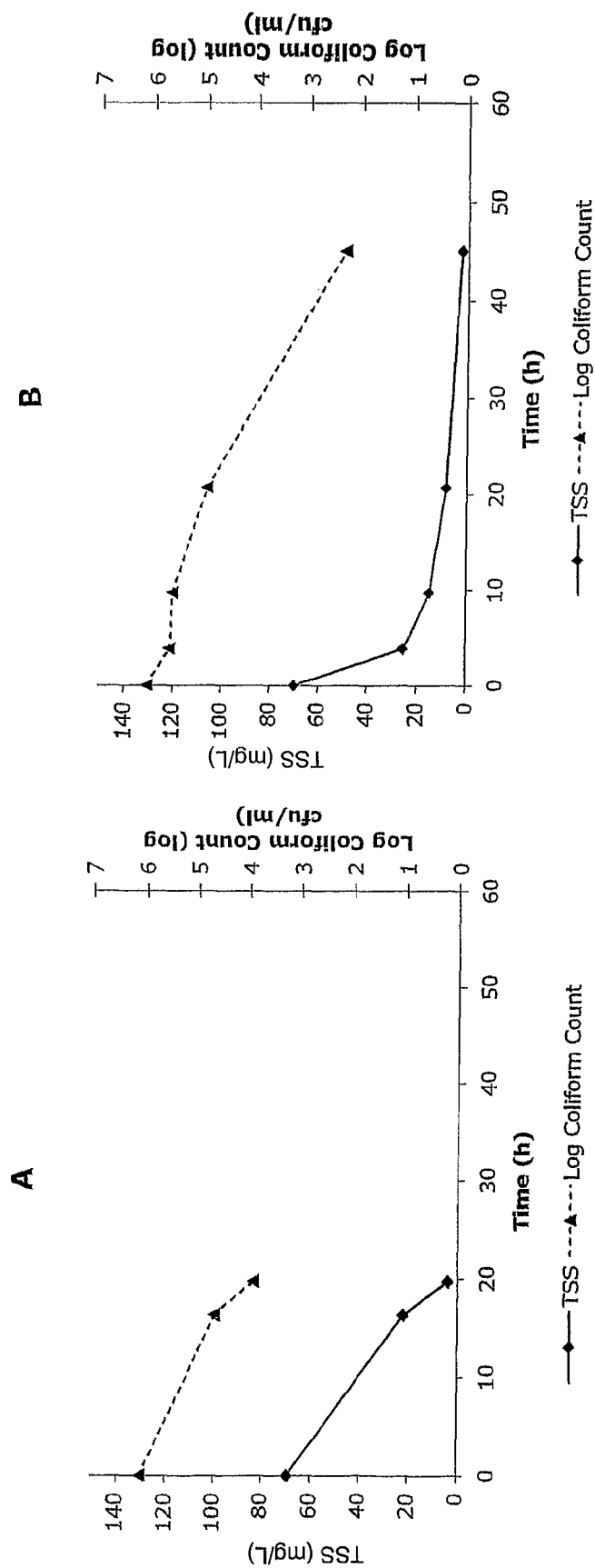
Figure 12A:
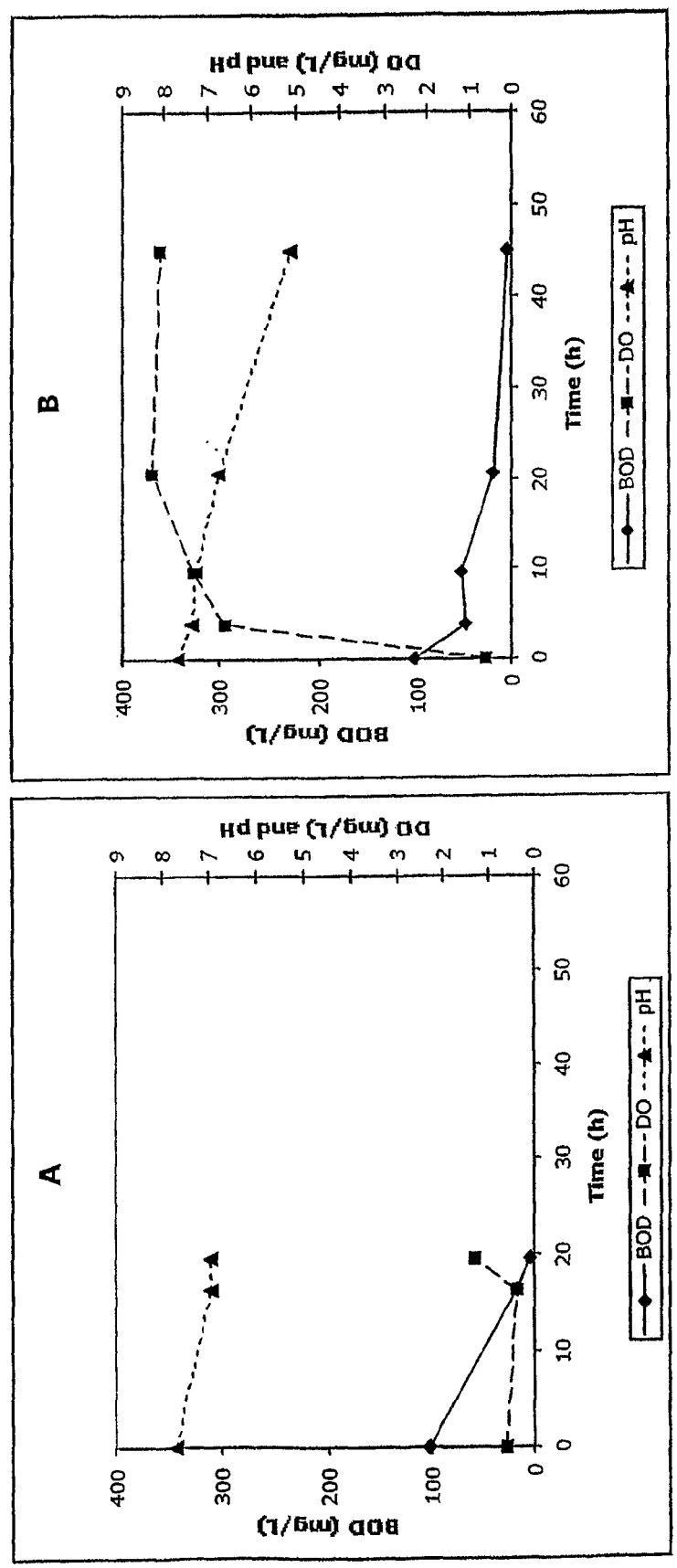
Figure 12A:
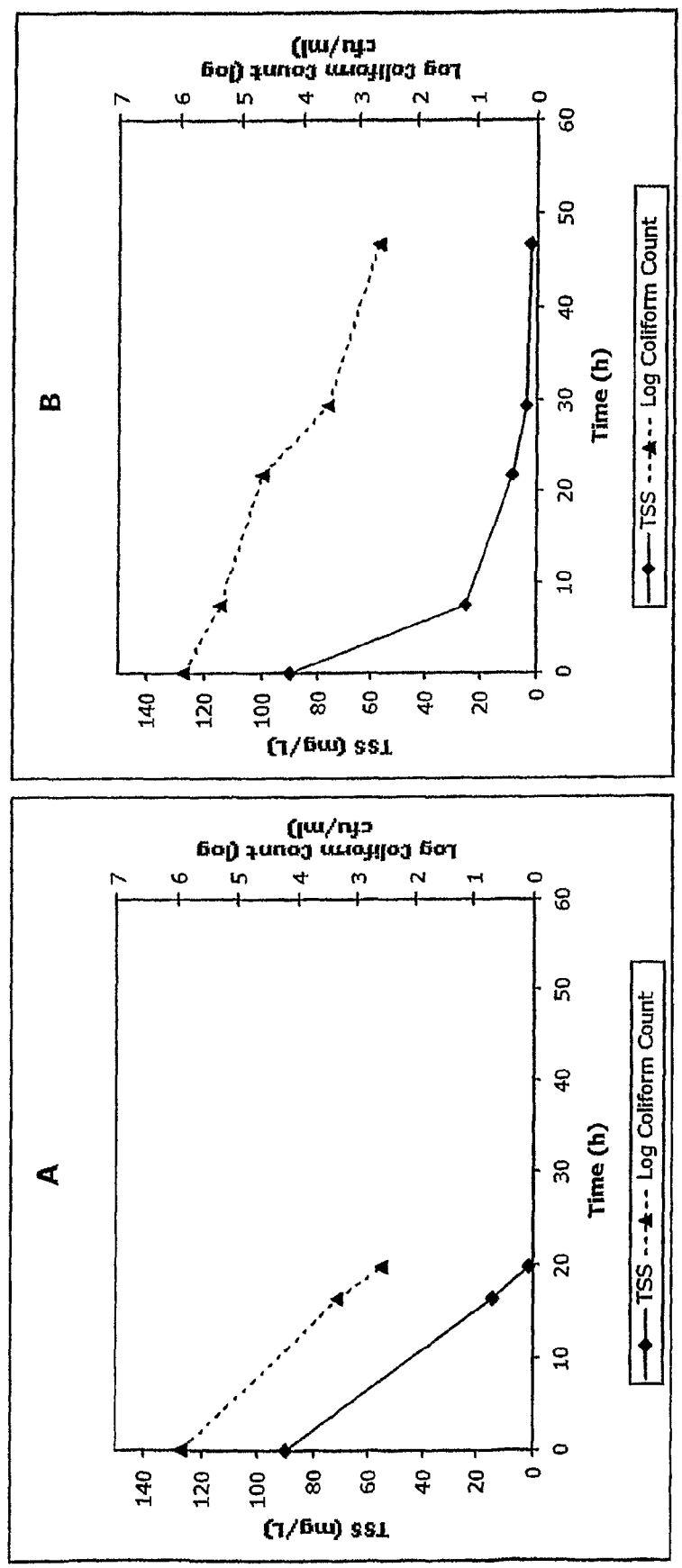
Figure 12A:
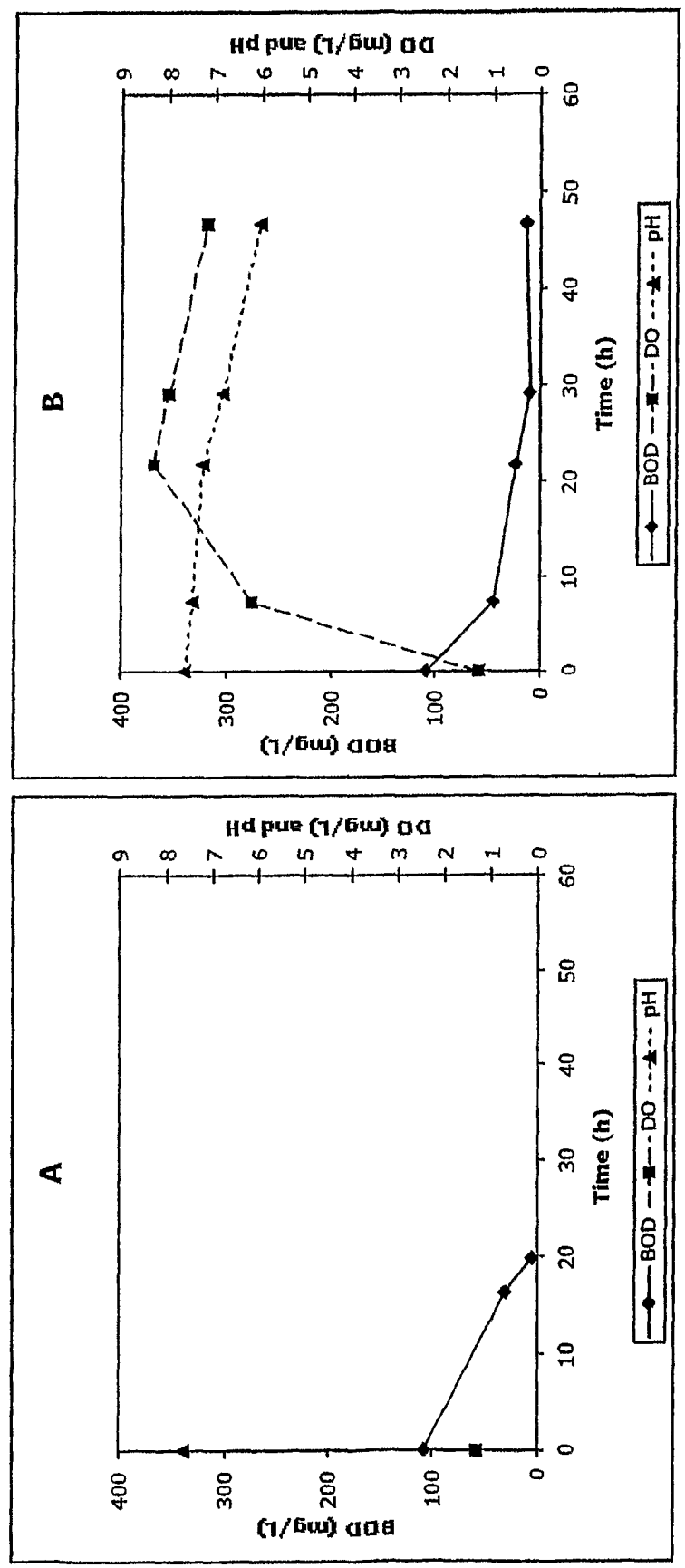
Figure 12A:
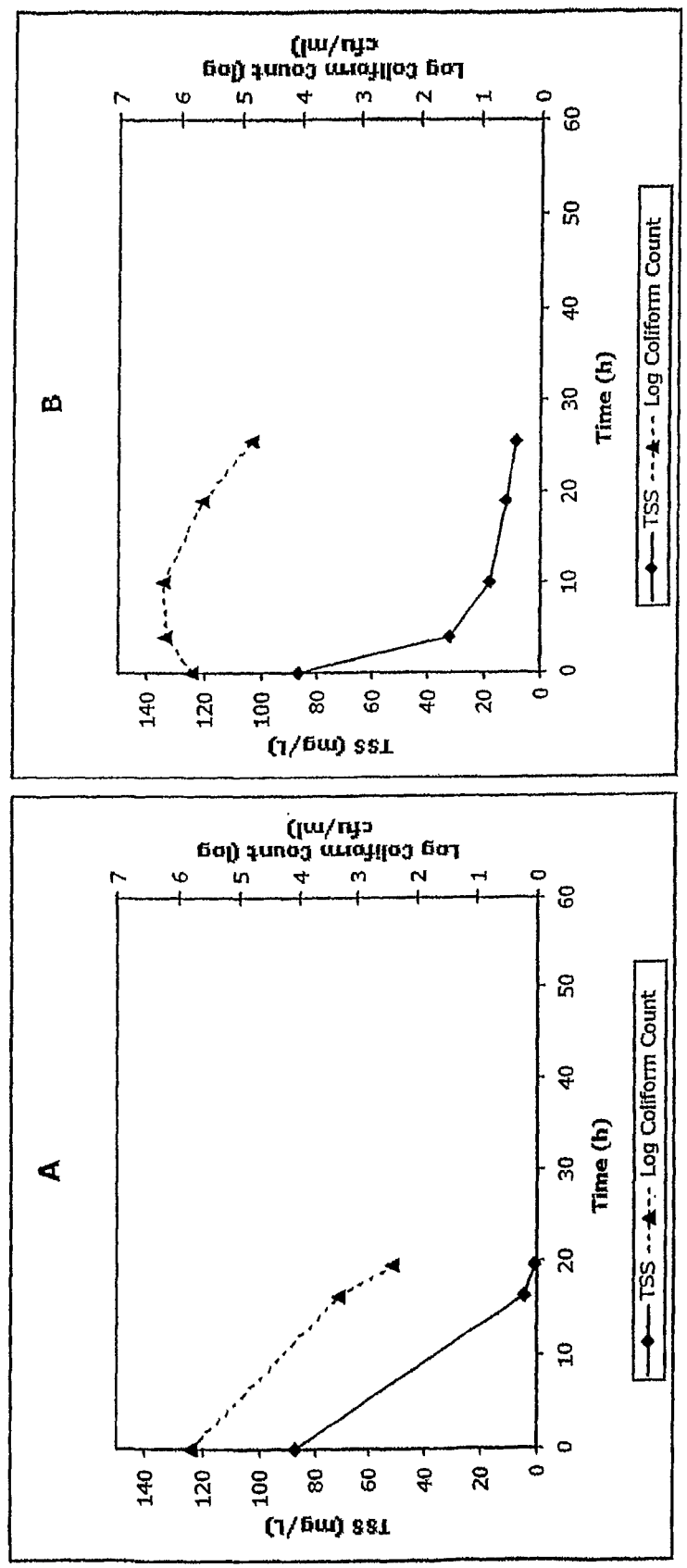
Figure 12A:
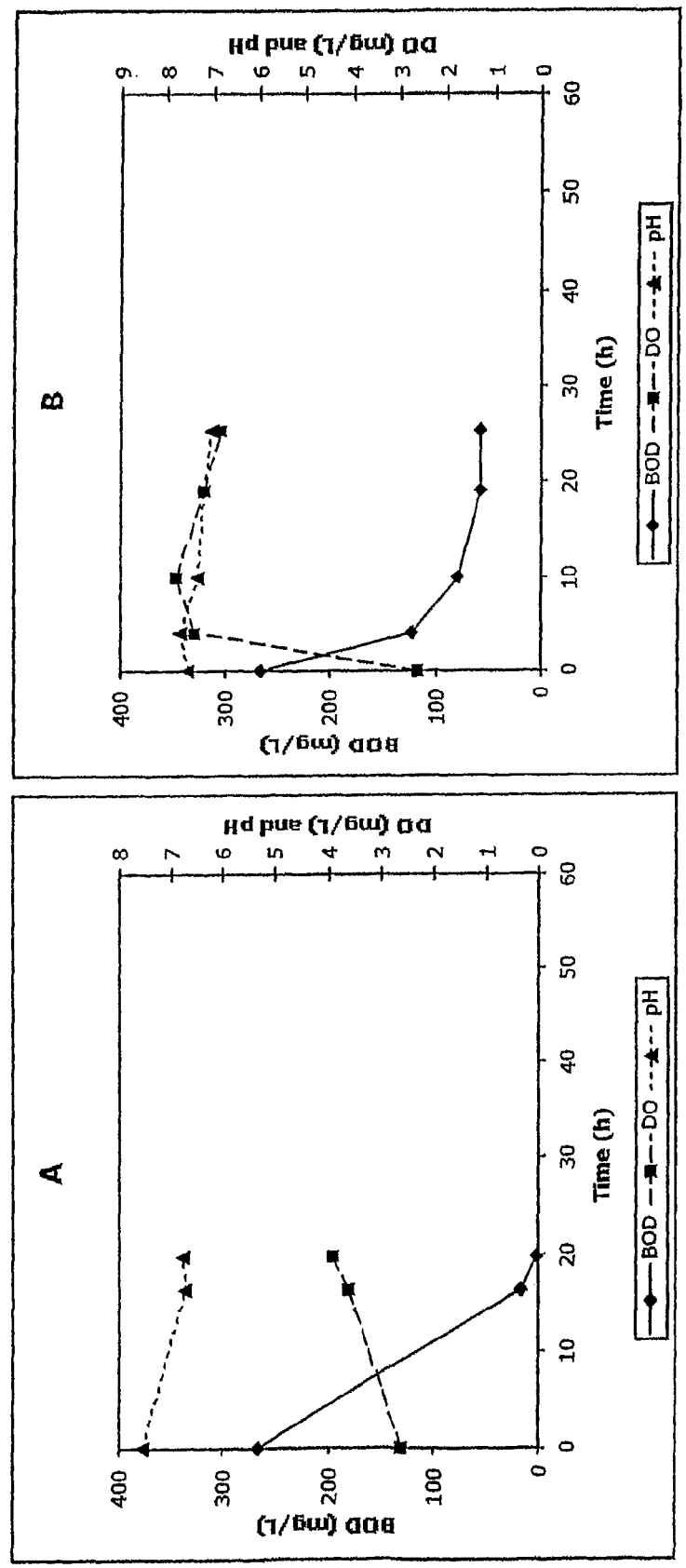
Figure 12A:
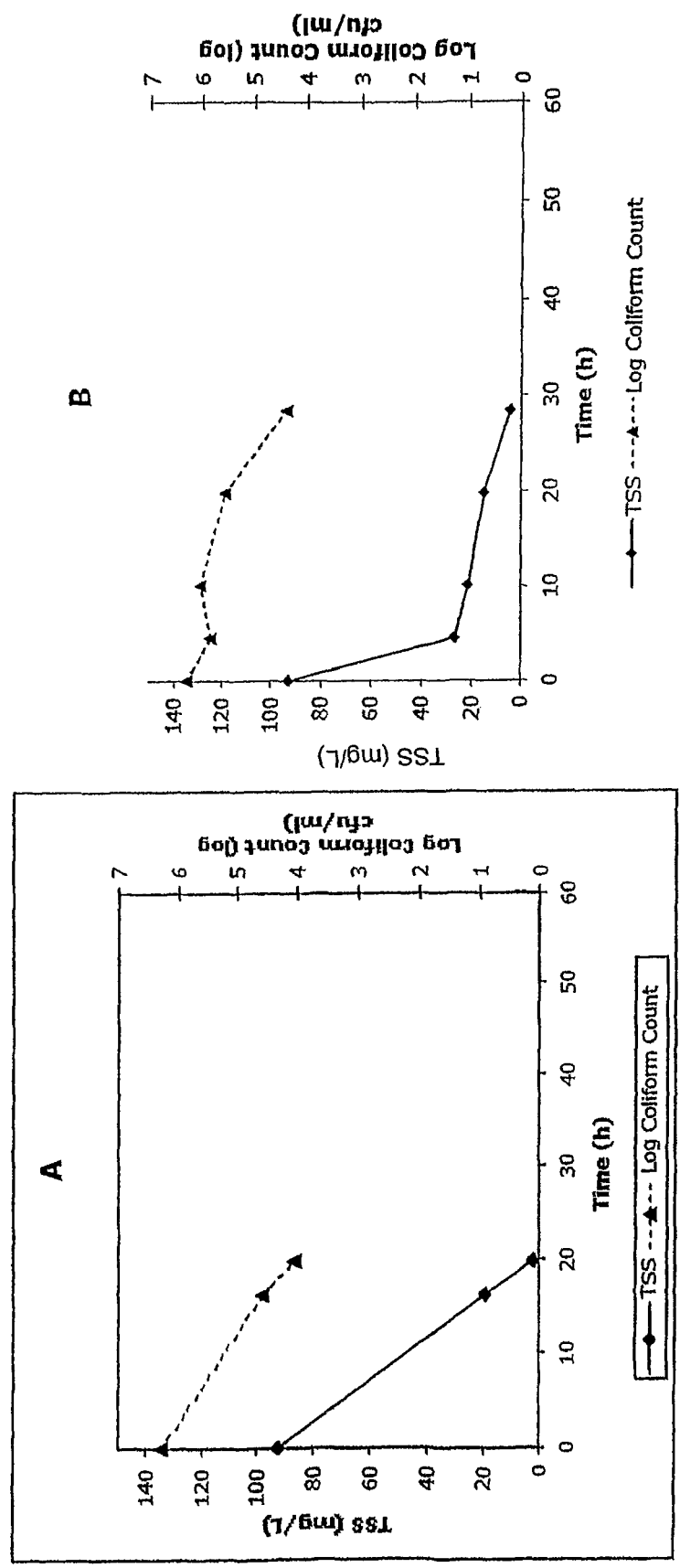
Figure 12A:
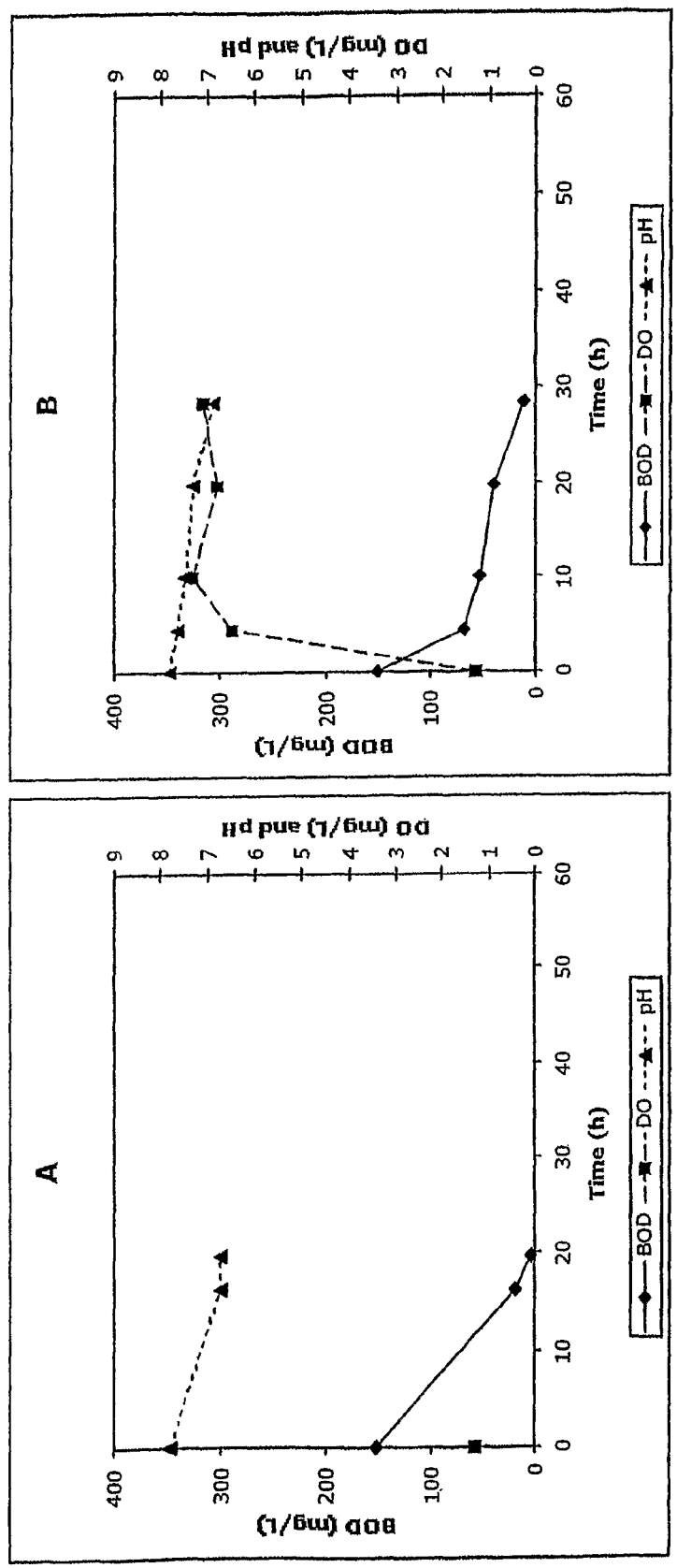
Figure 12A:
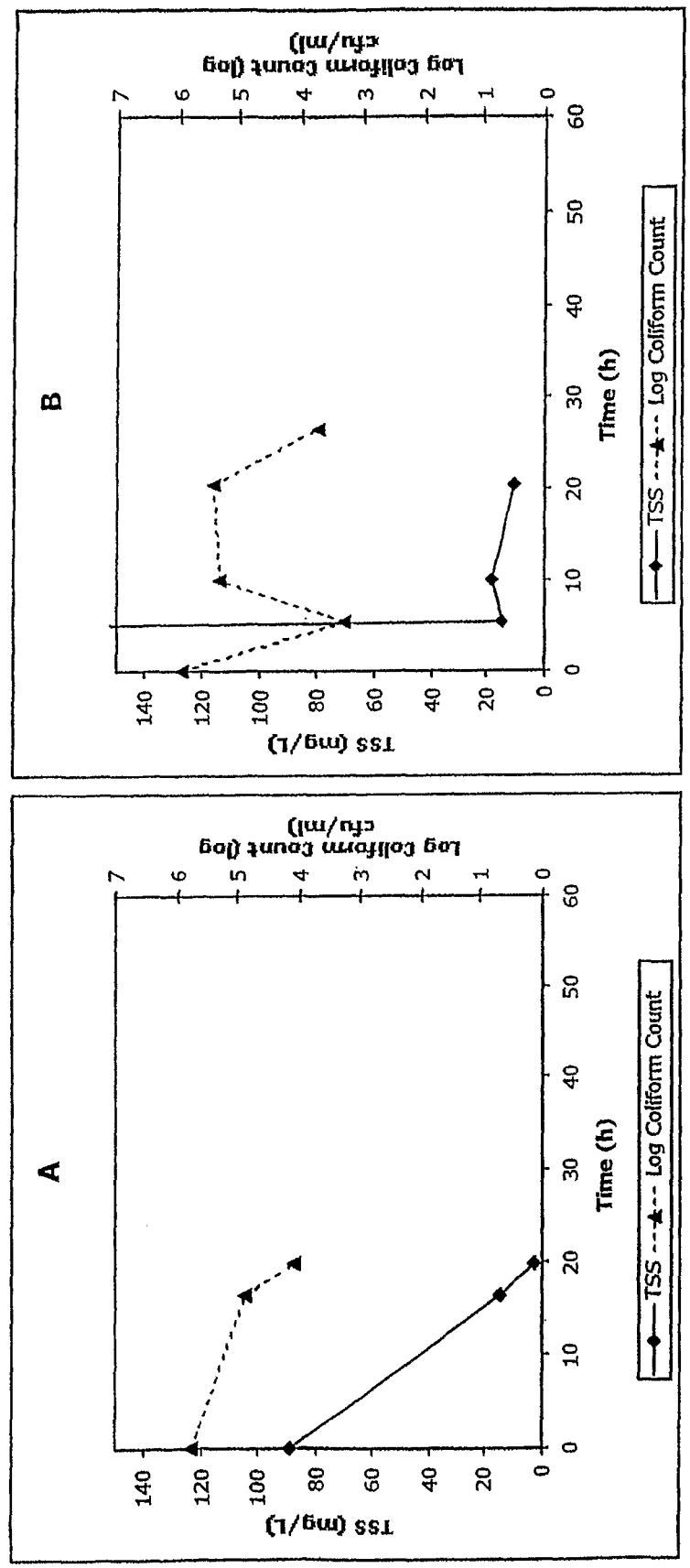
Figure 12A:
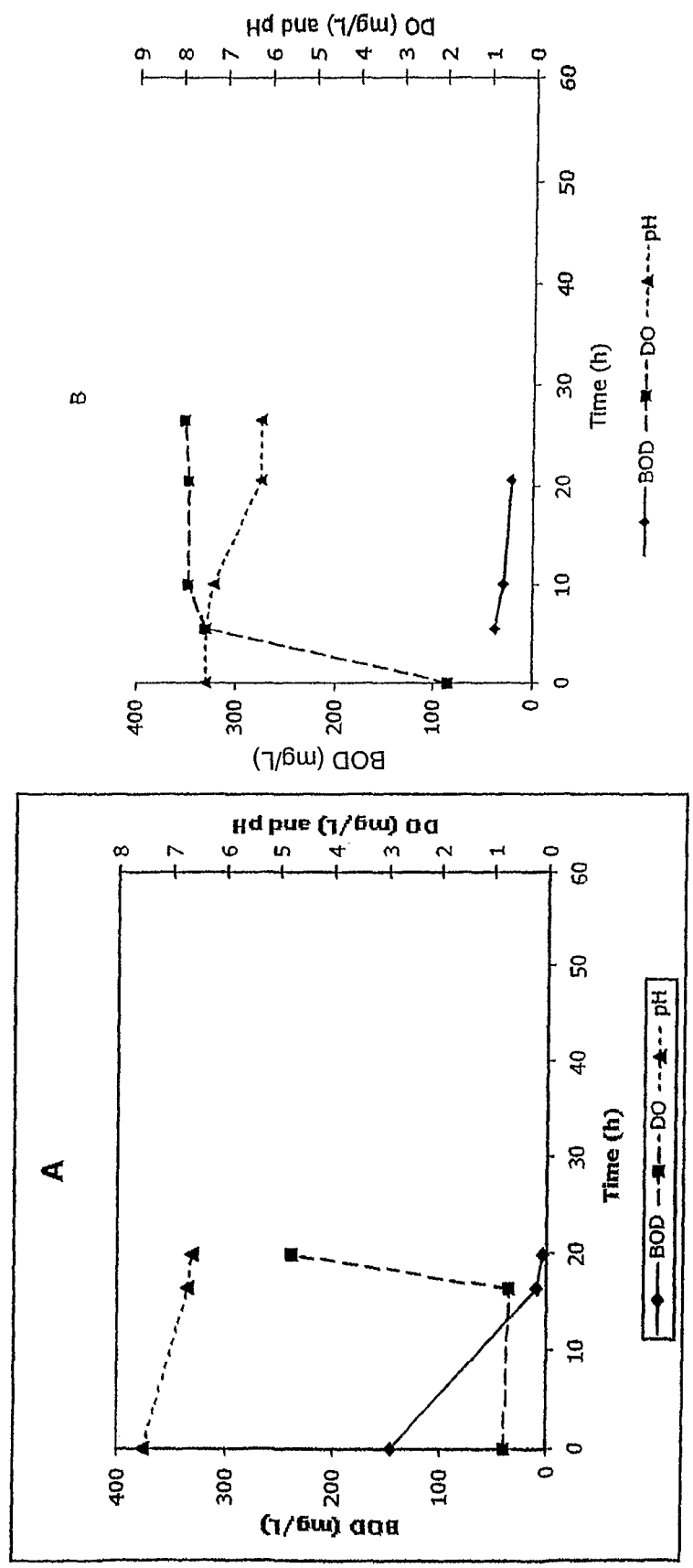
Figure 12A:
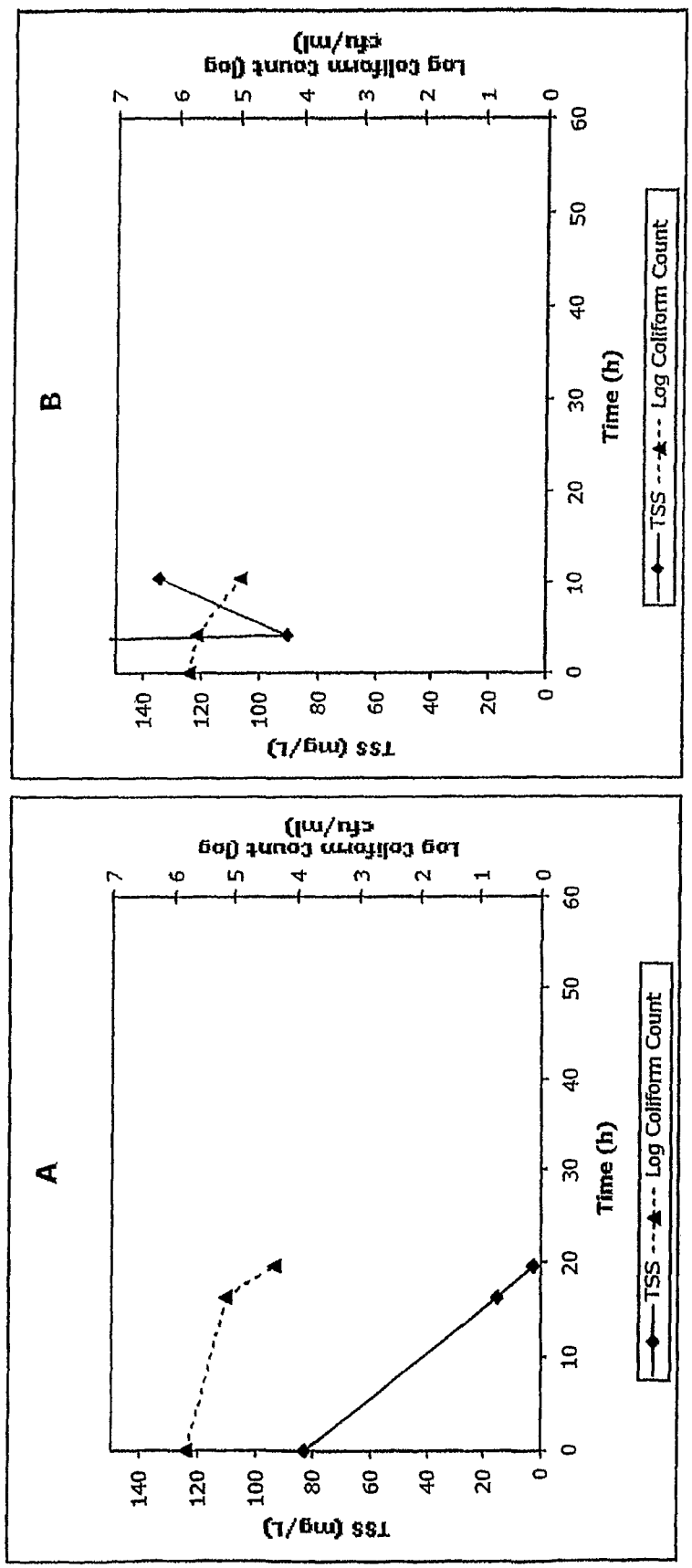
Figure 12A:
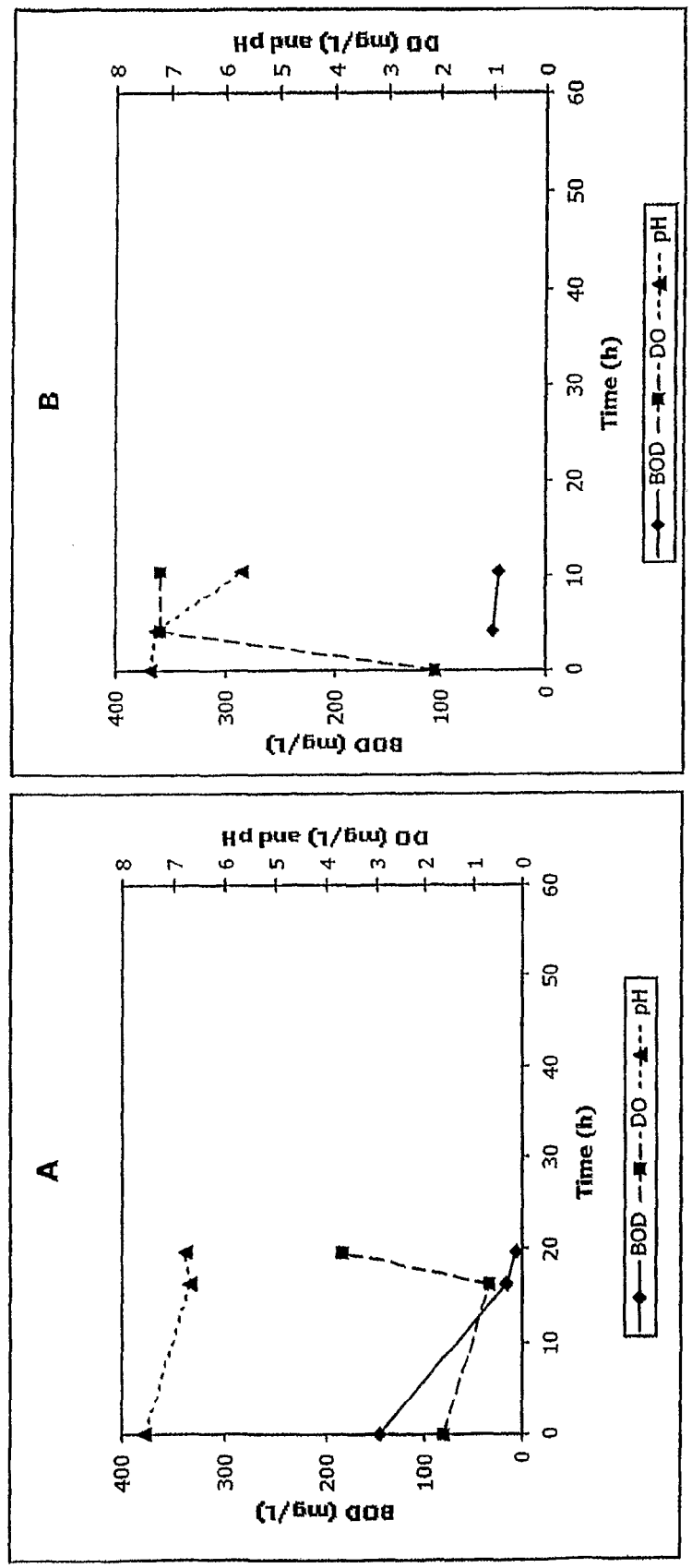

FIG. 11 shows a comparison of clarified effluent (secondary treated effluent) from a sewage treatment plant and effluent from a bioreactor according to the present invention, after treatment in the bioreactor for 18 hours. The comparison illustrates that the bioreactor is more effective than the sewage treatment plant for clarification of sewage.

The bioreactor of the present invention comprises a support membrane of porous or fibrous material having a gel, for example a silica gel, thereon and/or therein, and supported by a support material. The support membrane has a gas face biolayer and liquid face biolayer on opposite faces thereof. The bioreactor may have one or more membranes and may have between about 1 and 100,0000 membranes, or between about 1 and 50000, 1 and 20000, 1 and 10000, 1 and 5000, 1 and 1000 or between about 1 and 100 or between about 1 and 50 or between about 1 and 20 or between about 1 and 10 or between about 100 and 20000 or between about 1000 and 20000 or between about 10000 and 20000 or between about 2 and 10000 or between about 10 and 5000 or between about 20 and 1000 or between about 50 and 500 or between about 100 and 200, or between about 2000 and 100000 or between about 10000 and 100000 or between about 5000 and about 50000 and may have about 1, 2, 3, 4, 5, 6, 7, 8, 9, 10, 12, 14, 16, 18, 20, 30, 40, 50, 60, 70, 80, 90, 100, 120, 140, 160, 180, 200, 250, 350, 400, 450, 500, 600, 700, 800, 900, 1000, 1500, 2000, 2500, 3000, 3500, 4000, 4500, 5000, 6000, 7000, 8000, 9000, 10000, 12000, 14000, 16000, 18000, 20000, 30000, 40000, 50000, 60000, 70000, 80000, 90000, or 100000 membranes. Each membrane may have an area of between about 10 cm$^2$ and 300 m$^2$, and may have an area of between about 10 cm$^2$ and 300 m$^2$, or between about 10 and 5000, 10 and 1000, 10 and 500 cm$^2$, 10 and 100 cm$^2$, 10 and 50 cm$^2$, 100 and 5000, 100 and 1000, 100 and 500 cm$^2$, 500 cm$^2$ and 1 m$^2$, 1000 cm$^2$ and 1 m$^2$, 5000 cm$^2$ and 1 m$^2$, 1 and 10 m$^2$, 1 and 5 m$^2$, 5 and 10 m$^2$ or 500 cm$^2$ and 5 m$^2$, and may have an area of about 10, 50, 100, 200, 300, 400, 500, 600, 700, 800, 900, 1000, 1500, 2000, 2500, 3000, 3500, 4000, 4500, 5000, 6000, 7000, 8000, or 9000 cm$^2$, or about 1, 1.5, 2, 2.5, 3, 3.5, 4, 4.5, 5, 6, 7, 8, 9, 10, 15, 20, 25, 30, 40, 50, 60, 70, 80, 90, 100, 120, 150, 200, 250, or 300, m$^2$, or may have an area of greater than 300 m$^2$, for example 400, 500, 1000, 2000 or 3000 m$^2$ or more. The vertical length of the membranes may be determined by the strength of the membrane and the weight of the membrane. Commonly the membranes will be between about 10 cm and about 5 m in height. They may be between about 10 cm and 4 m, 01 cm and 3 m, 10 cm and 2 m, 10 cm and 1 m, 10 and 500 cm, 10 and 200 cm, 10 and 100 cm, 50 cm and 5 m, 1 and 5 m, 2 and 5 m, 3 and 5 m or 50 cm and 2 m, e.g. about 10, 20, 30, 40, 50, 60, 70, 80 or 90 cm, or about 1, 1.5, 2, 2.5, 3, 3.5, 4, 4.5 or 5 m in length. If the membranes are planar membranes, they may be arranged in pairs, or gills. There may be between about 1 and 50000 pairs (gills) or may be between about 1 and 20000 or between about 1 and 10000 or between about 10000 and 50000 or between about 10000 and 30000 or between about 1 and 5000 or between about 1 and 1000 or between about 1 and 500 or between about 1 and 100 or between about 1 and 50 or between about 1 and 10, or between about 2 and 10000 or between about 5 and 5000 or between about 10 and 1000 or between about 50 and 500 or between about 100 and 200 or between about 100 and 10000 or between about 500 and 10000 or between about 1000 and 10000 or between about 5000 and 10000 pairs, and may be about 1, 2, 3, 4, 5, 6, 7, 8, 9, 10, 12, 14, 16, 18, 20, 25, 30, 35, 40, 45, 50, 60, 70, 80, 90, 100, 200, 300, 500, 500, 600, 700, 800, 900, 1000, 1500, 2000, 2500, 3000, 3500, 4000, 4500, 5000, 6000, 7000, 8000, 9000, 10000, 12000, 14000, 16000, 18000, 20000, 30000, 40000 or 50000 pairs. In one embodiment, a pairs of membranes, i.e. gills, are disposed parallel to each other in a vertical orientation.

The membranes may be disposed between a liquid at the liquid face and a gas at the gas face, the liquid and the gas both being in contact with the membrane. The pressure of the gas at the gas face may be sufficient that the liquid does not pass through the membrane into the gas region. The pressure may be the same as or greater than the pressure of the liquid at the liquid face. The pressure may be between about 0.8 and 1.2 atm, or between about 0.9 and 1.1, 0.9 and 1 or 1 and 1.1 atm, and may be about 0.8, 0.9, 1, 1.1 or 1.2 atm. The pressure across the membrane may be less than about 0.2 atm, or less than about 0.15, 0.1, 0.1 or 0.05 atm., and may be about 0, 0.05, 0.1, 0.15 or 0.2, or between about 0 and 0.2, 0 and 0.1, 0 and 0.05 or 0.05 and 0.15 atm, or may be greater than 0.2 atm under some circumstances.

The gas in contact with the gas face of the membrane contains oxygen, to enable oxidation of ammonium ions at the gas face, and to provide oxygen for metabolism and/or growth of the bacteria and fungi of the liquid face biolayer. The gas may have between about 5 and 100% w/w oxygen, or between about 10 and 100, 15 and 100, 20 and 100, 30 and 100, 50 and 100, 75 and 100, 10 and 50, 10 and 30, 10 and 20, 15 and 50, 15 and 25 or 20 and 50% w/w oxygen, and may contain about 10, 15, 20, 25, 30, 35, 40, 45, 50, 55, 60, 65, 70, 75, 80, 85, 90, 95 or 100% w/w oxygen.

In a bioreactor according to the invention, the membrane may be maintained in a desired orientation by means of a support, for example a support frame, a casing, a housing, a framework, a scaffold or some other support. The membrane may be mounted such that it hangs from the support, or it may be constrained within the support, or it may be mounted in some other manner in or on the support.

The membranes of a bioreactor according to the invention may be housed in a housing. The housing may have one or more air inlets and one or more air outlet. It may have one or more vents located near the top of the bioreactor and one or more vents located near the bottom of the bioreactor. These may be fitted with membranes to prevent passage of microorganisms but permit passage of air. They may be fitted with a filter to prevent entry of insects or other macroscopic objects. The air inlets and/or outlets may be fitted with a pump to pump air into or out of the housing to encourage air circulation. Alternatively, the air circulation may be spontaneous.

Thus the operation of the bioreactor may maintain the membrane at a relatively constant temperature. In conditions where the outside air is warm relative to the temperature of the membrane (e.g. during daytime), the membranes may cool the air, causing it to move towards the bottom of the bioreactor an out of a lower vent located near the bottom of the bioreactor. This movement of air causes further warm air to enter an upper vent located near the top of the bioreactor. In this fashion a constant flow of air is promoted downwards past the membrane. In conditions where the outside air is cool relative to the temperature of the membrane (e.g. during nighttime), the membranes may warm the air, causing it to move towards the top of the bioreactor an out of an upper vent located near the top of the bioreactor. This movement of air causes further cool air to enter a lower vent located near the bottom of the bioreactor. In this fashion a constant flow of air is promoted upwards past the membrane. Thus, as indicated above, a temperature differential between the ambient air outside the bioreactor and the membrane can cause a flow of air past the membrane without the use of an air pump. Conveniently, the vents may be oriented so that they open upwards, in order to reduce the possibility of loss of liquid from the bioreactor by splashing. Similarly, adjustable louvers/vents in the housing could be opened and closed to facilitate the flow of air through the gills driven by the wind. The vents could be opened and closed via solenoids, or actuators powered and by the wind, with a strong wind having the vents relatively closed and a weak wind having the vents wide open. In the case of very strong winds the vents could be fully closed to protect the membranes.

In operation of a bioreactor according to the invention it may be necessary to recycle the liquid derived from sewage past the membrane of the bioreactor more than one time, in order to achieve sufficient contact time to remove the desired amount of matter in the waste. The contact time may be between about 1 minute and 10 days, depending on the nature of the biolayer, the nature and concentration of the matter to be removed and other factors. The contact time may be between about 1 minute and 1 day, 1 minute and 12 hours, 1 minute and 1 hour 1 and 30 minutes, 1 and 15 minutes, 1 hour and 10 days, 1 and 10 days, 5 and 10 days, 1 hour and 1 day, 1 and 12 hours 12 and 24 hours or 6 and 12 hours, and may be about 1, 2, 3, 4, 5, 6, 12, 18, 24, 30 or 45, minutes, 1, 2, 3, 4, 5, 6 8, 12, 15, 18 or 21 hours, or 1, 2, 3, 4, 5, 6, 7, 8, 9 or 10 days or may be more than 10 days. Accordingly the liquid may be recycled past the membrane between about 1 and 1000 times, depending on the dimensions of the membrane, the flow rate, the nature and concentration of the matter to be removed, the nature of the biolayers and other factors. It may be recycled between about 1 and 500, 1 and 200, 1 and 100, 1 and 50, 1 and 10, 10 and 1000, 100 and 1000, 500 and 1000, 10 and 500, 10 and 100, 100 and 500, 50 and 100 or 10 and 50 times, and may be recycled about 1, 2, 3, 4, 5, 10, 15, 20, 25, 30, 35, 40, 45, 50, 60, 70, 80, 90, 100, 200, 3400, 400, 500, 600, 700, 800, 900 or 1000 times. There may be a detector within the bioreactor to determine the concentration of the matter to be removed. Thus the liquid may be recycled until the matter to be removed has dropped to a predetermined concentration, as determined by the detector. The nature of the detector may depend on the nature of the matter to be removed. It may be a concentration detector, a pH detector, a pH probe, a dissolved oxygen probe, a turbidity detector, an ion concentration probe or some other type of detector.

The flow rate of the liquid past the membranes (or through the gills) of a bioreactor according to the present invention may be between about 0.001 and about 10 linear metres per second. It may be between about 0.001 and 1, 0.001 and 0.1, 0.001 and 0.01, 0.01 and 10, 0.1 and 10, 1 and 10, 0.01 and 1, 0.01 and 0.1 or 0.01 linear metres per second. It may be about 0.001, 0.005, 0.01, 0.05, 0.1, 0.2, 0.3, 0.4, 0.5, 0.6, 0.7, 0.8, 0.9, 1, 2, 3, 4, 5, 6, 7, 8, 9 or 10 linear metres per second. The hydraulic residence time of the liquid down a representative 1.5 m gill as described in the present specification may be between about 2 and 2000 s, or between about 10 and 1000, 10 and 500, 10 and 200, 10 and 100, 12 and 80, 10 and 50, 10 and 20, 50 and 2000, 100 and 2000, 500 and 2000, 1000 and 2000, 100 and 1000, 100 and 500 or 500 and 1000 s, e.g. about 2, 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900 or 2000 s.

A feature of the present invention is that the membrane may be accessible so as to enable removal of cells from the gas face biolayer. The membrane may have no support matrix on the gas face thereof in order that the gas face of the membrane be accessible. Removal of cells from the gas face biolayer may be for the purpose of using the cells, for example as food, or it may be to prevent excessive growth of the gas face biolayer. In operation the gas face biolayer may grow to such an extent that the diffusion of oxygen and/or of nutrient solution through the biolayer is slowed, thereby impeding the operation of the bioreactor. It may therefore be desirable to be able to remove some of the biolayer in order to achieve rates of diffusion of oxygen and/or of liquid sufficient for acceptable removal rates of components of the liquid. The membrane may be accessible to a device for scraping or shaking or washing or blowing or some other suitable means for separating the solid product from the gas face biolayer. Thus material may be removed from the gas face by a process comprising at least one of scraping or shaking or washing or blowing.

In bioreactors according to the present invention, pairs of membranes (which define a gill inside region, or lumen, for passage of liquid therebetween) may be separated by a space sufficient for passage of air between the pairs of membranes, for providing oxygen to the gas face biolayer. The space may be sufficient to allow diffusive flow therethrough. The gas (e.g. air) may be passed through the space by diffusion, convection, wind or some other means, i.e. without the need for additional equipment to cause it to pass through the space, or it may be by means of a fan, a blower, a gas circulator or some other means to cause the gas to pass across the gas faces of the membranes of the pairs. The space may depend on the size of the membranes. It may be between about 2 and 100 mm across (i.e. between the pairs of membranes), or between about 2 and 50, 2 and 20, 2 and 10, 5 and 50, 5 and 20, 5 and 10, 10 and 100, 50 and 100, 80 and 100, 10 and 50, and 20 or 8 and 10 mm, and may be about 2, 3, 4, 5, 6, 7, 8, 9, 10, 15, 20, 25, 30, 35, 40, 45, 50, 55, 60, 65, 70, 75, 80, 85, 90, 95 or 100 mm across, or may be more than 100 mm across. The inside region of the gills may be quite narrow. It may depend on the flow rate of liquid through the gills. It may be between about 0.05 and about 1 mm, or between about 0.05 and 0.5, 0.05 and 0.1, 0.1 and 1, 0.5 and 1, 0.1 and 0.5 or 0.1 and 0.2 mm, and may be about 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.6, 0.7, 0.8, 0.9 or 1 mm. The two membranes of a gill may touch in places. Optionally the inside region has a homogeneous width. In some cases, when two membranes of a gill touch, the region in which they touch is less accessible to nutrient. This causes to a reduction in growth, optionally death, of the liquid face biolayer in that region. This in turn may reduce the adhesion in that region, and may therefore lead to separation of the membranes in that region. This may then allow regrowth of the biolayer in that region.

Similarly if the gas face biolayers of two adjacent membranes touch, they may adhere due to surface tension. This may cause a reduction in oxygen supply to the region of adhesion, leading to a reduction in growth, optionally death, of the gas face biolayer in that region. This in turn may reduce the adhesion in that region, and may therefore lead to separation of the membranes in that region. This may then allow regrowth of the biolayer in that region.

In order to promote the health and efficient operation of the biolayer, the biolayer may be kept at a particular temperature. The temperature will depend on the nature of the biolayer, as different biological materials perform optimally at different temperatures. The temperature may vary slightly during operation of the bioreactor. The temperature may be between about −5 and 90° C., or between −5 and 0° C. or between about 0 and 90° C. or between about 0 and 50° C. or between about 0 and 20° C. or between about 20 and 90° C. or between about 50 and 90° C. or between about 10 and 45° C. or between about 10 and 35° C. or between about 10 and 25° C., or between about 20 and 55° C. or between about 30 and 55° C. or between about 40 and 55° C. or between about 15 and 45° C. or between about 17 and 42° C. or between about 20 and 40° C. or between about 20 and 30° C. or between about 30 and 40° C., and may be about −5, 0, 5, 10, 15, 17, 20, 25, 28, 30, 35, 37, 40, 42, 45, 50, 60, 70, 80, or 90° C. The temperature may be kept at about the desired temperature by the air or the effluent liquid which is in contact with the biolayer and/or by the operation of the bioreactor. The biolayer and the bioreactor effluent may be cooled by controlling the rate of evaporation at the air face. This may be achieved by controlling the rate of air flow past the membranes.

The support for supporting the membrane may be any suitable structure for supporting the membrane, or, in the case of a bioreactor having more than one membrane, all of the membranes, of the invention. It may comprise for example a frame, a bracket, a casing, a housing, a rack or a scaffold. It may be made of metal, for example aluminium, steel, stainless steel, titanium or other suitable metal, or it may be made of a suitably rigid plastic, for example polyethylene, polypropylene, polymethylpentene, polymethyl methacrylate or polycarbonate, or may be made of some other suitable rigid material. The membrane-supporting structure may support the membrane(s) in a vertical position or in a horizontal position. The membrane supporting structure may comprise rollers and motors for assisting movement of the membrane within the bioreactor.

The membrane of the invention may be nanoporous, mesoporous or microporous or it may have a combination of nanoscale and/or mesoscale and/or microscale pores. It may be capable of allowing the cells or spores of the biolayers to pass therethrough or it may be incapable of allowing the cells or spores of the biolayers to pass therethrough. The membrane comprises a support membrane which comprises a support material and a gel on and/or in the support material. The support membrane may comprise between about 0 and 90% gel on a weight or a volume basis, or between 10 and 90% or between about 10 and 50% or between about 10 and 30% or between about 30 and 90% or between about 50 and 90% or between about 70 and 90% or between about 20 and 80% or between about 30 and 70% or between about 40 and 60% gel on a weight or a volume basis, or may comprise about 0, 10, 20, 30, 40, 50, 60, 70, 80 or 90% gel on a weight or a volume basis. The membrane may be planar. The thickness of the membrane may be between about 0.1 and about 10 mm, and may be between about 0.1 and 5 mm or between about 0.1 and 2 mm or between about 0.1 and 1 mm or between about 1 and 10 mm or between about 5 and 10 mm or between about 0.5 and 5 mm or between about 1 and 5 mm or between about 1 and 2 mm, and may be about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9 or 10 mm.

The gel may comprise any suitable gel material that can be fabricated from a precursor liquid or vapour. The nanoporous solid or gel may comprise for example silica gel, titania gel, zirconia gel, alumina gel or a mixed gel comprising two or more of silica, titania, zirconia and alumina (e.g. silica-alumina gel), or it may comprise agar agar, agarose, calcium alginate, pectin or other biopolymer.

The porosity of the gel may be between about 10 and about 90% or between about 10 and 40% or between about 20 and 90% or between about 20 and 50% or between about 40 and 90%, or between about 40 and 75% or between about 40 and 60% or between about 50 and 90% or between about 60 and 90% or between about 70 and 90% or between about 50 and 80% or between about 60 and 70%, and may be about 10, 15, 20, 25, 30, 35, 40, 45, 50, 55, 60, 65, 70, 75, 80, 85 or 90%. The pores may have a mean diameter between about 1 nm and about 100 microns, or between about 1 nm and 1 micron or between about 1 and 500 nm or between about 1 and 100 nm or between about 1 and 50 nm or between about 1 and 10 nm or between about 100 nm and 10 microns or between about 500 nm and 10 microns or between about 1 and 10 microns or between about 10 nm and 1 micron or between about 50 and 500 nm or between about 100 and 200 nm, or between about 10 and 100 microns, 1 and 100 microns, 1 and 10 microns, 10 and 50 microns, 100 nm and 100 microns or 500 nm and 50 microns and may have a mean diameter about 1, 5, 10, 15, 20, 25, 30, 35, 40, 45, 50, 75, 100, 150, 200, 250, 300, 350, 400, 450, 500, 600, 700, 800 or 900 nm or about 1, 2, 3, 4, 5, 6, 7, 8, 9, 10, 15, 20, 25, 30, 35, 40, 45, 50, 60, 70, 80, 90 or 100 microns. The gel may have liquid in the pores thereof, and the liquid may be an aqueous liquid. The biolayer may be a biofilm.

The support material may be made of a material that is non-biodegradable under the conditions of operation of the membrane or of the bioreactor. The support material may be hydrophilic or hydrophobic, and may comprise a porous material or a woven material or a non-woven fibrous material or a sponge-like material or an open cell foam material or some other material having holes connecting a first face of the support material and a second face of the support. The support material may be, for example a woven or non-woven fibrous material or a non-fibrous porous material. The fibrous material may comprise glass fibre matting or cotton, and the non-fibrous porous material may be macroporous, for example an open-celled foam, or it may be mesoporous and/or microporous. It may be flexible. The porosity of the support material may be between about 10 and about 90% or between about 10 and 40% or between about 20 and 90% or between about 20 and 50% or between about 40 and 90%, or between about 40 and 75% or between about 40 and 60% or between about 50 and 90% or between about 60 and 90% or between about 70 and 90% or between about 50 and 80% or between about 60 and 70%, and may be about 10, 15, 20, 25, 30, 35, 40, 45, 50, 55, 60, 65, 70, 75, 80, 85 or 90%. The holes of the support may be between about 10 and 200 microns or between about 10 and 100 microns or between about 10 and 50 microns or between about 50 and 200 microns or between about 100 and 200 microns or between about 50 and 150 microns, and may be about 10, 20, 30, 40, 50, 60, 70, 80, 90, 100, 150 or 200 microns. The woven or non-woven support material may have between about 5 and 100 strands/cm or between about 10 and 100 strands/cm or between about 5 and 10 strands/cm or between about 20 and about 100 strands/cm, or between about 40 and 100 strands/cm or between about 60 and 100 strands/cm, or between about 10 and 60 strands/cm or between about 10 and 40 strands/cm or between about 25 and 70 strands/cm or between about 30 and 60 strands/cm or between about 35 and 50 strands/cm or between about 35 and 45 strands/cm, and may have about 5, 10, 15, 20, 25, 30, 35, 40, 45, 50, 55, 60, 65, 70, 75, 80, 85, 90, 95 or 100 strands/cm. The thickness of the strands may be between about 20 and about 2000 microns or between about 20 and 1000 microns or between about 1000 and 2000 microns or between about 500 and 2000 microns or between about 500 and 1500 microns or between about 20 and 500 microns or between about 20 and 200 microns or between about 20 and 100 microns or between about 100 and 500 microns or between about 200 and 500 microns or between about 300 and 500 microns, or between about 50 and 400 microns or between about 100 and 300 microns or between about 500 and 1000 microns or between about 750 and 1000 microns or between about 500 and 750 microns, and may be about 20, 30, 40, 50, 100, 150, 200, 250, 300, 350, 400, 450, 500, 600, 700, 800, 900, 1000, 1200, 1400, 1600, 1800 or 2000 microns. The support material may comprise for example a glass fibre matting, woven glass matting, polyester, microporous polyolefin (for example polyethylene or polypropylene), microporous fluoropolymer (such as polyvinylidene fluoride or polytetrafluoroethylene), cotton, polyester, polyester-cotton, silk, wool, sintered glass, sintered metal or some other porous or fibrous material.

The support material may be a hydrophilic material. Before use, the support material may be treated in order to clean the surface and/or to render the surface more hydrophilic. The details of the treatment may depend on the nature of the material. For example a treatment that may be used comprises the step of exposing the support material to an alkaline solution, for example aqueous potassium hydroxide solution. The alkaline solution may be between about 0.1 and 5M, or between about 0.1 and 1 M or between about 0.1 and 0.5 M or between about 0.5 and 5M or between about 1 and 5M or between about 3 and 5M or between about 0.5 and 2M, and may be about 0.1, 0.2, 0.3, 0.4, 0.5, 0.6, 0.7, 0.8, 0.9, 1, 1.5, 2, 2.5, 3, 3.5, 4, 4.5 or 5M. When treating a support material that comprises woven glass matting (or other glass fibre), the step of exposing may be for between about 12 and 48 hours, or between about 18 and 36 hours, or between about 20 and 28 hours, or between about 12 and 24 hours or between about 12 and 18 hours or between about 24 and 48 hours or between about 36 and 48 hours, and may be for about 12, 18, 24, 30, 36, 42 or 48 hours. However when treating a support material that comprises cotton, polyester-cotton or polyester, the step of exposing should be much shorter so as not to damage the support material, and may be between about 1 and 20 minutes, or between about 1 and 10 minutes or between about 1 and 5 minutes or between about 10 and 20 minutes or between about 15 and 20 minutes or between about 2 and 15 minutes or between about 3 and 10 minutes or between about 4 and 7 minutes, and may be about 1, 2, 3, 4, 5, 6, 7, 8, 9, 10, 12, 14, 16, 18 or 20 minutes. An alternate treatment that may be used is to expose the support material to a water plasma (which may be for example formed within an RF generator). The exposure may be for between about 1 and 20 minutes, or between about 1 and 10 minutes or between about 1 and 5 minutes or between about 10 and 20 minutes or between about 15 and 20 minutes or between about 2 and 15 minutes or between about 3 and 10 minutes or between about 5 and 8 minutes, and may be for about 1, 2, 3, 4, 5, 6, 7, 8, 9, 10, 12, 14, 16, 18 or 20 minutes. In an example, the support may be etched for about 6 minutes in water plasma at about 5.0×10⁻² millibar in a 40 W radio frequency plasma generator operating at 13.56 mH RM to hydroxylate the surfaces making them wettable. Alternatively an oven may be used to burn hydrophobic materials off glass support materials to make them more hydrophilic. The temperature of the oven may be between about 300 and 700° C., or between about 300 and 500° C. or between about 300 and 400° C. or between about 500 and 700° C. or between about 500 and 700° C. or between about 400 and 600° C., and may be about 400, 450, 500, 550, 600, 650 or 700° C. The time required to burn hydrophobic materials off a glass support material may be between about 5 minutes and 36 hours, or between about 10 minutes and about 24 hours or between about 30 minutes and 18 hours or between about 1 and 12 hours or between about 2 and 6 hours or between about 5 minutes and 12 hours or between about 5 minutes and 6 hours or between about 5 minutes and 1 hour or between about 5 and 30 minutes or between about 10 and 30 minutes or between about 1 and 36 hours or between about 6 and 24 hours or between about 12 and 24 hours or between about 18 and 24 hours, and may be about 5, 10, 15, 20, 25, 30, 40 or 50 minutes or about 1, 2, 3, 4, 5, 6, 9, 12, 18, 24, 30 or 36 hours.

Alternatively, the support material may be first treated with an acid, e.g. nitric acid (e.g. about 10%) before use. The support should then be rinsed with water until the rinse water is neutral, and then dried, before subsequent use.

Membranes made of woven glass matting doped with silica gel and polyester/cotton (65/35%) doped with silica gel have been autoclaved and were not affected adversely. A woven glass membranes has been autoclaved more than 10 times and had the biomass removed with 1.5% sodium hypochlorite solution as many times without any sign of deterioration of the membrane.

The precursor liquid may be any liquid which can be converted to a nanoporous material without damage to the support. An example of a precursor liquid is alkaline colloidal silica solution. These solutions are commonly at a pH of around 10, however may have a pH between about 9 and 11 or between about 9.5 and 10.5 or between about 9 and 10 or between about 10 and 11, and may have a pH of about 9, 9.5, 10, 10.5 or 11. The solids concentration of silica in the colloidal silica solution may be about 30% on a weight/weight basis, or between about 15 and 50% or between about 20 and 45% or between about 25 and 40% or between about 30 and 35% or between about 15 and 40% or between about 15 and 30% or between about 25 and 50% or between about 35 and 50% on a weight/weight basis, or may be about 15, 20, 25, 30, 35, 40, 45 or 50% on a weight/weight basis, or it may be about 17% on a volume/volume basis, or between about 10 and 20% or between about 12 and 20% or between about 15 and 20% or between about 16 and 20% or between about 10 and 18% or between about 10 and 16% or between about 10 and 14% or between about 12 and 19% or between about 14 and 18% or between about 16 and 17% on a volume/volume basis, or it may be about 10, 11, 12, 13, 14, 15, 16, 17, 18, 19 or 20% on a volume/volume basis.

The nanoporous solid or gel may comprise for example silica gel, titania gel, zirconia gel, alumina gel, or a mixed gel comprising two or more of silica, titania, zirconia and alumina (e.g. silica-alumina gel), or it may comprise agar agar, agarose, calcium alginate, pectin or other biopolymer. The mixed gels may be made by a process which comprises, as one step, controlled hydrolysis of mixtures of the corresponding alkoxides, for example silica-titania gel may be made by controlled hydrolysis of a tetraalkoxysilane (e.g. tetramethoxysilane $Si(OMe)_4$ TMOS) with a tetralkyltitanate (e.g. tetramethyltitanate $Ti(OMe)_4$). Alternatively the gel may be made using a trialkoxysilane, for example methyl trimethoxysilane or a functional alkylalkoxysilane (e.g. methacryloyloxypropytrimethoxysilane). The precursor liquid may be converted in to the nanoporous solid or gel by changing the pH (for example acidifying), or by evaporating a volatile liquid from the precursor liquid. The evaporating may comprise heating and/or passing a gas past the support material having the precursor liquid. The heating may be to a temperature sufficient to evaporate the volatile liquid but insufficient to cause deterioration of the support material. The temperature may be between about 30 and 90° C., or between about 30 and 80, 30 and 60, 30 and 40, 50 and 80 or 40 and 60° C., and may be about 30, 40, 50, 60, 70, 80 or 90° C., or it may be greater than 90° C. if the support material is capable of withstanding that temperature. A sufficient amount of volatile liquid may be evaporated to cause the formation of the gel on and/or in the support material.

Thus a sol (e.g. a hydrosol), the precursor liquid, may be infused into the support material, and be caused to gel in the support material, by a suitable sol-gel process which may depend on the nature of the sol, and may comprise one or more of: pH adjustment, temperature adjustment, evaporation of volatile liquid, exposure to a reagent and precipitation with a metal ion.

The membrane described in the present invention may be dehydrated and rehydrated to constitute the gel without apparent loss of function of the membrane.

In one example of a fabrication process, a support material having a plurality of holes therein (e.g. a woven polyester), is exposed to a colloidal silica solution, and the pH of the colloidal silica solution in the holes is reduced in order to form a nanoporous silica gel having the cells immobilised therein in the holes of the support material. The pH may be reduced to between about 4 and about 8, or between about 5 and about 7 or between about 4 and about 7 or between about 4 and about 6, or between about 5 and about 8 or between about 6 and about 8 and may be reduced to about 4, 4.5, 5, 5.5, 6, 6.5, 7, 7.5 or 8. The step of reducing the pH may comprise the steps of removing the support having the precursor solutions in the holes thereof from the bulk precursor solution and immersing the support in an aqueous solution of the desired pH. Alternatively a colloidal silica solution is adjusted to pH between about 4 and about 8 as described above and the support then removed from the solution. Other examples of precursor liquids include aqueous solutions of sodium alginate or of agar agar or agarose. The concentration of solute in the precursor liquid should be such that the viscosity of the precursor liquid is suitable for infusing into the support. The concentration will depend on factors which include the molecular weight and nature of the solute and the nature (pore size or mesh size) of the support material. The concentration may be between about 0.5% and 40% by weight or by volume and may be between about 0.5 and 30%, about 0.5 and 20%, about 0.5 and 15%, about 0.5 and 10%, about 0.5 and 5%, about 1% and 10%, about 1% and 5%, about 5 and 40%, about 10 and 40%, about 15 and 40%, about 20 and 40%, about 30 and 40%, about 5 and 30% or about 10 and 20%, and may be about 0.5, 0.6, 0.7, 0.8, 0.9, 1, 2, 3, 4, 5, 10, 15, 20, 25, 30, 35 or 40% by weight or by volume. Evaporation of a part of the water of the aqueous solution may cause the solute to precipitate as a gel on and/or in the support material. In the case that the gel comprises agar agar, the precursor solution may be made by heating agar agar with an aqueous liquid to a temperature above the gel temperature of the agar agar in order to dissolve it. The gel temperature depends on the grade of agar agar and may be between about 25 and about 70° C. The gel temperature may conveniently be below about 50° C., and may be below about 45° C. or below about 40° C., and may be about 30, 35, 40, 45 or 50° C. The concentration of agar agar in the precursor liquid may be between about 0.5 and 5% by weight or by volume, or between about 0.5 and 4% or between about 0.5 and 3% or between about 0.5 and 2% or between about 1 and 3%, or may be about 0.5, 0.6, 0.7, 0.8, 0.9, 1, 2, 3, 4 or 5% by weight or by volume. Cooling the support material infused with the precursor solution causes precipitation of an agar agar gel in and/or on the support material. In the case that the gel comprises calcium alginate, the precursor solution may be an aqueous solution of alginic acid, or of a soluble alginate salt such as sodium alginate. The concentration of alginic acid may be between about 1 and 10% by weight or by volume or between about 1 and 5% or between about 1 and 3% or between about 5 and 10% or between about 7 and 10% or between about 2 and 7% or between about 3 and 5% and may be about 1, 2, 3, 4, 5, 6, 7, 8, 9 or 10% by weight or by volume. Thus immersion of a support infused with the precursor solution into a solution of a metal ion the alginate salt of which is insoluble in water (for example calcium) causes precipitation of an insoluble alginate salt, for example calcium alginate, in and/or on the support material. The alginate salt may be for example calcium alginate, and the solution thereof may be between about 1 and 5% by weight or by volume, or between about 1 and 4% or between 1 and 3% or may be about 1, 2, 3, 4 or 5% by weight or by volume.

The support membrane may be porous, and may be nanoporous, microporous or otherwise porous. The pores may have a mean diameter between about 1 nm and 10 microns, or between about 1 nm and 1 micron or between about 1 and 500 nm or between about 1 and 100 nm or between about 1 and 50 nm or between about 1 and 10 nm or between about 100 nm and 10 microns or between about 500 nm and 10 microns or between about 1 and 10 microns or between about 10 nm and 1 micron or between about 50 and 500 nm or between about 100 and 200 nm, and may have a mean diameter about 1, 5, 10, 15, 20, 25, 30, 35, 40, 45, 50, 75, 100, 150, 200, 250, 300, 350, 400, 450, 500, 600, 700, 800 or 900 nm or about 1, 2, 3, 4, 5, 6, 7, 8, 9 or 10 microns. It may have larger pores, e.g. pinholes. These may have hydrophilic walls or hydrophobic walls, or some may have hydrophilic walls and some may have hydrophobic walls. The larger pores may be between about 1 and about 500 microns in diameter, or between about 1 and 100, 1 and 50, 1 and 20, 10 and 500, 50 and 500, 100 and 500, 10 and 200, 20 and 100 or 100 and 200 microns in diameter, for example about 1, 2, 3, 4, 5, 6, 7, 8, 9, 10, 15, 20, 25, 30, 35, 40, 45, 50, 60, 70, 80, 90, 100, 150, 200, 250, 300, 350, 400, 450 or 500 microns. The larger pores may represent between 1 and about 50% of the total pore volume of the support membrane, or between about 1 and 20, 1 and 10, 1 and 5, 5 and 50, 10 and 50, 20 and 50, 5 and 20 or 5 and 10%, for example about 1, 2, 3, 4, 5, 6, 7, 8, 9, 10, 15, 20, 25, 30, 35, 40, 45 or 50%. The larger pores may contribute to the efficiency of oxygenation of the liquid in the bioreactor of the present invention. They may facilitate penetration or grow-through of microorganisms through the membrane, or the support membrane, of the invention. Thus when growing the biolayers to form the membrane of the first aspect of the invention, the liquid face of the support membrane may be exposed to a waste stream containing microorganisms. Some of these microorganisms may grow on the liquid face to form the liquid face biolayer, and some may grow through to the gas face and grow there to form the gas face biolayer. It will be apparent, therefore, that no starter culture is necessary to prepare the membrane of the first aspect. Microorganisms from the waste stream are encouraged to grow on the support membrane in order to form the biolayers of the membrane.

Insect screen, muslin, cheesecloth, gauze, mesh openweave glass-fibre material and other extremely porous support materials may be used to form membranes with holes (macroscopic pores $\geq$ 100 µm) when doped with silica gel. The holes would enable the trans-membrane passage of liquid from the lumen to the air-face of the membrane, such that it could flow down the air-face creating sheer forces to wash the biomass off the air face and reduce the efficiency of the system. When the holes are small (100-400 µm) the biolayers may grow so as to seal the holes and prevent trans-membrane flow of the liquid in the lumen. The inventor observed that one such membrane made from glass-fibre matting doped with silica gel and formed into a pouch developed a biolayer slower than an equivalent pouch with a closer-weave glass fibre support material. The membrane with small macroscopic holes in it developed a biolayer on the air face noticeably slower, having a two-day lag before the holes were sealed, after which growth on the air face of the membrane was the same as on the more tightly woven membrane.

It is likely that there is a limit to how wide the holes in the support material could be, above which trans-membrane flow of the liquid from the lumen to the air-face of the membranes would not be able to be stopped by the growth of the biolayer on the air-face. By doping a mesh or similar such support material with large macroscopic holes a plurality of times, the gel may be successively built up to seal the holes, however, such a material may not be sufficiently durable for long-term use, or may require specific operating conditions in order to maintain its integrity over long-term use.

In an NMB V style bioreactor (described below in Example 2) three types of silica-doped membrane support materials, polyester, polyester/cotton blend (65/35%) and dacron, were tested for their ability to develop biolayers (biomass). The silica-doped polyester visibly had less biomass per unit area than the other two types of membranes. The silica-doped dacron appeared to have slightly more biomass attached to it than the silica-doped polyester/cotton blend. The silica-doped dacron appeared to have degraded during the incubation. Silica-doped polyacetate membranes used in NMB IV (see Example 3 below) also appeared to degrade during the blackwater trials.

The silica-doped polyester/cotton blend was significantly thicker than the silica-doped polyester. The polyester support material weighed 65 g/m$^2$ and the polyester/cotton blend support material weighed 105 gm/m$^2$. The polyester support material contained approximately 80 ml/m$^2$ of silica gel and the polyester/cotton blend support material contained approximately 120 ml/m$^2$. This demonstrates that the silica-doped polyester/cotton blend membranes were significantly thicker/heavier than the silica-doped polyester membranes, so the former would be expected to be less porous than the latter. Therefore the former was expected to grow less biomass per unit area.

A possible explanation for this anomaly relates to the observation of the interaction of methylcellulose with silica gel. The silica gelled almost immediately after the two solutions (i.e. silica gel and methylcellulose solutions) were mixed and the resultant gel had an opalescence. This indicated that the methylcellulose may have condensed the silica nanoparticles to form a gel with polydispersed pores, having very small pores (less than about 10 nm) close to the methylcellulose fibers/molecules and large pores (300-700 nm) away from the methylcellulose. This would explain the rapid gelation and opalescence observed. From this it is hypothesised that the cellulose fibres (cotton) in the polyester/cotton blend support material may have also differentially condensed the gel to yield a similar gel with polydispersed porosity. Silica-doped polyester/cotton blend membranes were observed to gel faster than did the silica-doped polyester membranes, which is consistent with this hypothesis. The much larger (300-700 nm) pores in the hypothesised polydispersed gel of the polyester/cotton supported membranes would have had very much enhanced diffusion of soluble nutrients and dissolved oxygen, which would have significantly enhanced the growth of cells on both faces of the membrane. It is possible that the differences in gelation rate and pore size distribution described above may be related to hydrogen bonding or some other interaction between the support material and the silica. This may be due to the presence of hydroxyl groups on the support material, which enable hydrogen bonding with silanol groups on the silica gel.

In an alternative process, colloidal silica may be pH adjusted using an acid, e.g. 4M HCl, to a pH of about 6. The support membrane may then be immersed in this solution prior to gellation, so that the colloidal silica forms a gel in the pores of the support membrane. In the instance that the support membrane is cotton or polyester-cotton, this may lead to bonding of the silica gel so formed to the cotton of the support membrane.

The thickness of the gas face biolayer may be less than about 8 mm, or less than about 7, 6, 5, 4 or 3 mm, or between about 1 and about 5 mm, or between about 1 and 4, 1 and 3, 2 and 5, 3 and 5; 2 and 4 or 2 and 3 mm, e.g. about 1, 2, 3, 4 or 5 mm. The thickness of the liquid face biolayer may be less than about 2 mm, or less than about 1.8, 1.6, 1.4, 1.2, 1, 0.9, 0.8, 0.7, 0.6, 0.5, 0.4, 0.3, 0.2 or 0.1 mm, or between about 0.1 and about 2 mm, or between about 0.1 and 1.5, 0.1 and 1, 0.1 and 0.8, 0.1 and 0.5, 0.5 and 2, 1 and 2, 1.5 and 2, 0.5 and 1, 0.7 and 0.1 or 0.8 and 1, e.g. about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 mm. The gas face biolayer may be thicker than the liquid face biolayer or it may be thinner than the liquid face biolayer.

In one mode of operation, the NMB may be operated using biomass spiking/activated sludge. In this mode, the NMB may be operated as an activated sludge in order to optimise the use of dissolved oxygen delivered to the liquid (i.e. the feed to the NMB). Thus an NMB is constructed with a cylindrical clarifier. The clarifier has a conical base and with an outlet at the bottom. The outlet acts as an inlet during the first cycle of operation. During the first cycle, the oxygen-rich effluent from the NMB enters the clarifier through the port at the bottom. This creates an uplift that makes the oxygen and nutrient rich liquid permeate biomass (sludge) at the bottom of the clarifier, creating a suspended sludge blanket in the bottom of the clarifier. During the second cycle the effluent from the NMB enters the clarifier from the side opposite the pump, via a disperser, so that the liquid is aerated, but not mixed, allowing the solids to settle to the bottom and be removed via the port at the bottom. A rotating scraper facilitates sludge removal via the port in the bottom. Sludge is removed periodically. The pump feeding the NMB is turned off at the end of a batch processing to allow final settling, scraping and sludge removal, before the clarified effluent is released through the outlet to complete the batch.

Example 1

Sewage

A nano-particulate membrane bioreactor (NMB) was constructed to trial the treatment of sewage using membrane-surface liquid culture. The NMB had a total of 0.6 m$^2$ of membrane composed of polyester-cotton material doped in colloidal silica gel, using the aqueous route. Sewage primary supernatant was collected from a municipal sewage treatment plant (STP) for treatment in the NMB. Secondary and sand-filtered effluents were also collected for testing, so that the performance of the NMB could be compared to that of a state-of-the-art sewage treatment plant. Total suspended solids (TSS), total dissolved solids (TDS), coliform counts, biochemical oxygen demand (BOD), pH, dissolved oxygen (DO) concentration, elemental analysis using ion-coupled plasma atomic emission spectroscopy (ICPAES), C—N—S analysis, and ion chromatography were performed on samples.

The NMB was incubated at 30° C. and 20° C. to determine the effect of temperature on performance. The flow rate and volume of primary supernatant were varied and the effects of biomass spiking were also tested. A control vessel consisting of a pump and reservoir identical to those in the NMB, was also tested to determine the role of the NMB membranes in the changes seen in the primary supernatant.

The NMB performed better than expected, with the form factor (surface area to volume ratio) being lowered to facilitate testing. The NMB removed suspended solids and coliforms very efficiently, with many batches recording data comparable to the sand-filtered effluents from the STP. The dissolved solids concentration rose significantly during experiments at 20° C. and 30° C., with minimal evaporation, suggesting that the NMB was very efficient at digesting and oxidising the sewage to release more inorganic compounds than in the STP.

The BOD fell rapidly in many batches in the NMB, and the DO concentration always rose to much higher levels than were recorded in the STP. The ammonia oxidation rates were equal to or better than those in the STP in many batches. Ammonia oxidation rates of 2.21 mg/L·h (64.4 mg/m$^2$·h) and 2.63 mg/L·h (78.9 mg/m$^2$·h) were recorded in the NMB. Increased flow rates, increased temperature and increased form factors all appeared to increase the efficiency of the NMB.

Small aquatic worms were prevalent in the resultant liquor after about 24 hours of treatment at 30° C. This demonstrates a potential for the resultant effluent to be used in aquaculture. The resultant effluents smelt like an aquarium or pond, and lacked the faecal/anaerobic smell of the tertiary effluent from STP. The NMB showed good potential for use in sewage treatment, particularly in the role of aeration, flocculation, biomass retention and ammonia oxidation.

Sewage treatment is a complex process involving physical, chemical and biological factors working together to reduce the amount of biological matter, pathogenic microorganisms and nutrients released into the environment. Sedimentation is enhanced by flocculation of cells to remove suspended solids and pathogenic cells from sewage. The retention of biomass for the flocculation of cells and the oxidation of ammonia is critical to the efficient operation of the secondary treatment component of modern sewage treatment plants. Oxidation of the activated sludge in secondary treatment bioreactors is one of the most expensive factors of sewage treatment, which is achieved by sparging the biomass-rich liquor with compressed air.

The NMB is an effective biomass-retention device which uses membrane-surface liquid culture to retain biomass in direct contact with air. The biomass is provided with soluble nutrients via diffusion across the supporting membranes. The aeration is passive, and simple pumping of the liquids provides nutrients to the retained biomass.

Membrane-surface liquid culture has been used to oxidise ammonia in sewage. However, the hollow-fibre membranes used are expensive and need to be submerged in the liquid, so compressed air needs to be supplied. The NMB technology uses pairs of planar membranes arranged into simple gills, which define a lumen for the passage of the sewage between them. The NMB suspends the liquid and biomass in the air, instead of submerging the gas and biomass in the liquid. The special membranes developed for this purpose are extremely porous (≈80%), strong, cheap, durable and non-biodegradable, making this technology an ideal candidate for scale-up to treat large quantities (tens to hundreds of ML/d) such as those required for sewage treatment.

Methods and Materials

Scaled-up NMB

Figure 16:
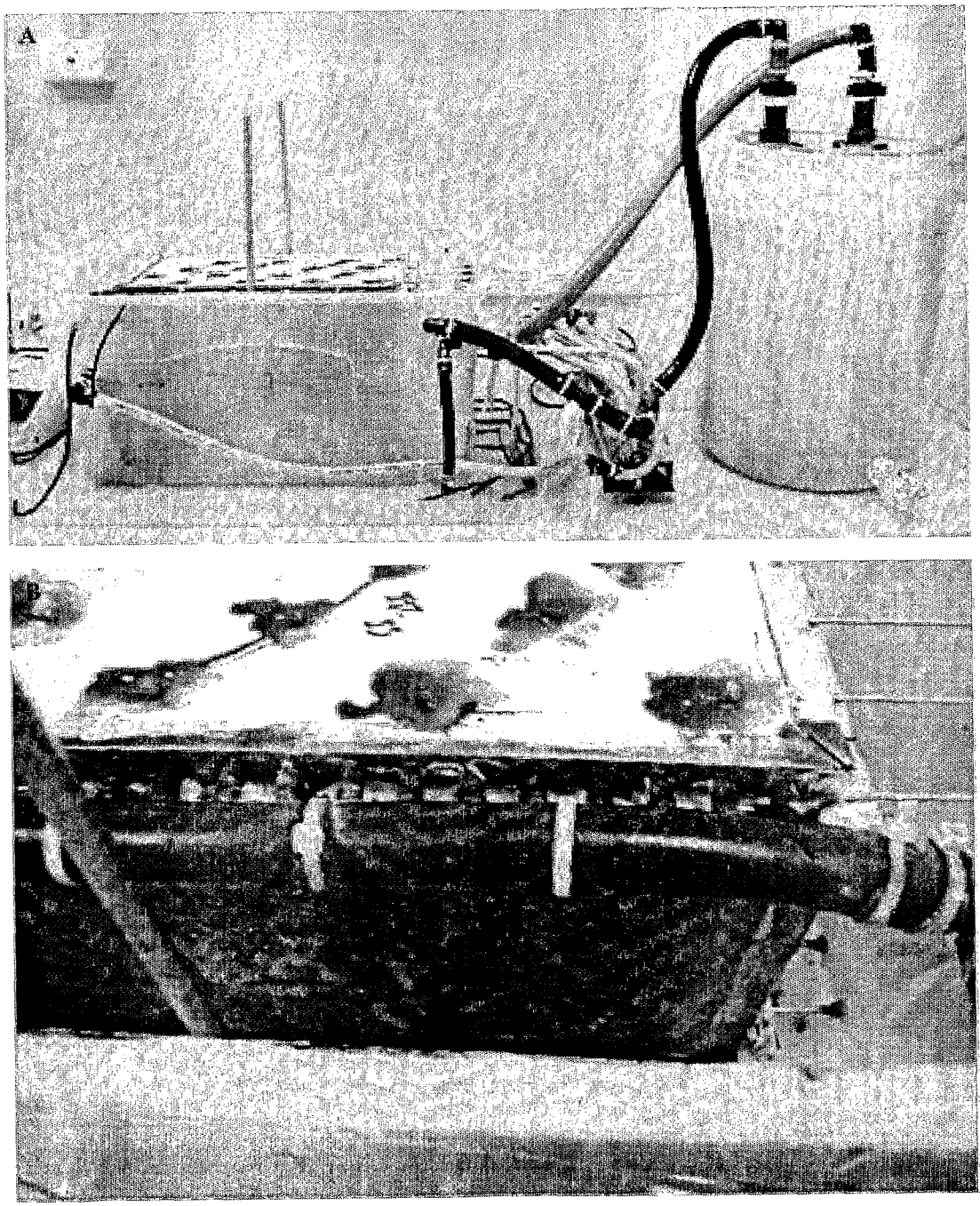
FIG. 16 shows photographs of NMB III: A) with lid removed from the membrane housing alongside the peristaltic pump and reservoir, B) showing the biofilm on the membrane and the inlet manifold.

The scaled up NMB (a diagram of which is shown in FIG. 4) consisted of a bank of five gills composed of two membranes each approximately 364 mm×160 mm with 3-4 mm wide entrance and exit slits. The inlet manifold consists of a flat rectangular box mounted on top of the gills with twenty 4 mm inside-diameter (ID) polyethylene (PE) tubes to feed the influent liquor (primary supernatant of sewage from the STP). Each gill was fed through four evenly spaced tubes. The twenty inlet hoses were all attached to a 19 mm ID PE irrigation hose connected to a 30 L PE reservoir with a tap (FIG. 16). The hose projected to 50 mm from the bottom of the reservoir. The outlet manifold was a flat rectangular box on the bottom of the gill assembly with an outlet hose that fed into a three-chambered peristaltic pump, which pumped the effluent into a reservoir via a hose in the lid. The inlet and outlet manifolds and gill frames were all composed of polyvinyl chloride (PVC). The membranes and frames etc. were glued together with PVC glue and all load-bearing joints were also fixed with stainless-steel pop-rivets and washers to spread the load. The gills, manifolds and plumbing assembly were contained within a 55 L PE box with a lid sealed with silicone glue. An outlet to collect liquid from the bottom of the outer chamber fed into the fourth chamber of the peristaltic pump, which recycled any spilled/leaked liquid from the manifold-gill assembly back into the inlet stream. The gills had a spacing of 20 mm between them.

Figure 16A:
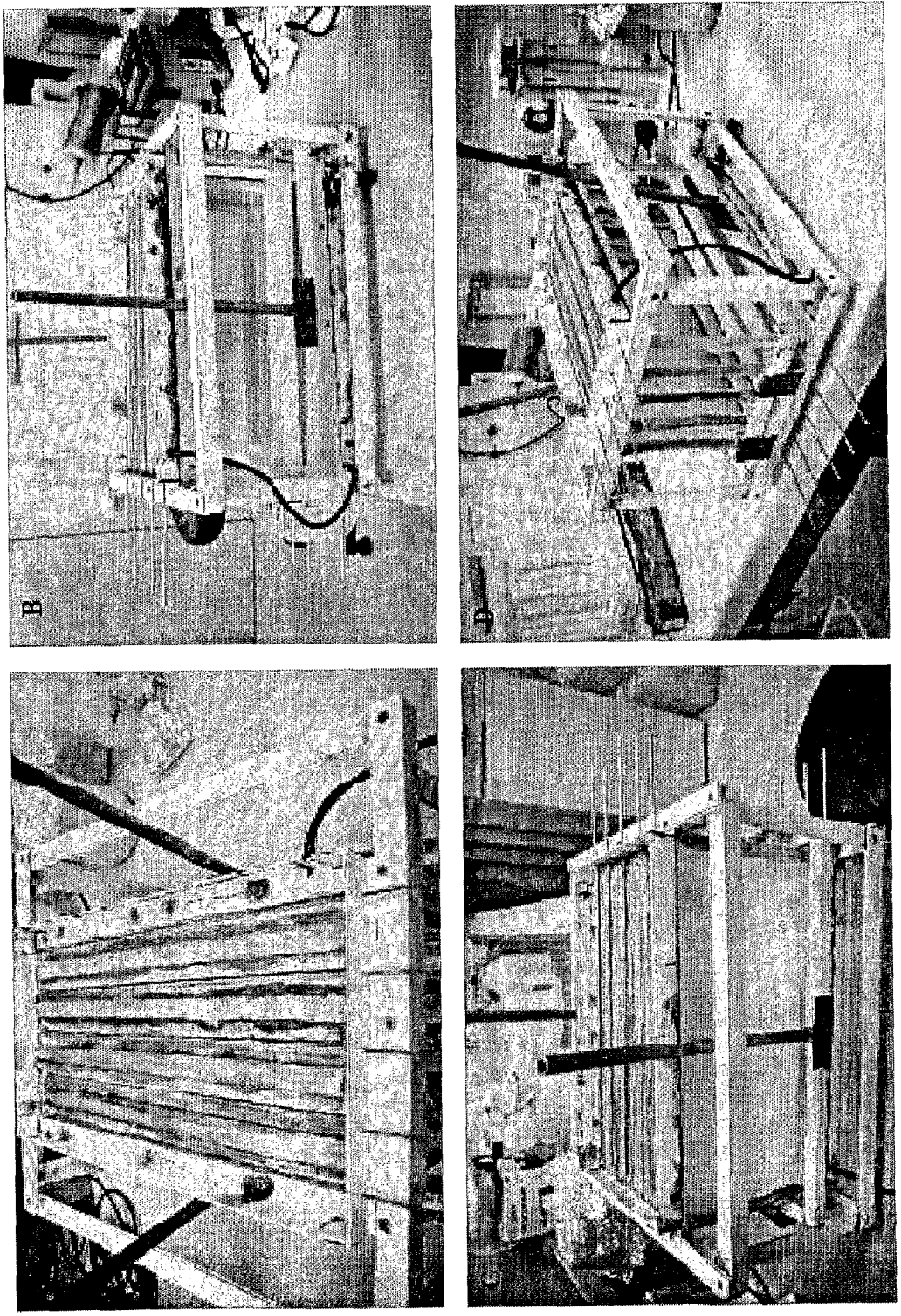
FIG. 16a shows photographs of a decommissioned NMB III bioreactor: A oblique top view, with inlet manifold cover removed to show inlet slits and pushrods that actuate inter-membrane scrapers, B left side elevation showing outer membrane scraper system and inter-membrane scrapers where the membranes have been removed, C right side elevation showing a gill with the membrane intact, and D isometric view showing the whole system without the outer housing.

The bioreactor also had an inter-membrane scraping system (FIG. 16a) and a gill scraping system, which had actuators (push rods) that projected through the outer housing inside rubber boots to contain the culture within the bioreactor and to prevent any external contaminated. The inter-membrane scrapers that reside between the membrane pairs of each gill were used to separate the membranes if/when they become attached to each other by the biofilm growing on the inner/liquid faces of the membranes. Such biofilm growth could potentially retard the flow of the liquid preventing even contact with the inner/liquid surfaces of the membranes. The inter-membrane scraping system was also used to separate the membranes during the silica-gel doping process. The inter-membrane scrapers reside between each pair of gills and have a push rod attached to the top and bottom of the scraper plate. The push rods lie horizontally inside the inlet and outlet manifolds and project through the end walls of the manifold housings, and further project horizontally through the outer housing so that the inter-membrane scrapers can be moved along the plane of each gill from outside the outer housing. To stop material from inside the NMB contaminating the environment, and to also stop the environment from contaminating the NMB the push rods were covered in rubber boots (sausage balloons) that were sealed onto the outer housing via tubular projections from the walls of the outer housing.

Sterile filtered air from a small aquarium pump was used to aerate the system via a hose into the outer chamber through a Sartobran 300™ air filter with 0.2 μm pores (Sartorius Australia PL). Used air exited the outer housing through an efflux vent also fitted with a Sartobran 300™ air filter.

The membranes were constructed of polyester/cotton blend material and were doped with colloidal silica solution (Bindzil™) that had its pH adjusted to 6.0 with 4M HCl and universal indicator. The membranes total combined surface area was 0.6 m$^2$.

The reservoir was oriented on its side (horizontally) during some experiments so that the influent liquid did not disturb the surface of the liquid stored in the reservoir, thus minimising any aeration caused by surface agitation. Experiments with the reservoir oriented vertically had very similar results to those with the reservoir oriented horizontally, so the vast majority of the aeration was attributed to the gills, and not the surface of the liquid in the reservoir. When the reservoir was filled (28.5 L) to the level of the influent liquid and oriented vertically, the surface of the liquid was also not stirred.

Experiments were performed with different volumes of primary supernatant from the STP (28.5 L and 17.5 L), with the reservoir oriented horizontally and vertically, with different pumping rates (level 4 gave a flow rate of 375 ml/min and level 10 gave a flow rate of 1260 ml/min), and with biomass retained in the reservoir over successive batches. Experiments were also conducted with biomass collected from the activated sludge at the STP. The NMB and reservoir were incubated at 30° C. and 20° C. The NMB treated sewage continuously for 14 weeks.

A control vessel was assembled to analyse the effects of the NMB versus the effects of the plumbing and reservoir (particularly sedimentation). The control consisted of an identical reservoir with the same inlets and outlets attached to a three-chambered peristaltic pump, operating at the same speed as the NMB. The control was also tested in the vertical and horizontal orientations.

To retain the biomass during the trial the membranes were not changed or scraped between batches. The biomass was allowed to accumulate over the first four batches grown on ANSTO sewage and the next six batches grown on sewage from the STP before detailed analysis began.

Sample Analysis

Samples were tested for: total suspended solids (TSS), total dissolved solids (TDS), coliform counts, biochemical oxygen demand (BOD), dissolved oxygen (DO) concentration, pH, ammonium cations, nitrate, nitrite, sulfate and phosphate anions, carbon-nitrogen-sulfur analysis (CNS), and ion-coupled plasma atomic emission spectroscopy (ICPAES) for elemental analysis.

Samples were taken from the NMB and allowed to settle for 10 minutes (partial clarification), before being decanted, to remove organic matter (biofilm) dislodged from the NMB membranes due to the passage of the liquid through it. The supernatant was tested as follows:

1. A 500 ml sample of supernatant was filtered through pre-weighed 47 mm wide glass fibre filter disc (Sartorius Australia PL) with a break-through size limit of 0.8 μm. The filters were dried at 110° C. and weighed to determine the mass of suspended solids (TSS).
2. A 50 ml sample of filtrate was further filtered through 0.2 μm reconstituted cellulose filters (Sartorius Australia PL) and subjected to ion chromatography analysis (IC) for anions and cations.

3. The remaining 450 ml of filtrate was dried at 110° C. in pre-weighed beakers for TDS analysis, and the precipitate transferred to crucibles for CNS analysis.
4. A separate 10 ml aliquot was collected from the original supernatant and digested in 30% hydrogen peroxide, nitric acid and filtered for ICPAES analysis.
5. A 1.0 ml sample was serially diluted in 0.1% Tween 80 in 0.85% saline, and 0.1 ml aliquots were spread over Endo Agar plates containing neutral fuschin. The plates were dried and incubated for 24 h at 37° C. before coliform colonies (colonies with a metallic sheen or with very dark purple centres) were counted and calculated to determine the coliform count.
6. Dissolved oxygen (DO) concentration was measured immediately in the samples using a DO probe.
7. The pH was also measured immediately using a pH probe.
8. BOD was analysed by mixing an aliquot (10-1000 ml depending on the load in the sample) of the sample into deionized water in a 5.6 L HDPE container. The DO concentration was measured and the bottle sealed without any air bubbles, before being incubated at 20° C. for four days. The DO concentration was measured again to calculate the amount of oxygen consumed by the sample.

Samples from the STP and the NMB were subjected to some or all of these tests in tandem so that the performance of the NMB could be compared to a state-of-the-art sewage treatment plant. Samples taken from the STP were taken from the splitter just prior to mixing with activated sludge (primary supernatant), the entry port into the sand filters (secondary effluent) and the spillway leading into the UV-irradiation tank (tertiary effluent). It should be noted that all tertiary effluent data was gathered prior to UV-irradiation, so all coliform counts will be significantly higher than the final treated effluent released from the STP and only reflects the quality of the effluent after sand filtration.

The retention times for the liquid in the various components of the STP were calculated from the following data: Flow rate=55 ML/d, Bioreactor volume=16.4 ML, Total clarifier volume=20.6 ML and Sand filter volume=7.9 ML. This gave a retention time for secondary treatment of 16.3 h and a retention time for sand filtration of 3.4 h. These retention times were significantly shorter on days where the flow rates were elevated by rain.

Batch Cultures
ANSTO Sewage

BATCHES A-C NMB: 5.0 L of primary supernatant was taken from the sewage aeration pond 008 at ANSTO Waste Operations and Technology Development and fed into the reservoir. The reservoir was oriented horizontally with the influent hose submerged to minimize aeration via the agitation of the influent liquid. The NMB pump and reservoir were incubated at 30° C. BATCH D NMB: the same as for batches A-C except the volume of ANSTO sewage was 10.0 L.

STP Sewage

The batch conditions for Batches 1-38 are shown in Table A.

TABLE A

| | NMB Batch conditions for STP Sewage | | | | | |
|---|---|---|---|---|---|---|
| Batch | Incubation Temp. | Quantity of supernatant | Reservoir orientation | Flow rate[#] | Sewage source | Details |
| 1-6 | 30° C. | 17.5 L | horizontal | 4 | STP | Influent hose was submerged |
| 7^ | 30° C. | 17.5 L | horizontal | 4 | STP | Influent hose was submerged |
| 8^ | 30° C. | 17.5 L | horizontal | 4 | STP | Influent hose was submerged |
| 9-10^ | 30° C. | 17.5 L | vertical | 4 | STP | |
| 11-15 | 30° C. | 17.5 L | vertical | 4 | STP | |
| 16-18 | 30° C. | 28.5 L | vertical | 4 | STP | |
| 19-21 | 30° C. | 28.5 L | vertical | 10 | STP | |
| 22 | 30° C. | 17.5 L | | 10 | STP | Approx. 3 L of biomass sedimented from 17.5 L of STP activated sludge was added. The reservoir was shaken after the sample was taken at 4.08 hours to re-suspend the biomass and the pump turned off until after the sample was taken at 7.25 hours. |
| 23-24 | 20° C. | 20 L | | | ANSTO* | ANSTO primary supernatant was used to allow biomass to acclimatise to new temp. |
| 25 | 20° C. | 17.5 L | vertical | 4 | STP | |
| 26 | 20° C. | 28.5 L | vertical | 4 | STP | |
| 27-29 | 20° C. | 28.5 L | vertical | 4 | ANSTO* | |
| 30 | 20° C. | 28.5 L | vertical | 10 | STP | |
| 31-33 | 20° C. | 28.5 L | vertical | 10 | ANSTO* | ANSTO primary supernatant was spiked with 3 g ammonium chloride |
| 34 | 20° C. | 28.5 L | vertical | 10 | ANSTO* | ANSTO primary supernatant was spiked with 6 g ammonium chloride |
| 35 | 20° C. | 28.5 L | vertical | 10 | STP | |
| 36 | 20° C. | 15 L | vertical | 10 | STP | Approx. 3 L of biomass sedimented from 17.5 L of STP activated sludge was added |

TABLE A-continued

NMB Batch conditions for STP Sewage

| Batch | Incubation Temp. | Quantity of supernatant | Reservoir orientation | Flow rate[#] | Sewage source | Details |
|---|---|---|---|---|---|---|
| 37 | 20° C. | 28.5 L | vertical | 10 | ANSTO* | ANSTO primary supernatant was spiked with 6 g ammonium chloride |
| 38 | 20° C. | 5 L | vertical | 10 | STP | Approx. 2 L of biomass sedimented from Batch 36 was added |

[#]Flow rate 4 = 375 ml/min; Flow rate 10 = 1260 ml/min
*ANSTO primary supernatant was taken from ANSTO sewage pit 008
^The control vessel was run in addition to the NMB for Batches 7-10

Results

Batch 7

The NMB efficiently removed suspended solids from the primary supernatant with the TSS falling from 118 mg/L to 5.0 mg/L in the first 18.25 hours (FIG. 12-a). TDS increased from 839 mg/L to 973 mg/L over the 45 hour incubation period (FIG. 12-a). The increase in the TDS was also observed throughout later batches and was possibly due in part to more complete oxidation and digestion of organic matter and biomass in the highly oxic NMB system (see later DO data in FIG. 12-g, k, o, s, w etc.). Evaporation alone could not explain the increase in TDS, as it was measured to be 12.6 ml/h, which only accounts for 20% of the increase in TDS. The TSS was almost equal to the net increase accounting for evaporation, so unless nearly all of the suspended solids were inorganic, the increase in TDS remains unaccountable.

Coliform counts fell slightly slower in the NMB than they did in the secondary treatment at STP (FIG. 12-a). They fell from $8.5 \times 10^5$ cfu/ml to $7.8 \times 10^4$ cfu/ml in the NMB over 18.25 h, and from $8.5 \times 10^5$ cfu/ml to $3.7 \times 10^4$ cfu/ml over 16.3 h in the STP. The slightly slower fall in coliform counts may have been due to the infrequent sampling schedule adopted for the first 13 batches.

The control bioreactor was very inefficient at removing solids and coliforms, and did not change the concentration of dissolved solids significantly during the incubation period. The liquid in the NMB rapidly lost the faecal smell, and smelt like a stream or aquarium within 18 hours. The liquid in the control had a very anaerobic smell due to a lack of aeration in the system. The odour from the secondary and tertiary effluents from STP were noticeably more faecal than that from the NMB effluent.

Small red worms about 3-5 mm long and about 0.1-0.2 mm in diameter were observed after about 18 hours. They were very prevalent in the bottom of the reservoir after 48 hours, with balls of the worms constituting most of the biomass present. These worms were prevalent in all batches incubated at 30° C., but were rare in batches incubated at 20° C.

Batch 8

The results for the NMB for batch 8 were very similar to those for batch 7 (FIG. 12-b). The control bioreactor appeared to have removed solids and coliforms more efficiently than it did when the reservoir was oriented horizontally in Batch 7. The TSS in the control bioreactor fell from 101.4 mg/L to 16.0 mg/L in 27 hours compared to 117.8 mg/L to 41.8 mg/L in 18.25 h in the previous batch. The coliform count fell from $8.5 \times 10^5$ cfu/ml to $4.2 \times 10^5$ cfu/ml in batch 7, while in batch 8 fell from $1.0 \times 10^6$ cfu/ml to $2.2 \times 10^4$ cfu/ml. However, the control bioreactor did not perform as well as the NMB with respect to removal of suspended solids or coliforms, and the dissolved solids remained constant throughout the incubation period.

Batch 9

The NMB worked equally or more efficiently than in previous batches at removing suspended solids and coliforms (FIG. 12-c). The TSS fell from 97.2 mg/L to 7.0 mg/L in 23 h, and the coliform counts fell from $8.1 \times 10^5$ cfu/ml to $5.8 \times 10^2$ cfu/ml over the same period. This was contrary to the prediction that the increase in agitation of the stored liquid from the influent pouring into the reservoir from a height of 150 mm, when the reservoir was oriented vertically, would decrease the sedimentation rate of suspended solids and freely suspended cells. This increased efficiency may have been due to the progressive increase in the biomass retained in the reservoir and/or the biomass on the membranes.

The control bioreactor was significantly less efficient at removing suspended solids and coliforms than in previous batches. The TSS increasing from 97.2 mg/L to 106.7 mg/L in the first 23 h, and the coliform count fell from $8.1 \times 10^5$ cfu/ml to $8.7 \times 10^4$ cfu/ml (FIG. 12-c). The increase in TSS in the first 23 h may have been due to retained biomass in the control bioreactor system sloughing off the surfaces, or experimental error from differences in the suspension of solids in the sampling process.

Batch 10

The NMB removed suspended solids quicker than in previous batches (FIG. 12-d). The TSS fell from 129.2 mg/L to 7.0 mg/L in only 19.5 h. This may have been due to the progressive accumulation of biomass in the reservoir and/or on the membranes, or it could have been an artefact of the shorter sampling time between the first and second samples, as was demonstrated in later batches with more frequent sampling. The coliform count in the NMB liquid fell from $8.5 \times 10^5$ cfu/ml to $2.3 \times 10^3$ cfu/ml. The control bioreactor was very inefficient at removing suspended solids and coliforms.

The total phosphorous concentration in the liquid in the NMB fell from 10.9 mg/L to 7.9 mg/L in the first 19.5 hours (FIG. 12-e), and rose back to 8.9 mg/L in the following 24 h. This could be explained by the sedimentation of flocculated biomass in the first increment and then the release of soluble phosphorous (i.e. phosphate ions) by the decay of the sedimented biomass in the second increment. Phosphorous removal in the control bioreactor followed the same trend as that of the suspended solids. The NMB removed slightly more phosphorous than did the STP over the first 19.5 hours.

Copper and zinc followed a similar trend to that of phosphorous in all three systems (FIG. 12-e). Iron did not appear to be returned to the solution in the second increment in the NMB (FIG. 12-b).

Batch 14

The more frequent sampling pattern adopted in batch 14 and later batches enabled the efficiency of the NMB to be more accurately assessed (FIG. 12-f). The suspended solids settled more rapidly than indicated in the previous batches, where an infrequent sampling system was used (FIG. 12-a to e), with nearly all suspended solids settling out in the first 5.42 h (137.2 mg/L fell to 17.4 mg/L). The coliform count fell from $7.2 \times 10^5$ cfu/ml to $3.1 \times 10^3$ cfu/ml in 18.33 h. TDS rose from 768.4 mg/L to 980.9 mg/L over the 51.76 h. This may have been due to evaporation, the release of inorganic solutes from the digestion of biomass, or both. Evaporation recorded in later trials was insignificant, and the amount of suspended solids was much less than the increase in TDS, so the cause of this phenomenon is unknown, but it was observed throughout following batches.

The BOD for the liquid in the STP (FIG. 12-g A) fell from 141.6 mg/L to 30.2 mg/L in 19.7 h, while the BOD for the liquid in the NMB (FIG. 12-g B) fell from 141.6 mg/L to 14.6 mg/L in only 18.33 h. The DO concentrations in the NMB were very high, being over 5.3 mg/L for most of the incubation period. The DO concentrations in the activated sludge at the STP operated between 0.0 and 3.6 mg/L, but were usually around 0.5 mg/L. For the majority of the time the liquid from the clarifiers had a DO concentration of 0.0 mg/L. Only for a brief period when the liquid left the clarifiers did the DO concentration rise to about 5.8 mg/L before falling back to between 1.8 and 4.8 mg/L in its passage through the biomass filled sand filters, which rapidly consumes DO. Thus the normal secondary and tertiary sewage treatment processes are oxygen limited, while the NMB operates under more oxic conditions. This explains why the BOD fell more rapidly in the NMB.

The pH in the NMB fell from 8.22 to 6.91 in 18.33 h (FIG. 12-g B). The pH in the STP fell more rapidly, going from 8.22 to 6.75 in less than 16.3 h (FIG. 12-g A). The ammonium ion concentrations in STP (FIG. 12-h A) fell from 53 mg/L to 0.0 mg/L in less than 16.3 h (3.25 mg/L·h), which was the most rapid ammonia oxidation recorded in this study. Concurrently, the nitrite concentration fell from 7.6 mg/L to 2.2 mg/L and the nitrate ion concentration rose from 0.8 mg/L to 120 mg/L in the same period. The complete oxidation of 53 mg/L of ammonium ions to nitrate ions would yield about 183 mg/L of nitrate, so it appears that about one third of the nitrate ions were denitrified to nitrogen gas in the anoxic phases of the treatment at STP.

The ammonium concentration in the sewage in the NMB (FIG. 12-h B) fell from 53 mg/L to 4.7 mg/L in 18.33 h (2.63 mg/L·h, or 76.9 mg/m²·h). This was the most rapid ammonium ion oxidation recorded in the NMB in this study, and was almost as quick as the STP for the same batch. The nitrite concentration in the NMB rose from 7.6 mg/L to 31.0 mg/L in the first 12 h and then fell back to 1.7 mg/L after 24 hours of incubation (FIG. 12-h B). The nitrate concentration steadily rose from 0.8 mg/L to 220 mg/L over 24 hours (FIG. 12-h B). After 30 h the nitrite concentration had risen to 230 mg/L, which is slightly more than would be expected from the complete oxidation of 53 mg/L of ammonium ions and 7.6 mg/L of nitrite ions to nitrate ions. The extra nitrate ions may have come from the continued digestion of the suspended solids, which would have released more ammonium ions throughout the incubation period.

The plot of the concentration of sulfate ions in the STP (FIG. 12-i A) shows a slight increase in concentration during secondary treatment and a decrease during sand filtration. This was consistent with the presence of sulfur oxidizing bacteria active in the secondary-treatment and sulfate reducing bacteria using sulfate in anaerobic respiration in the sand filters. The plot of sulfate ion concentration for the NMB (FIG. 12-i B) was erratic, with a slight increase during the incubation.

The plot of phosphate concentration for the liquid in the STP (FIG. 12-i A) showed an increase from 0.0 mg/L to 27 mg/L during secondary treatment and a fall to 18 mg/L during sand filtration. This was consistent with all of the phosphorous being bound as polyphosphate inclusions, phospholipids, DNA, RNA and other organic phosphates in the primary supernatant, and the activated sludge digesting the organic matter to release the phosphorous as soluble phosphates. The large retained biomass in the sand filters retrieved some of the phosphates in the tertiary treatment. The plot of phosphate concentration for the liquid in the NMB (FIG. 12-i B) showed a rapid initial release of phosphates, with the concentration rising from 0.0 mg/L to 24 mg/L in less than six hours. A significant retrieval commenced after 12 hours, which lowered the concentration to 18 mg/L after 18 h of incubation.

Batch 16

The fall in TSS in the STP sewage from 85.6 mg/L to 14.6 mg/L in 16.3 h (FIG. 12-j A) was consistent with previous samples. The fall in TSS in the NMB was comparable, with 85.6 mg/L lowering to 9.2 mg/L in less than 20 h (FIG. 12-j B). The reduction in the coliform count in the STP sewage ($6.3 \times 10^5$ cfu/ml to $5.8 \times 10^3$ cfu/ml in 16.3.h) was more rapid than in the NMB ($6.3 \times 10^5$ cfu/ml to $1.8 \times 10^5$ cfu/ml in just under 20 h). There was a lag of over four hours in the NMB culture before the coliform count started to fall (FIG. 12-j B). The biomass retained on the membranes and in the reservoir appeared to be relatively inactive, which was probably due to about two days of starvation over the weekend. This was reflected in the ammonia oxidation data. The larger volume of primary supernatant used may have also contributed to the slower treatment kinetics of the batch.

Complete BOD and pH data was not collected for the STP samples taken in conjunction with batch 16 (FIG. 12-k A). The DO concentration fell from 1.8 mg/L in the primary supernatant to 0.4 mg/L in the activated sludge. It briefly rose to 6.9 mg/L at the end of clarification when it was pumped through a turbine into the head of the sand filters (data not reported) and then fell back to 1.4 mg/L in the biomass rich sand filters.

The plot of BOD versus time for the NMB (FIG. 12-k B) mirrored the plot of TSS versus time, which indicates that sedimentation was the main factor governing the reduction in the BOD in this system. The BOD of the primary supernatant was approximately four times higher than the typical primary supernatant recorded throughout this trial, being 393.4 mg/L. The TSS was 85.6 mg/L, which is too low to constitute such a high BOD. Carbohydrates have a mass to BOD ratio of about 1:1.2 for complete oxidation to carbon dioxide and water. Lipids have a mass to BOD ratio of about 1:3.5, which is still lower than the TSS to BOD ratio of 4.5 recorded for the primary supernatant. Experimental error appears unlikely, as the plot of BOD followed first order kinetics with the equation for the exponential trendline $y=274.71 e^{-0.0622x}$ derived using Microsoft Excel™ software. From this there may have been a very large load of soluble biodegradable matter that caused the extremely high BOD, without a concurrently high TSS concentration. Once again the DO concentration in the NMB liquid rose rapidly (FIG. 12-k B). The pH fell slowly, which was consistent with the slow oxidation of ammonia in the system (data following).

The oxidation of ammonia in the STP was again rapid (2.31 mg/L·h) and almost complete in the 16.3 h of secondary treatment (FIG. 12-l A). The nitrate produced was denitrified in the anoxic phases, as the final nitrate concentration of 68 mg/L was about half of the 131 mg/L that would evolve from total oxidation of 38 mg/L of ammonium ions. The oxidation of ammonium ions in the NMB (FIG. 12-*l* B) had at least a four hour lag period before oxidation commenced. The plot of ammonia concentration followed normal exponential kinetics consistent with the growth curve of microbes, displaying the characteristic lag, log, and stationary phases associated with consumption of substrate by a growing culture. This demonstrated that the culture was well into death phase from starvation in the three day long previous batch, which was fed a dilute primary supernatant containing 72.6 mg/L TSS. The nitrite-oxidising bacteria appear to have been more depleted than the ammonia-oxidising bacteria, as the nitrite concentration rose to 14 mg/L after about 30 h. No denitrification took place in the highly oxic NMB system, as the final nitrate concentration was 130 mg/L.

The addition of an extra 11.0 L of primary supernatant in batch 16 did not account for the slower nitrification rate. The nitrification rate in batch 14 was 2.63 mg/L·h or 76.9 mg/m²h, whereas in batch 16 it was only 0.98 mg/L·h, or 46.5 mg/m²·h. So the hypothesis that the biomass was starved appears to be the most logical explanation for the poor performance in this batch.

The plot of sulfate ion concentration versus time for the STP (FIG. 12-*m* A) rose through secondary and tertiary treatment. The plot of sulfate ion concentration in the NMB (FIG. 12-*m* B) fell, rose and fell again, which was unexpected for a highly aerated system where sulfur oxidation should have occurred. There may have been an anoxic zone in the sedimented sludge in the reservoir where sulfate-reducing bacteria were active.

The plot of phosphate ion concentration in the STP (FIG. 12-*m* A) followed the same trend as seen in batch 14 (FIG. 12-*i* A). The phosphate concentration in the NMB (FIG. 12-*m* B) initially rose from 10 mg/L to 14 mg/L in the first 29 h and then fell to 9 mg/L over the next 20 hours.

Batch 17

The removal of suspended solids from the sewage was similar in both the NMB and STP (FIG. 12-*n*). The coliform count in the NMB remained high (6.3×10⁴ cfu/ml) after 18 h (FIG. 12-*n* B), but fell to 3.2×10³ cfu/ml over the next 7.75 hours. BOD reduction was comparable in the STP and NMB (FIG. 12-*o*). The DO did not rise very quickly in the NMB, only reaching 5.3 mg/L after 18 h (FIG. 12-*o* B), which was due to a gas leak in the reservoir, which reduced the flow rate to below 375 ml/min. This slow pumping rate may have reduced the efficiency of the NMB in batch 16 also. Ammonium ion oxidation was quite slow in the NMB, with only 0.89 mg/L·h or 42.2 mg/m²·h being oxidized in the first 18 h (FIG. 12-*p* B). Nitrite levels were around 4 mg/L throughout most of the incubation period (FIG. 12-*p* B), which indicated that the nitrite-oxidising bacteria were not very active.

The plots for sulfate ion concentration in the STP rose during secondary treatment and fell during sand filtration (FIG. 12-*q* A). The sulfate ion concentration in the NMB fell from 38 mg/L to 23 mg/L over the first 26 hours and rose after this point to 62 mg/L in the next 20 hours (FIG. 12-*q* B). This is not an expected result for an oxidising environment such as the NMB, as sulfur-oxidising bacteria should have rapidly oxidised the reduced sulfur species to sulfates. The phosphate ion concentration fell from 12 mg/L to 9 mg/L in the first 18 hours of incubation in the NMB, and fell from 12 mg/L to 11 mg/L in the secondary treatment at STP (FIG. 12-*q*). Sand filtration removed an extra 1 mg/L, so by coupling the NMB to a sand filter, it may be possible to remove about 33% of the phosphates from primary supernatant, yielding a liquor with about 8 mg/L phosphates.

Batch 19

There was heavy rain when batch 19 was sampled from STP, so the flow rates were much higher than the average 55 mL/day, hence the retention times were significantly shorter than those given in FIG. 12-*r* to *u*. The primary supernatant was relatively dilute, with TSS of 94.4 mg/L, BOD of 87.3 mg/L and ammonium ion concentration of 19 mg/L (FIG. 12-*r*, *s* and *t*). Secondary treatment at STP removed suspended solids less efficiently in the high flows, with TSS falling from 94.4 mg/L to 20.2 mg/L (FIG. 12-*r* A), which placed a high load on the sand filters, yielding a tertiary product containing 7.2 mg/L TSS. The coliform count remained quite high, falling from 8.5×10⁵ cfu/ml to 7.8×10⁴ cfu/ml in secondary treatment and to 2.2×10⁴ cfu/ml in tertiary treatment (FIG. 12-*r* A). The NMB removed suspended solids quite efficiently, compared to some previous batches, with TSS falling from 94.4 mg/L to 4.2 mg/L in 19.5 h (FIG. 12-*r* B). The coliform count fell from 8.5×10⁵ cfu/ml to 4.8×10³ cfu/ml in the same period (FIG. 12-*r* B).

The BOD in the STP fell from 87.3 mg/L to 39.7 mg/L during secondary treatment and to 23.4 mg/L after sand filtration (FIG. 12-*s* A). The BOD in the NMB fell from 87.3 mg/L to 18.3 mg/L over the first 19.5 h (FIG. 12-*s* B). The sampling was too infrequent to ascertain the real kinetics of the removal of suspended solids and the reduction in BOD over the early stages of operations in the NMB. The DO rose from 2.2 mg/L to 7.0 mg/L in the first 19.5 h, and the pH fell from 7.49 to 6.3 in the same period (FIG. 12-*s* B).

Ammonium ion oxidation in the STP was almost negligible in the secondary treatment, with the concentration falling from 19 mg/L to 17 mg/L (FIG. 12-*t* A). The nitrite concentration fell from 3.9 mg/L to 0 mg/L, and the nitrate concentration rose from 10 mg/L to 37 mg/L in the same period. Accounting for the oxidation of nitrite and ammonia to nitrate, the latter should have only risen by 12 mg/L not 27 mg/L. This indicates that the flow rate at the STP was most probably in a state of flux when the three samples were taken within 15 minutes of each other. It appears that the flow rate had increased significantly in the 15 hours prior to sampling, and most likely in the 3 hours prior to sampling. The NMB oxidised ammonium ions at a rate of 0.89 mg/L·h or 42.1 mg/m²·h (FIG. 12-*t* B). The poor performance was possibly due to a leak in the reservoir slowing the flow rate and the biomass being starved from the three-day-long batch prior.

The sulfate and phosphate ion concentrations in the STP (FIG. 12-*u* A) were similar to the plots in previous batches. The plot of sulfate ion concentration in the NMB was a more expected result, with the concentration rising from 19 mg/L to 38 mg/L in the first 19.5 h, where it levelled out (FIG. 12-*u* B). The plot of phosphate concentration was also more like the theoretically anticipated form, rising slightly from 8 mg/L to 11 mg/L over the first 28 h and falling back to 9 mg/L in the next 20 h. The high DO concentration in the NMB (FIG. 12-*s* B) was expected to promote the rapid oxidation of organic matter to release more phosphate from the primary supernatant than the less oxic STP.

Batch 20

The leak in the NMB reservoir was fixed for batch 20, so the flow rate was equal to 1260 ml/min. The TSS in the STP sewage fell from 74.8 mg/L to 15.6 mg/L during secondary treatment, and then to 5 mg/L after sand filtration (FIG. 12-*v* A). The TSS in the NMB fell from 74.8 mg/L to 6.0 mg/L in 17.6 h (FIG. 12-*v* B). The coliform count in the STP fell from 7.2×10⁵ cfu/ml to 7.8×10⁴ cfu/ml in secondary treatment and to 5.5×10³ cfu/ml after sand filtration (FIG. 12-v A). The coliform count in the NMB fell from 7.2×10⁵ cfu/ml to 8.5×10³ cfu/ml in 17.6 h (FIG. 12-v B).

The BOD in the STP fell from 169.7 mg/L to 51.1 mg/L after secondary treatment and to 9.6 mg/L after sand filtration (FIG. 12-w A). The BOD in the NMB fell from 169.7 mg/L to 15.7 mg/L after 15.7 h (FIG. 12-w B). The DO concentration in the NMB rose from 0.7 mg/L to 7.4 mg/L in the first 5.0 h of incubation (FIG. 12-w B), demonstrating that is an effective mechanism for the aeration of sewage.

The pH in the STP fell from 7.80 to 7.09 after secondary treatment (FIG. 12-w A), and it fell approximately the same amount in the first 15.7 h in the NMB (FIG. 12-w B). Ammonia oxidation in the STP was quite rapid, with the ammonium ion concentration falling from 42 mg/L to 8.7 mg/L after secondary treatment (2.04 mg/L·h) (FIG. 12-x A). The ammonium ion concentration fell almost as fast in the NMB, going from 42 mg/L to 11 mg/L in the first 17.6 h of incubation (1.76 mg/L·h 0r 83.6 mg/m²·h) (FIG. 12-x B). The nitrite ion concentration rose from 0.0 mg/L to 8.9 mg/L over this period, indicating that nitrite oxidation was slower than ammonia oxidation. The nitrate ion concentration in the STP rose from 0.4 mg/L to 56 mg/L after secondary treatment because oxic-anoxic cycling removed nitrate by denitrification. The nitrate ion concentration rose in the NMB from 0.4 mg/L to 110 mg/L in the 17.6 h of incubation. This demonstrates approximately stoichiometric conversion of ammonium ions to nitrate ions, allowing for a small amount of ammonia to be released in the digestion of organic matter, so denitrification did not play a significant roll in the nitrogen balance. In the STP the nitrate ion concentration rose from 0.4 mg/L to only 56 mg/L indicating that about half of the nitrate was denitrified in the oxic-anoxic cycling in the bioreactor. The pH fell the same amount in the NMB and secondary treated sewage at STP (FIG. 12-w). This can be accounted for by denitrification in the secondary treatment consuming as many protons as mixed-acid fermentation made in acetic, lactic and formic acid production, while under anoxic conditions.

The plot of sulfate ion concentrations in the STP had the opposite trend to that seen in previous samples, with the concentration falling during secondary treatment and rising after sand filtration (FIG. 12-y A). The sulfate concentration rose from 35 mg/L to 54 mg/L in the first 5.0 h of incubation in the NMB and only increased slightly through the rest of the incubation (FIG. 12-y B), which is consistent with the highly oxic conditions of over 7.0 mg/L DO in the NMB (FIG. 12-w B). The phosphate concentrations in the STP rose only slightly and returned to the initial 8 mg/L concentration after sand filtration (FIG. 12-y A). The phosphate concentrations in the NMB rose initially and then fell to 7 mg/L after 17.6 h (FIG. 12-y B).

Batch 22

From batch 16 to 21 the biomass in the reservoir had increased slightly. To ascertain the effect of increasing the biomass in the reservoir, biomass was collected from the activated sludge at STP and mixed with primary supernatant in the NMB for batch 22.

The TSS in the STP fell at the normal rate (FIG. 12-z A). But it is difficult to compare this to the TSS in the NMB, because the solution was spiked with biomass from the activated sludge. The initial concentration of suspended solids was 2335 mg/L (FIG. 12-z B), which is slightly lower than the average in the STP, which is around 3000 mg/L. The solids sedimented rapidly in the NMB, but were re-suspended after 4 h to maximise the contact between the biomass and the liquid in the reservoir. The final concentration of suspended solids was 68 mg/L, after 19 h. If the solids were not re-suspended after 4 h, the final TSS would have been much lower. The stirring effect created by the influent sewage, which fell 150 ml to the surface of the liquid, was also expected to have retarded the sedimentation of the suspended solids.

The coliform counts for the primary supernatant at STP fell from 1.3×10⁶ cfu/ml to 1.6×10⁵ cfu/ml after secondary treatment and to 1.1×10⁴ cfu/ml after sand filtration (FIG. 12-z A). The coliform counts for the NMB fell from 7.6×10⁵ cfu/ml to 2.0×10³ cfu/ml after only 19 h (FIG. 12-z B). Again, the re-suspension of the sewage in the reservoir appears to have significantly retarded the sedimentation of the coliforms, as the coliform count rose after the re-suspension (FIG. 12-z B). Regardless, the NMB removed coliforms more efficiently than the STP over the same period of time, and was slightly more efficient than in previous batches.

BOD analysis of the STP showed a typical plot (FIG. 12-aa A). BOD analysis was not performed on the NMB for this batch. The DO concentration in the NMB rose rapidly in the first 4 h to 6.2 mg/L (FIG. 12-aa B) and fell back to 3.5 over the next 3.75 h, while the pump was switched off. It rose rapidly again, once pumping resumed 3.75 h later, and had reached 7.7 mg/L by the final sample at 19.08 h.

Ammonia oxidation in the STP followed a normal plot, falling from 38 mg/L to 8.5 mg/L (1.81 mg/L·h) after secondary treatment (FIG. 12-ab A) and rose to 9.4 mg/L after sand filtration. The nitrate concentration rose only slightly, to 16 mg/L during secondary treatment, indicating that denitrification was very active. Ammonia oxidation in the NMB had two phases. Over the first four hours the ammonium ion concentration fell from 43 mg/L to 34 mg/L (FIG. 12-ab B). It rose again to 37 mg/L over the next 3.13 h, while the pump was stopped. During this period the DO concentration in the reservoir only fell to 3.5 mg/L, so there was sufficient DO for the biomass to carry on ammonia oxidation in the reservoir, but it did not. So it appears that the vast majority of the ammonia oxidation in batch 22 took place in the NMB not the reservoir, as ammonia oxidation resumed at the same rate, once pumping recommenced. The ammonia oxidation rate was 2.21 mg/L·h (75.4 mg/m²·h) over the first 4.08 h and was 2.11 mg/L·h (72.2 mg/m²·h) for the 11.83 h once pumping resumed. This increased ammonia oxidation rate is therefore attributed to the growth of a healthy ammonia oxidising population on the NMB membranes since batch 20, and not to the biomass in the reservoir.

The plot of sulfate ion concentration in the STP (FIG. 12-ac A) appeared similar to that in batch 20 (FIG. 12-y A), except it fell and rose more sharply. In batches 20 and 22 the DO concentration was low during secondary treatment, and rose sharply at the end of clarification and during pumping to the sand filters where the elevated DO concentrations favoured the oxidation of reduced sulfur compounds to sulfates. The plot of sulfate concentration in the NMB (FIG. 12-ac B) started very high and fell slightly during the incubation, which was an unexpected result. The plot of phosphate concentration in the STP appeared spurious, as the concentration started in a normal range and peaked after secondary treatment at 59 mg/L, before falling to a normal level after sand filtration. This may be experimental error or a spurious result from a spike in the influent sewage that had passed to the secondary effluent stage when sampled. The phosphate concentration rose consistently during the incubation in the NMB from 9 mg/L to 14 mg/L (FIG. 12-ac B), which is consistent with the extreme oxidising conditions promoting a more complete digestion of the organic matter in the sewage in the NMB.

Batch 25

Batch 25 was the first batch incubated at 20° C. to be analysed extensively. Only two batches fed with ANSTO primary supernatant were run prior to batch 25, so it was expected that the biomass would not have fully adapted/succeeded to the new temperature. The plot of TSS and log coliform count for the STP showed a typical removal of suspended solids and coliforms (FIG. 12-ad A). The TSS fell from 69.4 to 21.8 mg/L and the coliform count fell from $1.2 \times 10^6$ cfu/ml to $4.5 \times 10^4$ cfu/ml in the secondary treatment (16.3 h). The plot of the same parameters for the NMB (FIG. 12-ad B) showed more rapid sedimentation of solids (69.4 mg/L to 14.8 mg/L in 9.7 h), but a relatively slow removal of coliforms ($1.2 \times 10^6$ cfu/ml to $8.9 \times 10^4$ cfu/ml in 20.67 h).

The reduction in BOD for the STP (101.8 mg/L to 16.9 mg/L in 16.3 h) was more rapid than in the NMB (101.8 mg/L to 19.3 mg/L in 20.7 h) (FIG. 12-ae). The DO concentration in the NMB was again much higher than in the STP, exceeding 6.6 mg/L for most of the incubation (FIG. 12-ad B). The pH fell very slowly in the NMB compared with the rate of fall in the STP, indication that the ammonia oxidation was more rapid in the STP.

Batch 26

The plots of TSS and log coliform counts for the STP (FIG. 12-af A) were better for batch 26 than for batch 25 even though the loads in the primary supernatant were higher. The plots of the same parameters for the NMB (FIG. 12-af B) were also slightly better than those for batch 25. Since the volume of primary supernatant fed to the NMB was greater, the NMB worked significantly more efficiently in batch 26 than batch 25, consistent with the ramping-up process.

The drop in BOD was similar in the STP (126.9 mg/L to 30.9 mg/L in 16.3 h) to the NMB (126.9 mg/L to 22.9 mg/L in 20.7 h) (FIG. 12-ag). Once again the BOD and TSS appeared to form a plateau after the initial time increment. This was most likely due to the agitation of the reservoir by the pulse from the peristaltic pump (see batch 36 for details). The DO concentration in the NMB was again much higher in the NMB (FIG. 12-ag B) than was seen in the STP in other batches. The pH in the NMB fell quite slowly (7.66 to 6.83 in 29.33 h), which indicated that ammonia oxidation was still slow.

Batch 30

The TSS in the primary supernatant used in batch 30 was quite typical containing 86.6 mg/L, however, the BOD of the primary supernatant was very high (265.5 mg/L). As in batch 14, there appears to have been a large load of soluble reduced compounds (carbohydrates, lipids, sulfides, ammonia, etc.), which did not contribute to the TSS but affected the BOD. The coliform count fell rapidly in the STP (FIG. 12-ah A), but fell very slowly in the NMB (FIG. 12-ah B).

The BOD in the STP fell very rapidly from 265.5 mg/L to 16.9 mg/L during secondary treatment (FIG. 12-ai A), but it fell slower in the NMB, forming a plateau at around 56 mg/L after 19 h (FIG. 12-ai B). Once again, the plateau in the TSS and BOD data was most likely due to the agitation of the reservoir by the pulse from the pump. The DO concentration in the NMB rose rapidly as usual (FIG. 12-ai B), and the pH in the NMB (FIG. 12-ai B) fell slowly (7.54 to 7.05 in 25.42 h), which indicated a low rate of ammonia oxidation.

Batch 35

The reduction of TSS and coliform count in the STP (FIG. 12-aj A) was normal. The reduction in TSS in the NMB (FIG. 12-aj B) was comparable to the STP, but the coliform counts fell slower in the NMB. The reduction of the BOD in the STP was rapid (151.5 mg/L to 18.3 mg/L in 16.3 h) (FIG. 12-ak A). The BOD in the NMB fell rapidly at first and then slowed after 4.5 h (FIG. 12-ak B). Sedimentation was again retarded by the agitation of the reservoir. Again, the drop in pH in the NMB was only gradual (FIG. 12-ak B).

Batch 36

The removal of suspended solids by the STP was typical of other samples (FIG. 12-al A). The removal of coliforms was relatively slow, with the coliform count dropping from $6.2 \times 10^5$ cfu/ml to $7.2 \times 10^4$ cfu/ml during secondary treatment, and to $1.2 \times 10^4$ cfu/ml after sand filtration (FIG. 12-al A). The data for sedimentation in the NMB was erratic because the reservoir shook with the pulse of the peristaltic pump. This problem had became more pronounced since batch 20, when the leak in the reservoir was fixed, causing the reservoir to distort on the top and bottom. The rounded bottom of the reservoir provided an unstable platform, so the small force from the pulse of the peristaltic pump could noticeably shake the reservoir. This shaking prevented the sedimentation of suspended solids and coliforms. The TSS in the NMB rose from 88.8 mg/L to 2130 mg/L, with the addition of biomass from the activated sludge. It fell rapidly to 15 mg/L in just 5.5 h, but then rose again (FIG. 12-al B). The coliform count also fell rapidly in the first 5.5 h from $6.2 \times 10^5$ cfu/ml to only $2.0 \times 10^3$ cfu/ml (FIG. 12-al B). This showed that the activated sludge was an efficient way to remove suspended solids and freely suspended cells from liquids, and the coupling of the NMB technology to an activated sludge bioreactor has great potential for commercial use.

The BOD in the STP fell from 145.6 mg/L to 9.4 mg/L in secondary treatment, and fell further to 3.9 mg/L after sand filtration (FIG. 12-am A). The BOD in the NMB fell from 145.6 mg/L to 36.4 mg/L in the first 5.5 h, but only reduced slowly after that because of the sedimentation issues outlined above (FIG. 12-am B). The DO concentrations in the primary and secondary effluents at STP were typical, but the DO concentration was higher than usual (4.8 mg/L) after sand filtration (FIG. 12-am A). This may have been due to filter back flushing removing the majority of the trapped biomass prior to sampling. The DO concentrations in the NMB were very high as usual, reaching 7.4 mg/L in the first 5.5 h (FIG. 12-am B). The plot of pH for the STP was typical (FIG. 12-am A), but the plot of pH for the NMB fell more rapidly (7.52 to 6.18 in 20.6 h) than in previous batches incubated at 20° C. (FIG. 12-am B). This was most likely due to the growth of a healthy ammonia-oxidising population on the membranes, due to spiking the feed for previous batches with ammonium chloride.

Batch 38

The plot of TSS for the STP was very similar to that for other samples, falling from 82.8 mg/L 5 to 15.6 mg/L during secondary treatment, and further to 3.0 mg/L after sand filtration (FIG. 12-an A). The coliform count for STP (FIG. 12-an A) fell slower than usual from $6.5 \times 10^5$ cfu/ml to $1.4 \times 10^5$ cfu/ml in secondary treatment, and to $2.3 \times 10^4$ cfu/ml after sand filtration. The TSS in the NMB (FIG. 12-an B) remained very high throughout the short incubation due to the shaking reservoir. The primary supernatant contained 82.8 mg/L, which rose to 703 mg/L after the mixing in the reservoir with retained biomass, and fell back to 90.0 mg/L after 4.2 h. The coliform count in the NMB (FIG. 12-an B) fell from $6.2 \times 10^5$ cfu/ml to $9.3 \times 10^4$ cfu/ml in only 10.5 h, which demonstrated that the addition of biomass from the activated sludge to the NMB reservoir helped flocculate suspended cells.

The plot of BOD for the STP (FIG. 12-ao A) was normal, falling from 146.1 mg/L to 16.8 mg/L during secondary treatment and to 5.6 mg/L after sand filtration. The BOD in the NMB (FIG. 12-ao B) fell to 44.8 mg/L in the first 10.5 h, which was again high due to the shaking reservoir. The pH in the STP fell from 7.58 to 6.67 during secondary treatment (FIG. 12-*ao* A), and the pH in the NMB fell rapidly from 7.38 to 5.71 in only 10.5 h (FIG. 12-*ao* B). The rapid fall in pH in the NMB indicates a rapid oxidation of ammonium ions.

The very small volume of primary supernatant used in the NMB in batch 38 was chosen to demonstrate the activities of the NMB operating with a higher form factor (0.085 $m^2/L$) than in previous batches (0.034 $m^2/L$ and 0.021 $m^2/L$). The rocking reservoir and the disturbance of the sedimented biomass by the influent liquid falling 250 mm to the reservoir surface made the TSS, BOD and coliform counts remain higher than could be achieved with a stable reservoir, but the ion chromatography and ICPAES data following this report may still be useful.

It is interesting to note the drastic reduction in the total amount of biomass in the NMB reservoir from batch 36 (38.3 g) to batch 38 (4.9 g). The vast majority of the biomass was retained in each of the two decanting steps, so it appears that the biomass oxidised very rapidly in the highly oxic conditions over just two days. This may pose a problem if biomass retention becomes the favoured technique for sewage treatment. However, in a real sewage treatment situation the biomass in a NMB would be well fed, and not regularly starved as was the case in this experiment.

Discussion

A brown biofilm gradually grew on the outside (gas face) of the membranes during the trial. A biofilm also grew on the inside (liquid face) of the membranes during each batch and sloughed off after 18-24 hours depending on the liquor concentration, volume and flow rate. This was apparent by the steady reduction in suspended solids during the first 18-24 hours of each batch and the appearance of large thin sheets of brown cellular matter at this point. The biofilm sheets appeared in every batch, so could not have come from anywhere other than the inside faces of the membranes. There was no sign of biofilm development in any other sites of the bioreactor until later in the experiment and such biofilms were not as even in thickness. The biofilm that sloughed off settled rapidly in the reservoir.

It appears that the biofilm that formed on the inside (liquid) of the membranes were responsible for the flocculation of much of the suspended solids (mainly cellular material), which caused the rapid clearing of the liquor and reduction in the TSS, BOD and coliform counts. The biofilm on the outer (gas) faces of the membranes appears to have been responsible for the majority of the ammonia oxidation that took place in the NMB. The ammonia oxidation rate was usually linear and in most batches did not have a lag period, demonstrating that there was a large healthy biomass retained by the NMB. When the pump was turned off in batch 22 ammonia oxidation ceased, and when the pump was turned back on, ammonia oxidation resumed. This clearly demonstrated that the majority of the ammonia oxidation took place in/on the membranes, and some of the biodegradation took place in the reservoir, as the ammonia concentration rose and the DO concentration fell during the period when the pump was turned off. Concurrently, the nitrite and nitrate concentrations also fell. This suggests that even though the liquor was essentially oxic (DO$\geq$3.5 mg/L), some denitrification took place. The very active ammonia oxidation recorded in the NMB (up to 2.63 mg/L·h or 76.9 mg/$m^2$·h) in several batches demonstrates the presence of ammonia-oxidising and nitrite-oxidising bacteria, which are responsible for the oxidation of ammonia to nitrite and then the oxidation of nitrite to nitrate. No taxonomic or phylogenetic analysis was performed on the biofilms or biomass in the reservoir.

One of the main problems in sewage treatment is the retention of biomass, particularly when there are high flow rates. However, retention of biomass in the NMB was not found to be an issue, irrespective of the rate of flow. An example are the ammonia oxidising bacteria, which appear to reside on the outside of the membrane feeding on ammonia that is released from the degradation of the particulate matter in the sewage by bacteria on the liquid/inner face of the membranes, and to a lesser extent in the reservoir, and from activities prior to entering the NMB. It appears that the ammonia diffused through the membranes to the biomass on the outer/gas face, where it was oxidised to nitrite and then nitrate and diffused back across the membrane into the liquid stream.

The DO concentration in the secondary treatment stage at STP usually ranges from 1.5 mg/L to 0.0 mg/L, whereas the NMB operates with DO levels in the reservoir elevating from an initial level between 0.0 mg/L to 1.5 mg/L up to 7.4 mg/L in only five hours. Since it operated at DO concentrations between 6.0 mg/L and 8.0 mg/L it is reasonable to expect that the oxidation of volatile organic compounds was more complete in the NMB than in the STP. The relatively pleasant odour of the resultant treated effluent from the NMB, which smelt like an aquarium or pond, and lacked the faecal/anaerobic odour of the tertiary effluent from STP provided some evidence of this. The high DO also contributed to the rapid reduction in the BOD of the liquid in the NMB. The coliform counts also consistently fell two to three orders of magnitude in the first 20 hours.

The results of ion chromatography and ICPAES have not as yet been acquired for the batches incubated at 20° C. The pH data indicates that ammonia oxidation was slow in early batches (25-35) and faster in later ones (36 and 38). The very rapid change in pH in the batch 38 indicated complete oxidation of the ammonia in 10.5 hours, which is much faster than recorded in any of the STP samples. The biomass densities used in all of the batches spiked with biomass from the STP activated sludge, were lower then the biomass densities used at STP, and the high DO concentrations in these batches indicates that significantly higher biomass densities can be used to increase the rate of ammonia oxidation. However, the data from batch 22 indicates that the vast majority of the ammonia oxidation is conducted by the biomass on the membranes. This matter requires further investigation.

The leaking reservoir created uncertainty about the actual flow rates through the system. When the leak was fixed, the back pressure from the inlet manifold caused the reservoir to progressively deform at the ends, so that it sat on a rounded base, causing the reservoir to shake due to the pulse from the peristaltic pump. This phenomenon progressed from batch 20 to 38, with the base line for the TSS and BOD slowly rising with successive batches. Batches with lower volumes of liquid in the reservoir had less mass to oppose the force of the pulse from the peristaltic pump, so the shaking became more pronounced in these batches. The influent liquor also disturbed the liquid in the reservoir. When there was only 7.0 L of sewage in the reservoir the influent fell 250 mm into the liquid, which provided a significant disturbance. When there was 17.5 L in the reservoir the influent liquid fell 150 mm to the surface of the liquid, also providing a significant disturbance. In future experiments this will be ameliorated with an inlet tube extending into the reservoir with a dispersion nozzle on the end to minimise the suspension of sedimented biomass on the bottom of the reservoir. The uneven distribution of the biomass on the membranes seen after the experiment, demonstrated an uneven distribution of the influent liquor to the individual gills, where three of the gills received significantly more sewage then the other two. From this, there is room for further improvement of the inlet manifold to increase the efficiency of the NMB.

The differences between incubation at 20° C. and 30° C. are unclear, since factors such as disturbance by agitation in the reservoir clouds the picture. The ion analysis will clarify the differences in ammonia oxidation rates. The effect of spiking the reservoir with biomass also remains uncertain, as the experiments need to be repeated in the opposite order to enable the effect of accumulation of biomass on the membranes, and the health of that biomass (e.g. starved or well fed) to be determined. The data indicates that changing the form factor appears to be the most significant influence over the efficiency of the NMB. The health of the biomass was also an important factor. It is expected that with a continuous feeding system the NMB would have a well-fed biofilm, which would improve its efficiency.

With respect to the nature of the aeration of the nutrient stream, in this application the NMB was acting as an extremely efficient aeration mechanism. The use of such a mechanism for the aeration of liquids has not been claimed in any prior art, only the provision of oxygen to a biofilm growing on the liquid face of hollow-fibre membranes, but not the liquid itself (1-6). The co-operative activities of two biofilms on a membrane have not been covered by prior art either. In this application of the NMB there appears to be a biodegradative biofilm on the inner/liquid face, which flocculates cellular and particulate matter in the liquid stream and digests it to release ammonia and soluble organic molecules, which diffuse across the membrane and are consumed and oxidised by a second biofilm growing on the outer/gas face of the membrane. The biofilm on the inner face sloughs of the membrane when the particulate/nutrient levels drop sufficiently to induce starvation. These sheets of biofilm readily settle in the reservoir, which acted in the same way as a clarifier, so both removal of organic matter (TSS, BOD and coliform counts), and ammonia oxidation took place simultaneously. This innovation is the subject of Australian Patent Application No. 2005906407, which supplements the International Patent Application No. PCT/AU2005/000713.

Large numbers of small (5-6 mm long and 0.2 mm wide) red worms were detected in the sediment in the reservoir after 24 hours when incubated at 30° C., but not when incubated at 20° C. The numbers increased over the next 24 hours to yield balls of worms with an estimated maximum yield of about 200 worms/L. This demonstrates that the NMB technology may have a significant application in aquaculture, as it is efficient at dissolving oxygen, oxidising ammonia and nitrite, and promotes the growth of detritovores, which make a platform for the food chain in crayfish, prawn and fish farming.

This trial showed the NMB to be an efficient way to oxidise and clarify sewage. The NMB was also able to reduce faecal coliforms, BOD, TSS and TDS demonstrating that the NMB technology has a potential use in sewage treatment. In addition, the NMB technology has potential use in aquaculture.

Example 2

Shower Water

Construction

NMB V, used in this experiment, was constructed to have 16 gills each composed of two membranes 1465 mm tall and 994 mm wide. The membranes were made of polyester fabric doped with porous colloidal silica made by the aqueous route. The fabric was treated with 10% wt/vol nitric acid (AR) for 60 minutes and rinsed with tap water until the pH of the resultant water had returned to 7.0. The treated fabric was dried in a 30° C. incubator for two days before doping with silica. Thirteen 2870 mm×994 mm sheets of treated polyester fabric and one each of treated polyester/cotton (65/35%) and treated dacron were each attached in the middle to 1020 mm long 25×10 mm aluminium insect-screen support brackets and were rolled up. One ml of universal indicator was added to 1.0 L of Bindzil 30/360 (food grade) (EKA chemicals) and the pH adjusted to 6 using 4.0 M HCL ($\approx$35 ml). The rolls were each doped with the pH-adjusted Bindzil in an 1100×100×100 mm trough fitted with a rubber squeegie along one lip. The doped fabric was passed between the edge of the squeegie and a second squeegie to remove excess silica solution from the membrane. The membranes were hung from their support brackets on a temporary bracket support until they had gelled, and then the membranes were separated and allowed to dry. This was repeated for 24 more membrane sheets. Another two 1465× 994 mm fabric sheets were attached to aluminium support brackets at one end and were doped in a similarly manner. The dried membranes were hung with a 6.0 mm wide gap between each adjacent bracket from a rack at the top of the membrane housing, just below the inlet manifold. The 6.0 mm wide gap was defined by a length of plastic retaining tubing wedged into the retaining groove at each end of the brackets. Each of the single-membrane brackets was hung on the outer extremities of the set of membranes to complete the membrane pairs.

The inlet manifold consisted of a set of branched tubes with 3.5 mm wide holes over a flat PVC tray with 3.5 mm wide holes arranged in 26 rows 50 mm apart. The rows were spaced 16 mm apart so that they would align with the 6.0 mm wide gaps between the aluminium brackets so that they would trickle liquid between the adjacent membranes to form the gills by the action of surface tension.

Modifications

After five weeks it was noticed that the gills had become stuck together under surface tension between the biofilms on the air-faces of the membranes of adjacent gills. This effectively reduced the area of membranes in contact with air and subsequently the efficiency of the system. To correct this problem, the membranes were restrained at the bottom by brackets in the same way as they were at the top. Air spacers were made from PVC angle bent to 45. Holes 100 mm long and 6 mm wide were cut into the PVC to allow air to rise vertically and for biomass for fall through. The air spacers were mounted in the middle of the gills. The tubes in the inlet manifold were fouled with biomass accumulating in the outlet holes. The network of tubes was replaced with a single hose mounted over the top of the membrane box with two outlets draining over the flat tray. The holes in the tray were widened to 5.0 mm.

Figure 13:
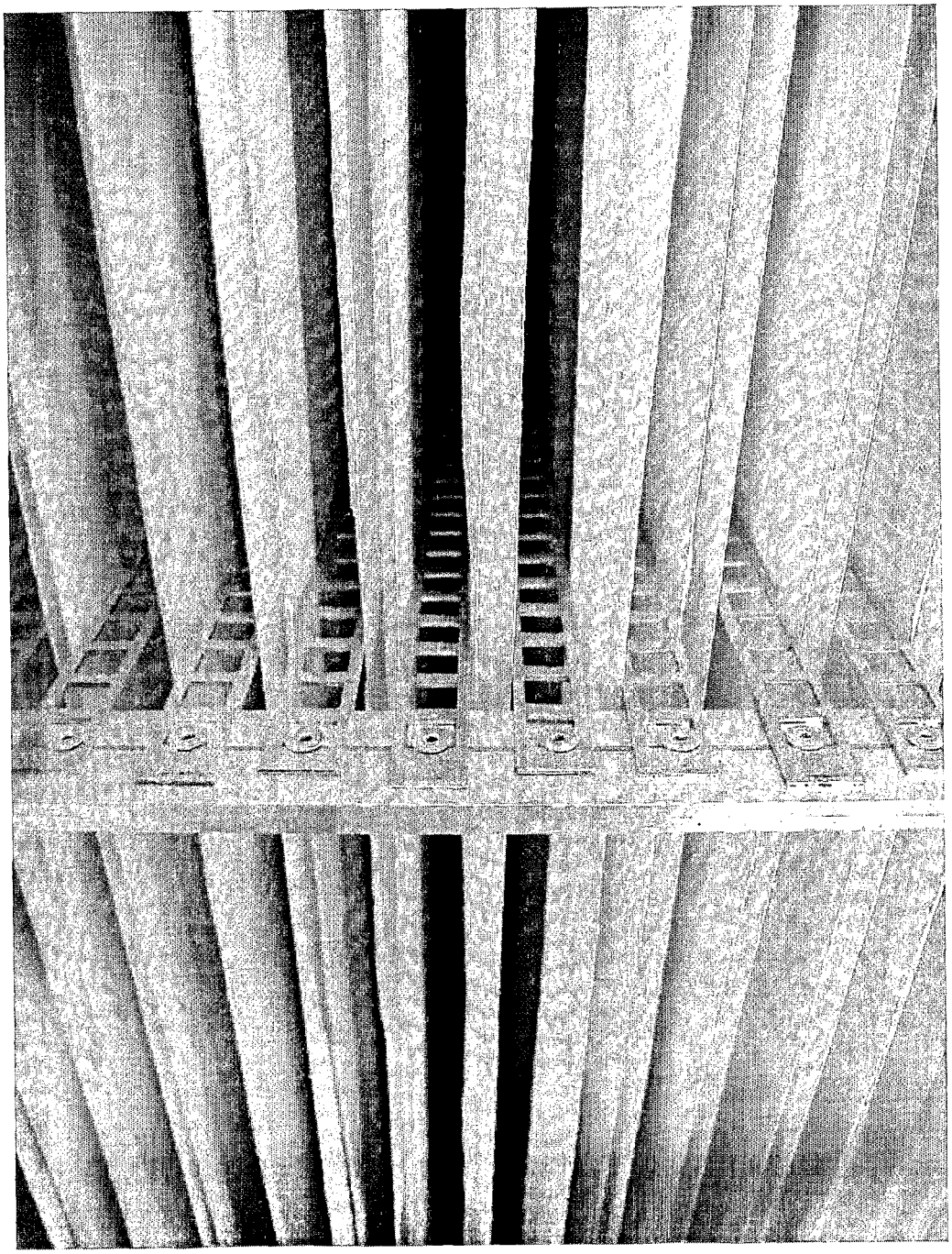
FIG. 13 is a photograph showing spacers used in the present invention.
Figure 14:
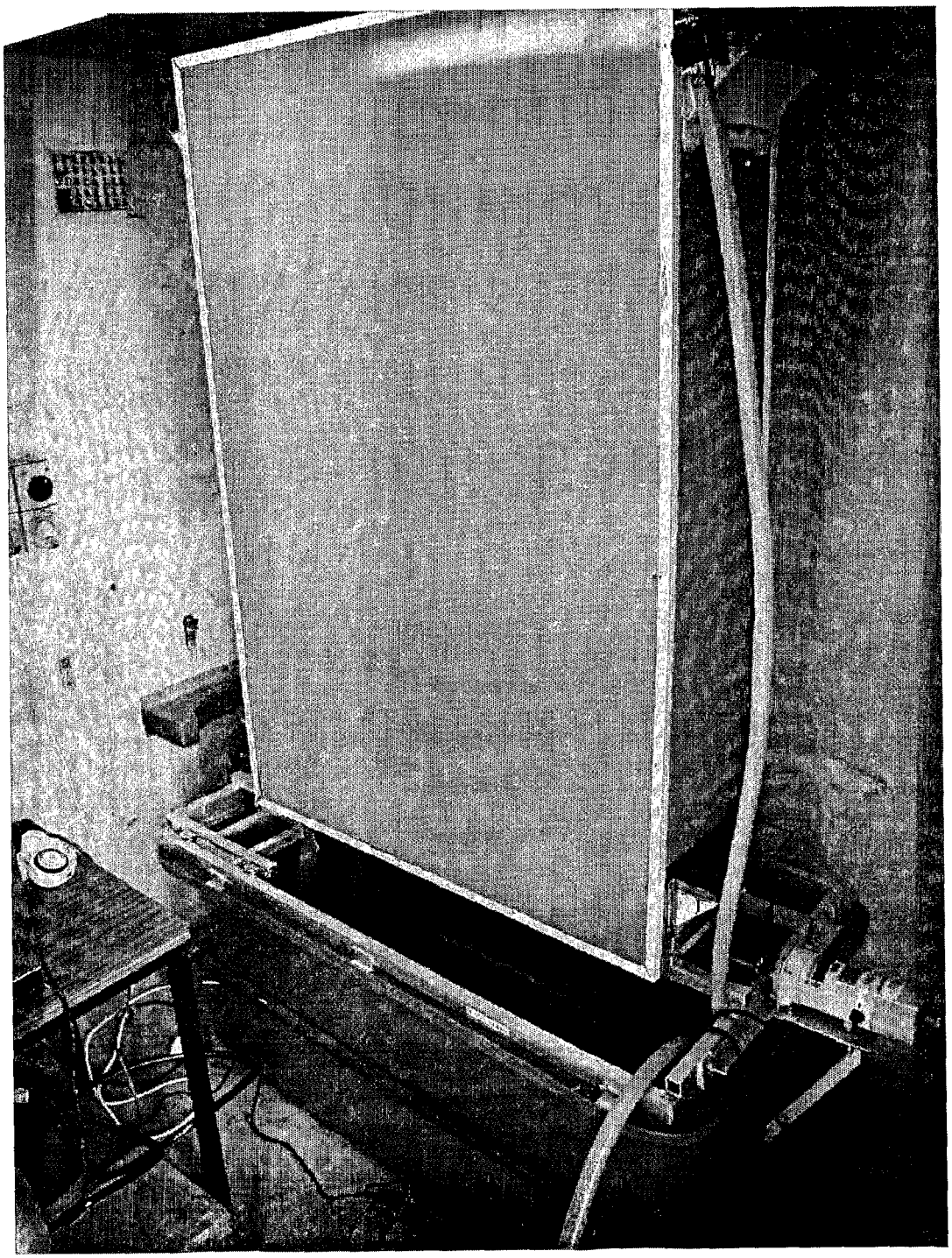
FIG. 14 is a photograph of a bioreactor, NMB V, used in Example 2.
Figure 15A:
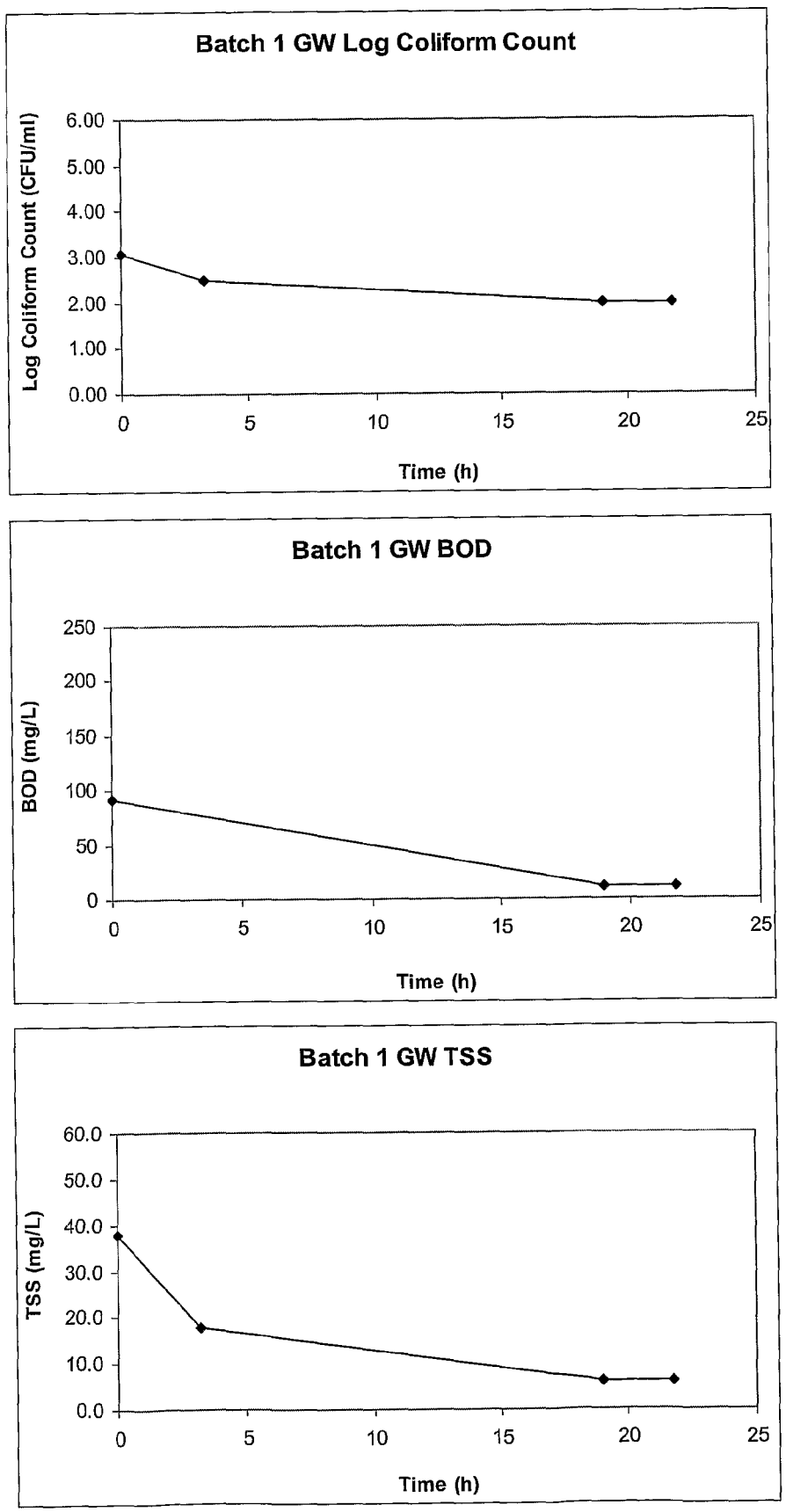
FIG. 15 shows the results obtained in Example 2 for shower water in NMB V: 15-a batch 1; 15-b batch 3; 15-c batch 15; 15-d batch 16; 15-e batch 17; 15-f batch 18; 15-g batch 27.
Figure 15A:
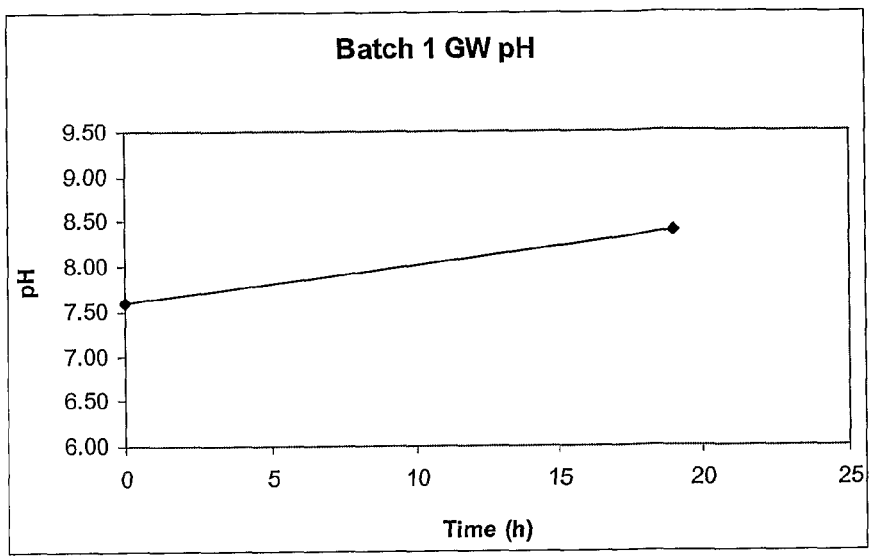
Figure 15A:
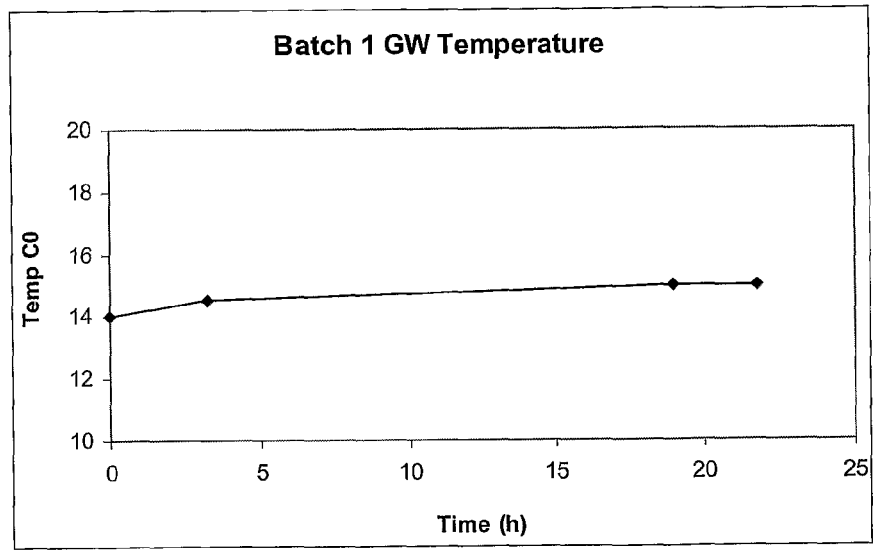
Figure 15A:
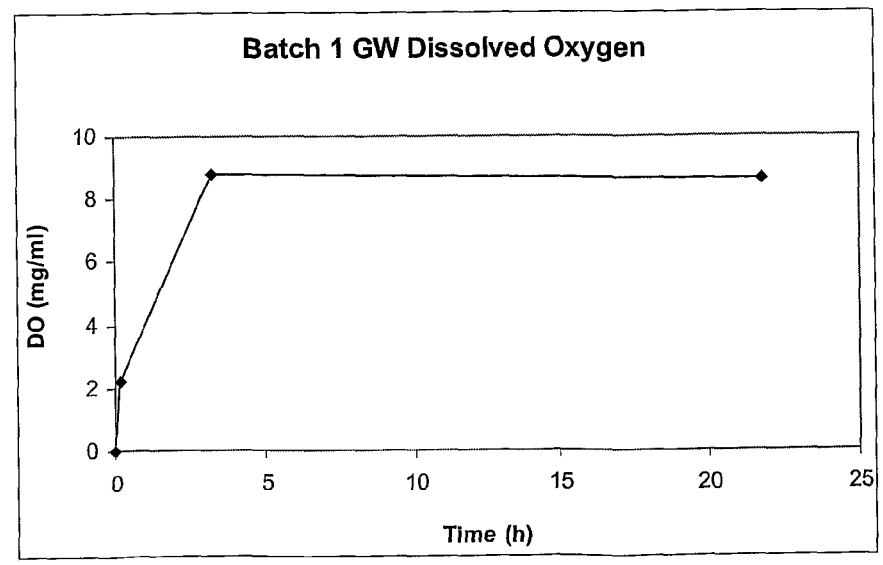
Figure 15B:
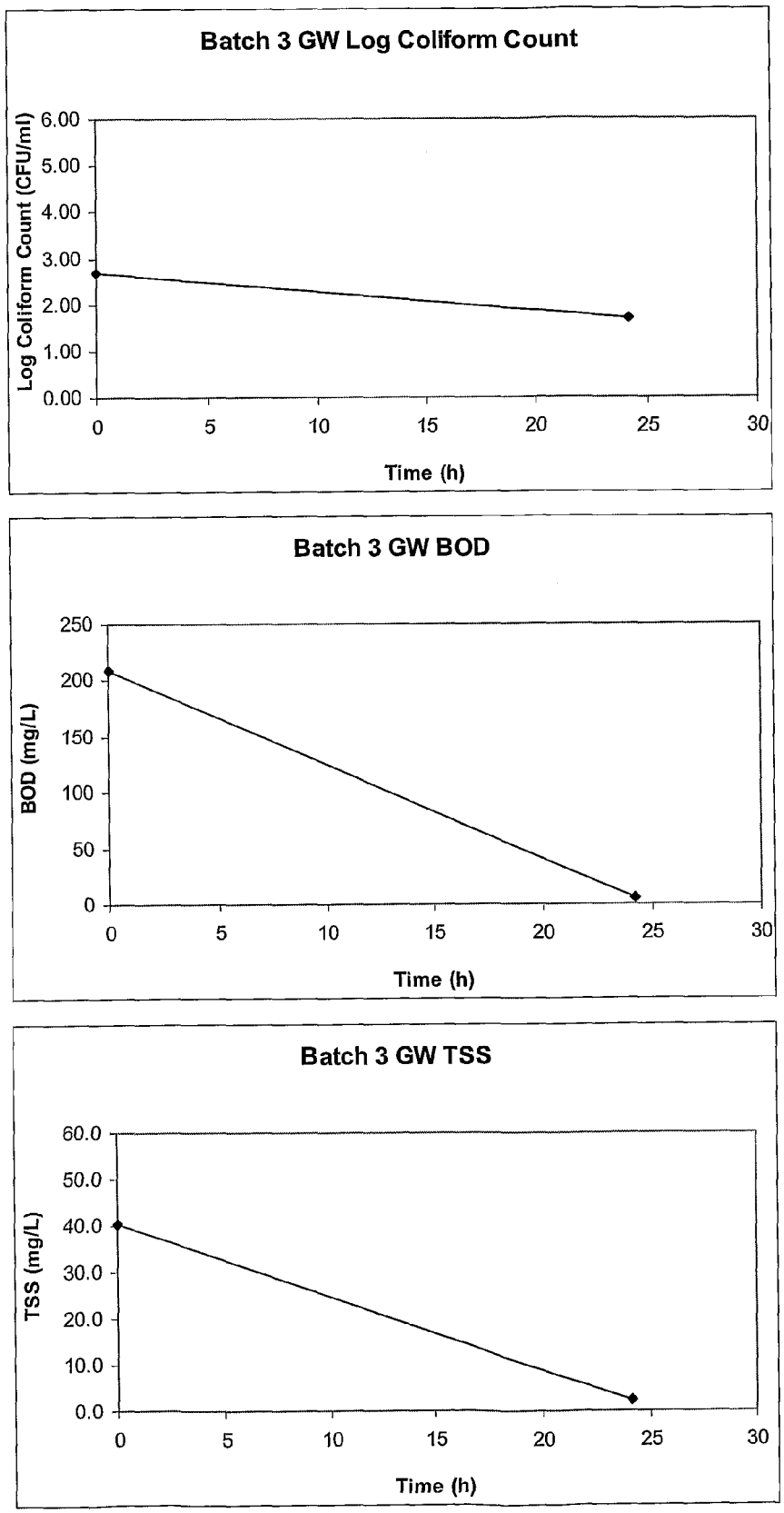
Figure 15B:
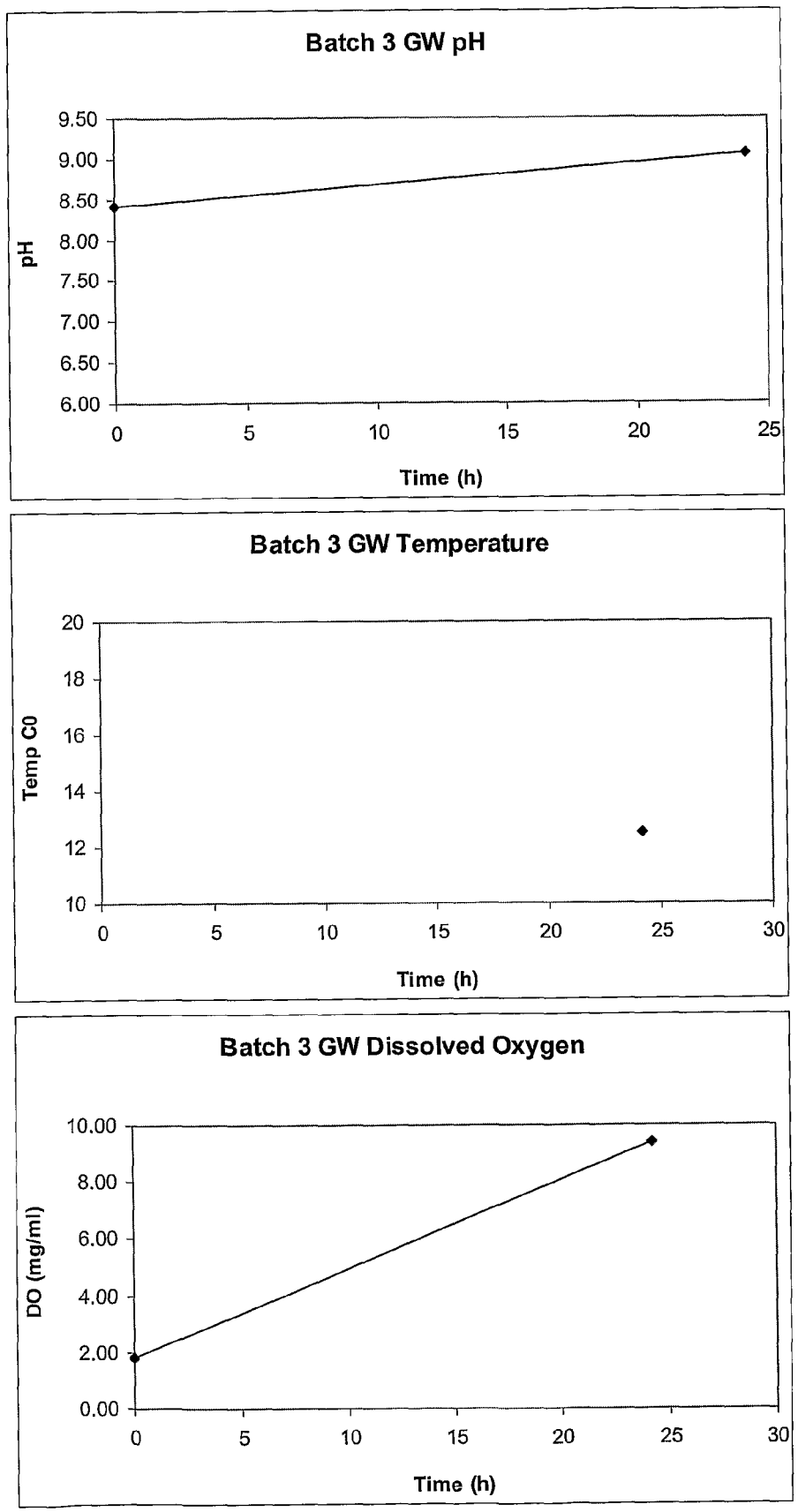
Figure 15C:
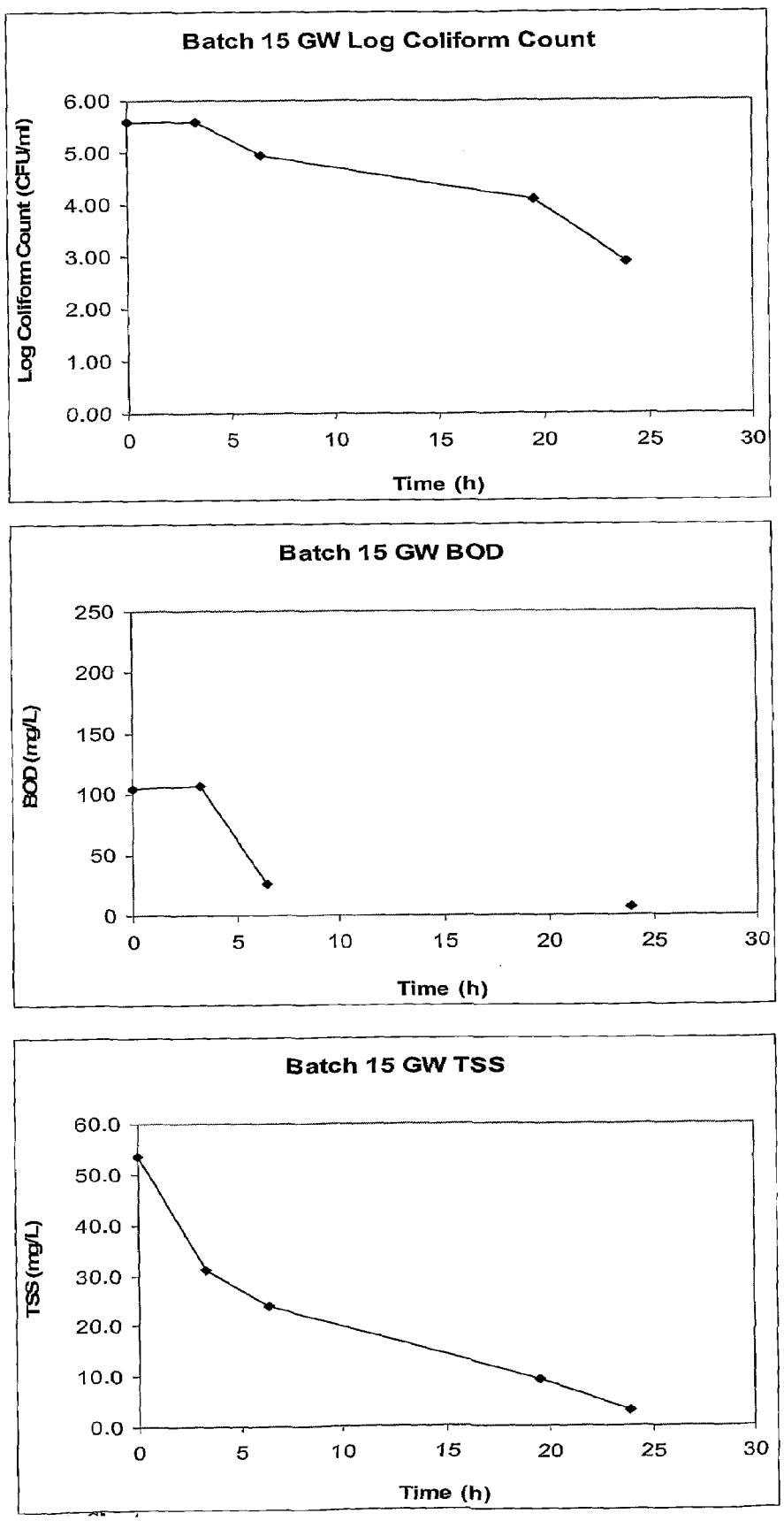
Figure 15D:
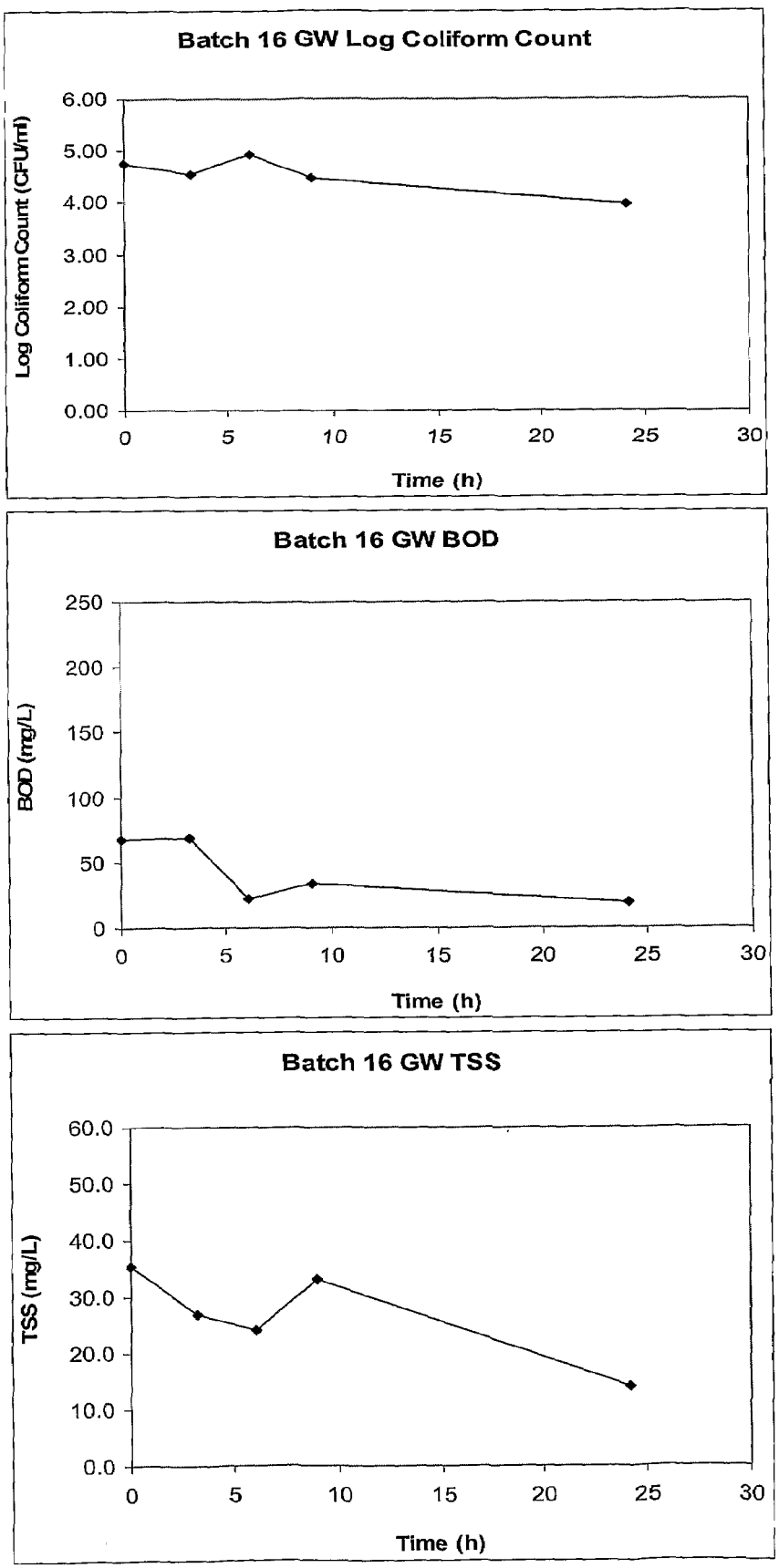
Figure 15D:
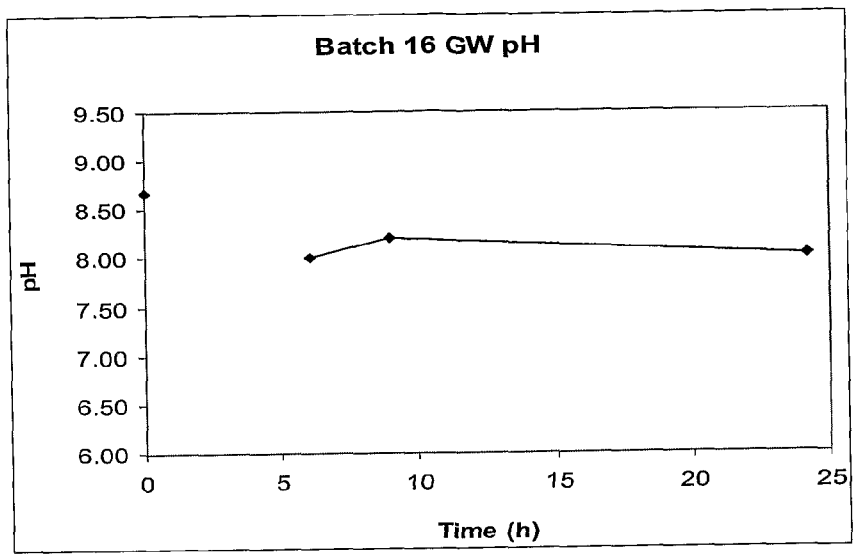
Figure 15D:
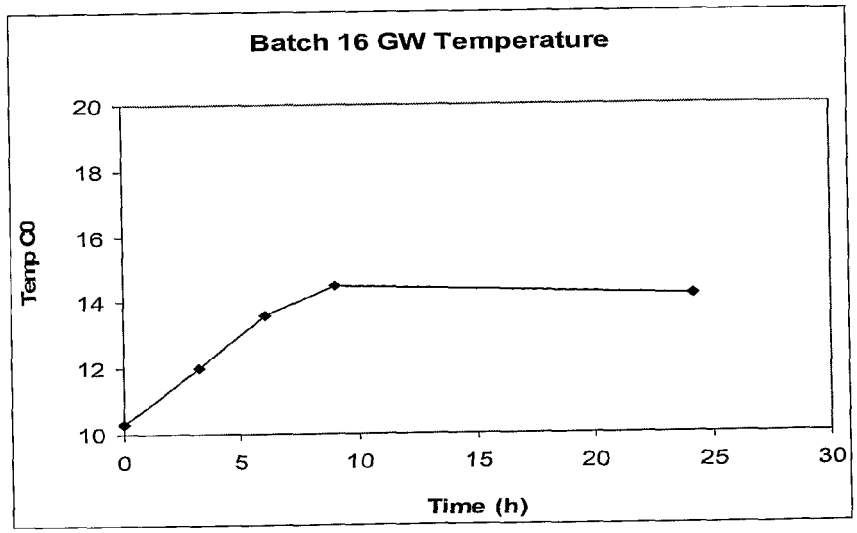
Figure 15D:
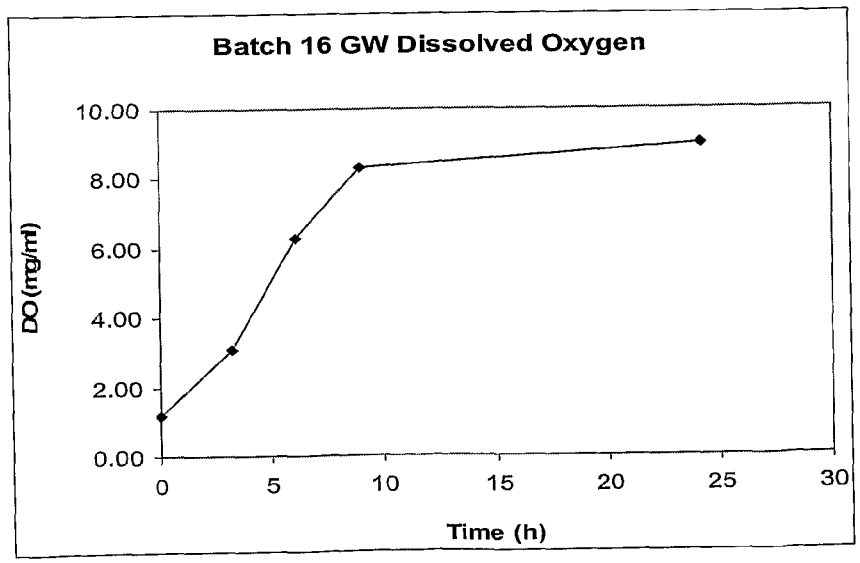
Figure 15E:
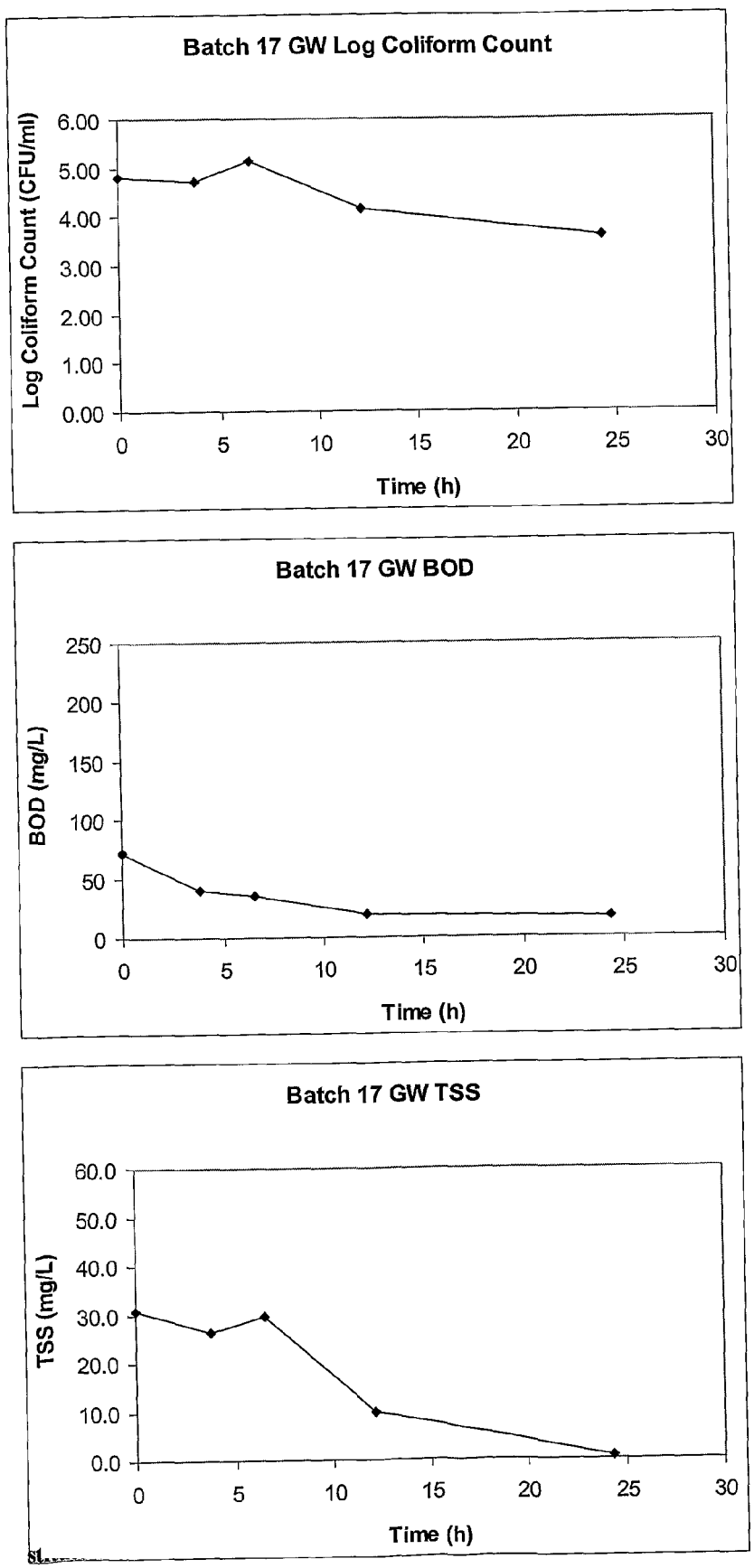
Figure 15E:
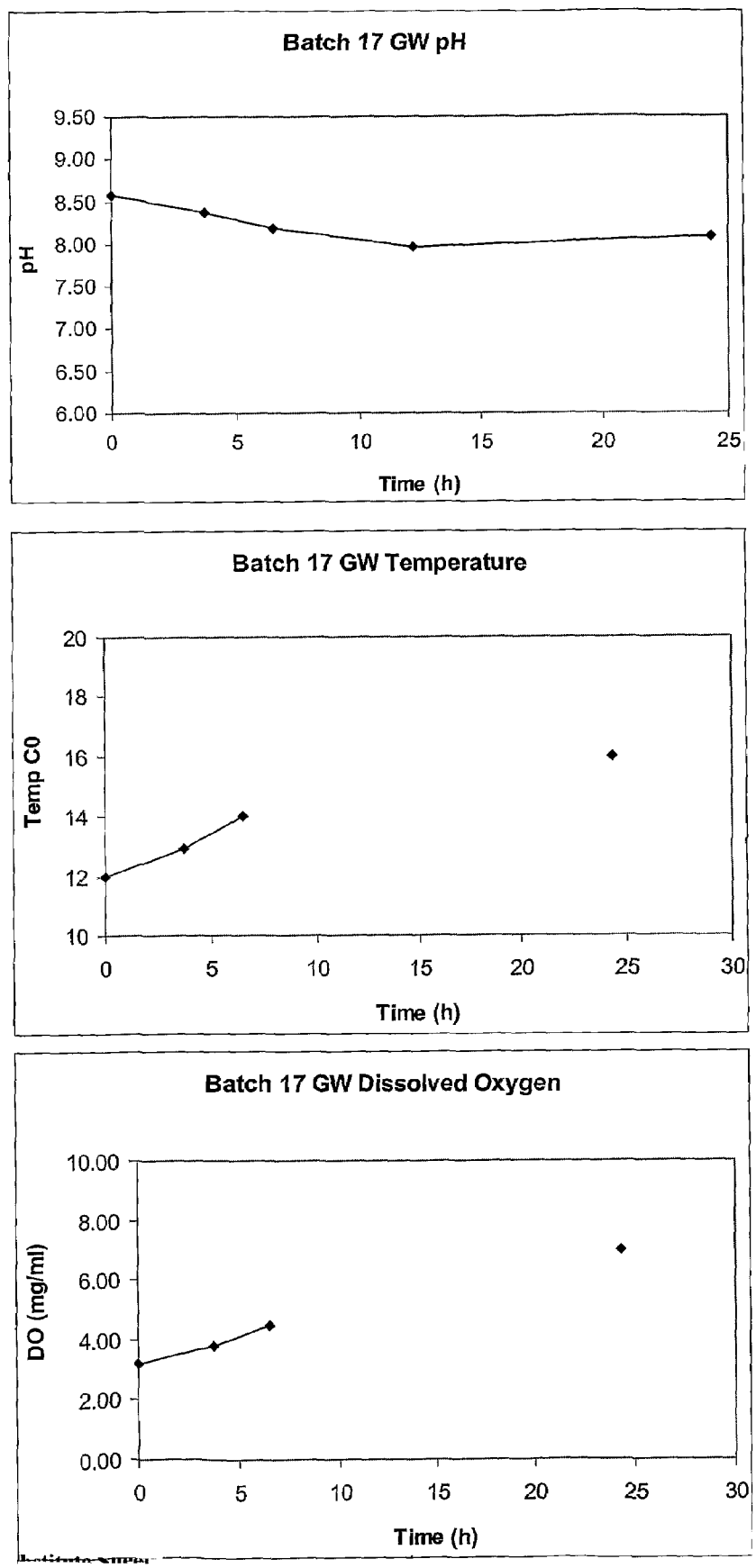
Figure 15F:
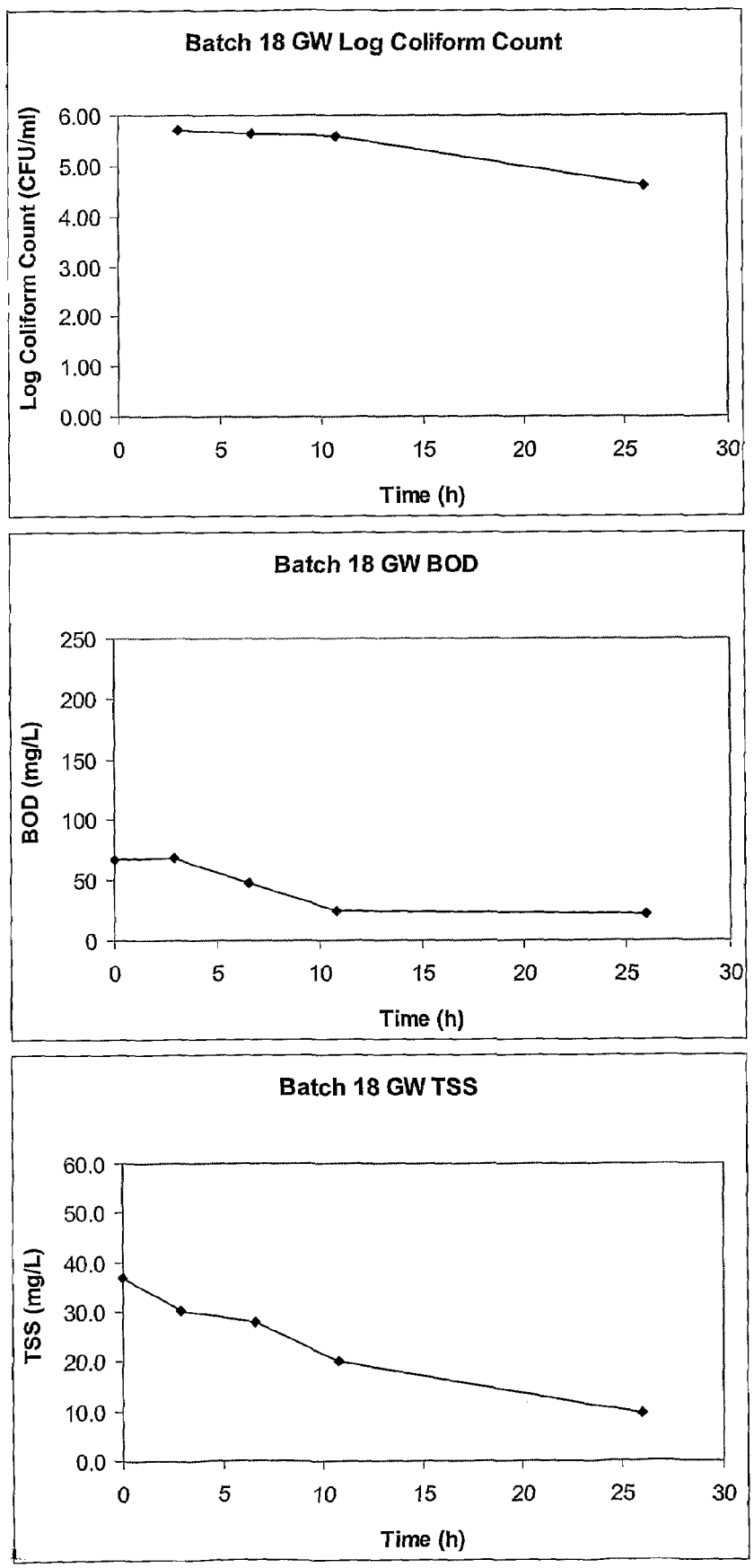
Figure 15F:
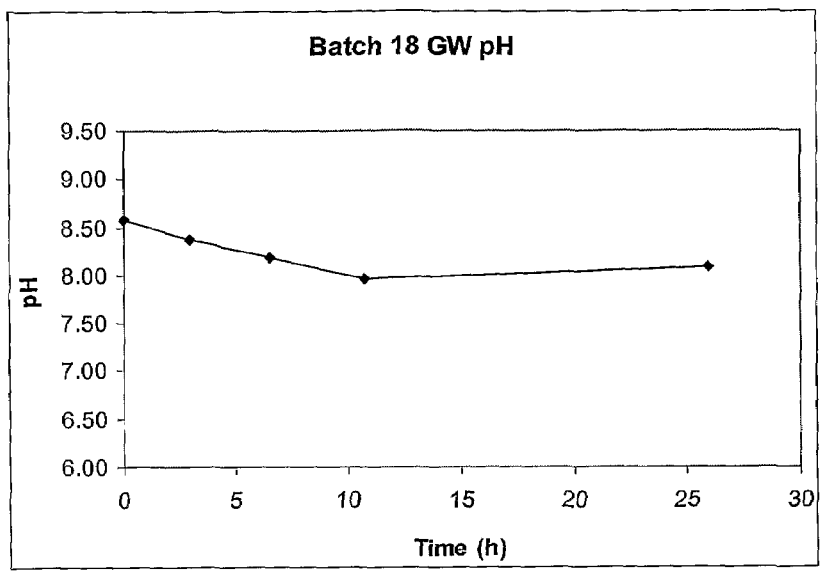
Figure 15F:
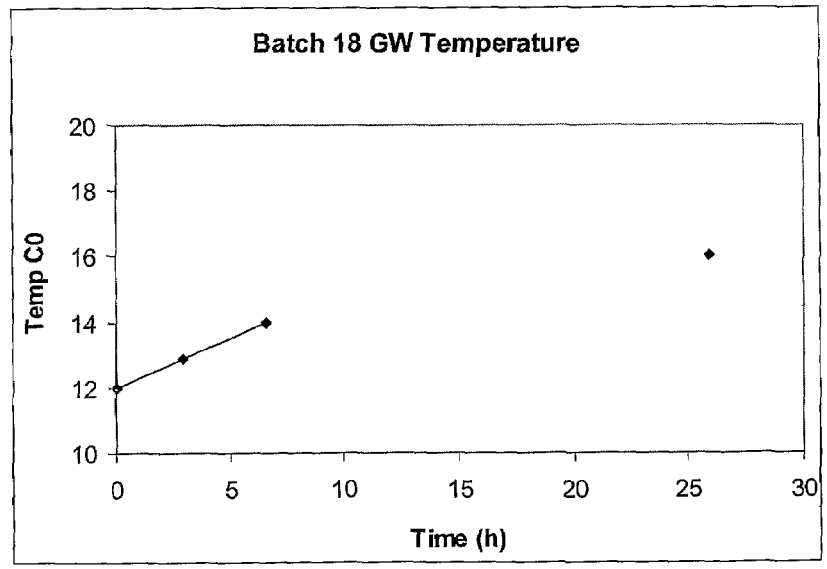
Figure 15F:
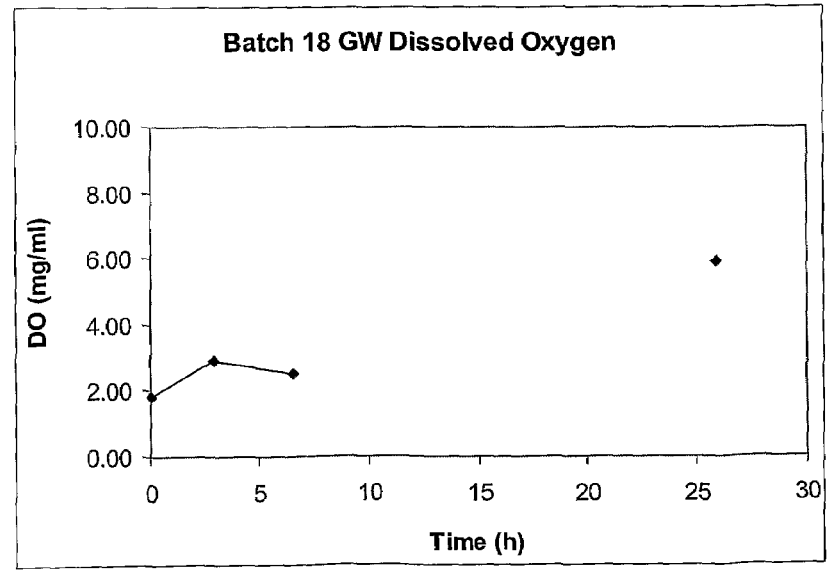
Figure 15G:
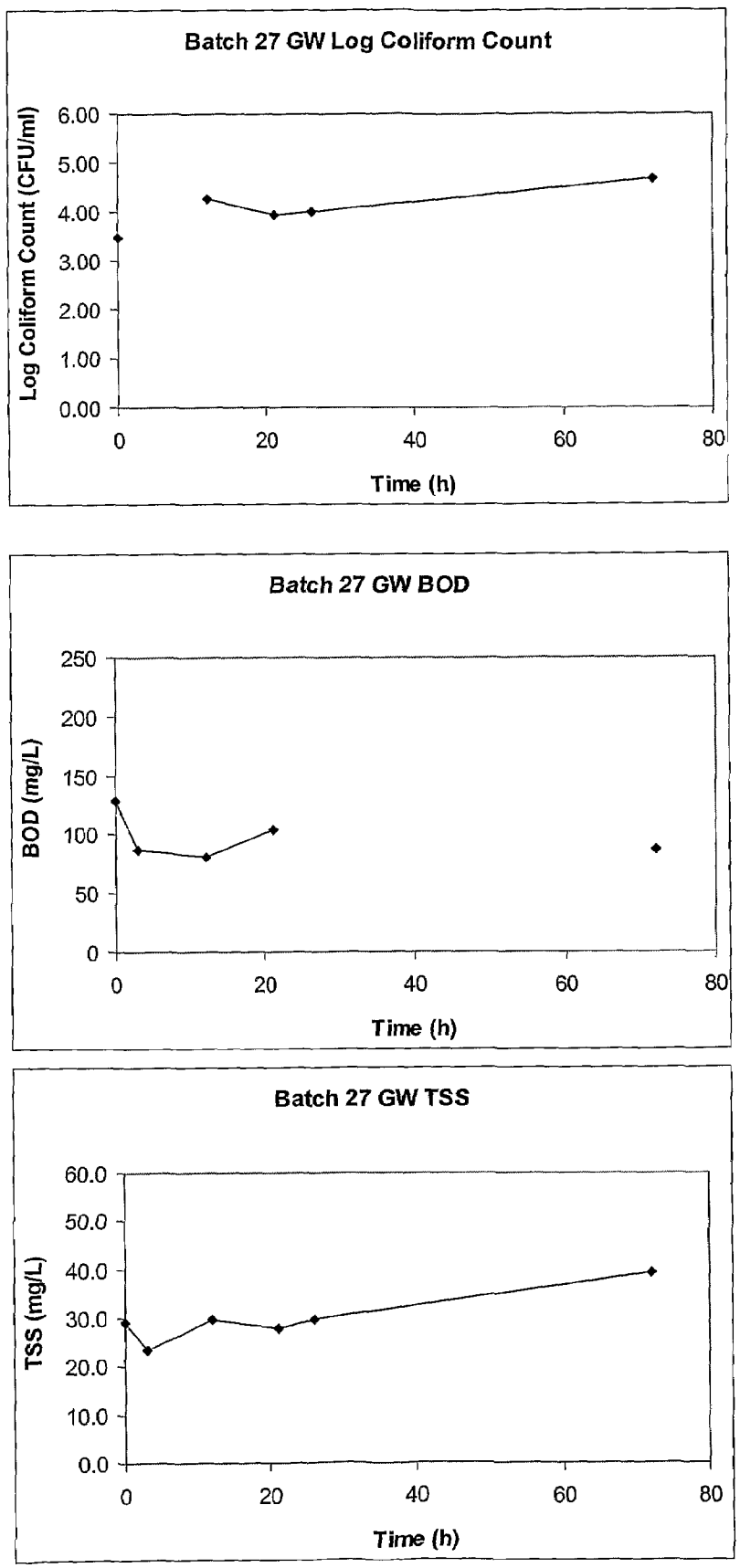
Figure 15G:
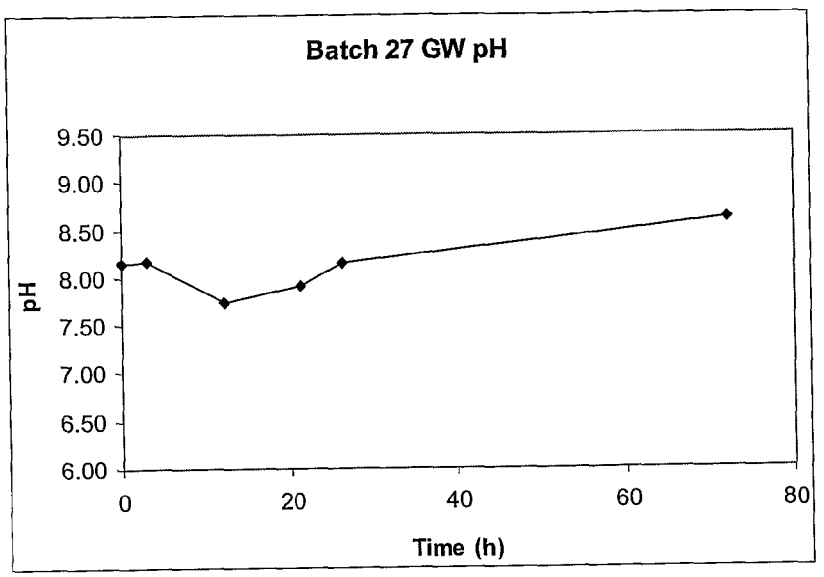
Figure 15G:
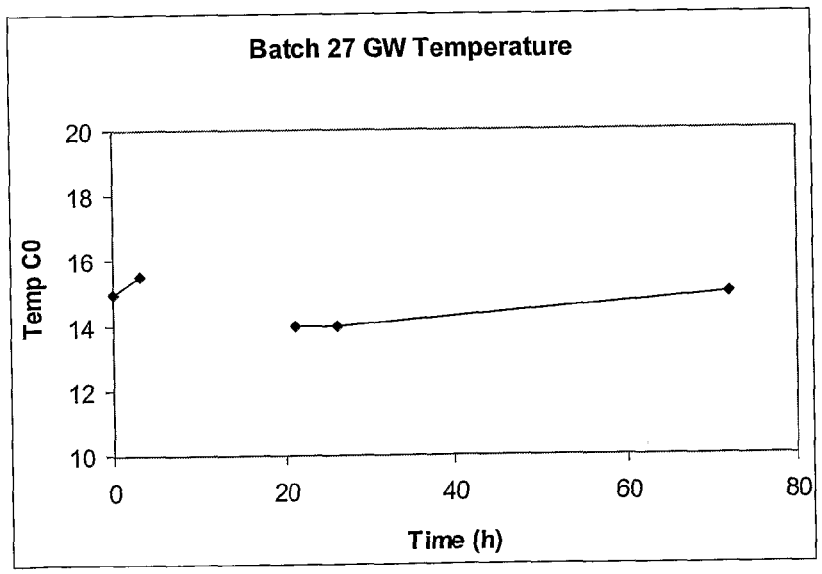
Figure 15G:
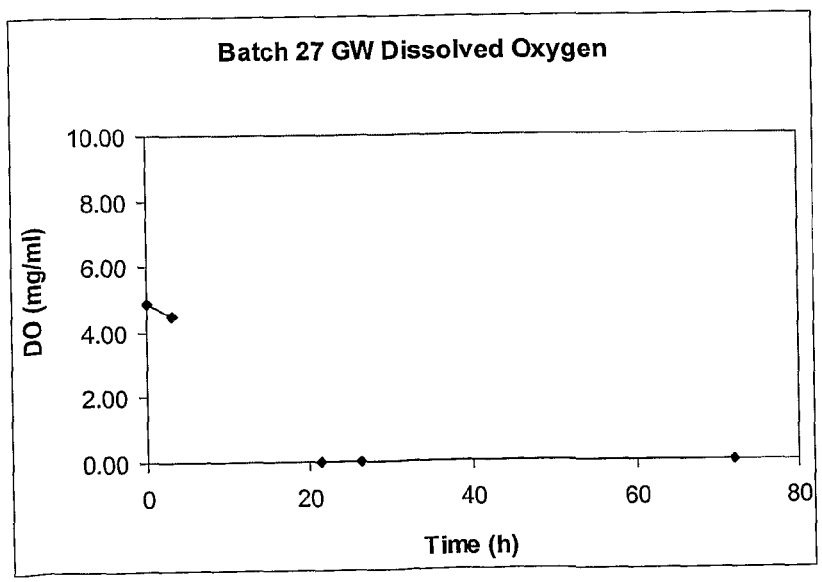

After another two months some of the gills had stuck together again, so a new type of air spacer was made from aluminium sheet with square perforations. The spacers were 14 mm wide and had 8 mm square holes. The air spacers were deployed every 300 mm down the gills (FIG. 13). The air spacers were very successful. A further view of the bioreactor used in this Example, without the housing in place, is shown in FIG. 14.

Shower Water

Shower water was collected from the single shower at the inventor's home. The shower water was derived from two adults, two adolescents and one juvenile and was collected in a 600 L polypropylene Waterworm™ (a long plastic tubular water reservoir designed for storing rainwater is underneath a low house of deck) via a grey-water-diverter attached to the S-bend under the shower. Water was transferred to the laboratory daily for testing, and when testing was not conducted a 500 ml of shower-water simulant was fed daily to NMB V via a peristaltic pump with a timer. The shower-water simulant used consisted of: Fivestar™ shampoo (60 g); Fivestar™ conditioner (45 g); Edger Allan Grooming T$_M$ shaving cream (12 g); Denti Tex™ toothpaste (6.0 g); Fivestar™ lavender soap (10 g); and urea (2.0 g) made up to 1000 ml. The system used a 95 W AquaPro™ dirty water filterless pump theoretically capable of pumping 3420 L/h to a height of 1.5 m. Testing in the NMB demonstrated that only 1500 L/h were pumped through the system. Resistance in the pipes leading to the manifold was assigned as the cause of the reduction in flow.

Operation

NMB V had a 420 L linear Imhoff trap. After each batch a motor-driven scraping device that was used to move the sedimented solids near to the efflux pump located under the trap at one end. The pump was not very efficient at removing the solids, so after the residual liquid was pumped out about 20 L of water was added incrementally to wash the last of the sediment out of the trap, so that each successive batch started with approximately equal amounts of residual solids, which more accurately represented a more functional cylindrical clarification system with a conical base and an outlet at the bottom (the preferred embodiment).

Various volumes of shower water were tested. The family produced 200-250 L/d of shower water, so storage in the Waterworm™ was used to facilitate a series of tests using 300 L/d. The pumping rate during different batches was varied (1500, 900, 600 and 230 L/h) using an inline tap mounted before the outlet manifold.

Testing

Samples were collected at various intervals, and an automatic sample collection system was used to collect samples during the night. Night samples were stored below 4° C. and were tested within 10 h of collection.

Total suspended solids, biochemical oxygen demand, coliform and thermotolerant coliform counts, ion chromatography for anions and ammonia, inductively-coupled plasma atomic emission spectroscopy and pH analysis were performed on the samples, and dissolved oxygen concentration and temperature were measured in the clarifier. The dissolved oxygen of the effluent from the membranes was also tested periodically to assess the amount of dissolved oxygen delivered to the liquid from a single passage through the gills. The dissolved oxygen concentration and temperature in the clarifier could not be measured when samples were collected at night by the automatic sampler.

Results

The results are shown graphically in FIG. 15.

Batch 1

Without an established biomass, the NMB V cleared the water in the 24 h of the incubation better than expected (FIG. 15-a). The log coliform count fell from 3.08 to 2.00, the BOD fell from 92 to 11 mg/L, the total suspended solids fell from 37.8 to 6.0 mg/L. This is ascribed to the rapid delivery of dissolved oxygen to the liquid, as the DO concentration rose from 0 to 8.8 mg/L in 3.25 hours.

Batch 3

Although only two samples were analysed, the NMB V treated the shower water slightly quicker in the third batch (FIG. 15-b). The log coliform count fell from 2.70 to 1.70, the BOD fell from 209 to 5.6 mg/L and the total suspended solids fell from 40.4 to 2.4 mg/L.

Batch 15

This batch had the same pumping rate as in all the previous batches (1500 L/h) (FIG. 15-c). The log coliform count fell from 5.58 to 2.91, the BOD fell from 104 to 6.1 mg/L and the total suspended solids fell from 53.6 to 3.0 mg/L.

Batch 16

The pumping rate during batch 16 was reduced to 916 l/h (FIG. 15-d). The log coliform count fell from 4.75 to 3.95, the BOD fell from 68 to 19 mg/L and the total suspended solids fell from 35.5 to 14 mg/L.

Batch 17

The pumping rate during batch 17 was reduced to 593 L/h (FIG. 15-e). The log coliform count fell from 4.81 to 3.60, the BOD fell from 72 to 16.6 mg/L and the total suspended solids fell from 30.8 to 0.5 mg/L.

Batch 18

The pumping rate during batch 18 was reduced to 231 l/h (FIG. 15-f). The log coliform count fell from 5.69 to 4.61, the BOD fell from 67.3 to 21.5 mg/L and the total suspended solids fell from 36.8 to 9.6 mg/L.

Batch 27

The pumping rate during batch 27 was reduced to 0 L/h (FIG. 15-g). The shower water had been stored for longer than usual, so it had different initial characteristics to normal. The log coliform count rose from 3.46 to 4.68, the BOD fell from 128.3 to 86.9 mg/L and the total suspended solids rose from 29.2 to 39.2 mg/L. Coliforms and suspended solid solids rose, while the BOD fell slightly. It appears that dissolved nutrients fed the growth of suspended cells, and little of the nutrients were removed from the water over the 72-hour incubation. This demonstrates that the pumping of the liquid through the NMB gills had a significant effect on the nutrients, solids and suspended cells in the liquid.

Discussion

The NMB performed better than expected in the initial batches. It appears that the membranes acted mainly as an oxygen delivery devise in the early batches when there was little or no biomass on the membranes. The dissolved oxygen appears to have fed the cells in the liquid enabling them to grow and, for flocculating cells, to coalesce the suspended cells so that they fell out of the liquid. The dissolved oxygen level in the liquid rose much more quickly in the early batches than it did in later ones with the same volume of liquid and the same pumping rate. As the biofilms on the membranes grew from successive batches, the performance improved and the rate of oxygen dissolution into the liquid reduced.

The water quality achieved in the resultant effluents was very good, especially when the BOD was reduced to less than 10 mg/L, because such effluents can be efficiently chlorinated to become Class A water, which can be stored without the quality reducing from regrowth of coliforms. Effluents with less than BOD 10 were achieved consistently with a pumping rate of 1500 L/h. Since the addition of air spacers, the optical quality and smell of the effluent has increased significantly. The addition of the air spaces has improved the effluent quality noticeably.

The effect of reducing the pumping rate reduced the efficiency of the NMB, as the rate of coliform removal and BOD and suspended solids reduction slowed. The dissolved oxygen concentrations did not rise as quickly either. The control rig with static liquid showed little reduction in BOD and increases in the coliform count and suspended solids. The dissolved oxygen concentration fell to 0.0 in less than 20 hours and the anoxic conditions appear to be responsible for the rises in coliforms and suspended solids seen here.

The NMB V was operated continuously for four months, without the membrane gills of modified inlet manifold fouling. Approximately 95% of the influent has been retrieved from the NMB operating as a sewer mine, because the extremely oxic conditions prevent formation of gas bubbles which, in conventional secondary sewage treatment systems, would float the settled biomass back up into the clarified stream. In these conventional systems, only 50% of the clarified stream would be retrieved.

Example 3

Macerated Domestic Blackwater

Macerated blackwater was treated in two types of nano-particulate membrane bioreactor (NMB) to assess the suitability of this technology for treating blackwater in a domestic wastewater recycling system. The small NMB (NMB III) had 0.6 m² of membranes and a 30 L reservoir and the larger NMB (NMB IV) had 33.6 m² of membranes and a 200 L reservoir and a 200 L clarifier. The following measurements were made on samples taken from the raw and treated blackwater: total suspended solids (TSS), biochemical oxygen demand (BOD), coliform and thermotolerant coliform counts, total dissolved solids, pH, ion chromatography for ammonium, nitrite, nitrate, sulfate, phosphate, chloride and fluoride ion, dissolved oxygen concentration, temperature and inductively-coupled-plasma atomic-emission spectroscopy for Ca, Mg, Mn, Na, K, Fe and other elements.

The raw blackwater was extremely rich, being 3-10 times richer than the primary supernatant from a typical sewage treatment plant, having TSS=149-546 mg/L, BOD=269-1024 mg/L, ammonium ion concentration=257-413 mg/L and coliform counts=$10^{4.7-6.0}$ cfu/ml. The NMB was efficient at reducing TSS and BOD. Ammonia oxidation was quite rapid compared with secondary treatment systems, but the extremely high ammonia loading was too much for both NMB III & NMB IV systems, which also appeared to be limited by pH changes and biomass ramp-up. The effluents produced in the small NMB III within 24 h had TSS=37 mg/L (88% reduction), BOD=124 mg/L (87% reduction), coliform count=$6.2 \times 10^4$ cfu/ml (86% reduction), $[NH_4^+]$=227 mg/L (18% reduction), and $[PO_4^{3-}]$=54 mg/L (56% reduction). The second NMB IV system appeared to be limited by the very slow pumping rate compared to the smaller NMB III system and produced effluents that had TSS=83-107 mg/L (31-83% reduction), BOD=98-251 mg/L (55-82% reduction), coliform counts=$10^{4.6-7.6}$ cfu/ml, $[NH_4^+]$=225-355 mg/L (0-15% reduction), and $[PO_4^{3-}]$=49-82 mg/L (29% reduction to 12% increase).

The membrane productivity was defined as the total amount of a parameter removed or made divided by the membrane area and time (eg. mg/m²/h). NMB III had a much higher hydraulic flow rate to hydraulic volume ratio than did NMB IV, and it outperformed NMB IV in every parameter of sewage treatment in respect of membrane productivity. The membrane flow factor was defined as the membrane productivity rate divided by the hydraulic flow rate (mg/m²/L). This parameter accounted for the differences in hydraulic flow, and both bioreactors performed similarly in this respect. This demonstrated that the efficiency of the NMB technology is dependent on the hydraulic flow rate and the membrane area.

The results of this study show that the supplied macerated blackwater was too rich for the NMB to be able to remove sufficient nutrients and contaminants (especially ammonia) within 24 h to enable the wastewater to be recycled. Accumulation of solids in the linear Imhoff tanks used to clarify the NMB effluent appears to have fed the clarified stream by diffusion of biodegradation products. Removal of solids from the clarifier and increased pumping rates in the larger (33.6 m²) NMB system were identified as potential ways to improve the system. The resultant effluents smelt like pond water due to the very active aerobic biomass on the membranes. It was concluded that in its current form the NMB was more suitable for treatment of more dilute wastewaters such as primary supernatants and grey water.

Methods and Materials

The Nano-Particulate Membrane Bioreactor (NMB)

Two NMB rigs were used in this experiment. The first called NMB-III consisted of five pairs of membranes each 160 mm high×360 mm wide attached together underneath an inlet manifold and above an outlet manifold (FIGS. 4 and 16). NMB-III had a total of 0.6 m² of membranes, composed of polyester/cotton fabric doped with colloidal silica solution (Bindzil™ EKA Chemicals Pty. Ltd.). The set of five gills were housed in a 55 L polyethylene storage box, with a reflux system to drain any leaked liquids back into the inlet stream. The outlet manifold was connected to a 30 L reservoir via 7.6 mm (ID) PharMed™ hose that went through a manifold into four peristaltic pump heads and another manifold to converge the hoses to a single line that fed into the top of the reservoir. A hose drained the pressurized reservoir into the inlet manifold to complete the system. The pump was operated on level 10, which pumped 1.26 L/min.

Figure 17:
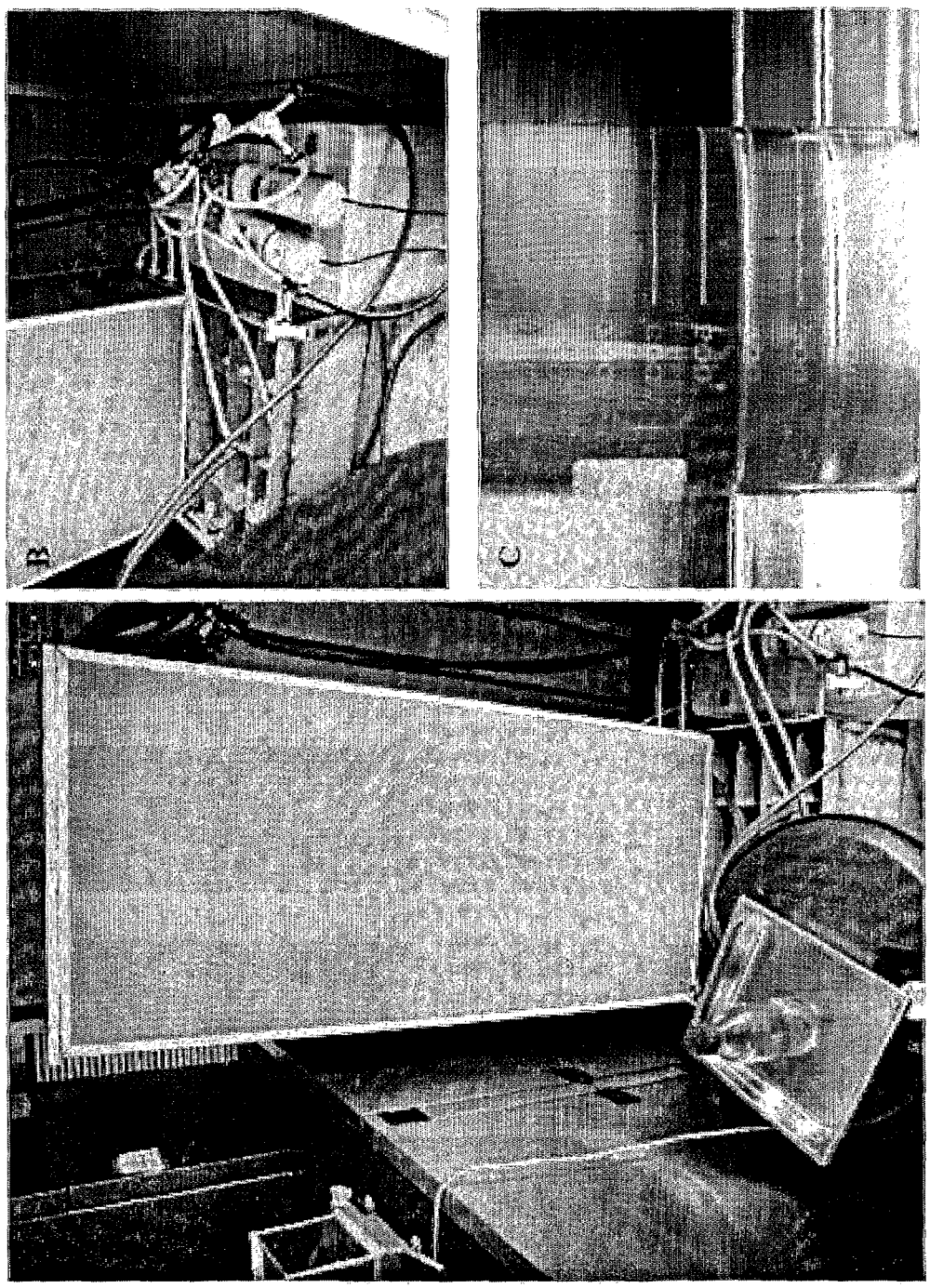
FIG. 17 shows photographs of bioreactor NMB IV used in Example 3: A) the housing located on top of a 200 L clarifier and attached to a 200 L reservoir (barrel bottom left), B) 200 W peristaltic pumps for pumping liquids, C) effluent from the equipment, shown here in a 100 ml Schott bottle.

The second NMB rig was called NMB-IV. It consisted of a membrane chamber 1600 mm high×705 mm wide×350 mm deep, sitting on top of an eight-chambered modified Imhoff tank 400 mm high×760 mm wide and 760 mm deep, with a capacity of 200 L (FIG. 17). The membrane chamber had 16 sets of gills 1500 mm high and 700 mm wide, giving a total area of 33.6 m². Four inlet manifolds sat above the gills. A 200 L polypropylene barrel was used as a reservoir for the system. Sewage was pumped from the reservoir via a single peristaltic pump chamber into the first set of four gills. It trickled down between the four pairs of membranes and fell out the bottom onto a lid on top of the first of the modified (flat bottom) Imhoff tanks and ran to one end and spilled into the tank. The liquid traveled along chamber one to an outlet that was connected to the second chamber of the peristaltic pump, and the process repeated for the next three sets of four gills, before passing into the last four chambers, which were connected in series. The outlet from chamber eight was connected to a peristaltic pump head, and the outlet either returned the sewage to the reservoir or expelled the treated effluent into the sewage pit behind the hut housing the NMB-IV.

Blackwater

Macerated and partially treated blackwater from a prototype domestic sewage-treatment system was tested in bioreactors NMB III and NMB IV.

Analyses

Total suspended solids (TSS) was analysed by filtration of 200-500 ml samples through pre-weighed 47 mm diameter glass fibre filter discs with a breakthrough limit of 0.8 μm (Sartorius Australia PL). The filter discs were dried in an oven at 110° C. for 24 h and weighed again.

100 ml of the filtrate from the TSS analysis was dried in the same way in pre-weighed 100 ml beakers (Duran PL), to determine the total dissolved solids (TDS) content.

Coliform and thermotolerant coliform counts were performed by serial dilution of samples plated onto Endo Agar (Oxoid PL) containing 4.0 ml/L of 10% neutral fuschin in 95% vol/vol ethanol and CHROMagar (Oxoid PL), incubated at 37° C. and 41° C., respectively. Thermotolerant coliform counts included: *E. coli* counts; and *Klebsiella, Enterobacter* and *Citrobacter* (KEC) counts.

Biochemical oxygen demand (BOD) analysis was performed by adding aliquots of the sample to deionized water in sealed 5.6 L plastic bottles. The dissolved oxygen consumption was determined by measuring the dissolved oxygen content before and after incubation in the dark at 20° C. for four days.

Dissolved oxygen content was determined using a Hanna HI9142 Dissolved Oxygen Probe (Livingstone Laboratory Supplies PL). The dissolved oxygen content of the blackwater in the reservoir and in the clarified streams of chambers 4 and 8 of the Imhoff tanks were measured and reported where appropriate.

The pH of samples was determined using a Cole Parmer Fermentation pH Electrode with a Jenco Electronics 6309 PDT microprocessor (Extech Equipment PL).

Inductively-coupled-plasma atomic-emission spectroscopy (ICPAES) was performed by the Institute for Environmental Research (IER) ANSTO, using a Varian Vista Pro calibrated with a minimum of nine standards for each of the elements analysed. Samples were digested in 0.6 ml of 30% hydrogen peroxide solution prior to analysis.

Ion chromatography (IC) was also performed by IER using a modular DIONEX system calibrated with ten standards for each of the anions & cations analysed. Samples were centrifuged at 3000 rpm for 100 minutes in an Ependorf bench centrifuge and the supernatant was filtered through 0.2 μm reconstituted cellulose 25 mm syringe filters (Sartorius Australia PL).

Blackwater Treatment Trial 1

10 L of partially treated sewage from tank-2 of a prototype blackwater digester was treated in NMB III with a pumping rate of 1260 ml/min. Samples (500 ml) were collected and allowed to settle for 60 minutes to simulate clarification before being decanted and analysed. The temperature of incubation was 20±0.5° C. throughout the trial. The trial ran for 24 hours.

Blackwater Treatment Trial 2

150 L of macerated blackwater mixed with 50 L of residual liquid in the Imhoff tanks left over from hydraulics testing, so the total volume of liquid treated in trial 2 was 200 L. The liquids were allowed to mix for 10 minutes before the $T_0$ sample was taken. The system pumped the sewage through the system at a rate of 315 ml/min as a closed-loop (batch system). On average the 200 L of blackwater passed through the system 2.27 times every 24 h. Samples were not allowed to settle before testing, as the system had a clarifier. This sampling procedure and pumping rate were used in trials 3 and 4 also (following). Trial 2 ran for 72 hours.

After Trial 2 the NMB was fed intermittently for 21 days on supernatant from ANSTO Pit 008, spiked daily with 30.0 g each of ammonium chloride, urea, peptone, meat extract and sodium thiosulfate and 10.0 g of potassium di-hydrogen phosphate to emulate the nutrient rich blackwater, in an attempt to grow a suitable biomass on the NMB membranes before the next trial.

The temperature of incubation for trials 2-4 was variable due to the hut storing the NMB IV being open via a large screen to the atmosphere. The temperature fluctuated between 20° C. and 25° C. throughout trials 2-4.

Blackwater Treatment Trial 3

200 L of macerated blackwater were added to the NMB IV, which still contained 120 L of treated sewage from Pit 008, so the total volume of liquid treated in trial 3 was 320 L. Samples of the blackwater and the residual liquid were taken and they were averaged to calculate the To values. Trial 3 ran for 72 hours.

Following completion of Trial 3 the NMB was fed for another 14 days as described above in trial 2 to further ramp up the biomass on the membranes.

Blackwater Treatment Trial 4

The NMB clarifier was emptied before the fourth trial to remove all of the residual sludge, which appeared to have influenced results in trials 2 and 3 (see Results following).

The biomass that had accumulated on the membranes was not touched. 200 L of macerated blackwater were added to the NMB IV on three consecutive days. At the end of each batch 200 L of effluent was pumped from the system. A total of 600 L of macerated blackwater was treated over a 96 hour long period.

Results

Blackwater Treatment Trial 1

Figure 18:
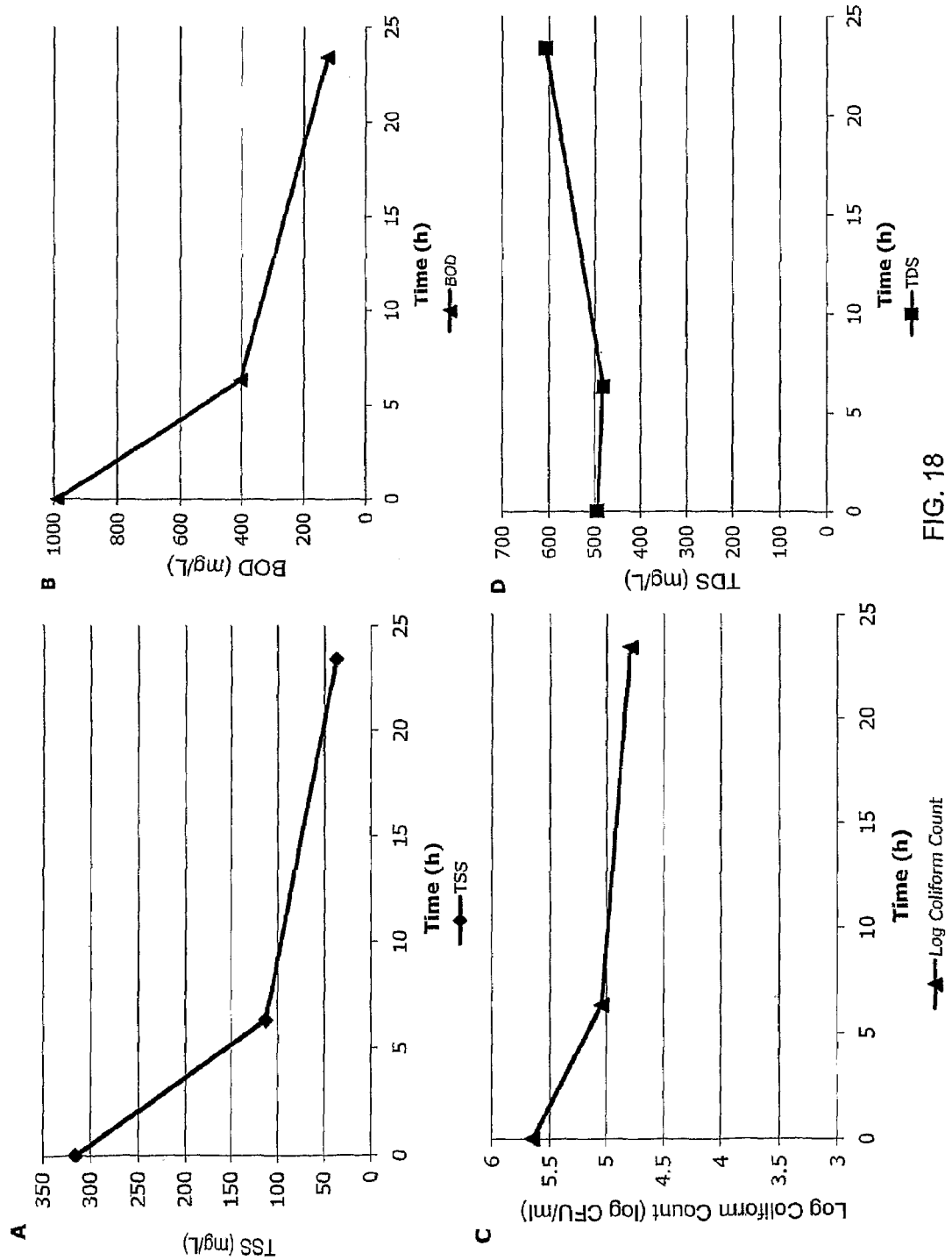
FIG. 18 shows graphs against time for blackwater treated in NMB III Example 3 trial 1: A) total suspended solids (TSS), B) biochemical oxygen demand (BOD), C) log coliform count, and D) total dissolved solids (TDS)

The NMB III had a ramped up biomass that had been starved for about a week prior to the trial. The biomass had ramped up during the trial of primary supernatant from a municipal sewage treatment plant (STP). The TSS (total suspended solids) in the blackwater fell from 316 to 37 mg/L in 24 hours in the NMB III (88% reduction) (FIG. 18A). The BOD fell from 990 to 124 mg/L (87%), the coliform count fell from $10^{5.7}$ to $10^{4.8}$ (86%) and the TDS rose from 493 to 607 (23%) concurrently (FIG. 18B-D). The blackwater was much richer than the primary supernatant from the sewage treatment plant, which usually had TSS, BOD, coliform counts and TDS (total dissolved solids) in the ranges of 100-150 mg/L, 80-350 mg/L, $10^{5.5-6.0}$ cfu/ml and 400-650 mg/L, respectively.

Figure 19:
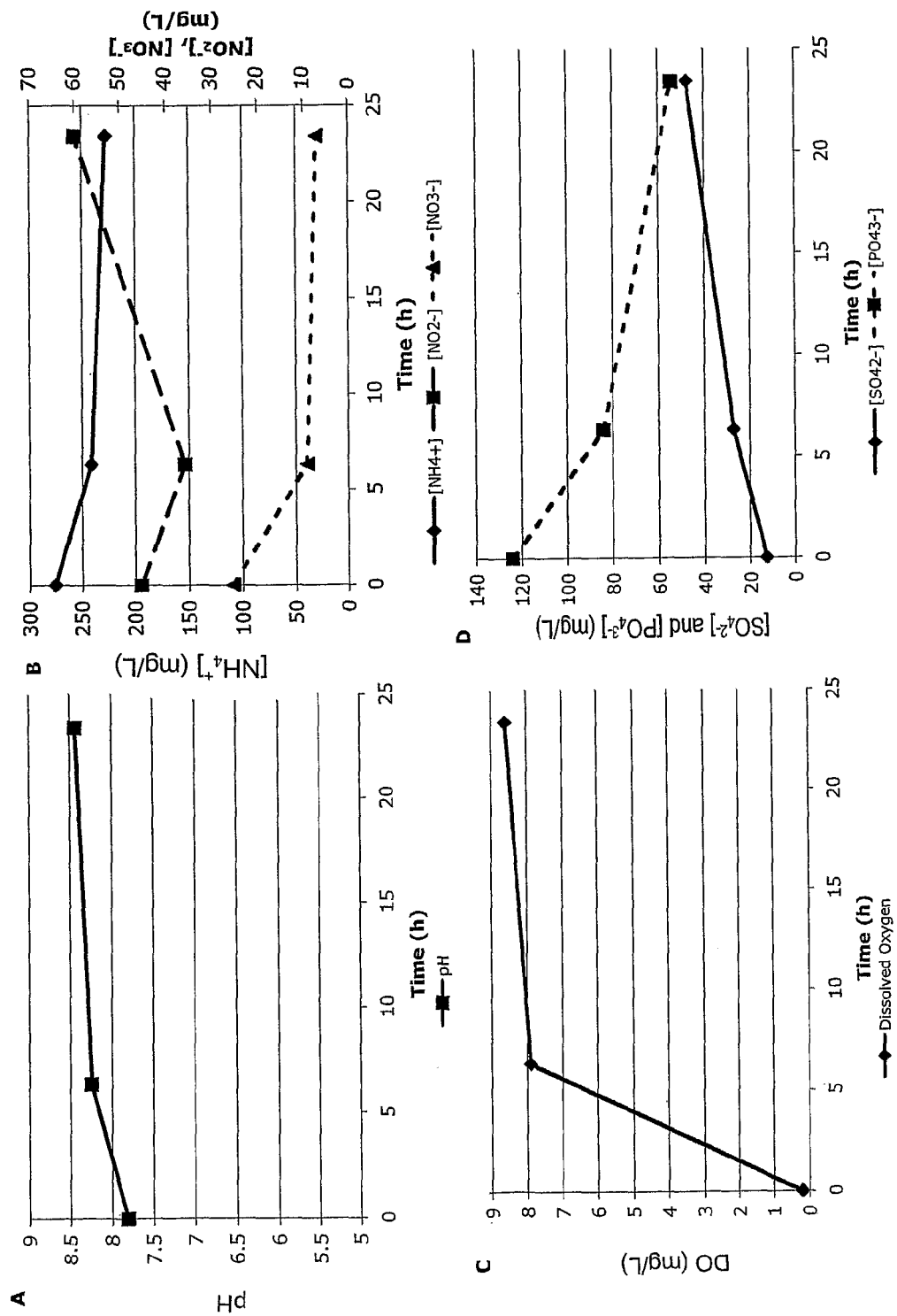
FIG. 19 shows graphs against time for blackwater treated in NMB III Example 3 trial 1: A) pH, B) ammonium, nitrite and nitrate ion concentrations, C) dissolved oxygen, D) sulfate and phosphate ion concentrations.

The pH rose from 7.80 to 8.24 in the first 6.3 h, where it reached a plateau (FIG. 19A). Concurrently, the $[NH_4^+]$ fell sharply from 276 to 241 mg/L (5.6 mg/L·h) in the first 6.3 h, but then fell by only 14 mg/L in the next 17.7 h (0.8 mg/L·h) (FIG. 19B). The $[NO_2^-]$ (45.4 mg/L) in the blackwater at $T_0$ is unable to be explained by microbiological principals considering the present system was reported to be anoxic. The nitrite concentration fell to 35.7 before rising to 59.9 mg/L after the 24-hour incubation. The $[NO_3^-]$ also commenced at 25.5 mg/L instead of the expected 0.0 mg/L that would be expected from an anoxic system. It fell to 6.3 mg/L over the incubation, indicating that denitrification was active in the NMB III system. This seems unlikely, as the dissolved oxygen concentration was too high throughout the treatment for anaerobic respiration of nitrite to occur (FIG. 19C), so it is likely that there was an error in the ion chromatography analysis. The $[SO_4^{2-}]$ rose from 12.6 to 47.2 mg/L during the treatment, consistent with the high availability of dissolved oxygen in the system (FIG. 19D). The $[PO_4^{3-}]$ fell from 124 to 54 mg/L during the incubation period, a loss of 56% (FIG. 19D).

Figure 20:
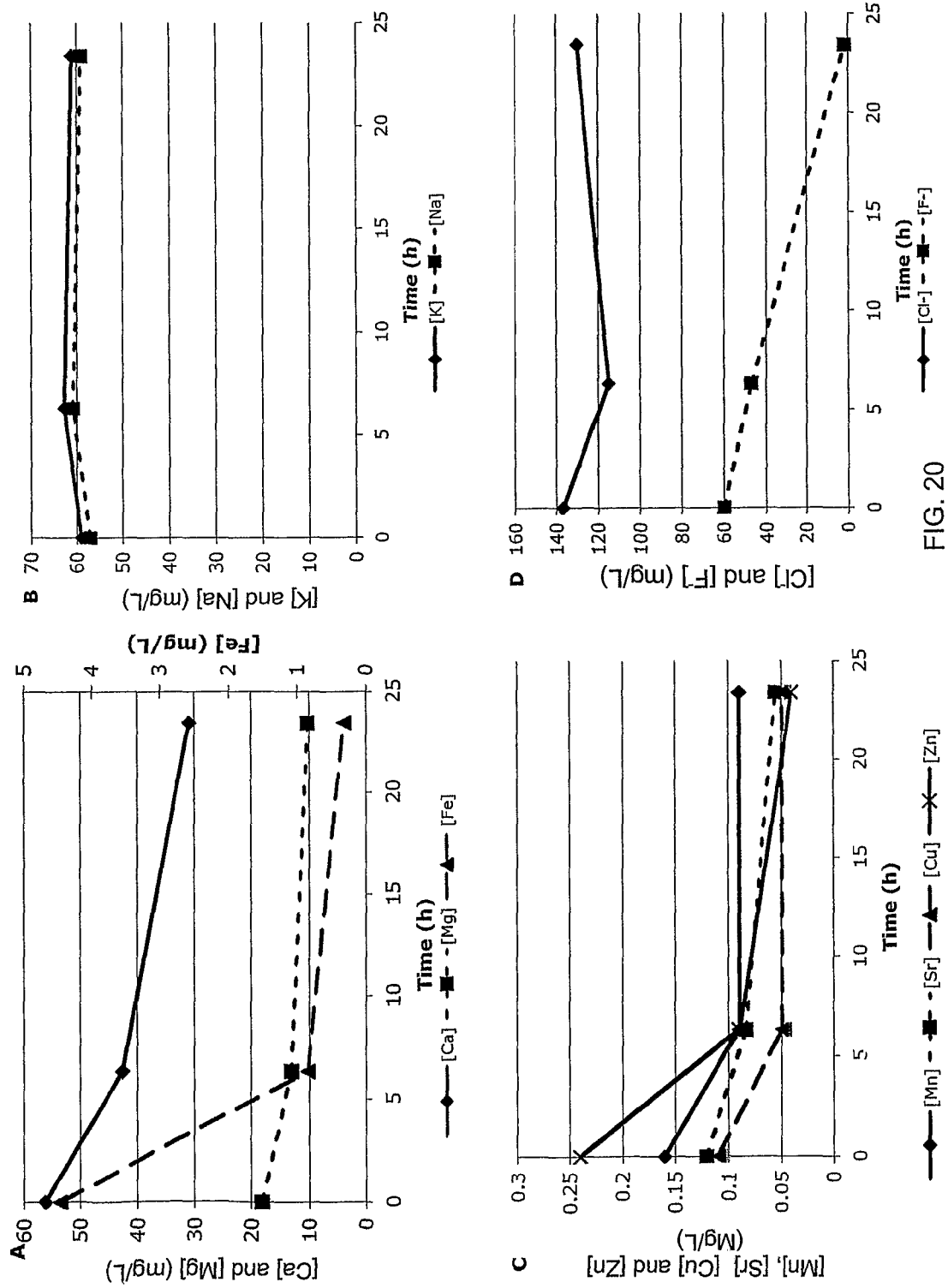
FIG. 20 shows graphs against time for blackwater treated in NMB III Example 3 trial 1: A) Ca, Mg and Fe concentrations, B) K and Na concentrations, C) Mn, Sr, Cu and Zn concentrations, D) chloride and fluoride ion concentrations.

Ca, Mg and Fe were actively removed from the system (FIG. 20A). [K] and [Na] rose marginally, possibly due to evaporation, or the release of these elements from the lysed and/or biodegraded matter (FIG. 20B). Mn, Sr, Cu and Zn were also actively removed from the system (FIG. 20C). The chloride ion concentrations fell (FIG. 6B), which indicates that biodegradation was the source of the increased [K] and [Na], as evaporation would have increased the [Cl$^-$] as well. The [F$^-$] was very high in the blackwater used in this experiment, being 60 mg/L (FIG. 20D). The highest [F$^-$] ever seen in the primary supernatant from sewage treatment plant was less than 2.0 mg/L. The source of the exceptionally high [F$^-$] may be toothpaste, or the tap water where the blackwater came from may be extremely rich in fluoride. The [F$^-$] in every fresh blackwater sample was extremely high (see following data).

Blackwater Treatment Trial 2

Figure 21:
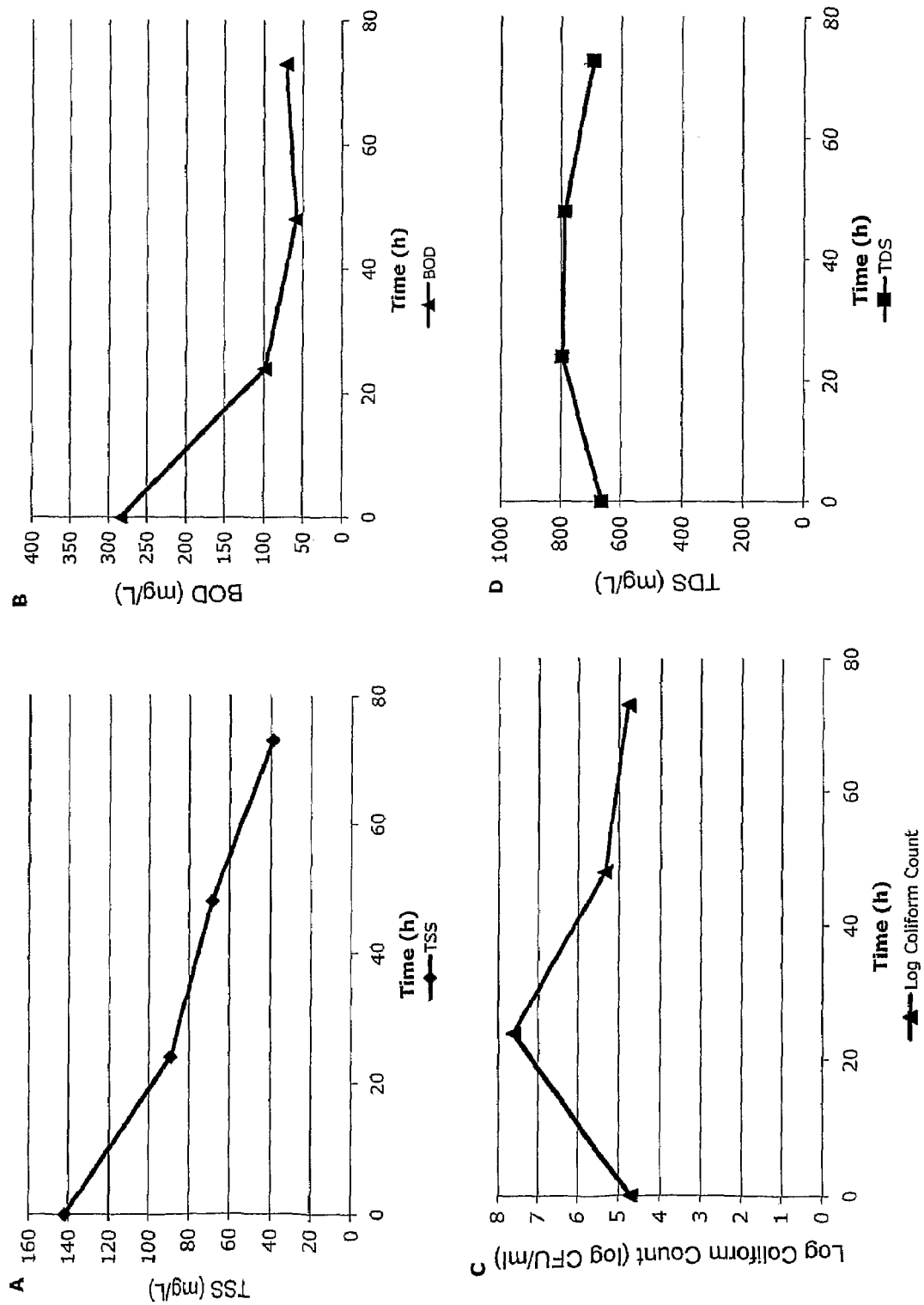
FIG. 21 shows graphs against time for blackwater treated in NMB IV Example 3 trial 2: A) total suspended solids (TSS), B) biochemical oxygen demand (BOD), C) log coliform count, and D) total dissolved solids (TDS)

The temperature ranged from 24-25° C. during trial 2 (data not reported). The falls in TSS and BOD were slower in trial 2, being 140 to 89 mg/L and 284 to 98 mg/L in the first 24 h, respectively (FIGS. 21A and B). These parameters continued to fall over the days following. The coliform count went up very significantly, from $10^{4.7}$ to $10^{7.6}$ cfu/ml in the first 24 h.

This rise appears to have been due to the presence of a large amount of stored sludge in the bottom of the Imhoff tanks, which was digesting anaerobically throughout the trial. The digestion would have released copious quantities of organic monomers to feed cells in the clarified stream, which explains the poor results for TSS and BOD removal. TDS rose and fell over the incubation (FIG. 21D).

Figure 22:
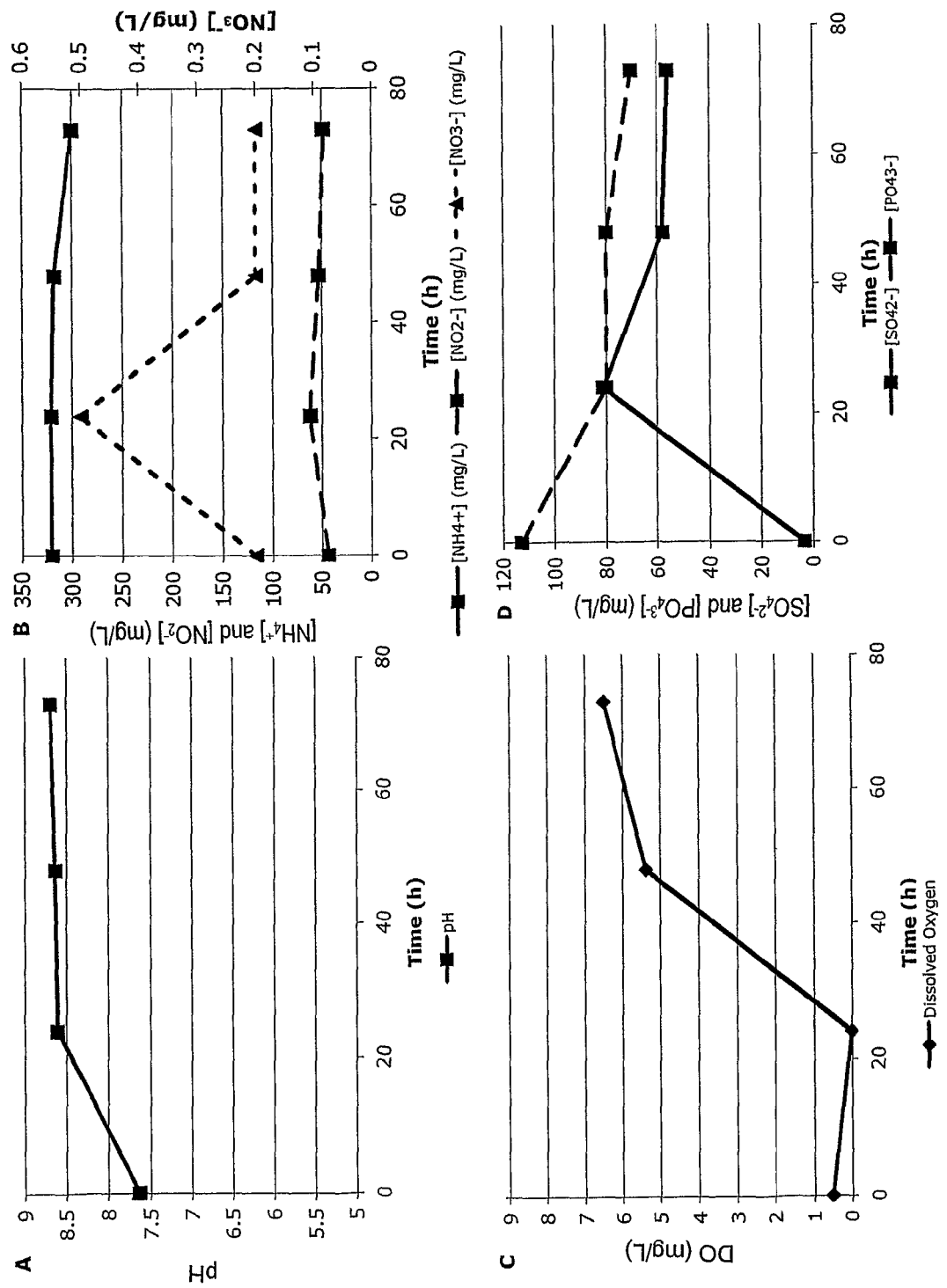
FIG. 22 shows graphs against time for blackwater treated in NMB IV Example 3 trial 2: A) pH, B) ammonium, nitrite and nitrate ion concentrations, C) dissolved oxygen, D) sulfate and phosphate ion concentrations.

The pH rose from 7.6 to 8.6 in the first day, and remained at this level for the next two days of the incubation (FIG. 22A). The [$NH_4^+$] remained static for the first 48 h before falling slowly over the last 24 h (FIG. 22B). The initial [$NO_2$] in the fresh blackwater was inconsistent with the blackwater being anoxic, being 44 mg/L (FIG. 22B). The [$NO_2^-$] rose slightly in the first 24 h to 81.3 mg/L and fell back to 48.5 mg/L over the next two days. The nitrate levels were insignificant throughout the trial (FIG. 22B), demonstrating that denitrification was very active, presumably in the biomass and therefore presumably anoxic trap chambers of the Imhoff tanks. The dissolved oxygen levels were very low in Imhoff tank number 4 for the first 24 h, after which it rose to substantially oxic conditions for the remainder of the trial (FIG. 22C). The sulfate levels rose sharply to 81 mg/L in the first 24 h and fell over the next two days (FIG. 22D). The fall was likely due to sulfate reducing bacteria growing in the anoxic regions of the Imhoff tanks. The phosphate levels fell from 113 to 80 mg/L in the first 24 h and fell slowly to 70 mg/L over the next 49 h (FIG. 22D).

Figure 23:
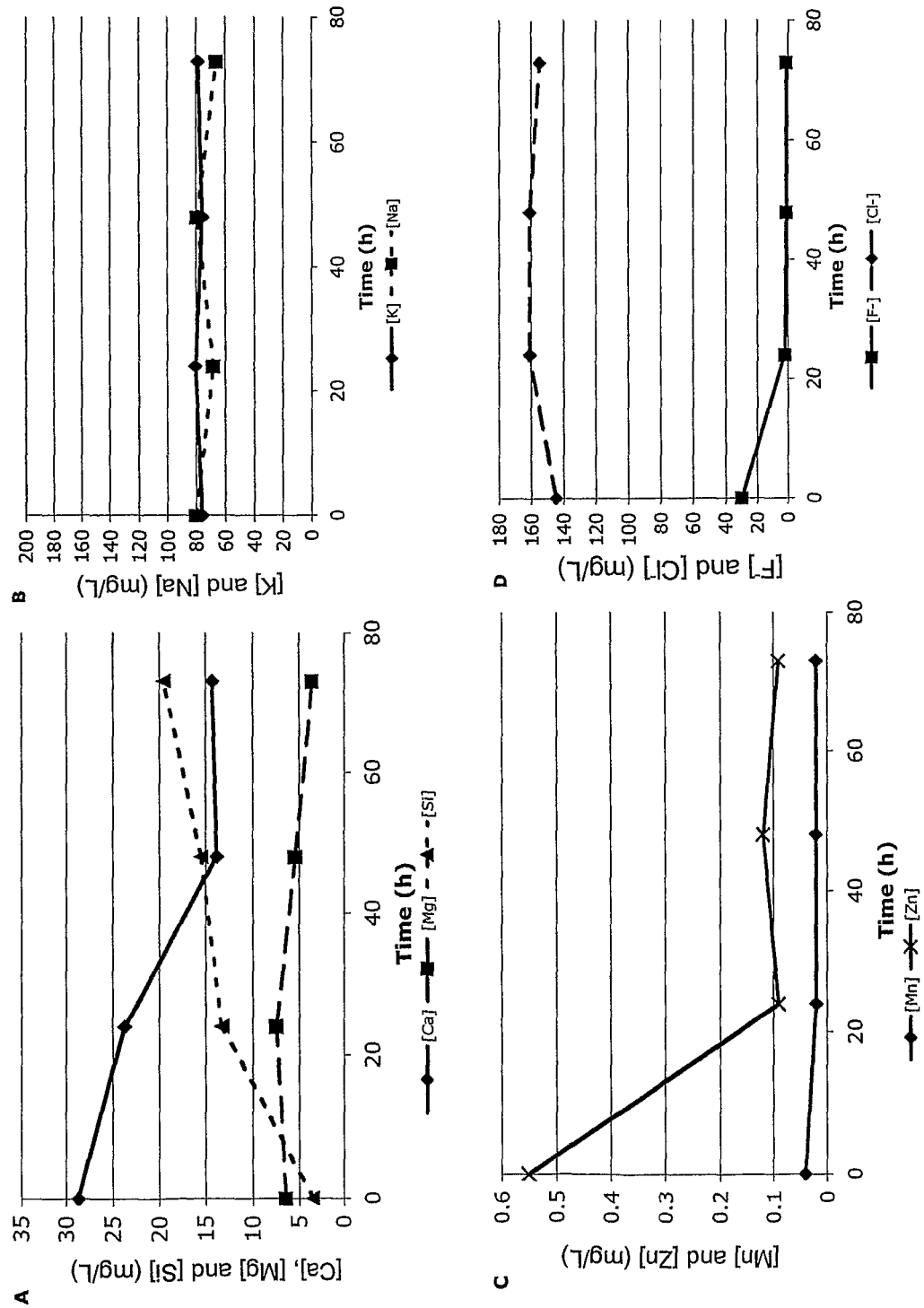
FIG. 23 shows graphs against time for blackwater treated in NMB IV Example 3 trial 2: A) Ca, Mg concentrations, B) K and Na concentrations, C) Mn, Cu and Zn concentrations, D) chloride and fluoride ion concentrations.

The [Ca] fell significantly in the first 24 h, the [Mg] fell slowly and the [Si] rose significantly over the three-day long incubation (FIG. 23A). The [K] and [Na] were static throughout batch 2 (FIG. 23B). The [Zn] fell early in the trial and reached a plateau, while [Mn] only fell slightly in the first 24 h (FIG. 23C). The [F—] fell in the first 24 h and remained level for the remainder of the trial and the [Cl—] was static throughout batch 2 (FIG. 23D).

Blackwater Treatment Trial 3

Figure 24:
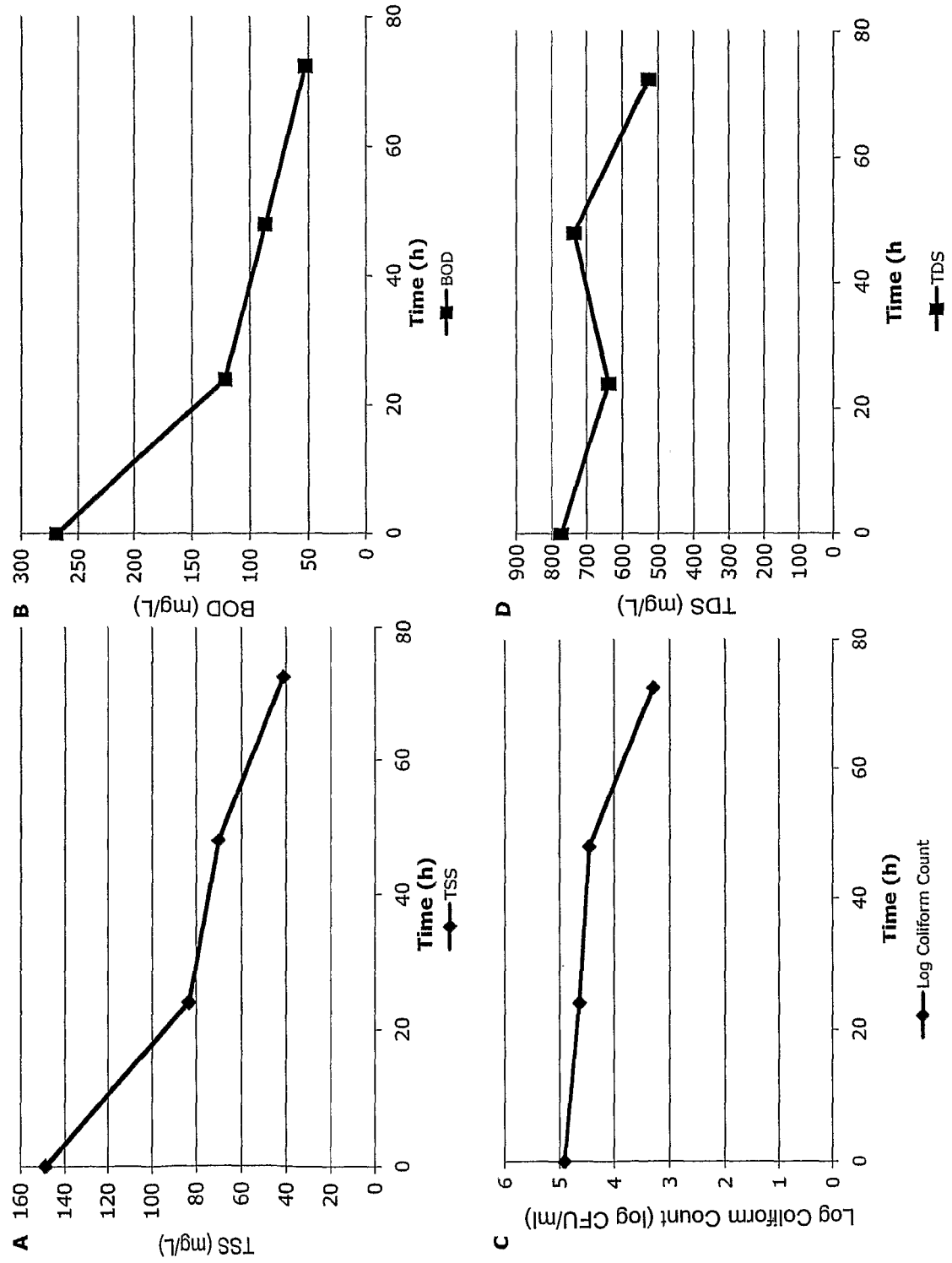
FIG. 24 shows graphs against time for blackwater treated in NMB IV Example 3 trial 3: A) total suspended solids (TSS), B) biochemical oxygen demand (BOD), C) log coliform count, and D) total is dissolved solids (TDS)

The TSS fell slowly from 149 to 83 mg/L in the first 24 h and then fell even slower for the next two days (FIG. 24A). The BOD also fell slowly from 269 to 121 mg/L in the first 24 h and slowed for the remaining 48 h (FIG. 24B). The coliform count fell very slowly in the first 48 h and was rapid in the last 24 h of the trial (FIG. 24C). The TDS fell from 774 to 526 mg/L over the three-day incubation period (FIG. 24D).

Figure 25:
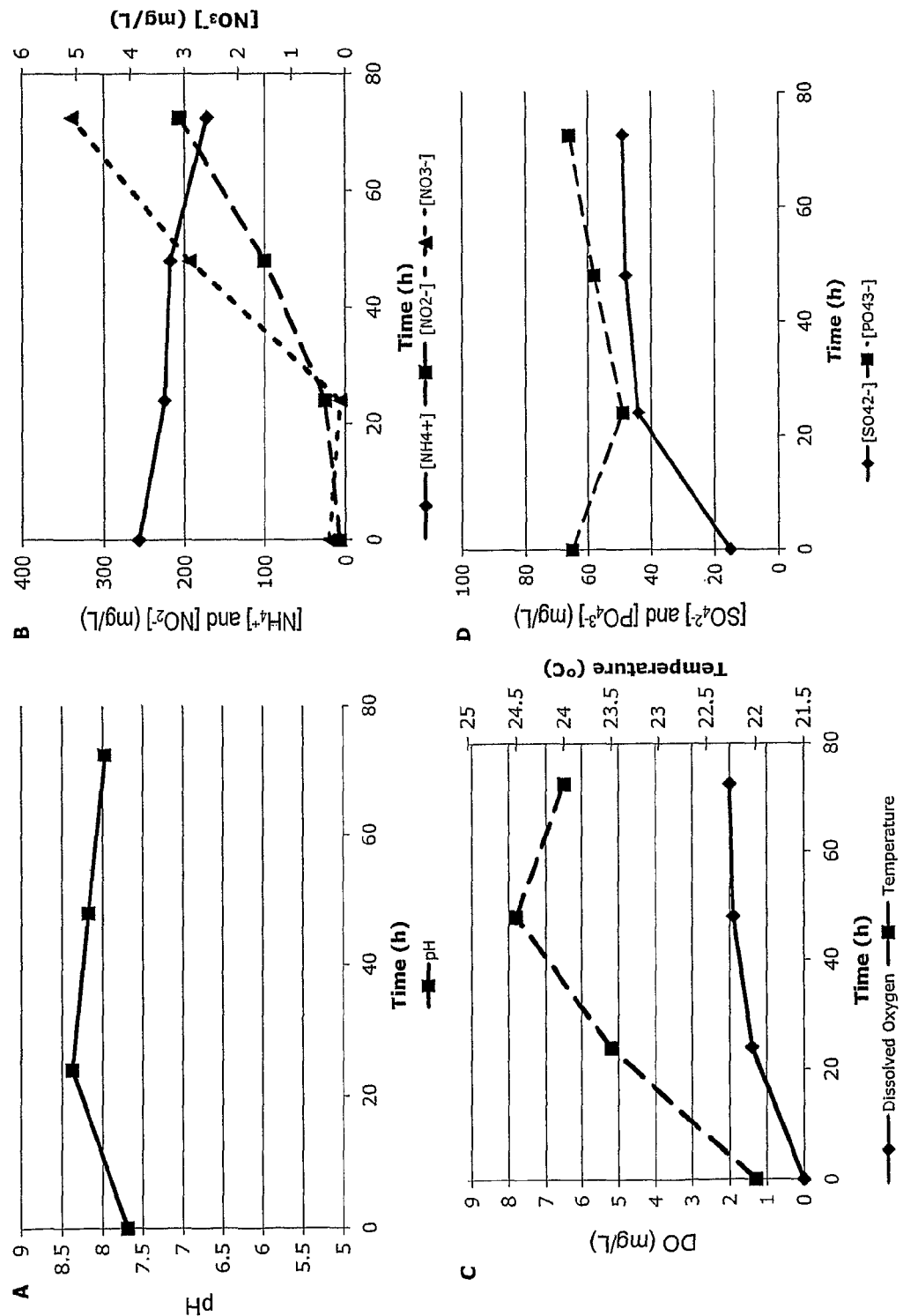
FIG. 25 shows graphs against time for blackwater treated in NMB IV Example 3 trial 3: A) pH, B) ammonium, nitrite and nitrate ion concentrations, C) dissolved oxygen, D) sulfate and phosphate ion concentrations.

The pH rose from 7.7 to 8.4 in the first 24 h and slowly fell to 8.0 over the next two days (FIG. 25A). The plots for [$NH_4^+$], [$NO_2^-$] and [$NO_3^-$] showed that ammonia oxidation and denitrification were active in the system (FIG. 25B). The [$NH_4^+$] fell, levelled out and fell again, with 45 mg/L of ammonium ions oxidised during the third day. This indicated that the ammonia oxidising bacterial populations ramped up during the trial. Nitrification and denitrification were active on the first day, as the loss of 24.9 mg/L of nitrogen as ammonium ions made only 5.4 mg/L of nitrogen as nitrite ions, so the rest of the nitrogen (19.5 mg/L) must have been nitrified and denitrified almost completely, as there was only 0.1 mg/L of nitrate ions after 24 h. during the second 24-hour long increment 6.2 mg/L of nitrogen as ammonium ions was lost, but 22.8 mg/L of nitrogen as nitrite was produced, while the increase in nitrate was insignificant, which indicates that ammonium ions were still being released from the biodegradation of the organic matter. The BOD fell enough during the second day to account for this release. On the third day the ammonia oxidation (35 mg/L of nitrogen) was almost equalled stoichiometrically by the increase in nitrogen as nitrite ions (32.3 mg/L) plus the small increase in the nitrate ion concentration (1.2 mg/L of nitrogen). This indicated that denitrification had ceased on the third day, when the dissolved oxygen concentration in the clarified stream reached 2.0 mg/L (FIG. 25C). The temperature fluctuated slightly over the incubation period, ranging from 22° C. to 24.5° C. (FIG. 25C). The [$SO_4^{2-}$] rose rapidly on the first day from 15 to 44 mg/L and levelled out over the next two days (FIG. 11D). The [$PO_4^{3-}$] fell in the first 24 hours from 65 mg/L to 49 mg/L, but rose over the next two days to the initial concentration (FIG. 25D).

Figure 26:
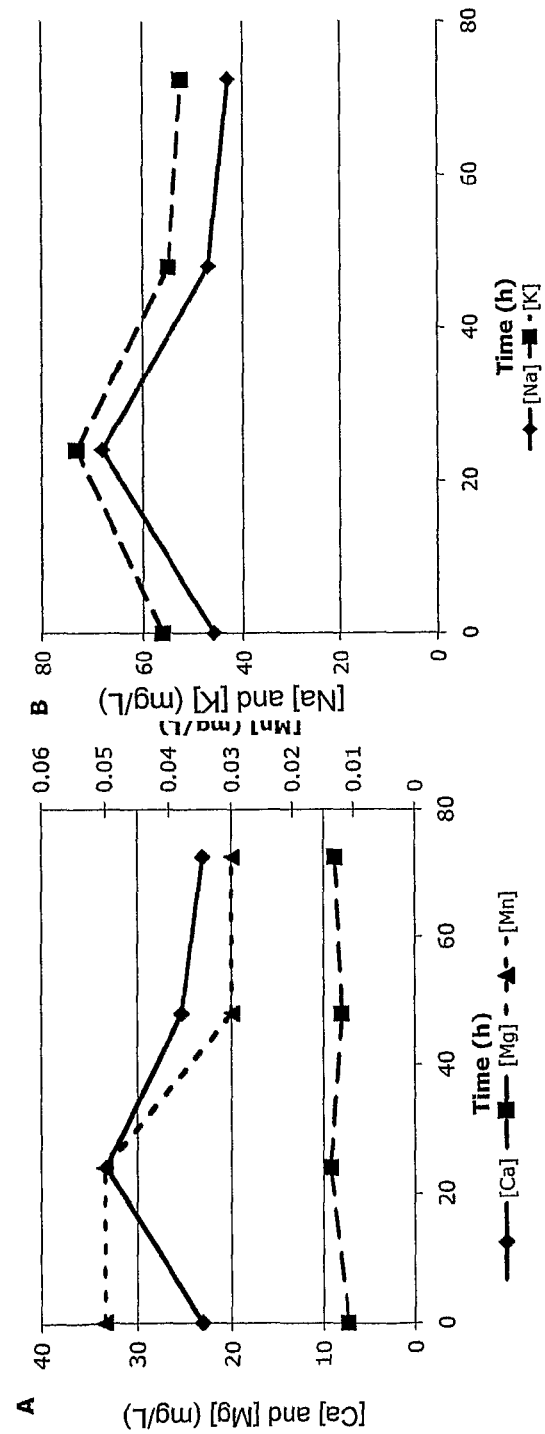
FIG. 26 shows graphs against time for blackwater treated in NMB IV Example 3 trial 3: A) Ca, Mg and Mn concentrations, B) K and Na concentrations, C) chloride and fluoride ion concentrations.
Figure 26:
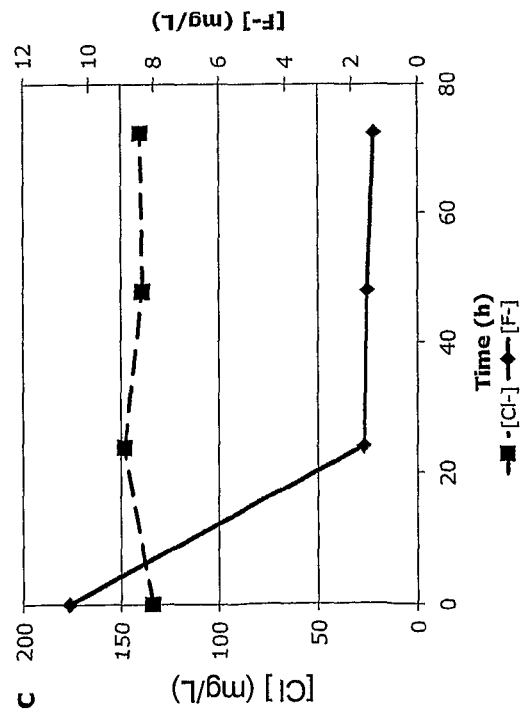

The [Ca] increased in the first 24 h and fell back to the initial level by the third day (FIG. 26A). The [Mg] was steady throughout the trial, and the [Mn] fell slightly through the trial (FIG. 26A). The [Na] and [K] also rose in the first 24 h and fell back to the initial levels after three days (FIG. 26B). The [Cl$^-$] remained stable throughout the trial, but the [F$^-$] fell in the first 24 h and levelled out (FIG. 26C). The initial [F$^-$] in the blackwater was again high (10.6 mg/L).

The poor performance of NMB IV in trial 3 was assigned to the accumulation of sludge in the bottom of the Imhoff tanks, which is hypothesised to have undergone anaerobic digestion releasing monomers and ammonium ions into the clarified stream, which fed microbes (including coliforms). The growing microbes in the clarified stream prevented the TSS and coliform counts from falling. The plateau in the BOD data and the very slow rise in the dissolved oxygen concentration support this hypothesis.

Blackwater Treatment Trial 4

Figure 27:
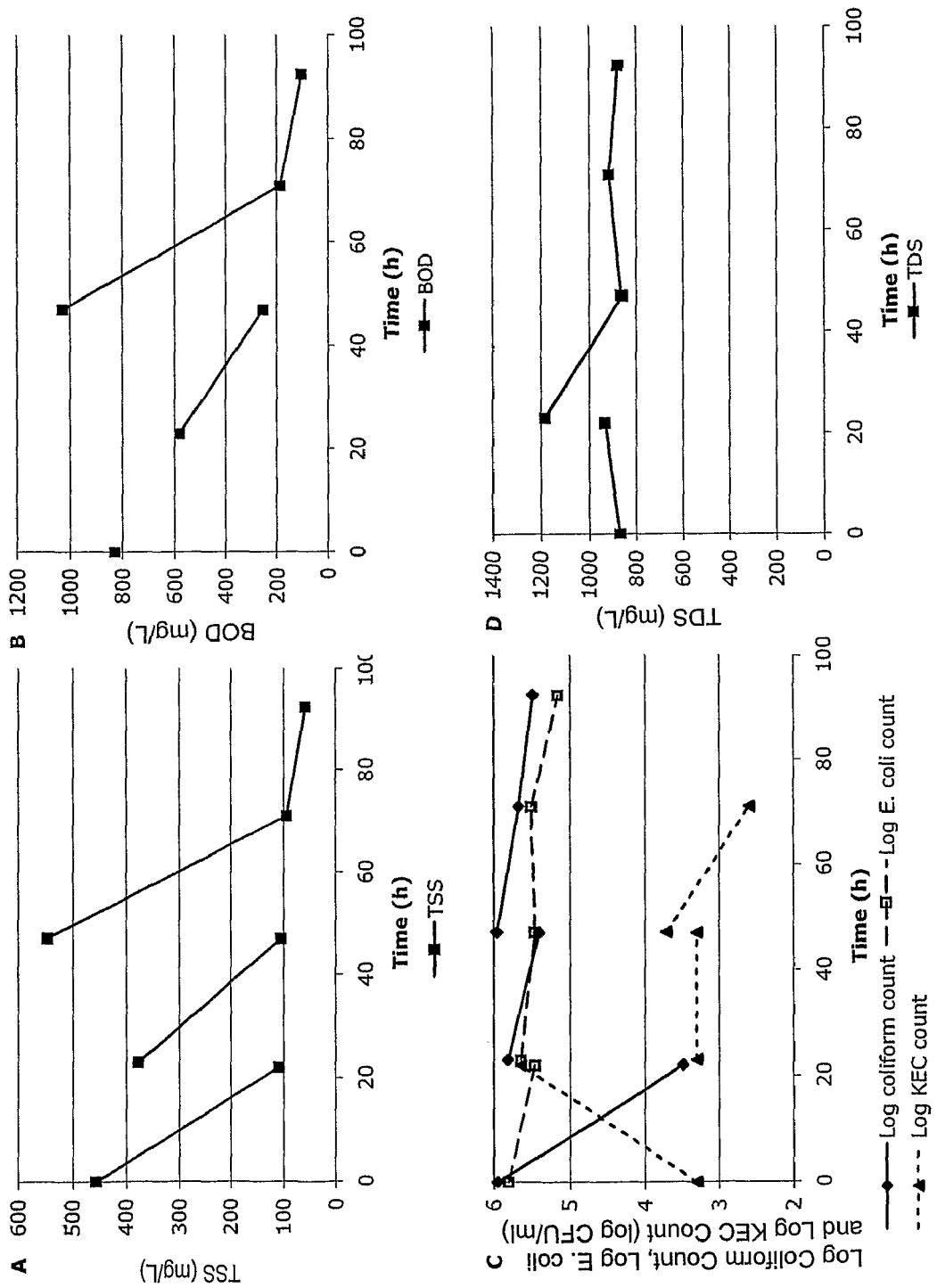
FIG. 27 shows graphs against time for blackwater treated in NMB IV Example 3 trial 4: A) total suspended solids (TSS), B) biochemical oxygen demand (BOD), C) log coliform count, and D) total dissolved solids (TDS)

The blackwater treated in trial 4 was much richer than in the first three trials. The TSS in the sewage fell from: 456 to 107 mg/L (77% fall) in the first batch; 376 to 104 mg/L (72% fall) in the second batch; and 546 to 94 mg/L (83% fall) in the third batch (FIG. 27A). The BOD was initially 829 mg/L in the first batch, but the 24-h reading was inaccurate, so was excluded (FIG. 27B). The BOD fell from 581 to 251 mg/L (56% fall) in the second batch, and from 1024 to 186 mg/L (82% fall) in the third batch. The coliform and thermotolerant coliform counts for the first batch are self-contradictory, as the coliform count went down from $10^{5.8}$ to $10^{3.5}$ cfu/ml, while the E. coli counts only fell from $10^{5.8}$ to $10^{5.5}$ cfu/ml, and the KEC count rose sharply from $10^{3.3}$ to $10^{5.6}$ cfu/ml (FIG. 27C). The coliform count taken after 24 h was incorrect. The coliform counts remained high through the remaining two batches, due to the high availability of nutrients (high BOD), most probably fed by the anaerobic digestion of sludge in the bottom of the Imhoff tanks. The TDS rose, fell and remained stationary over the three respective batches (FIG. 27D).

Figure 28:
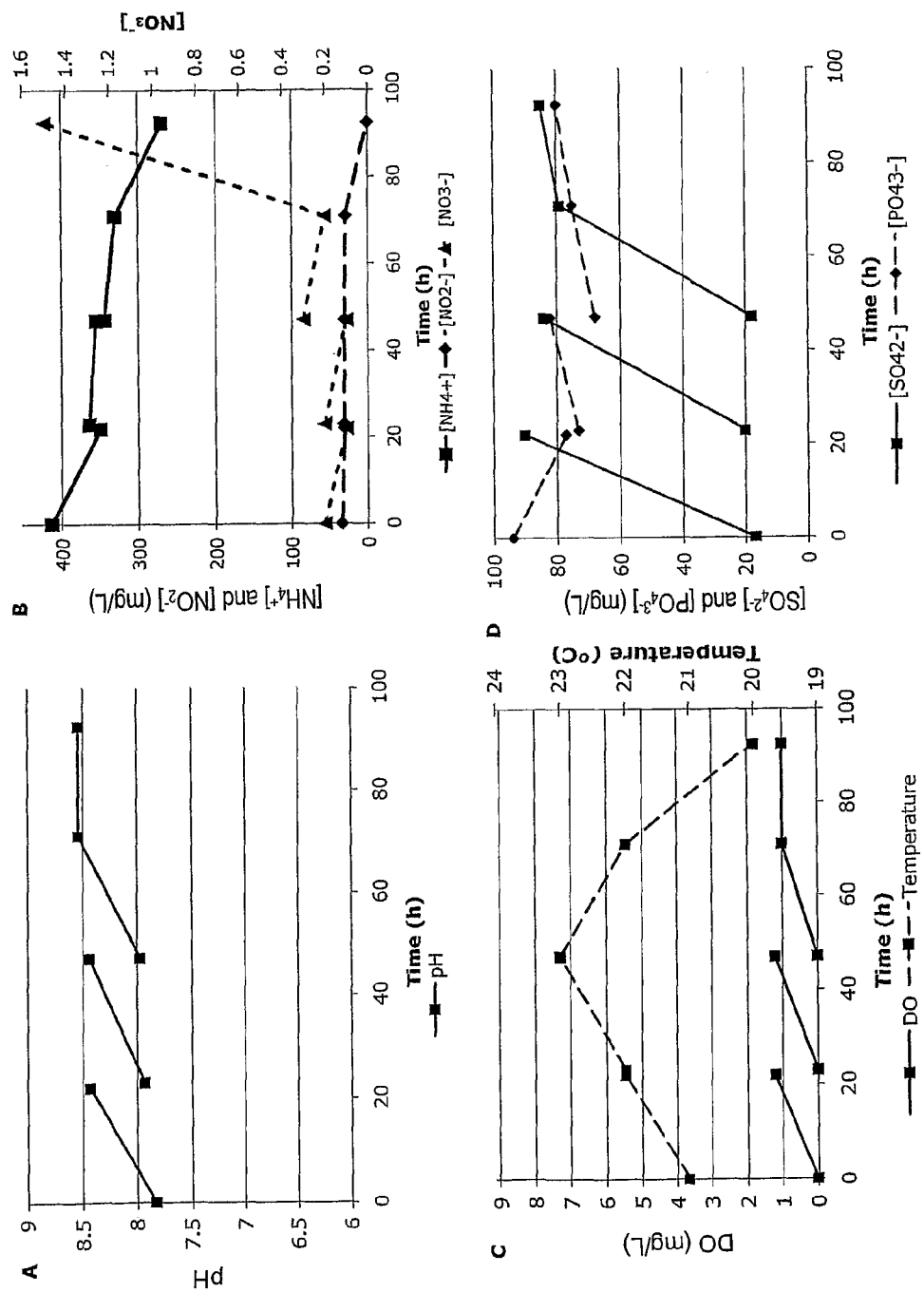
FIG. 28 shows graphs against time for blackwater treated in NMB IV Example 3 trial 4: A) pH, B) ammonium, nitrite and nitrate ion concentrations, C) dissolved oxygen, D) sulfate and phosphate ion concentrations.

The pH rose to about 8.5 during each of the three batches (FIG. 28A). Ammonia oxidation was rapid in the first and third batches (2.9 and 2.8 mg/L·h, respectively), but was slow in the second batch (0.4 mg/L·h) (FIG. 28B). Ammonia oxidation, nitrification and denitrification were balanced in all three batches, because there was no significant accumulation of nitrite and nitrate ions. Assuming no ammonium ions were released from the digestion of organic nitrogenous compounds during the incubation, the nitrification rates on each of the four days of the trial were 2.3, 0.3, 0.4 and 2.7 mg N/L·h, respectively. The dissolved oxygen concentrations rose to 1.2 mg/L in 24 h in the first two batches, but only rose to 1.0 mg/L in the first 24 h of the third batch, where it remained for the next 24 h (FIG. 28C). This result is consistent with the accumulation of sludge in the bottom of the Imhoff tanks feeding the clarified stream with digestion products. The temperature of the liquid ranged from 20° C. to 23° C. (FIG. 28C). The sulfate ion concentrations rose very rapidly during each of the three batches, and appeared to near completion within the first 24 h of each batch (FIG. 28D). The phosphate ion concentrations fell during the first batch, but rose during the second and third batches, indicating that the accumulation of solids in the Imhoff tanks at the bottom may have retarded phosphate sequestration by organisms such as *Acinetobacter* sp.

Figure 29:
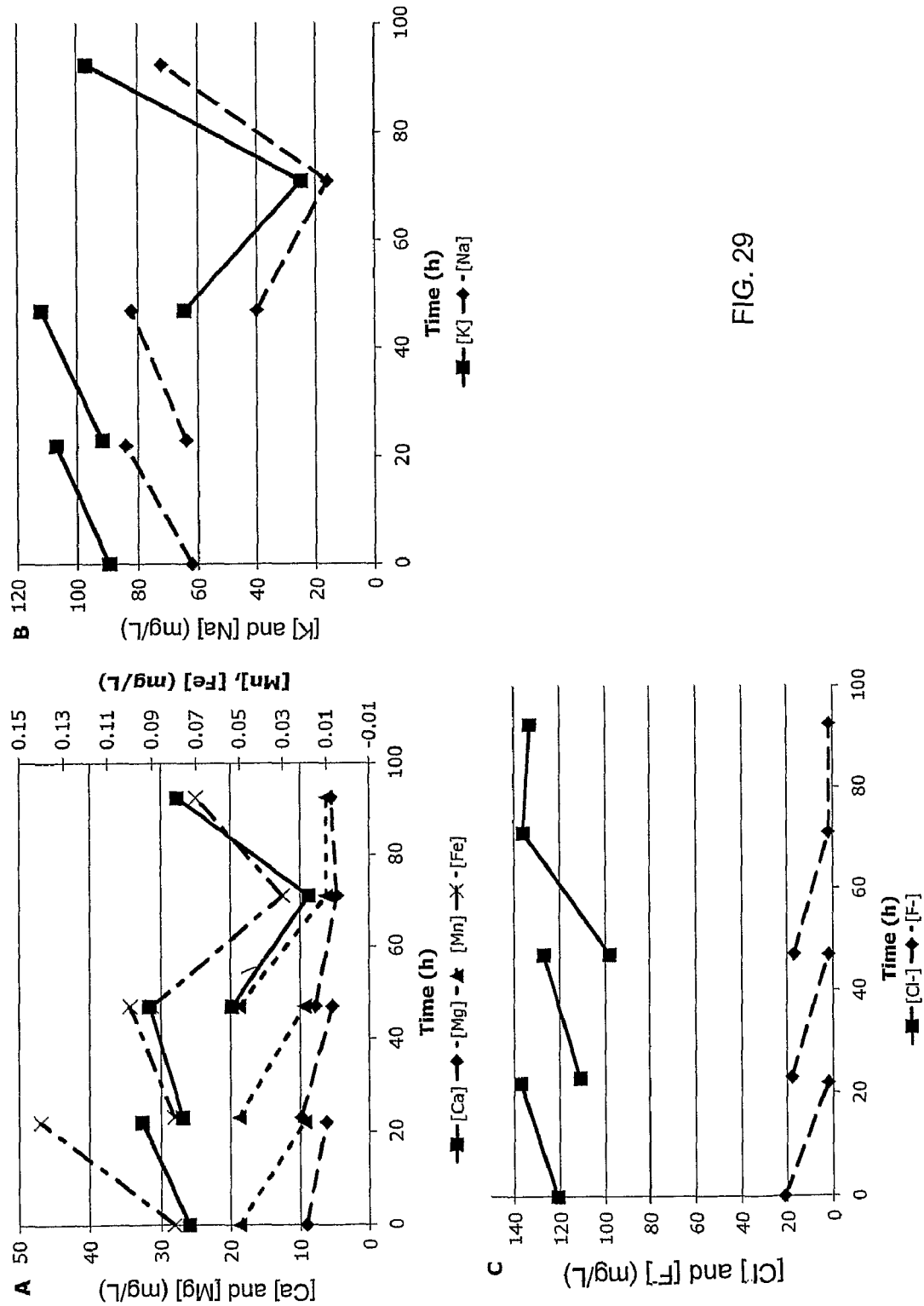
FIG. 29 shows graphs against time for blackwater treated in NMB IV Example 3 trial 4: A) Ca, Mg, Mn and Fe concentrations, B) K and Na concentrations, C) chloride and fluoride ion concentrations.
Figure 30A:
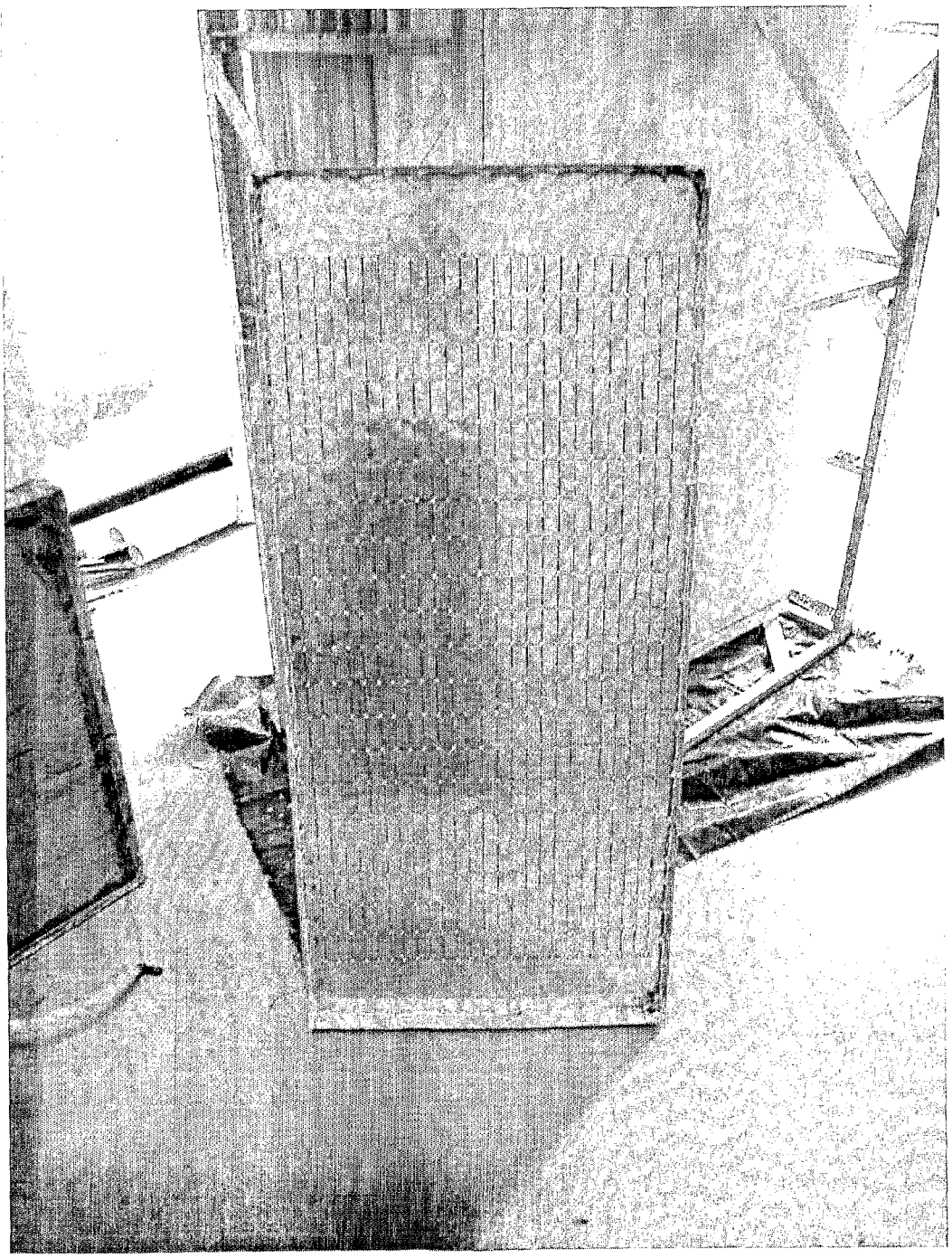
FIG. 30 shows further photographs of bioreactors and parts thereof according to the present invention: a) bioreactor NMB VI inlet manifold tray; b) biofilm on a gill of bioreactor NMB III; c) bioreactor NMB III with lid removed; d) bioreactor NMB VI membrane assembly without housing; e) bioreactor NMB VI gill assembly; f) bioreactor NMB V showing air inlet and holes in outer housing showing gills; g) bioreactor NMB V showing gills as seen through holes in the housing; h) bioreactor NMB V showing gills and air spacers through holes in the housing; i) air spacer as used in NMB V and NMB VI; j) bioreactor NMB IV; k) lower portion of NMB IV.
Figure 30B:
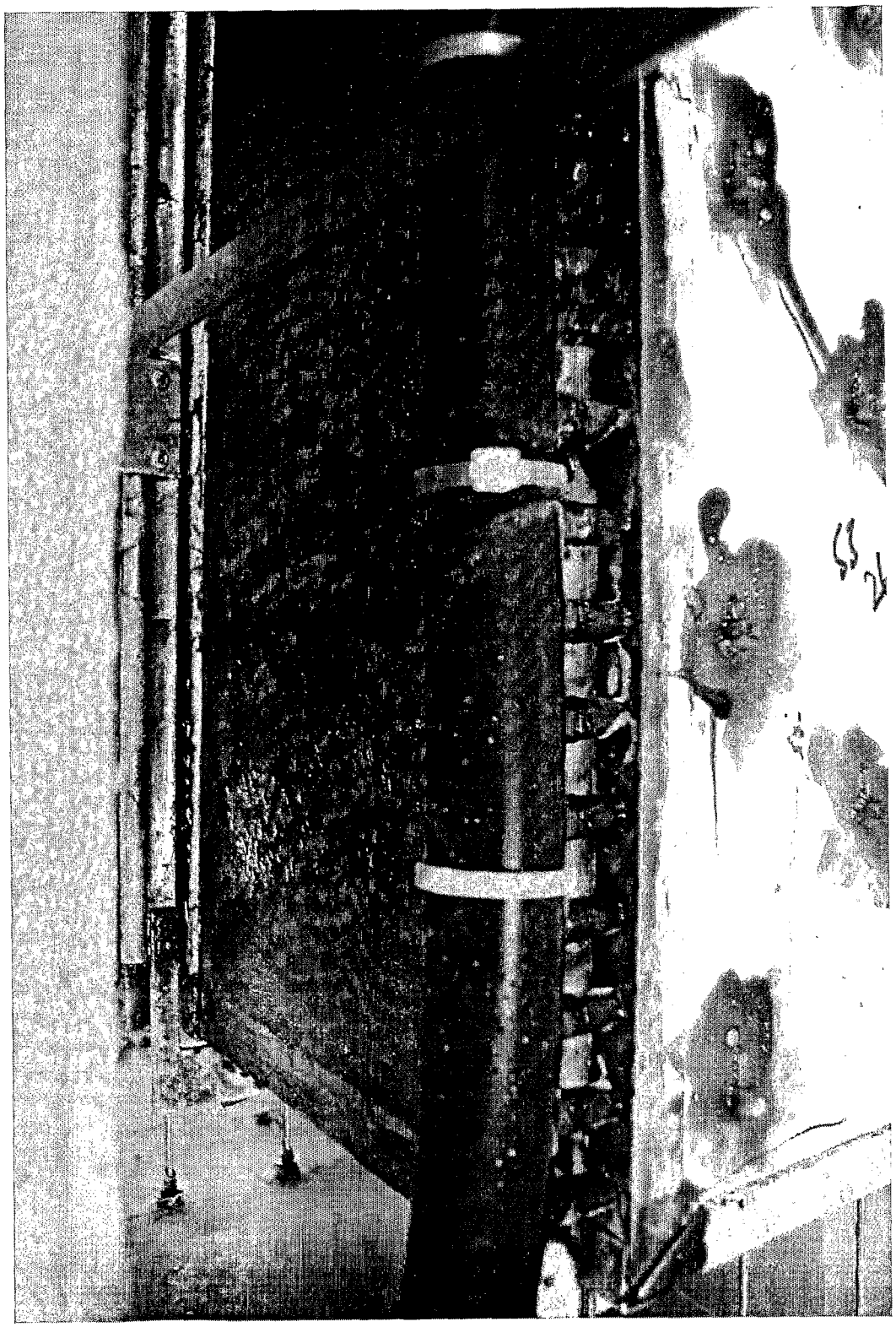
Figure 30C:
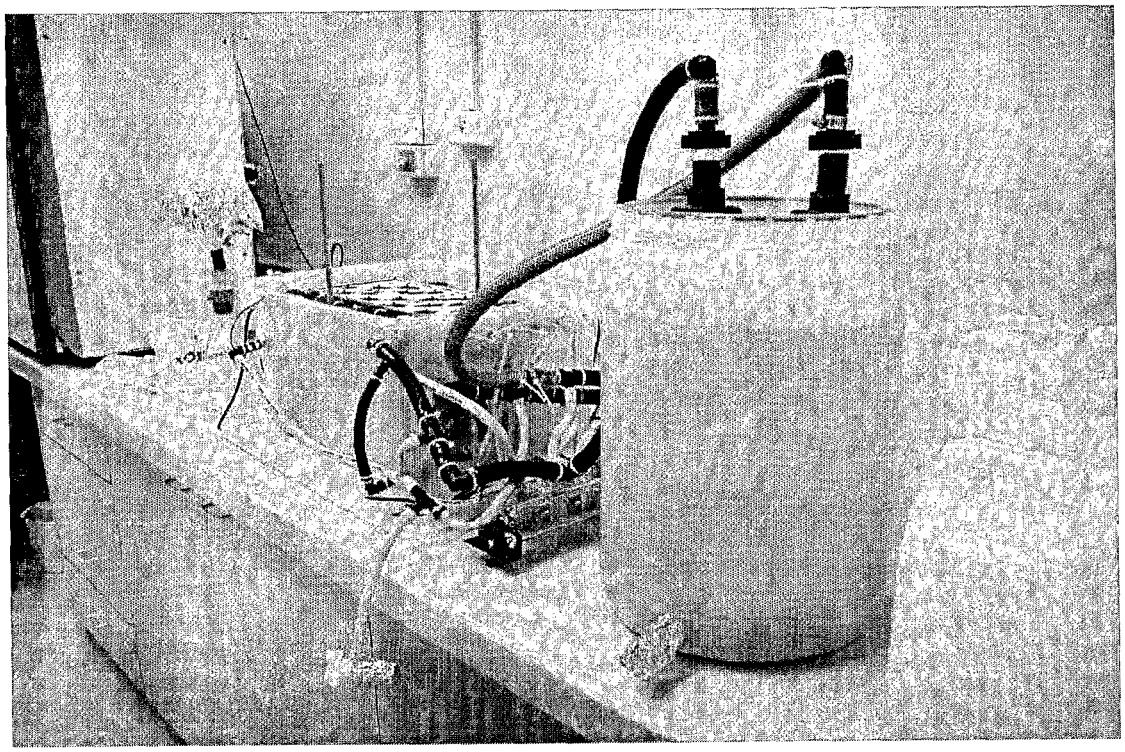
Figure 30D:
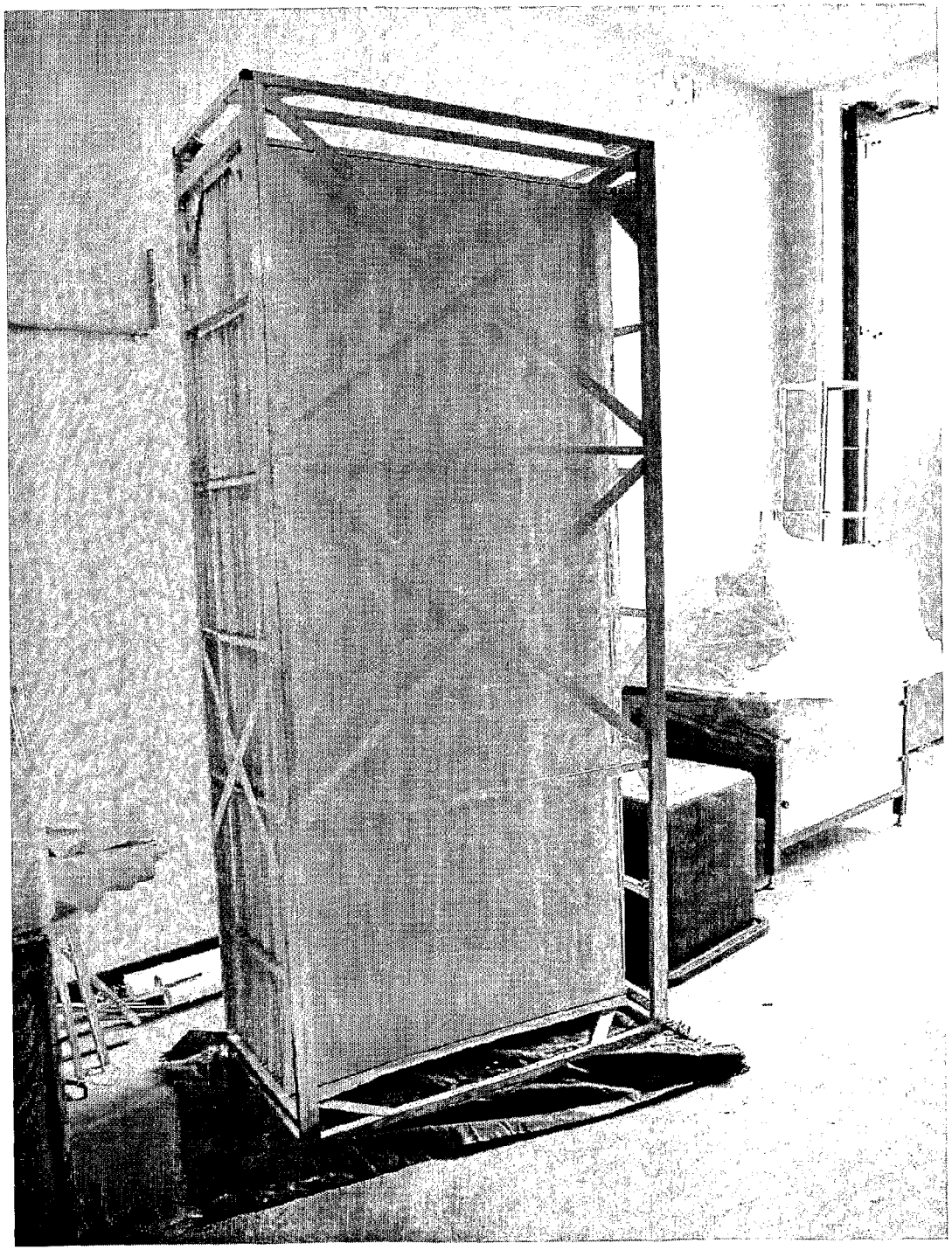
Figure 30E:
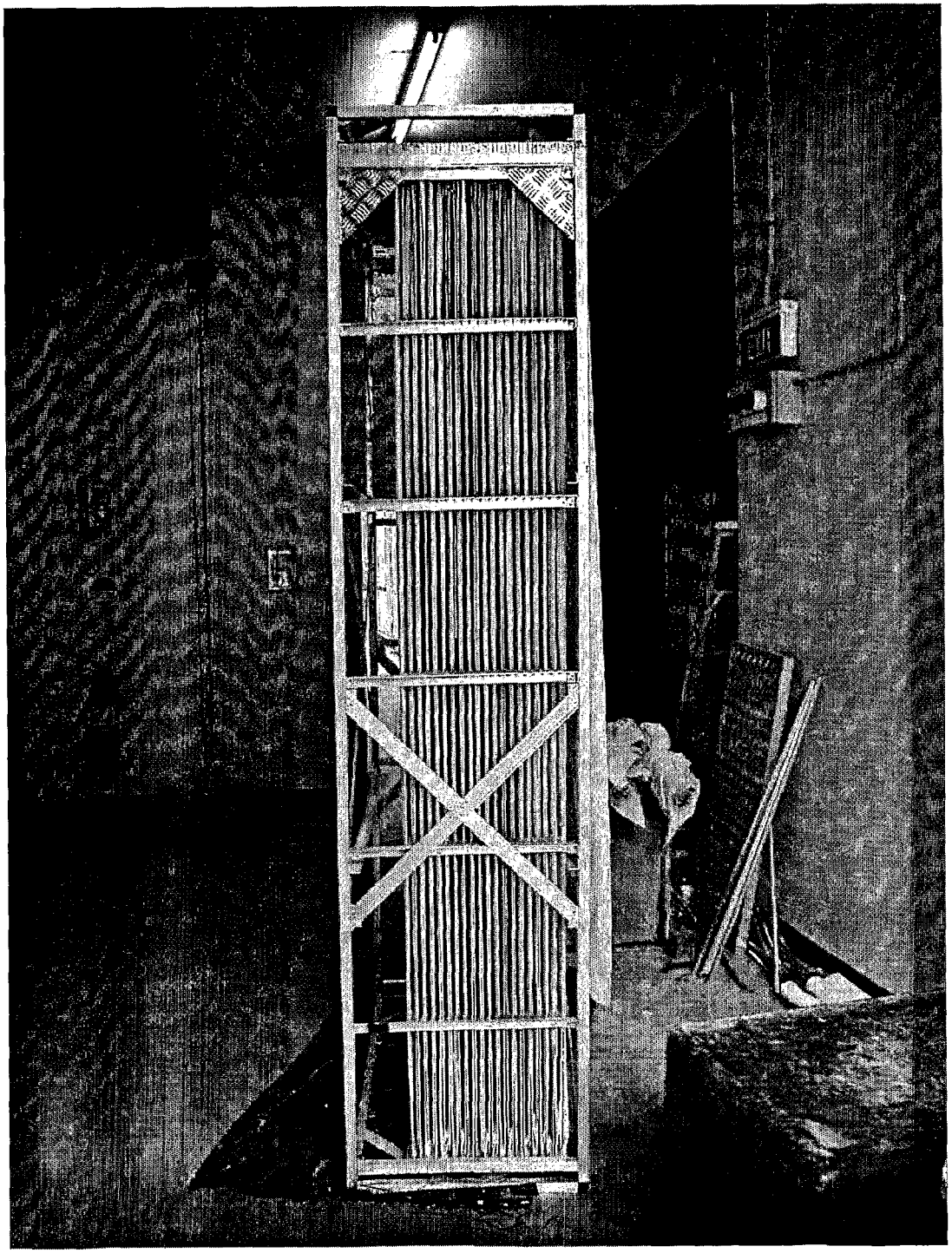
Figure 30F:
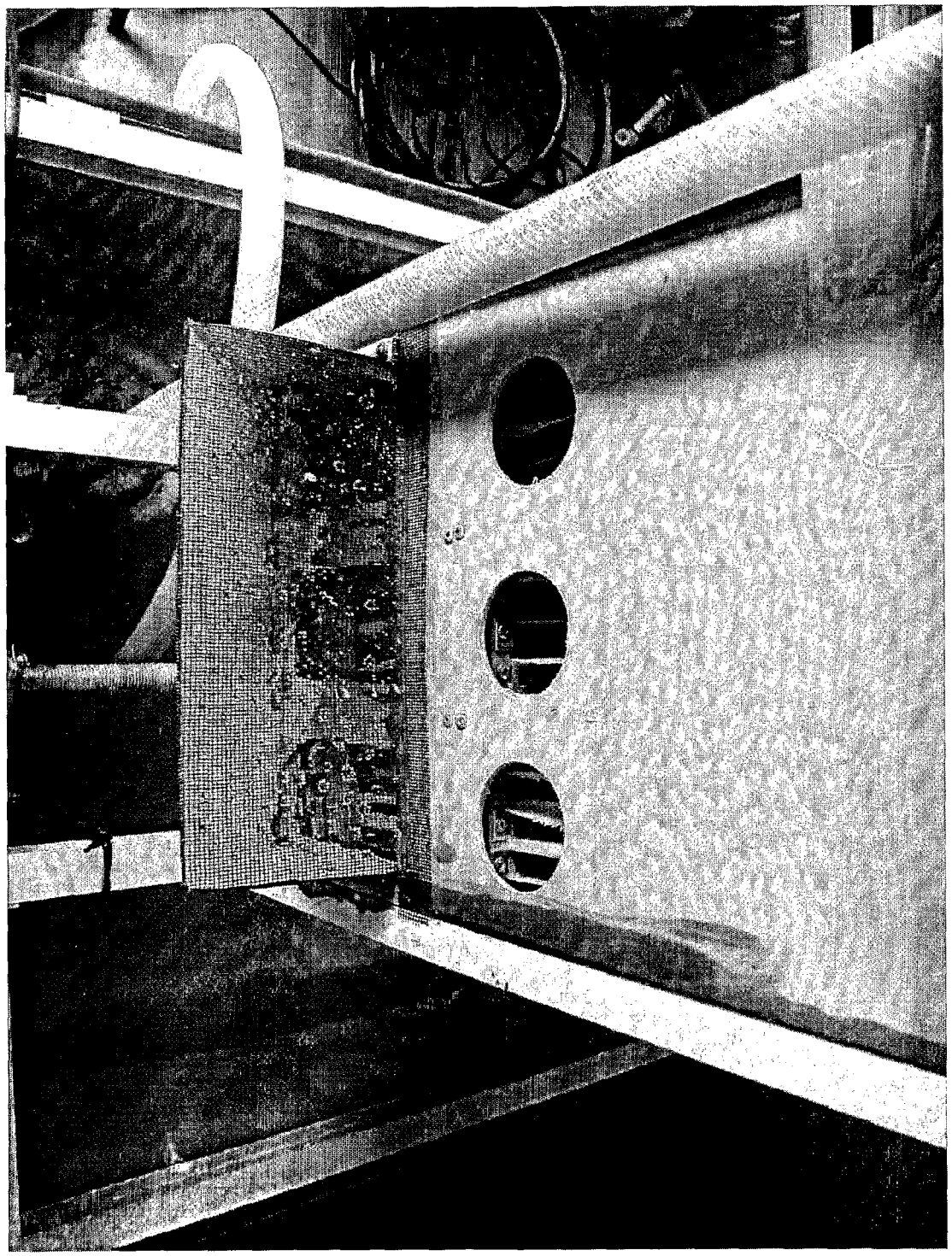
Figure 30G:
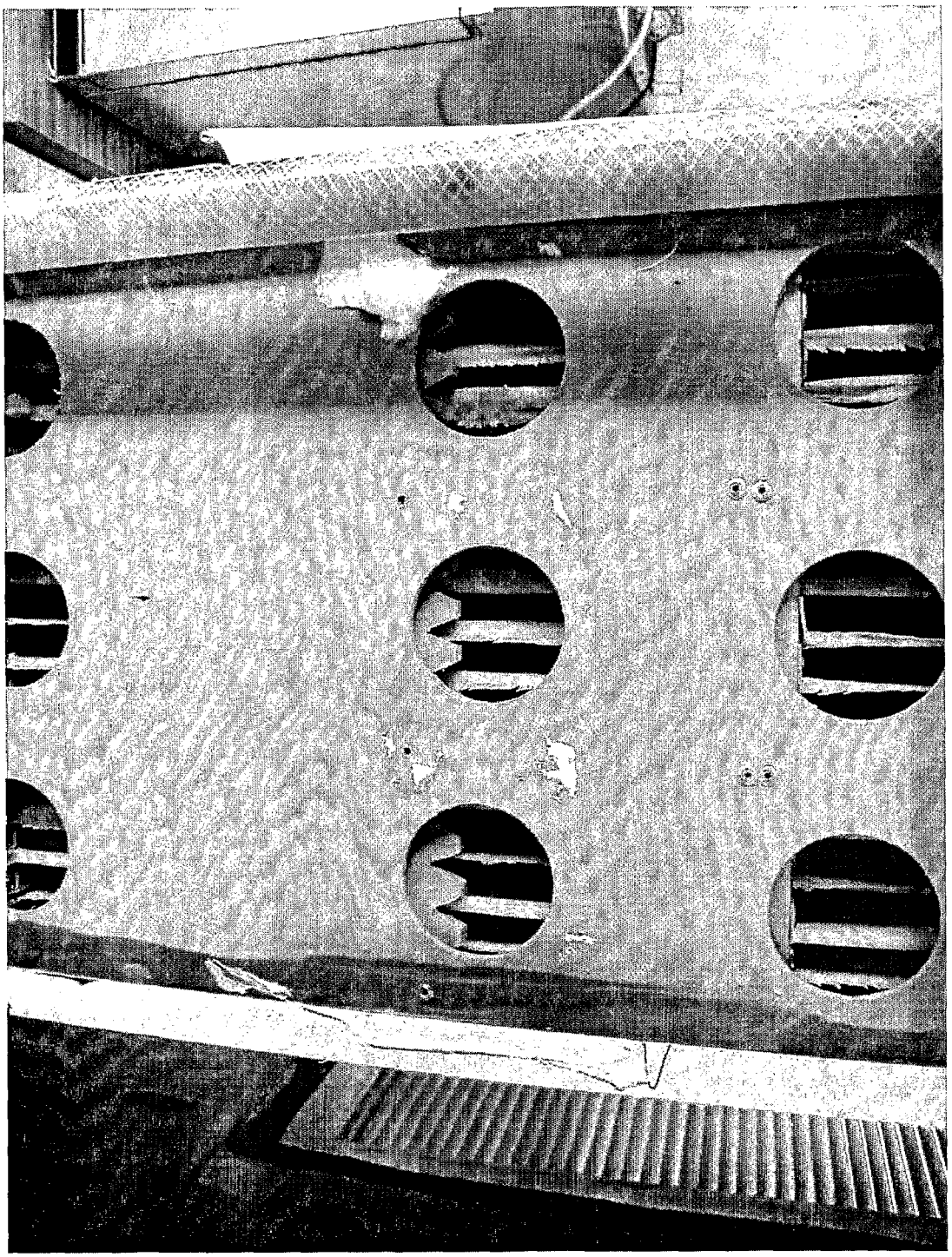
Figure 30H:
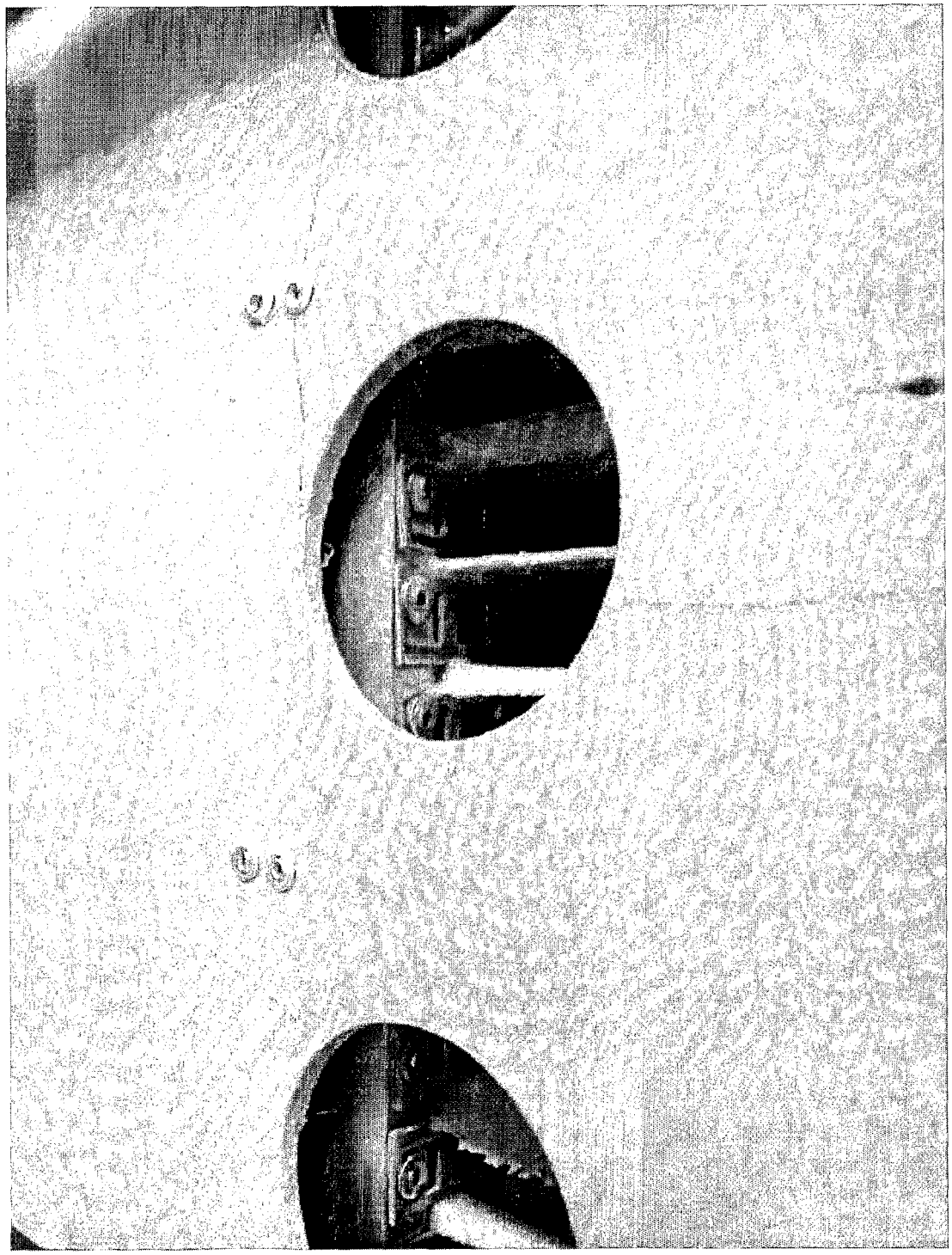
Figure 30I:
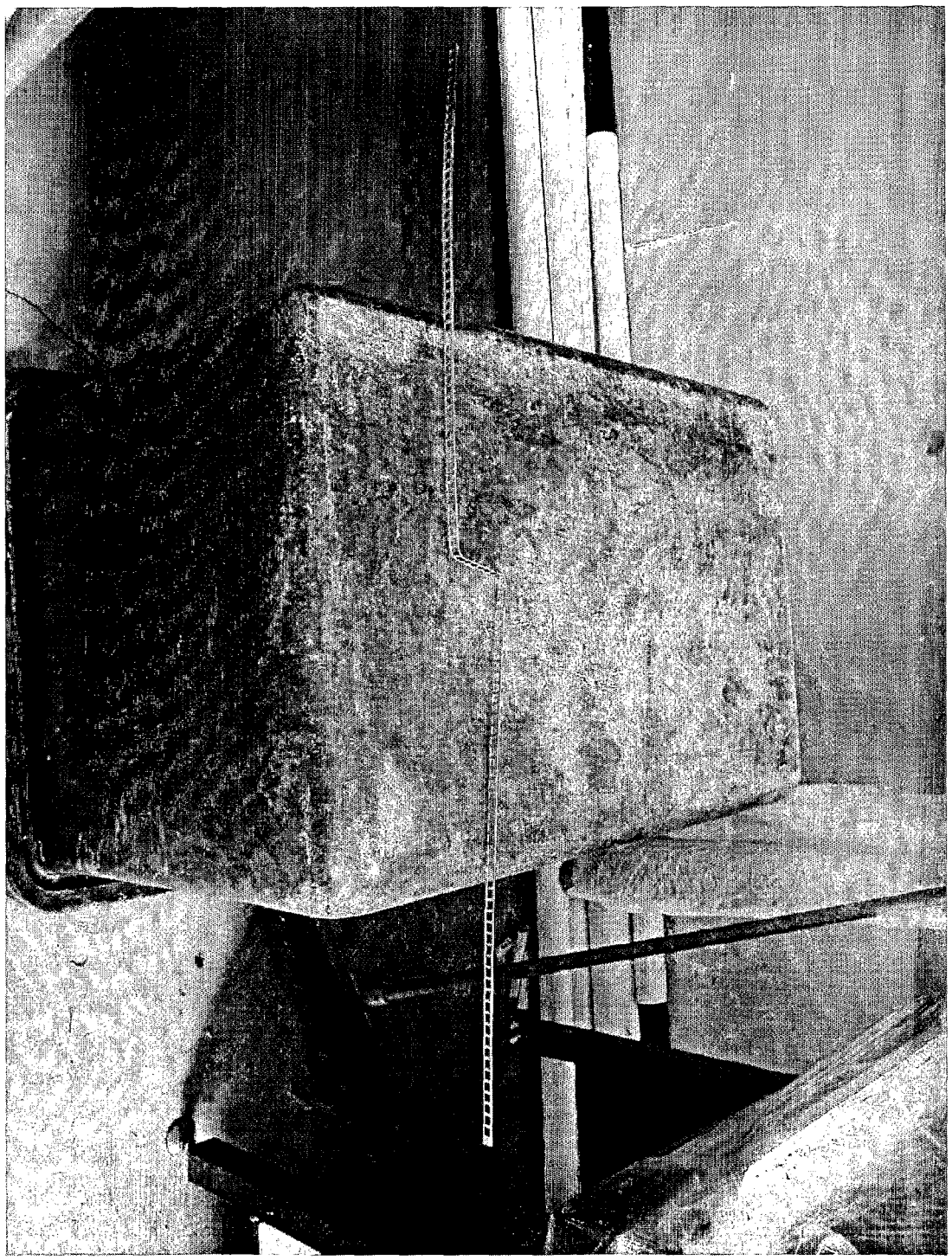
Figure 30J:
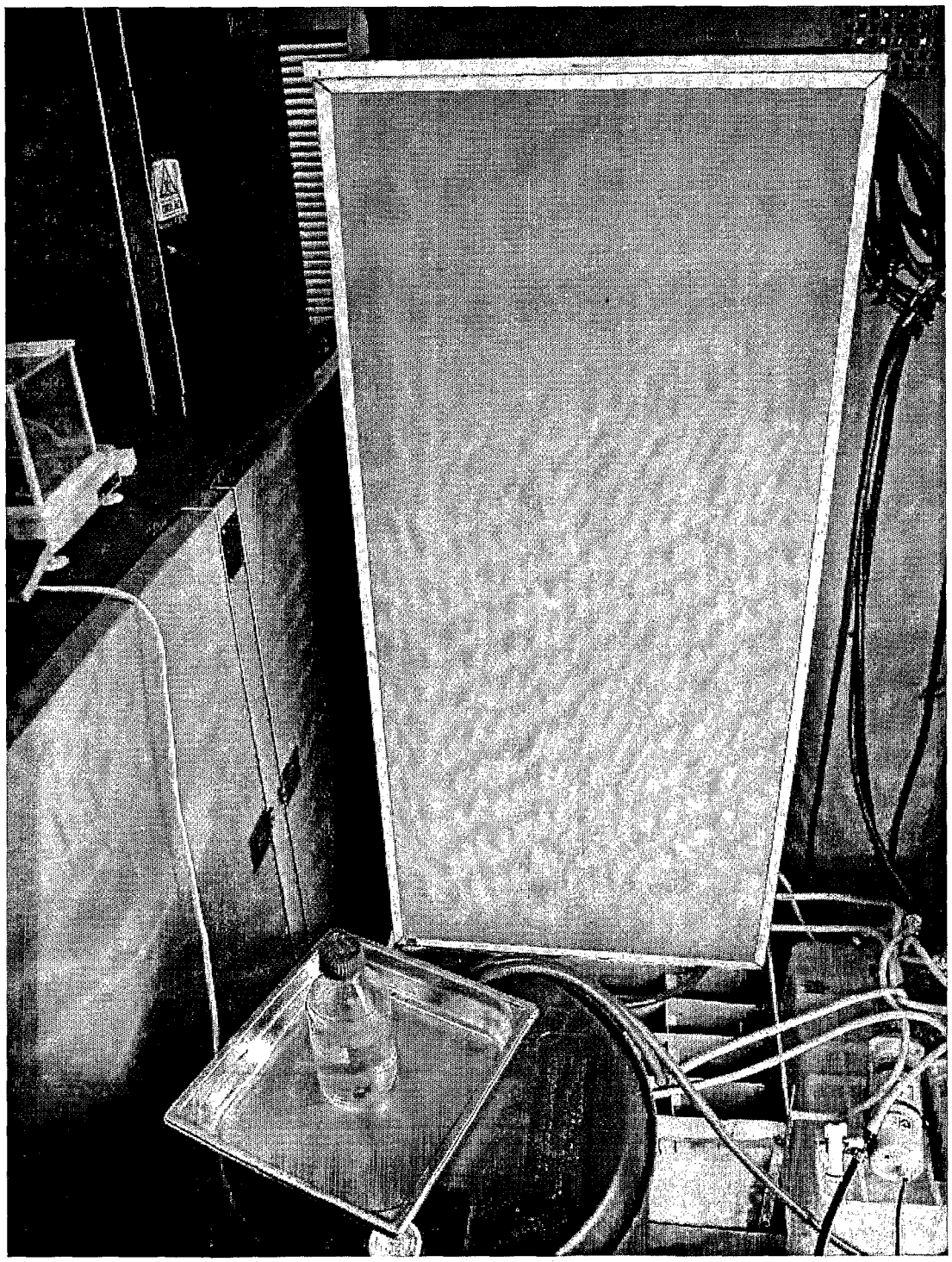
Figure 30K:
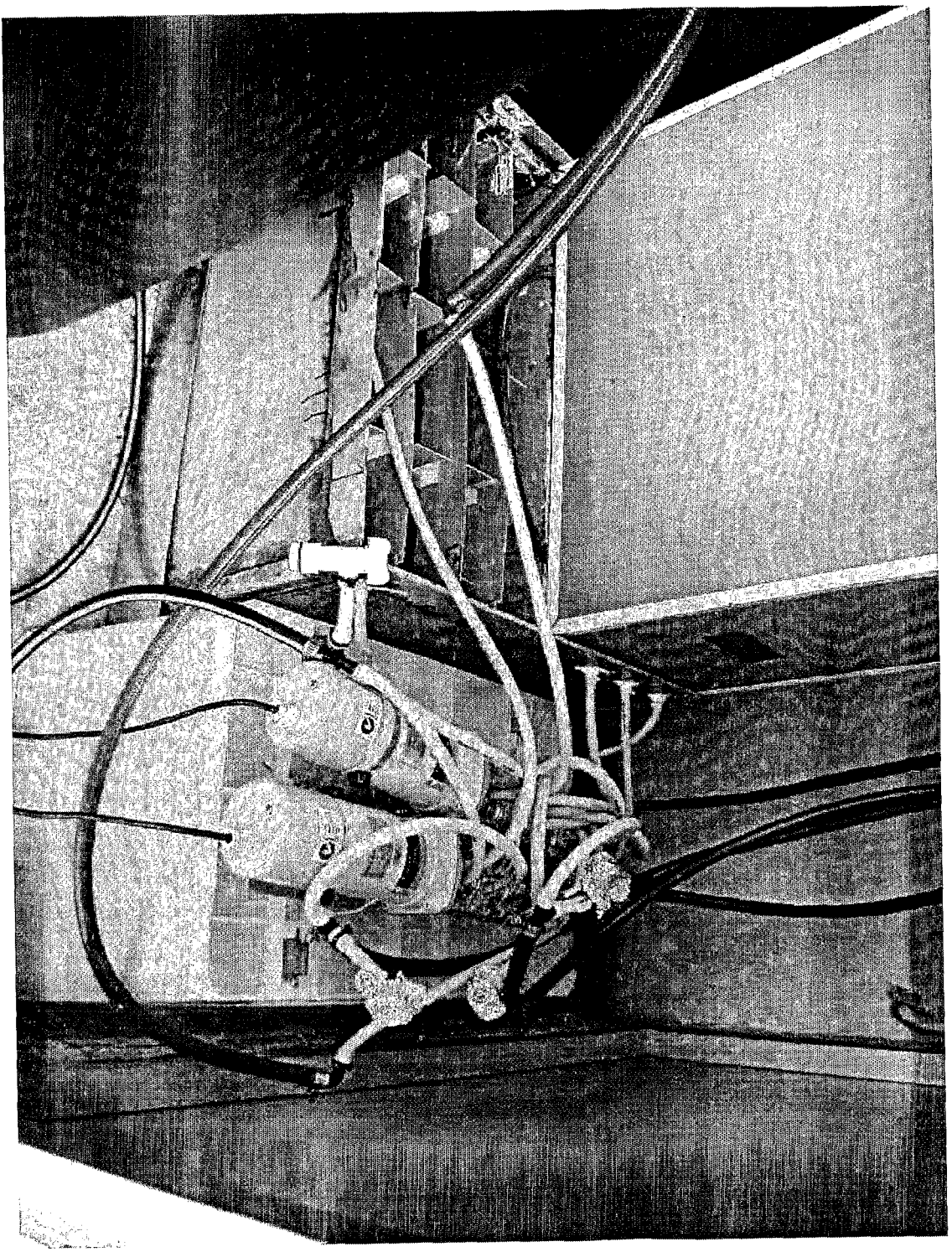

The [Ca] rose during each of the three batches (FIG. 29A). The [Mg] and [Mn] fell during each of the three batches and the [Fe] rose during the first two batches and fell slightly during the third (FIG. 29A). The [Fe] was too small to significantly effect the phosphate ion concentrations. The [K] and [Na] both rose during the three batches (FIG. 29B). The [Cl$^-$] rose during each of the three batches, while the [F$^-$] fell during each batch (FIG. 29C).

The results of the four trials are compared for removal of TSS, reduction of BOD, and oxidation of ammonia, production of sulfate and removal of phosphate from the sewage are provided in Tables 1-5, respectively. Membrane productivity rates were calculated as the difference on the final concentration (mg/L) minus the initial concentration (mg/L), multiplied by the total volume treated (L), divided by the membrane area (m$^2$) and the time (h), with the units being mg/m$^2$/h. The membrane flow factor was calculated as the membrane productivity rate (mg/m$^2$/h) divided by the hydraulic flow rate (L/h), which had the units of mg/m$^2$/L. The membrane productivity rates provide a way of comparing the efficiency the membranes in the two bioreactors, operating under different flow rates. The membrane flow factor was calculated to assess the effect of the different flow rates in the two systems. The elevated flow rate relative to the hydraulic volume in NMB III made the membrane operate much more efficiently than the very slow pumping rate in NMB IV, as NMB III outperformed NMB IV in every facet of sewage treatment. When the different hydraulic flow rates were compensated for by the membrane flow factor, NMB III performed on par with NMB IV in most facets of sewage treatment. This exemplifies the significance of the hydraulic flow rate to the efficiency of the NMB technology for treating wastewater.

TABLE 1 data from the performance of the two NMB's over trials 1-4 during the first 24 h of each batch for the removal of total suspended solids (TSS). Trial 4 had three batches denoted as 4.1-3.

| Trial | Membrane Area (m$^2$) | Pumping Rate (L/h) | TSS initial (mg/L) | TSS 24 h (mg/L) | TSS change (mg/L) | Change (%) | Membrane Productivity Rate (mg/m$^2$/h) | Membrane Flow Factor (mg/m$^2$/L) |
|---|---|---|---|---|---|---|---|---|
| 1 | 0.6 | 75.6 | 316 | 37 | −279 | −88 | −198.5 | −2.63 |
| 2 | 33.6 | 18.9 | 142 | 89 | −53 | −31 | −13.1 | −0.69 |
| 3 | 33.6 | 18.9 | 149 | 83 | −66 | −44 | −26.0 | −1.38 |
| 4.1 | 33.6 | 18.9 | 456 | 107 | −349 | −77 | −94.4 | −5.00 |
| 4.2 | 33.6 | 18.9 | 376 | 104 | −272 | −72 | −67.5 | −3.57 |
| 4.3 | 33.6 | 18.9 | 546 | 94 | −452 | −83 | −112.6 | −5.96 |

TABLE 2 data from the performance of the two NMB's over trials 1-4 during the first 24 h of each batch for the reduction of biochemical oxygen demand (BOD). Trial 4 had three batches denoted as 4.1-3.

| Trial | Membrane Area (m$^2$) | Pumping Rate (L/h) | BOD initial (mg/L) | BOD 24 h (mg/L) | BOD change (mg/L) | Change (%) | Membrane Productivity Rate (mg/m$^2$/h) | Membrane Flow Factor (mg/m$^2$/L) |
|---|---|---|---|---|---|---|---|---|
| 1 | 0.6 | 75.6 | 990 | 124 | −866 | −87 | −866 | −8.15 |
| 2 | 33.6 | 18.9 | 284 | 98 | −186 | −65 | −46.1 | −2.44 |
| 3 | 33.6 | 18.9 | 269 | 121 | −148 | −55 | −58.7 | −3.11 |
| 4.1 | 33.6 | 18.9 | 829 | | | | | |
| 4.2 | 33.6 | 18.9 | 581 | 251 | −330 | −57 | −81.8 | −4.33 |
| 4.3 | 33.6 | 18.9 | 1024 | 186 | −838 | −82 | −208.7 | −11.04 |

TABLE 3 data from the performance of the two NMB's over trials 1-4 during the first 24 h of each batch for the oxidation of ammonium ions. Trial 4 had three batches denoted as 4.1-3.

| Trial | Membrane Area (m$^2$) | Pumping Rate (L/h) | [NH$_4^+$] initial (mg/L) | [NH$_4^+$] 24 h (mg/L) | [NH$_4^+$] change (mg/L) | Change (%) | Membrane Productivity Rate (mg/m$^2$/h) | Membrane Flow Factor (mg/m$^2$/L) |
|---|---|---|---|---|---|---|---|---|
| 1 | 0.6 | 75.6 | 276 | 227 | −49 | −18 | −34.9 | −0.46 |
| 2 | 33.6 | 18.9 | 320 | 321 | 1 | 0 | 0 | 0 |
| 3 | 33.6 | 18.9 | 257 | 225 | −32 | −12 | −12.7 | −0.67 |
| 4.1 | 33.6 | 18.9 | 413 | 349 | −64 | −15 | −17.3 | −0.92 |
| 4.2 | 33.6 | 18.9 | 364 | 355 | −9 | −2 | −2.2 | −0.12 |
| 4.3 | 33.6 | 18.9 | 340 | 330 | −10 | −3 | −2.5 | −0.13 |

TABLE 4 data from the performance of the two NMB's over trials 1-4 during the first 24 h of each batch for the production of sulfate ions. Trial 4 had three batches denoted as 4.1-3.

| Trial | Membrane Area (m$^2$) | Pumping Rate (L/h) | [SO$_4^{2-}$] initial (mg/L) | [SO$_4^{2-}$] 24 h (mg/L) | [SO$_4^{2-}$] change (mg/L) | Change (%) | Membrane Productivity Rate (mg/m$^2$/h) | Membrane Flow Factor (mg/m$^2$/L) |
|---|---|---|---|---|---|---|---|---|
| 1   | 0.6  | 75.6 | 13 | 47 | 35 | 276  | 24.8 | 0.33 |
| 2   | 33.6 | 18.9 | 3  | 81 | 78 | 2291 | 19.3 | 1.02 |
| 3   | 33.6 | 18.9 | 15 | 44 | 29 | 191  | 11.5 | 0.61 |
| 4.1 | 33.6 | 18.9 | 17 | 90 | 73 | 429  | 19.8 | 1.05 |
| 4.2 | 33.6 | 18.9 | 20 | 84 | 64 | 320  | 15.9 | 0.84 |
| 4.3 | 33.6 | 18.9 | 18 | 79 | 61 | 339  | 15.2 | 0.80 |

TABLE 5 data from the performance of the two NMB's over trials 1-4 during the first 24 h of each batch for the removal of phosphate ions. Trial 4 had three batches denoted as 4.1-3.

| Trial | Membrane Area (m$^2$) | Pumping Rate (L/h) | [PO$_4^{3-}$] initial (mg/L) | [PO$_4^{3-}$] 24 h (mg/L) | [PO$_4^{3-}$] change (mg/L) | Change (%) | Membrane Productivity Rate (mg/m$^2$/h) | Membrane Flow Factor (mg/m$^2$/L) |
|---|---|---|---|---|---|---|---|---|
| 1   | 0.6  | 75.6 | 124 | 54 | −70 | −56 | −49.8 | −0.66 |
| 2   | 33.6 | 18.9 | 113 | 80 | −33 | −29 | −8.2  | −0.43 |
| 3   | 33.6 | 18.9 | 65  | 49 | −16 | −25 | −6.3  | −0.33 |
| 4.1 | 33.6 | 18.9 | 94  | 77 | −17 | −18 | −5.0  | −0.24 |
| 4.2 | 33.6 | 18.9 | 73  | 82 | 9   | 12  | 2.2   | 0.12 |
| 4.3 | 33.6 | 18.9 | 68  | 75 | 7   | 10  | 1.7   | 0.09 |

Discussion

NMB III had a very small vertical fall between the membrane pairs, so required very high recirculation rates to oxidise and flocculate the reduced molecules (organics, sulfides, sulfur, ammonia and nitrite) and suspended particles (cells, cellulose and cellular debris), respectively. Due to the membrane layout in NMB III, the membrane gills are pumped in parallel, whereas in NMB IV the 4 sets of membrane gills are pumped with a sequential flow. This results in the pumping rate in NMB III being four times faster than in the NMB IV, which appears to have severely reduced the efficiency of the NMB IV compared to the performance of the NMB III on a L/m$^2$/h basis. This was reflected in the much lower dissolved oxygen concentrations seen in the NMB IV. Another factor that may have significantly influenced these results was the significantly thicker membranes in the NMB IV due to the gelation process. The membranes in NMB IV were estimated as being more than twice as thick as in NMB III, which are anticipated to have significantly retarded the diffusion of nutrients to the gas face, thus retarding the biological activity of the biofilm on the outsides of the gills. This was confirmed by the observation of very thin biofilms.

The removal of sludge from the bottom of the Imhoff tanks was also another significant issue. All biologically based sewage treatment systems that achieve more than 90% reduction of loads have three phases to treatment. The partitioning of heavily loaded sewage from weaker solutions is essential to prevent mixing, and this was apparent in the NMB IV treating heavily loaded blackwater in this set of trials. Multiple phases are essential to achieve more efficient removal rates, as it prevents mixing. The accumulation of sludge in the bottom of the Imhoff tanks appears to have fed the clarified stream via the anaerobic digestion of the trapped cellular debris, which re-entered the clarified stream via diffusion and in turn appears to have fed coliforms and thermotolerant coliforms, as well as other types of bacteria.

Throughout the trials all samples collected from the NMB and the raw blackwater contained very fine suspended particles, which passed through the glass fibre filters used for TSS analysis, but would not pass through the 0.2 µm reconstituted cellulose syringe filters used to prepare samples for ion chromatography. Centrifugation of the pre-filtered samples yielded pellets about 10-15 µl in volume from 50 ml samples (data not reported). This indicates that there was at least 50-75 mg/L of these fine particles, which were possibly cellulose fibres. Cellulose is not readily biodegraded under oxic conditions, so these particles would not have contributed significantly to the BOD of samples, so was interpreted to not be responsible for the plateau in BOD curves. If the chemical oxygen demand was analysed, the proposed cellulose fibres would have contributed about 50-75 mg/L to such data. Removal of these particles was very problematic, as there appeared to be a significant reduction in their prevalence over the trials, even over three days. Such particles will be very difficult to remove by conventional filtration systems, and will foul microfiltration systems. Sterilization of the effluent by chemical oxidation will be retarded by the presence of such particles.

The BOD:[NH$_4^+$] ratios in the raw blackwater ranged from 3.6 down to 0.7, where as in the primary supernatant from the sewage treatment plant it ranged from 11 down to 3.6, being typically around 4.5. The ratio in the primary supernatant was too low to enable complete ammonia oxidation, so there appears to be no possibility that the blackwater tested here can be biologically treated to remove all of the ammonium ions in a practical time scale. The pH also played a significant role in preventing complete oxidation of the ammonium ions. In normal sewage treatment plants the problem with nitrogen removal is the pH falling below 6.5, which prevents nitrification, so lime is added to raise the pH. The ammonium ion concentrations in the blackwater were about ten times as high as in primary supernatant, which drove the pH so high that it retarded biological activity. To facilitate treatment of such rich sewage, acid will have to be added to keep the pH in a favourable range. Oxidation of ammonia is essential if the effluent is to be sterilized by chemical oxidation (chlorination, bromination or ozonation), as until all the ammonia is oxidised there will be no free chemical oxidant in solution.

After 14 weeks of sewage treatment the polyester cotton membrane support material used in the construction of NMB III showed no sign of deterioration, but the polyacetate membrane support material used in the construction of NMB IV were notably deteriorated. Alternative membrane support materials suitable for sewage treatment are polyester and fibreglass, but the latter is considerably more expensive.

The ramp up of biomass on the NMB membranes appears to have been incomplete over the six weeks that trials 2-4 were conducted over. Between trials the NMB biomass was fed primary supernatant from ANSTO sewage pit 008 spiked with peptone, ammonium chloride, urea, sodium thiosulfate, meat extract and potassium di-hydrogen ortho phosphate. It appears that the biomass was fed too infrequently to grow sufficiently. The spiked primary supernatant was also too weak. During trial 4 the biomass appears to have ramped up significantly, as repeated batches appear to have improved in efficiency. The ramp-up of the biomass in the NMB appears to be dependent on the system being fed identical blackwater, so it is anticipated that the NMB could perform better than was recorded in these trials if it had a continuous supply of blackwater, as would occur in an on going domestic situation.

CONCLUSIONS

Using the current NMB technology, the macerated blackwater was unsuitable for biological treatment in the timeframe expected ($\approx$24 h), as the BOD:[$NH_4^+$] ratio was too low, and the overall [$NH_4^+$] was too high. Chemical control of the pH will be essential to maximising the efficiency of the NMB technology when treating heavily loaded sewage, as well as compartmentalization of staged treatment processes. The maceration of raw sewage prior to treatment appears to be an unsuitable upstream process for the NMB technology, as the process loads the water with very fine particles that are difficult to flocculate, and it also maximises the dissolution of ammonia and organic matter, further complicating downstream processing.

The outcome of this study in the treatment of macerated blackwater indicate that, in the current form, the best applications for the NMB technology will be in the treatment of more dilute solutions such as screened/settled blackwater, primary treated sewage, and grey water.

The invention claimed is:

1. A membrane comprising:
a support membrane having a liquid face and a gas face;
a gas face biolayer at a location selected from on the gas face, in the support membrane near the gas face, and both on the gas face and in the support membrane; and
a liquid face biolayer at a location selected from on the liquid face, in the support membrane near the liquid face, and both on the liquid face and in the support membrane.

2. The membrane of claim 1, said membrane being a planar membrane.

3. The membrane of claim 1, said membrane being nanoporous, mesoporous or microporous.

4. The membrane of claim 1, said membrane being capable of allowing diffusion of substances selected from gases, liquids and gasses and liquids, therethrough without the external application of pressure.

5. The membrane of claim 1, said membrane having no support matrix on either the gas face or the liquid face.

6. The membrane of claim 1 wherein the support membrane comprises:
a support material, and
a gel supported by the support material.

7. The membrane of claim 6 wherein the support material comprises a woven or non-woven fibrous material or a non-fibrous porous material.

8. The membrane of claim 6 wherein the gel is sol-gel derived.

9. The membrane of claim 6 wherein the gel is selected from the group consisting of silica gel, titania gel, zirconia gel, alumina gel and a mixed gel comprising two or more of silica, titania, zirconia and alumina.

10. The membrane of claim 1 wherein the gas face biolayer and the liquid face biolayer comprise bacteria.

11. The membrane of claim 10 wherein the gas face biolayer comprises nitrosifying and nitrifying bacteria.

12. The membrane of claim 1 wherein the liquid face biolayer comprises bacteria capable of sequestering solids from a liquid stream.

13. A bioreactor comprising:
a membrane comprising a support membrane having a liquid face and a gas face; a gas face biolayer at a location selected from on the gas face, in the support membrane near the gas face, and both on the gas face and in the support membrane; and a liquid face biolayer at a location selected from on the liquid face, in the support membrane near the liquid face, and both on the liquid face and in the support membrane;
a support for supporting the membrane; and
a liquid cycling system for passing a liquid past the membrane.

14. The bioreactor of claim 13 having a plurality of membranes, each having a liquid face and a gas face and each comprising a support membrane, a gas face biolayer on the gas face and/or in the support membrane near the gas face, and a liquid face biolayer on the liquid face and/or in the support membrane near the liquid face.

15. The bioreactor of claim 14 wherein the membranes are arranged in gills, each gill having a pair of membranes arranged in parallel so as to define an inside region.

16. The bioreactor of claim 15 wherein the liquid face biolayer of each of the membranes of each gill abuts the inside region of the gill.

17. The bioreactor of claim 13 comprising an outer housing for housing the membrane(s) and at least a portion of the support.

18. The bioreactor of claim 17 in which the outer housing is opaque to UV radiation.

19. The bioreactor of claim 13 having one or more gas face scrapers for scraping the gas face(s) of the membrane(s).

20. The bioreactor of claim 13 having one or more liquid face scrapers for scraping the liquid face(s) of the membrane(s).

21. The bioreactor of claim 13 wherein the liquid cycling system comprises one or more of:
a pump for pumping the liquid,
an inlet manifold or spraying system for passing the liquid to the membrane, —an outlet manifold for accepting liquid from the membrane,
a reservoir for holding the liquid,
an influent line for passing liquid from the reservoir to the inlet manifold or spraying system,
a effluent line for passing liquid from the outlet manifold to the reservoir, —a reflux line for returning liquid that leaks from the membrane to the inlet manifold or spraying system or to the influent line or to the reservoir, and
a reflux pump for pumping fluid through the reflux line.

22. A process for making a membrane comprising:
providing a support membrane, —contacting a liquid derived from sewage or containing bacteria from sewage with a first face of the support membrane and exposing a second face of the support to a gas containing oxygen,
allowing growth of liquid face bacteria to form a liquid face biolayer on the first face; and—allowing growth of gas face bacteria to form a gas face biolayer on the second face.

23. The process of claim 22 wherein the support membrane comprises:
a support material, and
a gel supported by the support material.

24. The process of claim 23 wherein the step of providing the support membrane comprises the steps of:
infusing a precursor liquid into the support material, said precursor liquid being capable of generating the gel; and
generating the gel on and/or in the support material to form the support membrane.

25. A process for making a bioreactor comprising:
supporting a membrane on a support, said membrane comprising a support membrane having a liquid face and a gas face; a gas face biolayer at a location selected from on the gas face, in the support membrane near the gas face, and both on the gas face and in the support membrane; and a liquid face biolayer at a location selected from on the liquid face, in the support membrane near the liquid face, and both on the liquid face and in the support membrane; and
providing a liquid cycling system for passing a liquid past the membrane.

26. The process of claim 25 wherein a plurality of membranes are supported on the support, said membranes being arranged in parallel pairs so as to form gills, each gill having an inside region defined by the pair of membranes, wherein the liquid face biolayer of each membrane of a pair abuts the inside region.

27. A process for making a bioreactor comprising:
supporting a support membrane on a support;
providing a liquid cycling system for passing a liquid past the support membrane;
contacting a liquid derived from sewage with a first face of the support membrane and exposing a second face of the support to a gas containing oxygen,
allowing growth of liquid face bacteria to form a liquid face biolayer at a location selected from on the first face, in the support membrane near the first face, and both on the first face and in the support membrane; and
allowing growth of gas face bacteria to form a gas face biolayer at a location selected from on the second face, in the support membrane near the second face, and both on the second face and in the support membrane.

28. The process of claim 27 wherein a plurality of support membranes are supported on the support, said support membranes being arranged in precursor gills, whereby each precursor gill comprises a pair of parallel support membranes defining an inside region therebetween.

29. The process of claim 28 wherein the step of contacting a liquid derived from sewage with the first face of the support membrane comprises passing the liquid through the inside region of the precursor gills.

30. A method for treating sewage or some other waste stream, said method comprising:
providing a membrane comprising a support membrane having a liquid face and a gas face; a gas face biolayer at a location selected from on the gas face, in the support membrane near the gas face, and both on the gas face and in the support membrane; and a liquid face biolayer at a location selected from on the liquid face, in the support membrane near the liquid face, and both on the liquid face and in the support membrane;
exposing the liquid face biolayer of the membrane to the sewage or other waste stream; and
exposing the gas face biolayer of the membrane to a gas containing oxygen.

31. The method of claim 30 wherein the sewage or other waste stream comprises clarified raw sewage.

32. The method of claim 30 wherein the step of exposing the liquid face biolayer to the sewage or other waste stream comprises recycling the sewage or other waste stream across or past the liquid face.

33. The method of claim 30 comprising separating solid matter from the sewage or other waste stream.

34. A method for treating sewage comprising:
providing a bioreactor comprising a membrane comprising a support membrane having a liquid face and a gas face; a gas face biolayer at a location selected from on the gas face, in the support membrane near the gas face, and both on the gas face and in the support membrane; and a liquid face biolayer at a location selected from on the liquid face, in the support membrane near the liquid face, and both on the liquid face and in the support membrane; a support for supporting the membrane; and a liquid cycling system for passing a liquid past the membrane, said liquid cycling system comprising a pump for pumping the liquid, an inlet manifold for passing the liquid to the membrane, an outlet manifold for accepting liquid from the membrane, a reservoir for holding the liquid, an influent line for passing liquid from the reservoir to the inlet manifold and an effluent line for passing liquid from the outlet manifold to the reservoir;
passing a liquid derived from the sewage through the inlet manifold and into the inlet;
passing the liquid derived from the sewage past the membrane and out the outlet;
passing the liquid derived from the sewage into the reservoir; and
pumping the liquid derived from the sewage through the influent line to the inlet manifold by means of the pump.

* * * * *